US012566974B2

(12) United States Patent
Krishnan et al.

(10) Patent No.: US 12,566,974 B2
(45) Date of Patent: Mar. 3, 2026

(54) METHOD, SYSTEM, AND COMPUTER PROGRAM PRODUCT FOR KNOWLEDGE GRAPH BASED EMBEDDING, EXPLAINABILITY, AND/OR MULTI-TASK LEARNING

(71) Applicant: Visa International Service Association, San Francisco, CA (US)

(72) Inventors: Adit Krishnan, San Francisco, CA (US); Mahashweta Das, Campbell, CA (US); Mangesh Bendre, Sunnyvale, CA (US); Azita Nouri, Highland Park, NJ (US); Fei Wang, Fremont, CA (US); Hao Yang, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 1067 days.

(21) Appl. No.: 17/495,214

(22) Filed: Oct. 6, 2021

(65) Prior Publication Data

US 2022/0114456 A1 Apr. 14, 2022

Related U.S. Application Data

(60) Provisional application No. 63/092,717, filed on Oct. 16, 2020, provisional application No. 63/089,841, filed on Oct. 9, 2020.

(51) Int. Cl.
| | |
|---|---|
| *G06N 5/02* | (2023.01) |
| *G06F 9/38* | (2018.01) |
| *G06F 18/214* | (2023.01) |
| *G06N 5/045* | (2023.01) |

(52) U.S. Cl.
CPC ............. *G06N 5/02* (2013.01); *G06F 9/3851* (2013.01); *G06F 18/214* (2023.01); *G06N 5/045* (2013.01)

(58) Field of Classification Search
CPC ........ G06N 5/02; G06N 5/045; G06F 9/3851; G06F 18/214
See application file for complete search history.

(56) References Cited

U.S. PATENT DOCUMENTS

| | | | | |
|---|---|---|---|---|
| 11,455,512 | B1* | 9/2022 | Al-Rfou' | G06N 3/08 |
| 2015/0186464 | A1* | 7/2015 | Seputis | G06F 16/24539 707/718 |
| 2020/0167426 | A1* | 5/2020 | Scheideler | G06F 16/9024 |
| 2020/0210228 | A1* | 7/2020 | Wu | G06F 9/4881 |
| 2021/0064959 | A1* | 3/2021 | Gui | G06N 3/045 |
| 2022/0012190 | A1* | 1/2022 | Cheng | G06F 13/4282 |

OTHER PUBLICATIONS

Voudigari et al., "Rank Degree: An Efficient Algorithm for Graph Sampling," 2016 IEEE/ACM International Conference on Advances in Social Networks Analysis and Mining (ASONAM) (Year: 2016).*

(Continued)

*Primary Examiner* — Michael J Huntley
*Assistant Examiner* — Vincent Anton Spraul
(74) *Attorney, Agent, or Firm* — The Webb Law Firm

(57) ABSTRACT

Methods, systems, and computer program products for knowledge graph based embedding, explainability, and/or multi-task learning may connect task-specific inductive models with knowledge graph completion and enrichment processes.

20 Claims, 19 Drawing Sheets

(56) References Cited

OTHER PUBLICATIONS

Zhu et al., "Enhancing Stratified Graph Sampling Algorithms based on Approximate Degree Distribution," 2018, arXiv:1801.04624 (Year: 2018).*

Ying et al., "Graph Convolutional Neural Networks for Web-Scale Recommender Systems," 2018, arXiv:1806.01973v1 (Year: 2018).*

Zhang et al., "Degree-biased random walk for large-scale network embedding," 2019, Future Generation Computer Systems, 100, 198-209 (Year: 2019).*

Liu et al., "Principled Multilayer Network Embedding," 2017, arXiv:1709.03551v3 (Year: 2017).*

Hubler et al., "Metropolis Algorithms for Representative Subgraph Sampling," 2008, Eighth IEEE International Conference on Data Mining (Year: 2008).*

Bhatia et al., "An Efficient Algorithm for Sampling of a Single Large Graph," 2018, Tenth International Conference on Contemporary Computing (Year: 2018).*

Al et al., "Learning Heterogeneous Knowledge Base Embeddings for Explainable Recommendation", Algorithms, 2018, vol. 11, No. 9, pp. 1-17.

Bordes et al., "Translating Embeddings for Modeling Multi-relational Data", Advances in Neural Information Processing Systems (NIPS), 2018, pp. 1-9.

Cao et al., "Unifying Knowledge Graph Learning and Recommendation: Towards a Better Understanding of User Preferences", International World Wide Web Conference (WWW), 2019, pp. 1-11.

Casale et al., "Gaussian Process Prior Variational Autoencoders", Advances in Neural Information Processing Systems (NIPS), 2018, pp. 1-18.

Chandrahas et al., "Towards Understanding the Geometry of Knowledge Graph Embeddings", ACL, 2018, pp. 122-131.

Chen et al., "Embedding Uncertain Knowledge Graphs", Thirty-Third AAAI Conference on Artificial Intelligence, 2019, pp. 3363-3370.

Cheng et al., "Knowledge Graph-based Event Embedding Framework for Financial Quantitative Investments", International Conference on Research and Development in Information Retrieval (SIGIR), 2020, pp. 2221-2230.

Daume, III, et al., "Domain Adaptation for Statistical Classifiers", Journal of Artificial Intelligence Research 26, 2006, pp. 101-126.

Ernst et al., "KnowLife: a versatile approach for constructing a large knowledge graph for biomedical sciences", BMC Bioinformatics, 2015, vol. 16, No. 157, pp. 1-13.

Foerster et al., "Counterfactual Multi-Agent Policy Gradients", Thirty-Second AAAI Conference on Artificial Intelligence, 2018, pp. 2974-2982.

Guo et al., "Knowledge Graph Embedding with Iterative Guidance from Soft Rules", Thirty-Second AAAI Conference on Artificial Intelligence, 2017, pp. 4816-4823.

He et al., "Translation-based Recommendation", Eleventh ACM Conference on Recommender Systems, ACM, 2017, pp. 161-169.

Huang et al., "Knowledge Graph Embedding Based Question Answering", International Conference on Web Search and Data Mining (WSDM), 2019, pp. 1-9.

Inokuchi et al., "Complete Mining of Frequent Patterns from Graphs: Mining Graph Data", Journal of Machine earning vol. 50, No. 3, 2003, pp. 321-354.

Jagerman et al., "To Model or to Intervene: A Comparison of Counterfactual and Online Learning to Rank from User Interactions", 42nd International ACM SIGIR Conference on Research and Development in Information Retrieval, 2019, pp. 15-24.

Ji et al., "Knowledge Graph Completion with Adaptive Sparse Transfer Matrix", Thirtieth AAAI Conference on Artificial Intelligence, 2016, pp. 985-991.

Ji et al., "Knowledge Graph Embedding via Dynamic Mapping Matrix", Association for Computational Linguistics and International Joint Conference on Natural Language Processing (ACL-IJCNLP), 2015, pp. 687-696.

Jia et al., "Locally Adaptive Translation for Knowledge Graph Embedding", Thirtieth AAAI Conference on Artificial Intelligence, 2016, pp. 992-998.

Joachims et al., "Counterfactual Evaluation and Learning for Search, Recommendation and Ad Placement", 39th International ACM SIGIR Conference on Research and Development in Information Retrieval, 2016, pp. 1199-1201.

Johansson et al., "Learning Representations for Counterfactual Inference", 33rd International Conference on Machine Learning (ICML), 2016, pp. 1-10.

"Knowledge Graphs for Financial Services", Deloitte, White Report, 2020, pp. 1-16.

Krishnan et al., "Insights from the Long-Tail: Learning Latent Representations of Online User Behavior in the Presence of Skew and Sparsity", International Conference on Information and Knowledge Management (CIKM), 2018, pp. 297-306.

Krishnan et al., "Transfer Learning via Contextual Invariants for One-to-Many Cross-Domain Recommendation", Association for Computing Machinery (ACM), 2020, pp. 1-10.

Kusner et al., "Counterfactual Fairness", 31st Conference on Neural Information Processing Systems (NIPS), 2017, pp. 1-18.

Lerer et al., "PyTorch-BigGraph: A Large-scale Graph Embedding System", 2nd SysML Conference, 2019, pp. 1-12.

Li et al., "Unit Selection Based on Counterfactual Logic", International Joint Conferences on Artificial Intelligence (IJCAI), 2019, pp. 1-96.

Li, "Zipf's Law Everywhere", Glottometrics 5, 2002, pp. 14-21.

Lin et al., "Learning Entity and Relation Embeddings for Knowledge Graph Completion", Twenty-Ninth AAAI Conference on Artificial Intelligence, 2015, pp. 2181-2187.

Loughlin, "Why Knowledge Graph for Financial Services? Real World Use Cases", Cambridge Semantics Blog, 2019, pp. 1-10.

Mansour et al., "Domain Adaptation: Learning Bounds and Algorithms", 2009, pp. 1-16.

Mikolov et al., "Distributed Representations of Words and Phrases and their Compositionality", NIPS, 2013, pp. 1-9.

Morgan et al., "Counterfactuals and Causal Inference", Cambridge University Press, 2015, pp. 1-319.

Mothilal et al., "Explaining Machine Learning Classifiers through Diverse Counterfactual Explanations", 2020 Conference on Fairness, Accountability, and Transparency, 2020, pp. 607-617.

Narita et al., "Efficient Counterfactual Learning from Bandit Feedback", Thirty-Third AAAI Conference on Artificial Intelligence, 2019, pp. 4634-4641.

Nguyen et al., "A Capsule Network-based Embedding Model for Knowledge Graph Completion and Search Personalization", North American Chapter of the Association for Computational Linguistics: Human Language Technologies (NAACL-HLT), Association for Computational Linguistics, 2019, pp. 2180-2189.

Nickel et al., "An Analysis of Tensor Models for Learning on Structured Data", European Conference on Machine Learning and Principles and Practice of Knowledge Discovery in Databases (ECML PKDD), 2013, pp. 272-287.

Nickel et al., "Tensor Factorization for Multi-relational Learning", European Conference on Machine Learning and Principles and Practice of Knowledge Discovery in Databases (ECML PKDD), 2018, pp. 617-621.

Ouyang et al., "Query Associations Over Big Financial Knowledge Graph", Big SDM, 2019, pp. 199-211.

Pasricha et al., "Translation-based Factorization Machines for Sequential Recommendation", International Conference on Recommender Systems (RecSys), 2018, pp. 1-9.

Pearl, "Causal Diagrams for Empirical Research", Biometrika, 1994, vol. 82, No. 4, pp. 1-36.

Perozzi et al., "DeepWalk: Online Learning of Social Representations", 20th ACM SIGKDD International Conference on Knowledge Discovery and Data Mining, 2014, pp. 701-710.

Ren et al., "Query2box: Reasoning over Knowledge Graphs in Vector Space using Box Embeddings", ICLR 2020, 2020, pp. 1-17.

Rubin, "Estimating Causal Effects of Treatments in Randomized And Nonrandomized Studies", Journal of Educational Psychology, 1974, vol. 66, No. 5, pp. 688-701.

(56) References Cited

OTHER PUBLICATIONS

Sun et al., "Recurrent Knowledge Graph Embedding For Effective Recommendation", International Conference on Recommender Systems (RecSys), 2018, pp. 297-305.

Sun et al., "Rotate: Knowledge Graph Embedding by Relational Rotation in Complex Space", ICLR 2019, 2019, pp. 1-18.

Tang et al., "LINE: Large-scale Information Network Embedding", International World Wide Web Conference Committee (IW3C2), 2015, pp. 1067-1077.

Trouillon et al., "Complex Embeddings for Simple Link Prediction", 33rd International Conference on Machine Learning (ICML), 2016, pp. 1-10.

Wang et al., "Explainable Reasoning over Knowledge Graphs for Recommendation", Thirty-Third AAAI Conference on Artificial Intelligence, 2019, pp. 5329-5336.

Wang et al., "KGAT: Knowledge Graph Attention Network for Recommendation", International Conference on Knowledge Discovery Data Mining (SIGKDD), 2019, pp. 1-9.

Wang et al., "Knowledge Graph Embedding by Translating on Hyperplanes", Twenty-Eighth AAAI Conference on Artificial Intelligence, 2014, pp. 1112-1119.

Wang et al., "XLore: A Largescale English-Chinese Bilingual Knowledge Graph", International SemanticWeb Conference (ISWC), 2013, pp. 1-4.

Yang et al., "Embedding Entities and Relations for Learning and Inference in Knowledge Bases", ICLR 2015, 2014, pp. 1-12.

Zalite, "Case study: The Practicalities of building an enterprise knowledge graph", Data Management Summit in New York, Deutsche Bank, 2019, pp. 1-10.

* cited by examiner

500

502

Obtain graph including first layer

504

Select and aggregate first nodes and first edges from first layer to generate intermediate layer

506

Generate embeddings based on intermediate layer

600

602

Obtain output of machine learning model trained using embeddings

604

Determine variance for each entity attribute type

606

Determine statistical significance for entity attribute type

608

Normalize statistical significance

610

Generate explanation of output of machine learning model

800

802

Obtain embeddings for nodes in graph

804

Generate primary counterfactual link

806

Determine secondary counterfactual link

808

Determine factual link

810

Learn residual function

900

902

Obtain embeddings for nodes in graph

904

Generate primary counterfactual link

906

Determine factual link

908

Generate soft alignment of entity pair
of factual link

910

Update parameters of machine
learning model using objective function

1100

METHOD, SYSTEM, AND COMPUTER PROGRAM PRODUCT FOR KNOWLEDGE GRAPH BASED EMBEDDING, EXPLAINABILITY, AND/OR MULTI-TASK LEARNING

CROSS REFERENCE TO RELATED APPLICATIONS

This application claims priority to U.S. Provisional Patent Application No. 63/089,841, filed Oct. 9, 2020, and U.S. Provisional Patent Application No. 63/092,717, filed Oct. 16, 2020, the entire disclosures of each of which are incorporated herein by reference.

BACKGROUND

1. Field

This disclosure relates to knowledge graphs and, in some non-limiting embodiments or aspects, to knowledge graph based embedding, explainability, and/or multi-task learning.

2. Technical Considerations

A knowledge graph may include a formal way of structuring data in a domain in graph form by representing entities (e.g., cardholders, merchants, etc.) as nodes and relationships between entities (e.g., cardholder transacted at merchant, etc.) as edges. A knowledge graph may enable machines to incorporate human expertise for making meaningful decisions. A knowledge graph may unite machine learning and graph technologies to give artificial intelligence the context to solve complex real problems. In the last decade, tech companies have invested millions of dollars to create their own knowledge graphs. Financial organizations have started deploying knowledge graphs with the intent of addressing big data management challenges and performing cognitive inferences.

SUMMARY

Accordingly, provided are improved systems, devices, products, apparatus, and/or methods for knowledge graph based embedding, explainability, and/or multi-task learning.

According to some non-limiting embodiments or aspects, provided is a computer-implemented method including: reading, with at least one processor, in parallel, with a plurality of threads, graph data associated with a plurality of edges and a plurality of nodes for the plurality of edges of a graph; for each edge of the plurality of edges, with a thread of the plurality of threads that read the graph data associated with that edge, one of: (i) discarding that edge, (ii) sampling that edge to generate one or more samples and providing the one or more samples to a random queue of a plurality of queues, and (iii) oversampling that edge to generate the one or more samples and providing the one or more samples to the random queue of the plurality of queues, based on frequencies of nodes for that edge, wherein the plurality of queues corresponds to a plurality of groups of threads; and training, with at least one other processor, in parallel, with the plurality of groups of threads, a plurality of embeddings of a plurality of samples provided to the plurality of queues.

In some non-limiting embodiments or aspects, at least one central processing unit (CPU) executes the plurality of threads, and wherein a different graphics processing unit (GPU) of a plurality of GPUs executes each group of threads of the plurality of groups of threads.

In some non-limiting embodiments or aspects, the method further includes: converting, with the at least one processor, using a hash table, the graph to the graph data associated with the plurality of edges of the graph, wherein the graph data associated with the plurality of edges of the graph includes frequencies of the plurality of edges and frequencies of nodes for the plurality of edges.

In some non-limiting embodiments or aspects, the plurality of nodes includes a plurality of different types of nodes, and wherein for each edge of the plurality of edges, the thread of the plurality of threads that read the graph data associated with that edge determines to perform the one of: (i), (ii), and (iii) based on the frequencies of the nodes for that edge only with respect to frequencies of other nodes of a same type of node of the plurality of different types of nodes.

In some non-limiting embodiments or aspects, providing the one or more samples to the random queue of the plurality of queues further includes: for each of the one or more samples, determining, with the at least one processor, a distance between that sample and a negative sample including at least one of a different node than that sample, a same node having a different node type than the same node of that sample, and a same edge having a different edge type than the same edge of that sample; and in response to determining that the distance satisfies a threshold distance, providing, with the at least one processor, the negative sample to the random queue of the plurality of queues.

In some non-limiting embodiments or aspects, training, with the at least one other processor, in parallel, with the plurality of groups of threads, the plurality of embeddings includes: for each queue of the plurality of queues, generating, with a group of threads of the plurality of groups of threads corresponding to that queue, node embeddings for two nodes and an edge embedding for an edge connecting the two nodes, based on samples provided to that queue, using an objective function that depends on embeddings of two nodes and an embedding of an edge connecting the two nodes; and storing, in a shared memory, with each group of threads of the plurality of groups of threads, the embeddings generated by that group of threads.

In some non-limiting embodiments or aspects, the plurality of queues corresponding to the plurality of groups of threads further correspond to a plurality of intermediate threads, the method further including: for each queue of the plurality of queues, with an intermediate thread of the plurality of intermediate threads corresponding to that queue: determining, with the at least one processor, that (i) the queue is at full capacity and (ii) the group of threads corresponding to that queue is ready for a next batch of training samples; and in response to determining that (i) the queue is at full capacity and (ii) the group of threads corresponding to that queue is ready for the next batch of training samples, copying, with the at least one processor, the samples provided to that queue from that queue to a memory of the group of threads corresponding to that queue.

In some non-limiting embodiments or aspects, the objective function is defined according to the following Equation:

$$L = \sum_{R_r \in R} \sum_{(e_1, r, e_2) \in R_r} \sigma\left(r\left(\vec{e}_1 \otimes \vec{e}_2\right)\right)$$

where $\vec{e}_1$, $\vec{e}_2$, and r respectively denote an embedding representation of the two intermediate nodes and the connecting edge of the two intermediate nodes, and wherein $\sigma(x)=1/(1+e^{-x})$.

According to some non-limiting embodiments or aspects, provided is a system including: at least one central processing unit (CPU) programmed and/or configured to: read, in parallel, with a plurality of threads, graph data associated with a plurality of edges and a plurality of nodes for the plurality of edges of a graph; and for each edge of the plurality of edges, with a thread of the plurality of threads that read the graph data associated with that edge, one of: (i) discard that edge, (ii) sample that edge to generate one or more samples and provide the one or more samples to a random queue of a plurality of queues, and (iii) oversample that edge to generate the one or more samples and provide the one or more samples to the random queue of the plurality of queues, based on frequencies of nodes for that edge, wherein the plurality of queues corresponds to a plurality of groups of threads; and a plurality of graphics processing units (GPUs), wherein a different GPU of the plurality of GPUs executes each group of threads of the plurality of groups of threads, and wherein the plurality of GPUs are programmed and/or configured to: train, in parallel, with the plurality of groups of threads, a plurality of embeddings of a plurality of samples provided to the plurality of queues.

In some non-limiting embodiments or aspects, the at least one CPU is further programmed and/or configured to: convert, using a hash table, the graph to the graph data associated with the plurality of edges of the graph, wherein the graph data associated with the plurality of edges of the graph includes frequencies of the plurality of edges and frequencies of nodes for the plurality of edges.

In some non-limiting embodiments or aspects, the plurality of nodes includes a plurality of different types of nodes, and wherein for each edge of the plurality of edges, the thread of the plurality of threads that read the graph data associated with that edge determines to perform the one of: (i), (ii), and (iii) based on the frequencies of the nodes for that edge only with respect to frequencies of other nodes of a same type of node of the plurality of different types of nodes.

In some non-limiting embodiments or aspects, the at least one CPU is further programmed and/or configured to provide the one or more samples to the random queue of the plurality of queues by: for each of the one or more samples, determine a distance between that sample and a negative sample including at least one of a different node than that sample, a same node having a different node type than the same node of that sample, and a same edge having a different edge type than the same edge of that sample; and in response to determining that the distance satisfies a threshold distance, provide the negative sample to the random queue of the plurality of queues.

In some non-limiting embodiments or aspects, the plurality of GPUs are programmed and/or configured to train, in parallel, with the plurality of groups of threads, the plurality of embeddings by: for each queue of the plurality of queues, generating, with a group of threads of the plurality of groups of threads corresponding to that queue, node embeddings for two nodes and an edge embedding for an edge connecting the two nodes, based on samples provided to that queue, using an objective function that depends on embeddings of two nodes and an embedding of an edge connecting the two nodes; and storing, in a shared memory, with each group of threads of the plurality of groups of threads, the embeddings generated by that group of threads.

In some non-limiting embodiments or aspects, the plurality of queues corresponding to the plurality of groups of threads further correspond to a plurality of intermediate threads, and wherein the at least one CPU is further programmed and/or configured to: for each queue of the plurality of queues, with an intermediate thread of the plurality of intermediate threads corresponding to that queue: determine, that (i) the queue is at full capacity and (ii) the GPU of the group of threads corresponding to that queue is ready for a next batch of training samples; and in response to determining that (i) the queue is at full capacity and (ii) the group of threads corresponding to that queue is ready for the next batch of training samples, copy the samples provided to that queue from that queue to a memory of the GPU of the group of threads corresponding to that queue.

In some non-limiting embodiments or aspects, the objective function is defined according to the following Equation:

$$L = \sum_{R_r \in R} \sum_{(e_{r_1}, r, e_{r_2}) \in R_r} \sigma\left(r \cdot \left(e_{r_1} \otimes e_{r_2}\right)\right),$$

wherein $e_{r1}$, $e_{r2}$ and r respectively denote an embedding representation of the two nodes and the connecting edge of the two nodes, and wherein $\sigma(x)=1/(1+e^{-x})$.

According to some non-limiting embodiments or aspects, provided is a computer program product comprising at least one non-transitory computer-readable medium including program instructions that, when executed by at least one processor, cause the at least one processor to: read, in parallel, with a plurality of threads, graph data associated with a plurality of edges and a plurality of nodes for the plurality of edges of a graph; for each edge of the plurality of edges, with a thread of the plurality of threads that read the graph data associated with that edge, one of: (i) discard that edge, (ii) sample that edge to generate one or more samples and provide the one or more samples to a random queue of a plurality of queues, and (iii) oversample that edge to generate the one or more samples and provide the one or more samples to the random queue of the plurality of queues, based on frequencies of nodes for that edge, wherein the plurality of queues corresponds to a plurality of groups of threads; and train, in parallel, with the plurality of groups of threads, a plurality of embeddings of a plurality of samples provided to the plurality of queues.

In some non-limiting embodiments or aspects, the at least one processor includes at least one central processing unit (CPU) and a plurality of graphics processing units (GPUs), wherein the at least one CPU executes the plurality of threads, and wherein a different GPU of the plurality of GPUs executes each group of threads of the plurality of groups of threads.

In some non-limiting embodiments or aspects, the plurality of groups of threads, train, in parallel, the plurality of embeddings by: for each queue of the plurality of queues, generating, with a group of threads of the plurality of groups of threads corresponding to that queue, node embeddings for two nodes and an edge embedding for an edge connecting the two nodes, based on samples provided to that queue, using an objective function that depends on embeddings of two nodes and an embedding of an edge connecting the two nodes; and storing, in a shared memory, with each group of threads of the plurality of groups of threads, the embeddings generated by that group of threads.

In some non-limiting embodiments or aspects, the plurality of queues corresponding to the plurality of groups of threads further correspond to a plurality of intermediate threads, and wherein the instructions cause the at least one CPU to execute the plurality of intermediate threads to: for each queue of the plurality of queues, with an intermediate thread of the plurality of intermediate threads corresponding to that queue: determine, that (i) the queue is at full capacity and (ii) the group of threads corresponding to that queue is ready for a next batch of training samples; and in response to determining that (i) the queue is at full capacity and (ii) the group of threads corresponding to that queue is ready for the next batch of training samples, copy the samples provided to that queue from that queue to a memory of the group of threads corresponding to that queue.

In some non-limiting embodiments or aspects, the objective function is defined according to the following Equation:

$$L = \sum_{R_r \in R} \sum_{(e_1, r, e_2) \in R_r} \sigma\!\left(r\!\left(\vec{e}_1 \otimes \vec{e}_2\right)\right)$$

where $\vec{e}_1$, $\vec{e}_2$, and r respectively denote an embedding representation of the two intermediate nodes and the connecting edge of the two intermediate nodes, and wherein $\sigma(x)=1/(1+e^{-x})$.

According to some non-limiting embodiments or aspects, provided is a computer-implemented method including: obtaining, with at least one processor, a graph including a first layer including a plurality of first edges and a plurality of first nodes for the plurality of first edges, wherein the plurality of first nodes is associated with the plurality of entities, and wherein the plurality of first edges is associated with a plurality of first relationships between the plurality of entities; selecting and aggregating, with at least one processor, according to at least one function, a first subset of edges from the plurality of first edges and a first subset of nodes from the plurality of first nodes to generate an intermediate layer including a plurality of intermediate edges and a plurality of intermediate nodes for the plurality of intermediate edges, wherein the plurality of intermediate nodes is associated with a plurality of intermediate entities, and wherein the plurality of intermediate edges is associated with a plurality of intermediate relationships between the plurality of intermediate entities; and generating, with at least one processor, based on the intermediate layer, an embedding layer including embeddings for the plurality of intermediate edges and the plurality of intermediate nodes for the plurality of intermediate edges using an objective function that depends on the embeddings of two intermediate nodes and an intermediate edge connecting the two intermediate nodes.

In some non-limiting embodiments or aspects, selecting and aggregating, according to the at least one function, the first subset of edges from the plurality of first edges and the first subset of nodes from the plurality of first nodes to generate the intermediate layer further includes: selecting and aggregating, according to a to a first function, the first subset of edges from the plurality of first edges and the first subset of nodes from the plurality of first nodes to generate a second layer including a plurality of second edges and a plurality of second nodes for the plurality of second edges, wherein the plurality of second nodes is associated with the plurality of entities, and wherein the plurality of second edges is associated with a plurality of second relationships between the plurality of entities; and selecting and aggregating, according to a second function, a second subset of edges from the plurality of first edges and the plurality of second edges and a second subset of nodes from the plurality of first nodes and the plurality of second nodes to generate as the intermediate layer a third layer including a plurality of third edges as the plurality of intermediate edges and a plurality of third nodes as the plurality of intermediate nodes for the plurality of third edges, wherein the plurality of third nodes is associated with a plurality of third entities, and wherein the plurality of third edges is associated with a plurality of third relationships between the plurality of third entities.

In some non-limiting embodiments or aspects, the objective function is defined according to the following equation:

$$L = \sum_{R_r \in R} \sum_{(e_1, r, e_2) \in R_r} \sigma\!\left(r\!\left(\vec{e}_1 \otimes \vec{e}_2\right)\right)$$

where $\vec{e}_1$, $\vec{e}_2$, and r respectively denote an embedding representation of the two intermediate nodes and the connecting edge of the two intermediate nodes, and wherein $\sigma(x)=1/(1+e^{-x})$.

In some non-limiting embodiments or aspects, the objective function further depends on types of entities associated with the two intermediate nodes.

In some non-limiting embodiments or aspects, the objective function is defined according to the following equation:

$$\sigma_A(O_{Er1}(e_{r1}, r), O_{Er2}(e_{r2}, r))$$

wherein $\sigma_A$ is an alignment function that is the same for any pair of intermediate entity types $E_{r1}$, $E_{r2}$, wherein $e_{r1}$, $e_{r2}$ and r respectively denote an embedding representation of the two intermediate nodes and the connecting edge of the two intermediate nodes, wherein $O_{Er1}$ and $O_{Er2}$ respectively denote two projection operations depending on an entity type of a head entity $E_{r1}$ and an entity type of tail entity $E_{r2}$ of the two intermediate nodes $e_{r1}$, $e_{r2}$ for the connecting intermediate edge r.

In some non-limiting embodiments or aspects, generating the embeddings further includes: selecting a further subset of nodes from the plurality of intermediate nodes that have a threshold number of intermediate edges between a same two intermediate nodes; generating, based on only the further subset of nodes and the intermediate edges between the further subset of nodes, the embeddings for the further subset of nodes and the intermediate edges between the further subset of nodes using the objective function that depends on the embeddings of the two intermediate nodes and the intermediate edge connecting the two intermediate nodes; and generating, based on (i) the embeddings for the further subset of nodes and the intermediate edges between the further subset of nodes and (ii) the remaining intermediate nodes of the plurality of intermediate nodes not included in the further subset of nodes and the intermediate edges between the remaining intermediate nodes, the embeddings for the remaining intermediate nodes of the plurality of intermediate nodes not included in the further subset of nodes and the intermediate edges between the remaining intermediate nodes, using the objective function that depends on the embeddings of the two intermediate nodes and the intermediate edge connecting the two intermediate nodes, without updating the embeddings for the further subset of nodes and the intermediate edges between the further subset of nodes.

In some non-limiting embodiments or aspects, the method further includes: obtaining, with the at least one processor, an output of a machine learning model generated based on an input to the machine learning model, wherein the machine learning model is trained using the embeddings for the plurality of intermediate edges and the plurality of intermediate nodes for the plurality of intermediate edges, wherein the input includes a first intermediate entity of the plurality of intermediate entities and one or more intermediate entities of the plurality of intermediate entities having a different entity type than the first intermediate entity, and wherein the output includes at least one intermediate entity of the plurality of intermediate entities having a same entity type as the one or more intermediate entities, and wherein the same entity type is associated with a plurality of entity attribute types $A_1, A_2, \ldots A_n$; determining, with the at least one processor, for each entity attribute type $A_i$ of the plurality of entity attribute types $A_1, A_2, \ldots A_n$, a variance of that entity attribute type Variance($A_i$) as a cardinality of that entity attribute type Cardinality($A_i$) over the one or more intermediate entities included in the input; determining, with the at least one processor, for each entity attribute type $A_i$ for which the at least one intermediate entity in the output has a value $a_j$, a statistical significance of that entity attribute type Statistical Significance ($A$; $=a_j$) as a number of the one or more intermediate entities in the input that have a value $a_j$ for that entity attribute type $A_i$ divided by the variance of that entity attribute type Variance($A_i$); normalizing, with the at least one processor, to a 0 to 1 range the statistical significance of each entity attribute type Statistical Significance ($A_i=a_j$)~[0, 1]; and generating, with the at least one processor, based on the normalized statistical significance of each entity attribute type Statistical Significance ($A_i=a_j$)~[0, 1], an explanation for the output of the machine learning model.

According to some non-limiting embodiments or aspects, provided is a system including: at least one processor programmed and/or configured to: obtain a graph including a first layer including a plurality of first edges and a plurality of first nodes for the plurality of first edges, wherein the plurality of first nodes is associated with the plurality of entities, and wherein the plurality of first edges is associated with a plurality of first relationships between the plurality of entities; select and aggregate, according to at least one function, a first subset of edges from the plurality of first edges and a first subset of nodes from the plurality of first nodes to generate an intermediate layer including a plurality of intermediate edges and a plurality of intermediate nodes for the plurality of intermediate edges, wherein the plurality of intermediate nodes is associated with a plurality of intermediate entities, and wherein the plurality of intermediate edges is associated with a plurality of intermediate relationships between the plurality of intermediate entities; and generate, based on the intermediate layer, an embedding layer including embeddings for the plurality of intermediate edges and the plurality of intermediate nodes for the plurality of intermediate edges using an objective function that depends on the embeddings of two intermediate nodes and an intermediate edge connecting the two intermediate nodes.

In some non-limiting embodiments or aspects, the at least one processor is further programmed and/or configured to select and aggregate, according to the at least one function, the first subset of edges from the plurality of first edges and the first subset of nodes from the plurality of first nodes to generate the intermediate layer further by: selecting and aggregating, according to a to a first function, the first subset of edges from the plurality of first edges and the first subset of nodes from the plurality of first nodes to generate a second layer including a plurality of second edges and a plurality of second nodes for the plurality of second edges, wherein the plurality of second nodes is associated with the plurality of entities, and wherein the plurality of second edges is associated with a plurality of second relationships between the plurality of entities; and selecting and aggregating, according to a second function, a second subset of edges from the plurality of first edges and the plurality of second edges and a second subset of nodes from the plurality of first nodes and the plurality of second nodes to generate as the intermediate layer a third layer including a plurality of third edges as the plurality of intermediate edges and a plurality of third nodes as the plurality of intermediate nodes for the plurality of third edges, wherein the plurality of third nodes is associated with a plurality of third entities, and wherein the plurality of third edges is associated with a plurality of third relationships between the plurality of third entities.

In some non-limiting embodiments or aspects, the objective function is defined according to the following equation:

$$L = \sum_{R_r \in R} \sum_{(e_1, r, e_2) \in R_r} \sigma\left(r\left(\vec{e}_1 \otimes \vec{e}_2\right)\right)$$

where $\vec{e}_1$, $\vec{e}_2$, and r respectively denote an embedding representation of the two intermediate nodes and the connecting edge of the two intermediate nodes, and wherein $\sigma(x)=1/(1+e^{-x}))$.

In some non-limiting embodiments or aspects, the objective function further depends on types of entities associated with the two intermediate nodes.

In some non-limiting embodiments or aspects, the objective function is defined according to the following equation:

$$\sigma_A(O_{Er1}(e_{r1}, r), O_{Er2}(e_{r2}, r))$$

wherein $\sigma_A$ is an alignment function that is the same for any pair of intermediate entity types $E_{r1}$, $E_{r2}$, wherein $e_{r1}$, $e_{r2}$ and r respectively denote an embedding representation of the two intermediate nodes and the connecting edge of the two intermediate nodes, wherein $O_{Er1}$ and $O_{Er2}$ respectively denote two projection operations depending on an entity type of a head entity $E_{r1}$ and an entity type of tail entity $E_{r2}$ of the two intermediate nodes $e_{r1}$, $e_{r2}$ for the connecting intermediate edge r.

In some non-limiting embodiments or aspects, the at least one processor is further programmed and/or configured to generate generating the embeddings by: selecting a further subset of nodes from the plurality of intermediate nodes that have a threshold number of intermediate edges between a same two intermediate nodes; generating, based on only the further subset of nodes and the intermediate edges between the further subset of nodes, the embeddings for the further subset of nodes and the intermediate edges between the further subset of nodes using the objective function that depends on the embeddings of the two intermediate nodes and the intermediate edge connecting the two intermediate nodes; and generating, based on (i) the embeddings for the further subset of nodes and the intermediate edges between the further subset of nodes and (ii) the remaining intermediate nodes of the plurality of intermediate nodes not included in the further subset of nodes and the intermediate edges between the remaining intermediate nodes, the embeddings for the remaining intermediate nodes of the plurality of intermediate nodes not included in the further subset of nodes and the intermediate edges between the remaining intermediate nodes, using the objective function that depends on the embeddings of the two intermediate nodes and the intermediate edge connecting the two intermediate nodes, without updating the embeddings for the further subset of nodes and the intermediate edges between the further subset of nodes.

In some non-limiting embodiments or aspects, the at least one processor is further programmed and/or configured to: obtain an output of a machine learning model generated based on an input to the machine learning model, wherein the machine learning model is trained using the embeddings for the plurality of intermediate edges and the plurality of intermediate nodes for the plurality of intermediate edges, wherein the input includes a first intermediate entity of the plurality of intermediate entities and one or more intermediate entities of the plurality of intermediate entities having a different entity type than the first intermediate entity, and wherein the output includes at least one intermediate entity of the plurality of intermediate entities having a same entity type as the one or more intermediate entities, and wherein the same entity type is associated with a plurality of entity attribute types $A_1$, $A_2$, . . . $A_n$; determine, for each entity attribute type $A_i$ of the plurality of entity attribute types $A_1$, $A_2$, . . . $A_n$, a variance of that entity attribute type Variance ($A_i$) as a cardinality of that entity attribute type Cardinality ($A_i$) over the one or more intermediate entities included in the input; determine, for each entity attribute type $A_i$ for which the at least one intermediate entity in the output has a value $a_j$, a statistical significance of that entity attribute type Statistical Significance ($A_i$=$a_j$) as a number of the one or more intermediate entities in the input that have a value $a_j$ for that entity attribute type $A_i$ divided by the variance of that entity attribute type Variance($A_i$); normalize, to a 0 to 1 range the statistical significance of each entity attribute type Statistical Significance ($A_i$=$a_j$)~[0, 1]; and generate, based on the normalized statistical significance of each entity attribute type Statistical Significance ($A_i$=$a_j$)~[0, 1], an explanation for the output of the machine learning model.

According to some non-limiting embodiments or aspects, provided is a computer program product comprising at least one non-transitory computer-readable medium including program instructions that, when executed by at least one processor, cause the at least one processor to: obtain a graph including a first layer including a plurality of first edges and a plurality of first nodes for the plurality of first edges, wherein the plurality of first nodes is associated with the plurality of entities, and wherein the plurality of first edges is associated with a plurality of first relationships between the plurality of entities; select and aggregate, according to at least one function, a first subset of edges from the plurality of first edges and a first subset of nodes from the plurality of first nodes to generate an intermediate layer including a plurality of intermediate edges and a plurality of intermediate nodes for the plurality of intermediate edges, wherein the plurality of intermediate nodes is associated with a plurality of intermediate entities, and wherein the plurality of intermediate edges is associated with a plurality of intermediate relationships between the plurality of intermediate entities; and generate, based on the intermediate layer, an embedding layer including embeddings for the plurality of intermediate edges and the plurality of intermediate nodes for the plurality of intermediate edges using an objective function that depends on the embeddings of two intermediate nodes and an intermediate edge connecting the two intermediate nodes.

In some non-limiting embodiments or aspects, the instructions, when executed by the at least one processor, further cause the at least one processor to select and aggregate, according to the at least one function, the first subset of edges from the plurality of first edges and the first subset of nodes from the plurality of first nodes to generate the intermediate layer further by: selecting and aggregating, according to a to a first function, the first subset of edges from the plurality of first edges and the first subset of nodes from the plurality of first nodes to generate a second layer including a plurality of second edges and a plurality of second nodes for the plurality of second edges, wherein the plurality of second nodes is associated with the plurality of entities, and wherein the plurality of second edges is associated with a plurality of second relationships between the plurality of entities; and selecting and aggregating, according to a second function, a second subset of edges from the plurality of first edges and the plurality of second edges and a second subset of nodes from the plurality of first nodes and the plurality of second nodes to generate as the intermediate layer a third layer including a plurality of third edges as the plurality of intermediate edges and a plurality of third nodes as the plurality of intermediate nodes for the plurality of third edges, wherein the plurality of third nodes is associated with a plurality of third entities, and wherein the plurality of third edges is associated with a plurality of third relationships between the plurality of third entities.

In some non-limiting embodiments or aspects, the objective function is defined according to the following equation:

$$L = \sum_{R_r \in R} \sum_{(e_1, r, e_2) \in R_r} \sigma\left(r\left(\vec{e}_1 \otimes \vec{e}_2\right)\right)$$

where $\vec{e}_1$, $\vec{e}_2$, and r respectively denote an embedding representation of the two intermediate nodes and the connecting edge of the two intermediate nodes, and wherein $\sigma(x) = 1/(1+e^{-x})$).

In some non-limiting embodiments or aspects, the objective function further depends on types of entities associated with the two intermediate nodes.

In some non-limiting embodiments or aspects, the objective function is defined according to the following equation:

$$\sigma_A(O_{Er1}(e_{r1}, r), O_{Er2}(e_{r2}, r))$$

wherein $\sigma_A$ is an alignment function that is the same for any pair of intermediate entity types $E_{r1}$, $E_{r2}$, wherein $e_{r1}$, $e_{r2}$ and r respectively denote an embedding representation of the two intermediate nodes and the connecting edge of the two intermediate nodes, wherein $O_{Er1}$ and $O_{Er2}$ respectively denote two projection operations depending on an entity type of a head entity $E_{r1}$ and an entity type of tail entity $E_{r2}$ of the two intermediate nodes $e_{r1}$, $e_{r2}$ for the connecting intermediate edge r.

In some non-limiting embodiments or aspects, the instructions, when executed by the at least one processor, further cause the at least one processor to generate the embeddings by: selecting a further subset of nodes from the plurality of intermediate nodes that have a threshold number of intermediate edges between a same two intermediate nodes; generating, based on only the further subset of nodes and the intermediate edges between the further subset of nodes, the embeddings for the further subset of nodes and the intermediate edges between the further subset of nodes using the objective function that depends on the embeddings of the two intermediate nodes and the intermediate edge connecting the two intermediate nodes; and generating, based on (i) the embeddings for the further subset of nodes and the intermediate edges between the further subset of nodes and (ii) the remaining intermediate nodes of the plurality of intermediate nodes not included in the further subset of nodes and the intermediate edges between the remaining intermediate nodes, the embeddings for the remaining intermediate nodes of the plurality of intermediate nodes not included in the further subset of nodes and the intermediate edges between the remaining intermediate nodes, using the objective function that depends on the embeddings of the two intermediate nodes and the intermediate edge connecting the two intermediate nodes, without updating the embeddings for the further subset of nodes and the intermediate edges between the further subset of nodes.

In some non-limiting embodiments or aspects, the instructions, when executed by the at least one processor, further cause the at least one processor to: obtain an output of a machine learning model generated based on an input to the machine learning model, wherein the machine learning model is trained using the embeddings for the plurality of intermediate edges and the plurality of intermediate nodes for the plurality of intermediate edges, wherein the input includes a first intermediate entity of the plurality of intermediate entities and one or more intermediate entities of the plurality of intermediate entities having a different entity type than the first intermediate entity, and wherein the output includes at least one intermediate entity of the plurality of intermediate entities having a same entity type as the one or more intermediate entities, and wherein the same entity type is associated with a plurality of entity attribute types $A_1$, $A_2$, ... $A_n$; determine, for each entity attribute type $A_i$ of the plurality of entity attribute types $A_1$, $A_2$, ... $A_n$, a variance of that entity attribute type Variance($A_i$) as a cardinality of that entity attribute type Cardinality($A_i$) over the one or more intermediate entities included in the input; determine, for each entity attribute type $A_i$ for which the at least one intermediate entity in the output has a value $a_j$, a statistical significance of that entity attribute type Statistical Significance ($A_i$=$a_j$) as a number of the one or more intermediate entities in the input that have a value $a$; for that entity attribute type $A_i$ divided by the variance of that entity attribute type Variance($A_i$); normalize, to a 0 to 1 range the statistical significance of each entity attribute type Statistical Significance ($A_i$=$a_j$)~[0, 1]; and generate, based on the normalized statistical significance of each entity attribute type Statistical Significance ($A_i$=$a_j$)~[0, 1], an explanation for the output of the machine learning model.

According to some non-limiting embodiments or aspects, provided is a computer-implemented method comprising: obtaining, with at least one processor, embeddings for a plurality of nodes in a graph including the plurality of nodes and a plurality of edges, wherein the plurality of nodes is associated with a plurality of entities, and wherein the plurality of edges is associated with a plurality of relationships between the plurality of entities; for each focus entity of a subset of focus entities, generating, with the at least one processor, using a machine learning model, at least one primary counterfactual link between that focus entity and at least one other entity; for each focus entity of the subset of focus entities, determining, with the at least one processor, at least one secondary counterfactual link between that focus entity and at least one 1-hop node neighbor entity of the at least one other entity; for each focus entity of the subset of focus entities, determining, with the at least one processor, one or more factual links between that focus entity and one or more other entities; learning, with at least one processor, a residual function by iteratively and alternatively optimizing a first objective function that depends on the one or more factual links and a second objective function that depends on the at least one primary counterfactual link and the at least one secondary counterfactual link, wherein alternatively optimizing the first objective function and the second objective function alternately updates embeddings of focus entities in the subset of focus entities, the residual function, and discrepancy distance measures of node embeddings across a factual domain and counterfactual domain.

In some non-limiting embodiments or aspects, the first objective function is defined according to the following Equation:

$$\mathcal{L}_F = \sum_{(e_1 r, e_F) \in F(S_1)} sim\left(\left(\vec{e}_1^T \otimes (\vec{p}_1^r + s\mathbb{I})\right)\left(\vec{e}_F^T \otimes (\vec{p}_2^r + s\mathbb{I})\right)\right)$$

where $S_1$ is the subset of focus entities of a set of focus entities $E_1^j$ of a first entity type $E_1$ for a task j, where the task j is associated with the machine learning model, where $(e_1, r, e_F) \in F(S_1)$ is a set of each factual link for each focus entity of the subset of focus entities $S_1$, where each factual link $(e_1, r, e_F)$ is between a focus entity $e_1$ of the subset of focus entities $S_1$ and a tail entity $e_F$ of that focus entity $e_1$, where r is a relation type of each factual link $(e_1, r, e_F)$, where $\vec{e}_1^T$ is a transformed embedding of the focus entity $e_1$, where $\vec{e}_F^T$ is a transformed embedding of the tail entity $e_F$, where $\vec{p}_1^r$ is a projector of the focus entity $e_1$ for the relation type r, where $\vec{p}_2^r$ is a projector of the tail entity $e_F$ for the relation type r, and where $s\mathbb{I}$ is an identity-matrix scaling factor, wherein the second objective function is defined according to the following Equation:

$$\mathcal{L}_{CF}^j = \sum_{(e_1, e_{CF}) \in CF^j(S_1)} \mathcal{LPR}_{\left(\vec{e}_1 + \delta_{E_1}^j (\vec{e}_1), \vec{e}_{CF} + \delta_{E_{CF}}^j (\vec{e}_{CF})\right) + d1 \times disc\left(\delta_{E_1}^j (\vec{e}_1)\right)\right) + d2 \times disc\left(\delta_{E_1}^j (\vec{e}_i)\right)}^{CF}$$

where $(e_1, e_{CF}) \in CF^j(S_1)$ is a set counterfactual links including each primary counterfactual link and each secondary counterfactual link for each focus entity of the subset of focus entities $S_1$, where each counterfactual link $(e_1, e_{CF})$ is between the focus entity $e_1$ and a counterfactual entity $e_{CF}$ of that focus entity, where $\vec{e}_1$ is an embedding of the focus entity $e_1$, where $\delta_{E_1}^j$ is the residual function for the task j and the first entity type $E_1$, where $\vec{e}_{CF}$ is an embedding of the counterfactual entity $e_{CF}$, where d1 is a head scaling parameter, where d2 is a tail scaling parameter, where disc is a discrepancy distance measure, and where $\vec{e}_i$ are embeddings of focus entities $e_i$ in a focus set $S_{E_i}$.

According to some non-limiting embodiments or aspects, provided is a computer-implemented method comprising: obtaining, with at least one processor, embeddings for a plurality of nodes in a graph including the plurality of nodes and a plurality of edges, wherein the plurality of nodes is associated with a plurality of entities, and wherein the plurality of edges is associated with a plurality of relationships between the plurality of entities; for each focus entity of a subset of focus entities, generating, with the at least one processor, using a machine learning model, at least one primary counterfactual link between that focus entity and at least one other entity; for each focus entity of the subset of focus entities, determining, with the at least one processor, one or more factual links between that focus entity and one or more other entities; for each focus entity of the subset of focus entities, generating, with the at least one processor, a soft alignment of an entity pair of the one or more factual links; and updating, with the at least one processor, one or more parameters of the machine learning model using an objective function that depends on the at least one primary counterfactual link and the soft alignment of the entity pair of the one or more factual links for each focus entity.

In some non-limiting embodiments or aspects, the soft alignment of the entity pair is generated according to the following Equation:

$$ SA^j(e_1,e_F) = \mathcal{L}_{(\vec{e}_1 + \delta_{E_1}^{\ j}(\vec{e}_1), e_{CF} + \delta_{E_{CF}}^{\ j}(\vec{e}_{CF}))} $$

where $(e_1,e_F)$ is the entity pair of the one or more factual links between a focus entity $e_1$ of a subset of focus entities $S_1$ of a set of focus entities $E_1^{\ j}$ of a first entity type $E_1$ for a task j and a factual entity $e_F$ of that focus entity, where the task j is associated with the machine learning model, where $\vec{e}_1$ is an embedding of the focus entity $e_1$, where $\delta_{E_1}^{\ j}$ is a residual function for the task j and the first entity type $E_1$, where $\vec{e}_{CF}$ is an embedding of a counterfactual entity $e_{CF}$ of a counterfactual link between the focus entity $e_1$ and the counterfactual entity $e_{CF}$, where $\delta_{E_{CF}}^{\ j}$ is a residual function for the task j and an entity type of the counterfactual entity $e_{CF}$, and where $\mathcal{L}$ is a factual likelihood defined according to the following Equation:

$$ \mathcal{L}_{(\vec{e}_1, r, \vec{e}_2)} = sim((\vec{e}_1^{\ T} \otimes (\vec{p}_1^{\ r} + s\,\mathbb{1})) $$
$$ (\vec{e}_F^{\ T} \otimes (\vec{p}^2 r + s\,\mathbb{1})) $$

where $\vec{e}_1^{\ T}$ is a transformed embedding of the focus entity $e_1$, where $\vec{e}_F^{\ T}$ is a transformed embedding of factual entity $e_F$, where $\vec{p}_1^{\ r}$ is a projector of the focus entity $e_1$ for the relation type r, where $\vec{p}_2^{\ r}$ is a projector of the factual entity $e_F$ for the relation type r, and where $s\,\mathbb{1}$ is an identity-matrix scaling factor.

According to some non-limiting embodiments or aspects, provided is a computer-implemented method comprising: obtaining, with at least one processor, embeddings for a plurality of nodes in a graph including the plurality of nodes and a plurality of edges, wherein the plurality of nodes is associated with a plurality of entities, and wherein the plurality of edges is associated with a plurality of relationships between the plurality of entities; for each focus entity of a subset of focus entities, generating, with the at least one processor, using a machine learning model, at least one primary counterfactual link between that focus entity and at least one other entity; for each focus entity of the subset of focus entities, determining, with the at least one processor, at least one secondary counterfactual link between that focus entity and at least one 1-hop node neighbor entity of the at least one other entity; for each focus entity of the subset of focus entities, determining, with the at least one processor, one or more factual links between that focus entity and one or more other entities; for each focus entity of the subset of focus entities, generating, with the at least one processor, a soft alignment of an entity pair of the one or more factual links; and learning, with the at least one processor, a residual function by iteratively and alternatively optimizing a first objective function that depends on the one or more factual links, a second objective function that depends on the at least one primary counterfactual link and the at least one secondary counterfactual link, and a third objective function that depends on the at least one primary counterfactual link and the soft alignment of the entity pair of the one or more factual links, wherein alternatively optimizing the first objective function, the second objective function, and the third objective function alternately updates embeddings of focus entities in the set of focus entities, the residual function, discrepancy distance measures of node embeddings across a factual domain and a counterfactual domain, and one or more parameters of the machine learning model.

In some non-limiting embodiments or aspects, the first objective function is defined according to the following Equation:

$$ \mathcal{L}_F = \sum_{(e_1,r,e_F) \in F(S_1)} sim((\vec{e}_1^T \otimes (\vec{p}_1^r + s\,\mathbb{1}))(\vec{e}_F^T \otimes (\vec{p}_2^r + s\,\mathbb{1})) $$

where $S_1$ is the subset of focus entities of a set of focus entities $E_1^{\ j}$ of a first entity type $E_1$ for a task j, where the task j is associated with the machine learning model, where $(e_1,r,e_F) \in F(S_1)$ is a set of each factual link for each focus entity of the subset of focus entities $S_1$, where each factual link $(e_1,r,e_F)$ is between a focus entity $e_1$ of the subset of focus entities $S_1$ and a tail entity $e_F$ of that focus entity $e_1$, where r is a relation type of each factual link $(e_1,r,e_F)$, where $\vec{e}_1^{\ T}$ is a transformed embedding of the focus entity $e_1$, where $\vec{e}_F^{\ T}$ is a transformed embedding of the tail entity $e_F$, where $\vec{p}_1^{\ r}$ is a projector of the focus entity $e_1$ for the relation type r, where $\vec{p}_2^{\ r}$ is a projector of the tail entity $e_F$ for the relation type r, and where $s\,\mathbb{1}$ is an identity-matrix scaling factor, wherein the second objective function is defined according to the following Equation:

$$ \mathcal{L}_{CF}^j = $$
$$ \sum_{(e_1,e_{CF}) \in CF^j(S_1)} \mathcal{LPR}_{(\vec{e}_1 + \delta_{E_1}^j(\vec{e}_1), \vec{e}_{CF} + \delta_{E_{CF}}^j(\vec{e}_{CF})) + d1 \times disc(\delta_{E_1}^j(\vec{e}_1)) + d2 \times disc(\delta_{E_1}^j(\vec{e}_i))}^{CF} $$

where $(e_1, e_{CF}) \in CF^j(S_1)$ is a set counterfactual links including each primary counterfactual link and each secondary counterfactual link for each focus entity of the subset of focus entities $S_1$, where each counterfactual link $(e_1, e_{CF})$ is between the focus entity $e_1$ and a counterfactual entity $e_{CF}$ of that focus entity, where $\vec{e}_1$ is an embedding of the focus entity $e_1$, where $\delta_{E_1}^{\ j}$ is the residual function for the task j and the first entity type $E_1$, where $\vec{e}_{CF}$ is an embedding of the counterfactual entity $e_{CF}$, where d1 is a head scaling parameter, where d2 is a tail scaling parameter, where disc is a discrepancy distance measure, and where $\vec{e}_i$ are embeddings of focus entities $e_i$ in a focus set $S_{E_i}$, where the third objective function is defined according to the following Equation:

$$ \partial j = O^j + \lambda^j \sum_{(e_1,r,e_F) \in F(S_1)} (SA^j(e_1, e_F) - M^j(e_1, e_F)) $$

where $O^j$ is a differentiable objective function of the machine learning model $M^j$, where $\lambda^j$ is a strength parameter that sets a strength of a regularization applied to the machine learning model $M^j$, where $M^j(e_1, e_F)$ is a predicted output of the machine learning model $M^j$ for an input including the focus entity $e_1$ of the entity pair of the one or more factual links between the focus entity $e_1$ and the factual entity $e_F$ of that focus entity, where $SA^j(e_1,e_F)$ is the soft alignment of the entity pair of the one or more factual links between the focus entity $e_1$ and the factual entity $e_F$ of that focus entity.

According to some non-limiting embodiments or aspects, provided is a computer-implemented method comprising: obtaining, with at least one processor, embeddings for a plurality of nodes in a graph including the plurality of nodes and a plurality of edges, wherein the plurality of nodes is associated with a plurality of entities, and wherein the plurality of edges is associated with a plurality of relationships between the plurality of entities; for each focus entity of a subset of focus entities, generating, with the at least one processor, using a machine learning model, at least one primary counterfactual link between that focus entity and at least one other entity; for each focus entity of the subset of focus entities, determining, with the at least one processor, at least one secondary counterfactual link between that focus entity and at least one 1-hop node neighbor entity of the at least one other entity; for each focus entity of the subset of focus entities, determining, with the at least one processor, one or more factual links between that focus entity and one or more other entities; learning, with the at least one processor, a residual function by iteratively and alternatively optimizing a first objective function that depends on the one or more factual links and a second objective function that depends on the at least one primary counterfactual link and the at least one secondary counterfactual link, wherein, for each at least one other entity generated for each focus entity using the machine learning model, that at least one other entity is connected to one 1-hop node neighbor entity of that focus entity to update the node embeddings of those entities while holding the residual function constant; for each focus entity of the subset of focus entities, generating, with the at least one processor, using a further machine learning model different than the machine learning model, at least one further primary counterfactual link between that focus entity and at least one further entity; for each focus entity of the set of focus entities, determining, with the at least one processor, one or more further factual links between that focus entity and one or more further entities; for each focus entity of the set of focus entities, generate, with the at least one processor, a soft alignment of an entity pair of the one or more further factual links; and updating, with the at least one processor, one or more parameters of the further machine learning model using a further objective function that depends on the at least one further primary counterfactual link and the soft alignment of the entity pair of the one or more further factual links.

In some non-limiting embodiments or aspects, the first objective function is defined according to the following Equation:

$$\mathcal{L}_F = \sum_{(e_1,r,e_F)\in F(S_1)} sim\big((\vec{e}_1^T \otimes (\vec{p}_1^r + s\mathbb{I}))(\vec{e}_F^T \otimes (\vec{p}_2^r + s\mathbb{I}))\big)$$

where $S_1$ is the subset of focus entities of a set of focus entities $E_1^j$ of a first entity type $E_1$ for a task j, where the task j is associated with the machine learning model, where $(e_1,r,e_F)\in F(S_1)$ is a set of each factual link for each focus entity of the subset of focus entities $S_1$, where each factual link $(e_1,r,e_F)$ is between a focus entity $e_1$ of the subset of focus entities $S_1$ and a tail entity $e_F$ of that focus entity $e_1$, where r is a relation type of each factual link $(e_1,r,e_F)$, where $e_F$ is a transformed embedding of the focus entity $e_1$, where $\vec{e}_F^T$ is a transformed embedding of the tail entity $e_F$, where $\vec{p}_1^r$ is a projector of the focus entity $e_1$ for the relation type r, where $\vec{p}_2^r$ is a projector of the tail entity $e_F$ for the relation type r, and where $s\mathbb{I}$ is an identity-matrix scaling factor, wherein the second objective function is defined according to the following Equation:

$$\mathcal{L}_{CF}^j = \sum_{(e_1,e_{CF})\in CF^j(S_1)} \mathcal{LPR}_{(\vec{e}_1+\delta_{E_1}^j(\vec{e}_1),\vec{e}_{CF}+\delta_{E_{CF}}^j(\vec{e}_{CF}))+d1\times disc(\delta_{E_1}^j(\vec{e}_1))+d2\times disc(\delta_{E_1}^j(\vec{e}_i))}^{CF}$$

where $(e_1, e_{CF})\in CF^j(S_1)$ is a set counterfactual links including each primary counterfactual link and each secondary counterfactual link for each focus entity of the subset of focus entities $S_1$, where each counterfactual link $(e_1, e_{CF})$ is between the focus entity $e_1$ and a counterfactual entity $e_{CF}$ of that focus entity, where $\vec{e}_1$ is an embedding of the focus entity $e_1$, where $\delta_{E_1}^j$ is the residual function for the task j and the first entity type $E_1$, where $\vec{e}_{CF}$ is an embedding of the counterfactual entity $e_{CF}$, where d1 is a head scaling parameter, where d2 is a tail scaling parameter, where disc is a discrepancy distance measure, and where $\vec{e}_i$ are embeddings of focus entities $e_i$ in a focus set $S_{E_i}$, wherein the further objective function is defined according to the following Equation:

$$\partial^{j2} = O^{j2} + \lambda^{j2} \sum_{(e_1,r,e_{FF})\in F(S_1)} \big(SA^{j2}(e_1, e_{FF}) - M^{j2}(e_1, e_{FF})\big)$$

where $O^{j2}$ is a differentiable objective function of the further machine learning model $M^{j2}$, where $\lambda^{j2}$ is a strength parameter that sets a strength of a regularization applied to the further machine learning model $M^{j2}$, where $M^{j2}(e_1,e_{FF})$ is a predicted output of the further machine learning model $M^{j2}$ for an input including the focus entity $e_1$ of the entity pair of the one or more factual links between the focus entity $e_1$ and the further factual entity $e_F$ of that focus entity, where $SA^j(e_1,e_{FF})$ is the soft alignment of the entity pair of the one or more further factual links between the focus entity $e_1$ and the further factual entity $e_{FF}$ of that focus entity.

In some non-limiting embodiments or aspects, the soft alignment of the entity pair is generated according to the following Equation:

$$SA^{j2}(e_1,e_F)= \mathcal{L}_{(\vec{e}_1+\delta_{E_1}^{j2}(\vec{e}_1),e_{CFF}+\delta_{E_{CF}}^{j2}(\vec{e}_{CFF}))}$$

where $(e_1,e_{FF})$ is the entity pair of the one or more further factual links between the focus entity $e_1$ and a further factual entity $e_{FF}$ of that focus entity, where a task j2 is associated with the further machine learning model, where $\vec{e}_1$ is an embedding of the focus entity $e_1$, where $\delta_{E_1}^{j2}$ is a residual function for the task j2 and the first entity type $E_1$, where $\vec{e}_{CFF}$ is an embedding of a further counterfactual entity $e_{CFF}$ of a further counterfactual link between the focus entity $e_1$ and the further counterfactual entity $e_{CF}$, where $\partial_{E_{CFF}}^{j2}$ is a residual function for the task j2 and an entity type of the further counterfactual entity $e_{CFF}$, and where $\mathcal{L}$ is a factual likelihood defined according to the following Equation:

$$\mathcal{L}_{(\vec{e}_1,r,\vec{e}_2)}=\text{sim}((\vec{e}_1{}^T\otimes(\vec{p}_1{}^r+s\,\mathbb{I}))(\vec{e}_{FF}{}^T\otimes$$
$$(\vec{p}_2{}^r+s\,\mathbb{I}))$$

where $\vec{e}_1{}^T$ is a transformed embedding of the focus entity $e_1$, where $\vec{e}_{FF}{}^T$ is a transformed embedding of the further factual entity $e_{FF}$, where $\vec{p}_1{}^r$ is a projector of the focus entity $e_1$ for the relation type r, where $\vec{p}_2{}^r$ is a projector of the further factual entity $e_{FF}$ for the relation type r, and where $s\,\mathbb{I}$ is an identity-matrix scaling factor.

According to some non-limiting embodiments or aspects, provided is a system comprising: at least one processor programmed and/or configured to: obtain embeddings for a plurality of nodes in a graph including the plurality of nodes and a plurality of edges, wherein the plurality of nodes is associated with a plurality of entities, and wherein the plurality of edges is associated with a plurality of relationships between the plurality of entities; for each focus entity of a subset of focus entities, generate, using a machine learning model, at least one primary counterfactual link between that focus entity and at least one other entity; for each focus entity of the subset of focus entities, determine at least one secondary counterfactual link between that focus entity and at least one 1-hop node neighbor entity of the at least one other entity; for each focus entity of the subset of focus entities, determine one or more factual links between that focus entity and one or more other entities; learn a residual function by iteratively and alternatively optimizing a first objective function that depends on the one or more factual links and a second objective function that depends on the at least one primary counterfactual link and the at least one secondary counterfactual link, wherein alternatively optimizing the first objective function and the second objective function alternately updates embeddings of focus entities in the subset of focus entities, the residual function, and discrepancy distance measures of node embeddings across a factual domain and counterfactual domain.

In some non-limiting embodiments or aspects, the first objective function is defined according to the following Equation:

$$\mathcal{L}_F = \sum_{(e_1,r,e_F)\in F(S_1)} \text{sim}((\vec{e}_1^T \otimes (\vec{p}_1^r + s\mathbb{I}))(\vec{e}_F^T \otimes (\vec{p}_2^r + s\mathbb{I}))$$

where $S_1$ is the subset of focus entities of a set of focus entities $E_1{}^j$ of a first entity type $E_1$ for a task j, where the task j is associated with the machine learning model, where $(e_1,r,e_F)\in F(S_1)$ is a set of each factual link for each focus entity of the subset of focus entities $S_1$, where each factual link $(e_1,r,e_F)$ is between a focus entity $e_1$ of the subset of focus entities $S_1$ and a tail entity $e_F$ of that focus entity $e_1$, where r is a relation type of each factual link $(e_1,r,e_F)$, where $\vec{e}_1{}^T$ is a transformed embedding of the focus entity $e_1$, where $\vec{e}_F{}^T$ is a transformed embedding of the tail entity $e_F$, where $\vec{p}_1{}^r$ is a projector of the focus entity $e_1$ for the relation type r, where $\vec{p}_2{}^r$ is a projector of the tail entity $e_F$ for the relation type r, and where $s\,\mathbb{I}$ is an identity-matrix scaling factor, wherein the second objective function is defined according to the following Equation:

$$\mathcal{L}_{CF}^j =$$
$$\sum_{(e_1,e_{CF})\in CF^j(S_1)} \mathcal{LPR}^{CF}_{(\vec{e}_1+\delta_{E_1}^j(\vec{e}_1),\vec{e}_{CF}+\delta_{E_{CF}}^j(\vec{e}_{CF}))+d1\times disc(\delta_{E_1}^j(\vec{e}_1))+d2\times disc(\delta_{E_1}^j(\vec{e}_1))}$$

where $(e_1, e_{CF})\in CF^j(S_1)$ is a set counterfactual links including each primary counterfactual link and each secondary counterfactual link for each focus entity of the subset of focus entities $S_1$, where each counterfactual link $(e_1, e_{CF})$ is between the focus entity $e_1$ and a counterfactual entity $e_{CF}$ of that focus entity, where $\vec{e}_1$ is an embedding of the focus entity $e_1$, where $\delta_{E_1}{}^j$ is the residual function for the task j and the first entity type $E_1$, where $\vec{e}_{CF}$ is an embedding of the counterfactual entity $e_{CF}$, where d1 is a head scaling parameter, where d2 is a tail scaling parameter, where disc is a discrepancy distance measure, and where $\vec{e}_i$ are embeddings of focus entities $e_i$ in a focus set $S_{E_i}$.

According to some non-limiting embodiments or aspects, provided is a system comprising: at least one processor programmed and/or configured to: obtain embeddings for a plurality of nodes in a graph including the plurality of nodes and a plurality of edges, wherein the plurality of nodes is associated with a plurality of entities, and wherein the plurality of edges is associated with a plurality of relationships between the plurality of entities; for each focus entity of a subset of focus entities, generate, using a machine learning model, at least one primary counterfactual link between that focus entity and at least one other entity; for each focus entity of the subset of focus entities, determine one or more factual links between that focus entity and one or more other entities; for each focus entity of the subset of focus entities, generate a soft alignment of an entity pair of the one or more factual links; and update one or more parameters of the machine learning model using an objective function that depends on the at least one primary counterfactual link and the soft alignment of the entity pair of the one or more factual links for each focus entity.

In some non-limiting embodiments or aspects, the soft alignment of the entity pair is generated according to the following Equation:

$$SA^j(e_1,e_F)= \mathcal{L}_{(\vec{e}_1+\delta_{E_1}^j(\vec{e}_1),e_{CF}+\delta_{E_{CF}}^j(\vec{e}_{CF}))}$$

where $(e_1,e_F)$ is the entity pair of the one or more factual links between a focus entity $e_1$ of a subset of focus entities $S_1$ of a set of focus entities $E_1{}^j$ of a first entity type $E_1$ for a task j and a factual entity $e_F$ of that focus entity, where the task j is associated with the machine learning model, where $\vec{e}_1$ is an embedding of the focus entity $e_1$, where $\delta_{E_1}{}^j$ is a residual function for the task j and the first entity type $E_1$, where $\vec{e}_{CF}$ is an embedding of a counterfactual entity $e_{CF}$ of a counterfactual link between the focus entity $e_1$ and the counterfactual entity $e_{CF}$, where $\delta_{E_{CF}}{}^j$ is a residual function for the task j and an entity type of the counterfactual entity $e_{CF}$, and where $\mathcal{L}$ is a factual likelihood defined according to the following Equation:

$$\mathcal{L}_{(\vec{e}_1,r,\vec{e}_2)}=\text{sim}((\vec{e}_1{}^T\otimes(\vec{p}_1{}^r+s\,\mathbb{I}))(\vec{e}_F{}^T\otimes(\vec{p}_2{}^r+s\,\mathbb{I}))$$

where $\vec{e}_1{}^T$ is a transformed embedding of the focus entity $e_1$, where $\vec{e}_F{}^T$ is a transformed embedding of factual entity $e_F$, where $\vec{p}_1{}^r$ is a projector of the focus entity $e_1$ for the relation type r, where $\vec{p}_2{}^r$ is a projector of the factual entity $e_F$ for the relation type r, and where $s\,\mathbb{I}$ is an identity-matrix scaling factor.

According to some non-limiting embodiments or aspects, provided is a system comprising: at least one processor programmed and/or configured to: obtain embeddings for a plurality of nodes in a graph including the plurality of nodes and a plurality of edges, wherein the plurality of nodes is associated with a plurality of entities, and wherein the plurality of edges is associated with a plurality of relationships between the plurality of entities; for each focus entity of a subset of focus entities, generate, using a machine learning model, at least one primary counterfactual link between that focus entity and at least one other entity; for each focus entity of the subset of focus entities, determine at least one secondary counterfactual link between that focus entity and at least one 1-hop node neighbor entity of the at least one other entity; for each focus entity of the subset of focus entities, determine one or more factual links between that focus entity and one or more other entities; for each focus entity of the subset of focus entities, generate a soft alignment of an entity pair of the one or more factual links; and learn a residual function by iteratively and alternatively optimizing a first objective function that depends on the one or more factual links, a second objective function that depends on the at least one primary counterfactual link and the at least one secondary counterfactual link, and a third objective function that depends on the at least one primary counterfactual link and the soft alignment of the entity pair of the one or more factual links, wherein alternatively optimizing the first objective function, the second objective function, and the third objective function alternately updates embeddings of focus entities in the set of focus entities, the residual function, discrepancy distance measures of node embeddings across a factual domain and a counterfactual domain, and one or more parameters of the machine learning model.

In some non-limiting embodiments or aspects, the first objective function is defined according to the following Equation:

$$\mathcal{L}_F = \sum_{(e_1, r, e_F)\in F(S_1)} sim\left((\vec{e}_1^T \otimes (\vec{p}_1^r + s\mathbb{I}))(\vec{e}_F^T \otimes (\vec{p}_2^r + s\mathbb{I}))\right)$$

where $S_1$ is the subset of focus entities of a set of focus entities $E_1{}^j$ of a first entity type $E_1$ for a task j, where the task j is associated with the machine learning model, where $(e_1, r, e_F)\in F(S_1)$ is a set of each factual link for each focus entity of the subset of focus entities $S_1$, where each factual link $(e_1, r, e_F)$ is between a focus entity $e_1$ of the subset of focus entities $S_1$ and a tail entity $e_F$ of that focus entity $e_1$, where r is a relation type of each factual link $(e_1, r, e_F)$, where $\vec{e}_1^T$ is a transformed embedding of the focus entity $e_1$, where $\vec{e}_F^T$ is a transformed embedding of the tail entity $e_F$, where $\vec{p}_1^r$ is a projector of the focus entity $e_1$ for the relation type r, where $\vec{p}_2^r$ is a projector of the tail entity $e_F$ for the relation type r, and where $s\,\mathbb{I}$ is an identity-matrix scaling factor, wherein the second objective function is defined according to the following Equation:

$$\mathcal{L}_{CF}^j =$$
$$\sum_{(e_1, e_{CF})\in CF^j(S_1)} \mathcal{LPR}_{(\vec{e}_1+\delta_{E_1}^j(\vec{e}_1),\vec{e}_{CF}+\delta_{E_{CF}}^j(\vec{e}_{CF}))+d1\times disc(\delta_{E_1}^j(\vec{e}_1))+d2\times disc(\delta_{E_1}^j(\vec{e}_i))}^{CF}$$

where $(e_1, e_{CF})\in CF^j(S_1)$ is a set counterfactual links including each primary counterfactual link and each secondary counterfactual link for each focus entity of the subset of focus entities $S_1$, where each counterfactual link $(e_1, e_{CF})$ is between the focus entity $e_1$ and a counterfactual entity $e_{CF}$ of that focus entity, where $\vec{e}_1$ is an embedding of the focus entity $e_1$, where $\delta_{E_1}^j$ is the residual function for the task j and the first entity type $E_1$, where $\vec{e}_{CF}$ is an embedding of the counterfactual entity $e_{CF}$, where d1 is a head scaling parameter, where d2 is a tail scaling parameter, where disc is a discrepancy distance measure, and where $\vec{e}_i$ are embeddings of focus entities $e_i$ in a focus set $S_{E_i}$, where the third objective function is defined according to the following Equation:

$$\partial^j = O^j + \lambda^j \sum_{(e_1, r, e_F)\in F(S_1)} \left(SA^j(e_1, e_F) - M^j(e_1, e_F)\right)$$

where $O^j$ is a differentiable objective function of the machine learning model $M^j$, where $\lambda^j$ is a strength parameter that sets a strength of a regularization applied to the machine learning model $M^j$, where $M^j(e_1, e_F)$ is a predicted output of the machine learning model $M^j$ for an input including the focus entity $e_1$ of the entity pair of the one or more factual links between the focus entity $e_1$ and the factual entity $e_F$ of that focus entity, where $SA^j(e_1, e_F)$ is the soft alignment of the entity pair of the one or more factual links between the focus entity $e_1$ and the factual entity $e_F$ of that focus entity.

According to some non-limiting embodiments or aspects, provided is a system comprising: at least one processor programmed and/or configured to: obtain embeddings for a plurality of nodes in a graph including the plurality of nodes and a plurality of edges, wherein the plurality of nodes is associated with a plurality of entities, and wherein the plurality of edges is associated with a plurality of relationships between the plurality of entities; for each focus entity of a subset of focus entities, generate, using a machine learning model, at least one primary counterfactual link between that focus entity and at least one other entity; for each focus entity of the subset of focus entities, determine at least one secondary counterfactual link between that focus entity and at least one 1-hop node neighbor entity of the at least one other entity; for each focus entity of the subset of focus entities, determine one or more factual links between that focus entity and one or more other entities; learn a residual function by iteratively and alternatively optimizing a first objective function that depends on the one or more factual links and a second objective function that depends on the at least one primary counterfactual link and the at least one secondary counterfactual link, wherein, for each at least one other entity generated for each focus entity using the machine learning model, that at least one other entity is connected to one 1-hop node neighbor entity of that focus entity to update the node embeddings of those entities while holding the residual function constant; for each focus entity of the subset of focus entities, generate, using a further machine learning model different than the machine learning model, at least one further primary counterfactual link between that focus entity and at least one further entity; for each focus entity of the set of focus entities, determine one or more further factual links between that focus entity and one or more further entities; for each focus entity of the set of focus entities, generate a soft alignment of an entity pair of the one or more further factual links; and update one or more parameters of the further machine learning model using a further objective function that depends on the at least one further primary counterfactual link and the soft alignment of the entity pair of the one or more further factual links.

In some non-limiting embodiments or aspects, the first objective function is defined according to the following Equation:

$$\mathcal{L}_F = \sum_{(e_1, r, e_F) \in F(S_1)} sim((\vec{e}_1^T \otimes (\vec{p}_1^r + s\mathbb{I}))(\vec{e}_F^T \otimes (\vec{p}_2^r + s\mathbb{I}))$$

where $S_1$ is the subset of focus entities of a set of focus entities $E_1^j$ of a first entity type $E_1$ for a task j, where the task j is associated with the machine learning model, where $(e_1, r, e_F) \in F(S_1)$ is a set of each factual link for each focus entity of the subset of focus entities $S_1$, where each factual link $(e_1, r, e_F)$ is between a focus entity $e_1$ of the subset of focus entities $S_1$ and a tail entity $e_F$ of that focus entity $e_1$, where r is a relation type of each factual link $(e_1, r, e_F)$, where $\vec{e}_1^T$ is a transformed embedding of the focus entity $e_1$, where $\vec{e}_F^T$ is a transformed embedding of the tail entity $e_F$, where $\vec{p}_1^r$ is a projector of the focus entity $e_1$ for the relation type r, where $\vec{p}_2^r$ is a projector of the tail entity $e_F$ for the relation type r, and where s is an identity-matrix scaling factor, wherein the second objective function is defined according to the following Equation:

$$\mathcal{L}_{CF}^j = \sum_{(e_1, e_{CF}) \in CF^j(S_1)} \mathcal{LPR}_{(\tilde{e}_1 + \delta_{E_1}^j(\tilde{e}_1), \tilde{e}_{CF} + \delta_{E_{CF}}^j(\tilde{e}_{CF})) + d1 \times disc(\delta_{E_1}^j(\tilde{e}_1)) + d2 \times disc(\delta_{E_1}^j(\tilde{e}_i))}^{CF}$$

where $(e_1, e_{CF}) \in CF^j(S_1)$ is a set counterfactual links including each primary counterfactual link and each secondary counterfactual link for each focus entity of the subset of focus entities $S_1$, where each counterfactual link $(e_1, e_{CF})$ is between the focus entity $e_1$ and a counterfactual entity $e_{CF}$ of that focus entity, where $\vec{e}_1$ is an embedding of the focus entity $e_1$, where $\delta_{E_1}^j$ is the residual function for the task j and the first entity type $E_1$, where $\vec{e}_{CF}$ is an embedding of the counterfactual entity $e_{CF}$, where d1 is a head scaling parameter, where d2 is a tail scaling parameter, where disc is a discrepancy distance measure, and where $\vec{e}_i$ are embeddings of focus entities $e_i$ in a focus set $S_{E_i}$, wherein the further objective function is defined according to the following Equation:

$$\tilde{O}^{j2} = O^{j2} + \lambda^{j2} \sum_{(e_1, r, e_{FF}) \in F(S_1)} (SA^{j2}(e_1, e_{FF}) - M^{j2}(e_1, e_{FF}))$$

where $O^{j2}$ is a differentiable objective function of the further machine learning model $M^{j2}$, where $\lambda^{j2}$ is a strength parameter that sets a strength of a regularization applied to the further machine learning model $M^{j2}$, where $M^{j2}(e_1, e_{FF})$ is a predicted output of the further machine learning model $M^{j2}$ for an input including the focus entity $e_1$ of the entity pair of the one or more factual links between the focus entity $e_1$ and the further factual entity $e_F$ of that focus entity, where $SA^j(e_1, e_{FF})$ is the soft alignment of the entity pair of the one or more further factual links between the focus entity $e_1$ and the further factual entity $e_{FF}$ of that focus entity.

In some non-limiting embodiments or aspects, the soft alignment of the entity pair is generated according to the following Equation:

$$SA^{j2}(e_1, e_F) = \mathcal{L}_{(\vec{e}_1 + \delta_{E_1}^{j2}(\vec{e}_1), e_{CFF} + \delta_{E_{CF}}^{j2}(\vec{e}_{CFF}))}$$

where $(e_1, e_{FF})$ is the entity pair of the one or more further factual links between the focus entity $e_1$ and a further factual entity $e_{FF}$ of that focus entity, where a task j2 is associated with the further machine learning model, where $\vec{e}_1$ is an embedding of the focus entity $e_1$, where $\delta_{E_1}^{j2}$ is a residual function for the task j2 and the first entity type $E_1$, where $\vec{e}_{CFF}$ is an embedding of a further counterfactual entity $e_{CFF}$ of a further counterfactual link between the focus entity $e_1$ and the further counterfactual entity $e_{CF}$, where $\delta_{E_{CFF}}^{j2}$ is a residual function for the task j2 and an entity type of the further counterfactual entity $e_{CFF}$, and where $\mathcal{L}$ is a factual likelihood defined according to the following Equation:

$$\mathcal{L}_{(\vec{e}_1, r, \vec{e}_2)} = sim((\vec{e}_1^T \otimes (\vec{p}_1^r + s\mathbb{I}))(\vec{e}_{FF}^T \otimes (\vec{p}_2^r + s\mathbb{I}))$$

where $\vec{e}_1^T$ is a transformed embedding of the focus entity $e_1$, where $\vec{e}_{FF}^T$ is a transformed embedding of the further factual entity $e_{FF}$, where $\vec{p}_1^r$ is a projector of the focus entity $e_1$ for the relation type r, where $\vec{p}_2^r$ is a projector of the further factual entity $e_{FF}$ for the relation type r, and where s $\mathbb{I}$ is an identity-matrix scaling factor.

According to some non-limiting embodiments or aspects, provided is a computer program product comprising at least one non-transitory computer-readable medium including program instructions that, when executed by at least one processor, cause the at least one processor to: obtain embeddings for a plurality of nodes in a graph including the plurality of nodes and a plurality of edges, wherein the plurality of nodes is associated with a plurality of entities, and wherein the plurality of edges is associated with a plurality of relationships between the plurality of entities; for each focus entity of a subset of focus entities, generate, using a machine learning model, at least one primary counterfactual link between that focus entity and at least one other entity; for each focus entity of the subset of focus entities, determine at least one secondary counterfactual link between that focus entity and at least one 1-hop node neighbor entity of the at least one other entity; for each focus entity of the subset of focus entities, determine one or more factual links between that focus entity and one or more other entities; learn a residual function by iteratively and alternatively optimizing a first objective function that depends on the one or more factual links and a second objective function that depends on the at least one primary counterfactual link and the at least one secondary counterfactual link, wherein alternatively optimizing the first objective function and the second objective function alternately updates embeddings of focus entities in the subset of focus entities, the residual function, and discrepancy distance measures of node embeddings across a factual domain and counterfactual domain.

In some non-limiting embodiments or aspects, the first objective function is defined according to the following Equation:

$$\mathcal{L}_F = \sum_{(e_1,r,e_F)\in F(S_1)} sim((\vec{e}_1^T \otimes (\vec{p}_1^r + s\mathbb{I}))(\vec{e}_F^T \otimes (\vec{p}_2^r + s\mathbb{I})))$$

where $S_1$ is the subset of focus entities of a set of focus entities $E_1^j$ of a first entity type $E_1$ for a task j, where the task j is associated with the machine learning model, where $(e_1,r,e_F)\in F(S_1)$ is a set of each factual link for each focus entity of the subset of focus entities $S_1$, where each factual link $(e_1,r,e_F)$ is between a focus entity $e_1$ of the subset of focus entities $S_1$ and a tail entity $e_F$ of that focus entity $e_1$, where r is a relation type of each factual link $(e_1,r,e_F)$, where $\vec{e}_1^T$ is a transformed embedding of the focus entity $e_1$, where $\vec{e}_F^T$ is a transformed embedding of the tail entity $e_F$, where $\vec{p}_1^r$ is a projector of the focus entity $e_1$ for the relation type r, where $\vec{p}_2^r$ is a projector of the tail entity $e_F$ for the relation type r, and where $s\mathbb{I}$ is an identity-matrix scaling factor, wherein the second objective function is defined according to the following Equation:

$$\mathcal{L}_{CF}^j = \sum_{(e_1,e_{CF})\in CF^j(S_1)} \mathcal{LPR}_{(\vec{e}_1+\delta_{E_1}^j(\vec{e}_1),\vec{e}_{CF}+\delta_{E_{CF}}^j(\vec{e}_{CF}))+d1\times disc(\delta_{E_1}^j(\vec{e}_1))+d2\times disc(\delta_{E_1}^j(\vec{e}_i))}^{CF}$$

where $(e_1, e_{CF})\in CF^j(S_1)$ is a set counterfactual links including each primary counterfactual link and each secondary counterfactual link for each focus entity of the subset of focus entities $S_1$, where each counterfactual link $(e_1, e_{CF})$ is between the focus entity $e_1$ and a counterfactual entity $e_{CF}$ of that focus entity, where $\vec{e}_1$ is an embedding of the focus entity $e_1$, where $\delta_{E_1}^j$ is the residual function for the task j and the first entity type $E_1$, where $\vec{e}_{CF}$ is an embedding of the counterfactual entity $e_{CF}$, where d1 is a head scaling parameter, where d2 is a tail scaling parameter, where disc is a discrepancy distance measure, and where $\vec{e}_i$ are embeddings of focus entities $e_i$ in a focus set $S_{E_i}$.

According to some non-limiting embodiments or aspects, provided is a computer program product comprising at least one non-transitory computer-readable medium including program instructions that, when executed by at least one processor, cause the at least one processor to: obtain embeddings for a plurality of nodes in a graph including the plurality of nodes and a plurality of edges, wherein the plurality of nodes is associated with a plurality of entities, and wherein the plurality of edges is associated with a plurality of relationships between the plurality of entities; for each focus entity of a subset of focus entities, generate, using a machine learning model, at least one primary counterfactual link between that focus entity and at least one other entity; for each focus entity of the subset of focus entities, determine one or more factual links between that focus entity and one or more other entities; for each focus entity of the subset of focus entities, generate a soft alignment of an entity pair of the one or more factual links; and update one or more parameters of the machine learning model using an objective function that depends on the at least one primary counterfactual link and the soft alignment of the entity pair of the one or more factual links for each focus entity.

In some non-limiting embodiments or aspects, the soft alignment of the entity pair is generated according to the following Equation:

$$SA^j(e_1,e_F)= \mathcal{L}(\vec{e}_1+\delta_{E_1}^j(\vec{e}_1),e_{CF}+\delta_{E_{CF}}^j(\vec{e}_{CF}))$$

where $(e_1,e_F)$ is the entity pair of the one or more factual links between a focus entity $e_1$ of a subset of focus entities $S_1$ of a set of focus entities $E_1^j$ of a first entity type $E_1$ for a task j and a factual entity $e_F$ of that focus entity, where the task j is associated with the machine learning model, where $\vec{e}_1$ is an embedding of the focus entity $e_1$, where $\delta_{E_1}^j$ is a residual function for the task j and the first entity type $E_1$, where $\vec{e}_{CF}$ is an embedding of a counterfactual entity $e_{CF}$ of a counterfactual link between the focus entity $e_1$ and the counterfactual entity $e_{CF}$, where $\delta_{E_{CF}}^j$ is a residual function for the task j and an entity type of the counterfactual entity $e_{CF}$, and where $\mathcal{L}$ is a factual likelihood defined according to the following Equation:

$$\mathcal{L}_{(\vec{e}_1,r,\vec{e}_2)}=sim((\vec{e}_1^T\otimes(\vec{p}_1^r+s\mathbb{I}))(\vec{e}_F^T\otimes(\vec{p}_2^r+s\mathbb{I}))$$

where $\vec{e}_1^T$ is a transformed embedding of the focus entity $e_1$, where $\vec{e}_F^T$ is a transformed embedding of factual entity $e_F$, where $\vec{p}_1^r$ is a projector of the focus entity $e_1$ for the relation type r, where $\vec{p}_2^r$ is a projector of the factual entity $e_F$ for the relation type r, and where $s\mathbb{I}$ is an identity-matrix scaling factor.

According to some non-limiting embodiments or aspects, provided is a computer program product comprising at least one non-transitory computer-readable medium including program instructions that, when executed by at least one processor, cause the at least one processor to: obtain embeddings for a plurality of nodes in a graph including the plurality of nodes and a plurality of edges, wherein the plurality of nodes is associated with a plurality of entities, and wherein the plurality of edges is associated with a plurality of relationships between the plurality of entities; for each focus entity of a subset of focus entities, generate, using a machine learning model, at least one primary counterfactual link between that focus entity and at least one other entity; for each focus entity of the subset of focus entities, determine at least one secondary counterfactual link between that focus entity and at least one 1-hop node neighbor entity of the at least one other entity; for each focus entity of the subset of focus entities, determine one or more factual links between that focus entity and one or more other entities; for each focus entity of the subset of focus entities, generate a soft alignment of an entity pair of the one or more factual links; and learn a residual function by iteratively and alternatively optimizing a first objective function that depends on the one or more factual links, a second objective function that depends on the at least one primary counterfactual link and the at least one secondary counterfactual link, and a third objective function that depends on the at least one primary counterfactual link and the soft alignment of the entity pair of the one or more factual links, wherein alternatively optimizing the first objective function, the second objective function, and the third objective function alternately updates embeddings of focus entities in the set of focus entities, the residual function, discrepancy distance measures of node embeddings across a factual domain and a counterfactual domain, and one or more parameters of the machine learning model.

In some non-limiting embodiments or aspects, the first objective function is defined according to the following Equation:

$$\mathcal{L}_F = \sum_{(e_1, r, e_F) \in F(S_1)} sim\big((\vec{e}_1^T \otimes (\vec{p}_1^r + s\mathbb{I}))(\vec{e}_F^T \otimes (\vec{p}_2^r + s\mathbb{I}))\big)$$

where $S_1$ is the subset of focus entities of a set of focus entities $E_1^j$ of a first entity type $E_1$ for a task j, where the task j is associated with the machine learning model, where $(e_1, r, e_F) \in F(S_1)$ is a set of each factual link for each focus entity of the subset of focus entities $S_1$, where each factual link $(e_1, r, e_F)$ is between a focus entity $e_1$ of the subset of focus entities $S_1$ and a tail entity $e_F$ of that focus entity $e_1$, where r is a relation type of each factual link $(e_1, r, e_F)$, where $\vec{e}_1^T$ is a transformed embedding of the focus entity $e_1$, where $\vec{e}_F^T$ is a transformed embedding of the tail entity $e_F$, where $\vec{p}_1^r$ is a projector of the focus entity $e_1$ for the relation type r, where $\vec{p}_2^r$ is a projector of the tail entity $e_F$ for the relation type r, and where $s\mathbb{I}$ is an identity-matrix scaling factor, wherein the second objective function is defined according to the following Equation:

$$\mathcal{L}_{CF}^j =$$
$$\sum_{(e_1, e_{CF}) \in CF^j(S_1)} \mathcal{LPR}^{CF}_{\left(\vec{e}_1 + \delta_{E_1}^j(\vec{e}_1), \vec{e}_{CF} + \delta_{E_{CF}}^j(\vec{e}_{CF})\right) + d1 \times disc\left(\delta_{E_1}^j(\vec{e}_1)\right)) + d2 \times disc\left(\delta_{E_1}^j(\vec{e}_i)\right)}$$

where $(e_1, e_{CF}) \in CF^j(S_1)$ is a set counterfactual links including each primary counterfactual link and each secondary counterfactual link for each focus entity of the subset of focus entities $S_1$, where each counterfactual link $(e_1, e_{CF})$ is between the focus entity $e_1$ and a counterfactual entity $e_{CF}$ of that focus entity, where $\vec{e}_1$ is an embedding of the focus entity $e_1$, where $\delta_{E_1}^j$ is the residual function for the task j and the first entity type $E_1$, where $\vec{e}_{CF}$ is an embedding of the counterfactual entity $e_{CF}$, where d1 is a head scaling parameter, where d2 is a tail scaling parameter, where disc is a discrepancy distance measure, and where $\vec{e}_i$ are embeddings of focus entities $e_i$ in a focus set $S_{E_i}$, where the third objective function is defined according to the following Equation:

$$\tilde{O}^j = O^j + \lambda^j \sum_{(e_1, r, e_F) \in F(S_1)} \big(SA^j(e_1, e_F) - M^j(e_1, e_F)\big)$$

where $O^j$ is a differentiable objective function of the machine learning model $M^j$, where $\lambda^j$ is a strength parameter that sets a strength of a regularization applied to the machine learning model $M^j$, where $M^j(e_1, e_F)$ is a predicted output of the machine learning model $M^j$ for an input including the focus entity $e_1$ of the entity pair of the one or more factual links between the focus entity $e_1$ and the factual entity $e_F$ of that focus entity, where $SA^j(e_1, e_F)$ is the soft alignment of the entity pair of the one or more factual links between the focus entity $e_1$ and the factual entity $e_F$ of that focus entity.

According to some non-limiting embodiments or aspects, provided is a computer program product comprising at least one non-transitory computer-readable medium including program instructions that, when executed by at least one processor, cause the at least one processor to: obtain embeddings for a plurality of nodes in a graph including the plurality of nodes and a plurality of edges, wherein the plurality of nodes is associated with a plurality of entities, and wherein the plurality of edges is associated with a plurality of relationships between the plurality of entities; for each focus entity of a subset of focus entities, generate, using a machine learning model, at least one primary counterfactual link between that focus entity and at least one other entity; for each focus entity of the subset of focus entities, determine at least one secondary counterfactual link between that focus entity and at least one 1-hop node neighbor entity of the at least one other entity; for each focus entity of the subset of focus entities, determine one or more factual links between that focus entity and one or more other entities; learn a residual function by iteratively and alternatively optimizing a first objective function that depends on the one or more factual links and a second objective function that depends on the at least one primary counterfactual link and the at least one secondary counterfactual link, wherein, for each at least one other entity generated for each focus entity using the machine learning model, that at least one other entity is connected to one 1-hop node neighbor entity of that focus entity to update the node embeddings of those entities while holding the residual function constant; for each focus entity of the subset of focus entities, generate, using a further machine learning model different than the machine learning model, at least one further primary counterfactual link between that focus entity and at least one further entity; for each focus entity of the set of focus entities, determine one or more further factual links between that focus entity and one or more further entities; for each focus entity of the set of focus entities, generate a soft alignment of an entity pair of the one or more further factual links; and update one or more parameters of the further machine learning model using a further objective function that depends on the at least one further primary counterfactual link and the soft alignment of the entity pair of the one or more further factual links.

In some non-limiting embodiments or aspects, the first objective function is defined according to the following Equation:

$$\mathcal{L}_F = \sum_{(e_1, r, e_F) \in F(S_1)} sim\big((\vec{e}_1^T \otimes (\vec{p}_1^r + s\mathbb{I}))(\vec{e}_F^T \otimes (\vec{p}_2^r + s\mathbb{I}))\big)$$

where $S_1$ is the subset of focus entities of a set of focus entities $E_1^j$ of a first entity type $E_1$ for a task j, where the task j is associated with the machine learning model, where $(e_1, r, e_F) \in F(S_1)$ is a set of each factual link for each focus entity of the subset of focus entities $S_1$, where each factual link $(e_1, r, e_F)$ is between a focus entity $e_1$ of the subset of focus entities $S_1$ and a tail entity $e_F$ of that focus entity $e_1$, where r is a relation type of each factual link $(e_1, r, e_F)$, where $\vec{e}_1^T$ is a transformed embedding of the focus entity $e_1$, where $\vec{e}_F^T$ is a transformed embedding of the tail entity $e_F$, where $\vec{p}_1^r$ is a projector of the focus entity $e_1$ for the relation type r, where $\vec{p}_2^r$ is a projector of the tail entity $e_F$ for the relation type r, and where $s\mathbb{I}$ is an identity-matrix scaling factor, wherein the second objective function is defined according to the following Equation:

$$\mathcal{L}_{CF}^{j} =$$

$$\sum_{(e_1, e_{CF}) \in CF^j(S_1)} \mathcal{LPR}_{(\tilde{e}_1 + \delta_{E_1}^j(\tilde{e}_1), \tilde{e}_{CF} + \delta_{E_{CF}}^j(\tilde{e}_{CF})) + d1 \times disc(\delta_{E_1}^j(\tilde{e}_1)) + d2 \times disc(\delta_{E_1}^j(\tilde{e}_i))}^{CF}$$

where $(e_1, e_{CF}) \in CF^j(S_1)$ is a set counterfactual links including each primary counterfactual link and each secondary counterfactual link for each focus entity of the subset of focus entities $S_1$, where each counterfactual link $(e_1, e_{CF})$ is between the focus entity $e_1$ and a counterfactual entity $e_{CF}$ of that focus entity, where $\vec{e}_1$ is an embedding of the focus entity $e_1$, where $\delta_{E_1}^j$ is the residual function for the task j and the first entity type $E_1$, where $\vec{e}_{CF}$ is an embedding of the counterfactual entity $e_{CF}$, where d1 is a head scaling parameter, where d2 is a tail scaling parameter, where disc is a discrepancy distance measure, and where $\vec{e}_i$ are embeddings of focus entities $e_i$ in a focus set $S_{E_i}$, wherein the further objective function is defined according to the following Equation:

$$\partial^{j2} = O^{j2} + \lambda^{j2} \sum_{(e_1, r, e_{FF}) \in F(S_1)} (SA^{j2}(e_1, e_{FF}) - M^{j2}(e_1, e_{FF}))$$

where $O^{j2}$ is a differentiable objective function of the further machine learning model $M^{j2}$, where $\lambda^{j2}$ is a strength parameter that sets a strength of a regularization applied to the further machine learning model $M^{j2}$, where $M^{j2}(e_1, e_{FF})$ is a predicted output of the further machine learning model $M^{j2}$ for an input including the focus entity $e_1$ of the entity pair of the one or more factual links between the focus entity $e_1$ and the further factual entity $e_F$ of that focus entity, where $SA^j(e_1, e_{FF})$ is the soft alignment of the entity pair of the one or more further factual links between the focus entity $e_1$ and the further factual entity $e_{FF}$ of that focus entity.

In some non-limiting embodiments or aspects, the soft alignment of the entity pair is generated according to the following Equation:

$$SA^{j2}(e_1, e_F) = \mathcal{L}_{(\vec{e}_1 + \delta_{E_1}^{j2}(\vec{e}_1), e_{CFF} + \delta_{E_{CF}}^{j2}(\vec{e}_{CFF}))}$$

where $(e_1, e_{FF})$ is the entity pair of the one or more further factual links between the focus entity $e_1$ and a further factual entity $e_{FF}$ of that focus entity, where a task j2 is associated with the further machine learning model, where $\vec{e}_1$ is an embedding of the focus entity $e_1$, where $\delta_{E_1}^{j2}$ is a residual function for the task j2 and the first entity type $E_1$, where $\vec{e}_{CFF}$ is an embedding of a further counterfactual entity $e_{CFF}$ of a further counterfactual link between the focus entity $e_1$ and the further counterfactual entity $e_{CF}$, where $\delta_{E_{CFF}}^{j2}$ is a residual function for the task j2 and an entity type of the further counterfactual entity $e_{CFF}$, and where $\mathcal{L}$ is a factual likelihood defined according to the following Equation:

$$\mathcal{L}_{(\vec{e}_1, r, \vec{e}_2)} = sim((\vec{e}_1^T \otimes (\vec{p}_1^r + s\mathbb{I}))(\vec{e}_{FF}^T \otimes (\vec{p}_2^r + s\mathbb{I}))$$

where $\vec{e}_1^T$ is a transformed embedding of the focus entity $e_1$, where $\vec{e}_{FF}^T$ is a transformed embedding of the further factual entity $e_{FF}$, where $\vec{p}_1^r$ is a projector of the focus entity $e_1$ for the relation type r, where $\vec{p}_2^r$ is a projector of the further factual entity $e_{FF}$ for the relation type r, and where s $\mathbb{I}$ is an identity-matrix scaling factor.

Further embodiments or aspects are set forth in the following numbered clauses:

Clause 1. A computer-implemented method comprising: reading, with at least one processor, in parallel, with a plurality of threads, graph data associated with a plurality of edges and a plurality of nodes for the plurality of edges of a graph; for each edge of the plurality of edges, with a thread of the plurality of threads that read the graph data associated with that edge, one of: (i) discarding that edge, (ii) sampling that edge to generate one or more samples and providing the one or more samples to a random queue of a plurality of queues, and (iii) oversampling that edge to generate the one or more samples and providing the one or more samples to the random queue of the plurality of queues, based on frequencies of nodes for that edge, wherein the plurality of queues corresponds to a plurality of groups of threads; and training, with at least one other processor, in parallel, with the plurality of groups of threads, a plurality of embeddings of a plurality of samples provided to the plurality of queues.

Clause 2. The computer-implemented method of clause 1, wherein at least one central processing unit (CPU) executes the plurality of threads, and wherein a different graphics processing unit (GPU) of a plurality of GPUs executes each group of threads of the plurality of groups of threads.

Clause 3. The computer-implemented method of clauses 1 or 2, further comprising: converting, with the at least one processor, using a hash table, the graph to the graph data associated with the plurality of edges of the graph, wherein the graph data associated with the plurality of edges of the graph includes frequencies of the plurality of edges and frequencies of nodes for the plurality of edges.

Clause 4. The computer-implemented method of any of clauses 1-3, wherein the plurality of nodes includes a plurality of different types of nodes, and wherein for each edge of the plurality of edges, the thread of the plurality of threads that read the graph data associated with that edge determines to perform the one of: (i), (ii), and (iii) based on the frequencies of the nodes for that edge only with respect to frequencies of other nodes of a same type of node of the plurality of different types of nodes.

Clause 5. The computer-implemented method of any of clause 1-4, wherein providing the one or more samples to the random queue of the plurality of queues further includes: for each of the one or more samples, determining, with the at least one processor, a distance between that sample and a negative sample including at least one of a different node than that sample, a same node having a different node type than the same node of that sample, and a same edge having a different edge type than the same edge of that sample; and in response to determining that the distance satisfies a threshold distance, providing, with the at least one processor, the negative sample to the random queue of the plurality of queues.

Clause 6. The computer-implemented method of any of clauses 1-5, wherein training, with the at least one other processor, in parallel, with the plurality of groups of threads, the plurality of embeddings includes: for each queue of the plurality of queues, generating, with a group of threads of the plurality of groups of threads corresponding to that queue, node embeddings for two nodes and an edge embedding for an edge connecting the two nodes, based on samples provided to that queue, using an objective function that depends on embeddings of two nodes and an embedding of an edge connecting the two nodes; and storing, in a shared memory, with each group of threads of the plurality of groups of threads, the embeddings generated by that group of threads.

Clause 7. The computer-implemented method of any of clauses 1-6, wherein the plurality of queues corresponding to the plurality of groups of threads further correspond to a plurality of intermediate threads, the method further comprising: for each queue of the plurality of queues, with an intermediate thread of the plurality of intermediate threads corresponding to that queue: determining, with the at least one processor, that (i) the queue is at full capacity and (ii) the group of threads corresponding to that queue is ready for a next batch of training samples; and in response to determining that (i) the queue is at full capacity and (ii) the group of threads corresponding to that queue is ready for the next batch of training samples, copying, with the at least one processor, the samples provided to that queue from that queue to a memory of the group of threads corresponding to that queue.

Clause 8. The computer-implemented method of any of clauses 1-7, wherein the objective function is defined according to the following Equation:

$$L = \sum_{R_r \in R} \sum_{(e_{r_1}, r, e_{r_2}) \in R_r} \sigma(r \cdot (e_{r_1} \oplus e_{r_2})),$$

wherein $e_{r_1}$, $e_{r_2}$ and r respectively denote an embedding representation of the two nodes and the connecting edge of the two nodes, and wherein $\sigma(x) = 1/(1+e^{-x})$.

Clause 9. A system comprising: at least one central processing unit (CPU) programmed and/or configured to: read, in parallel, with a plurality of threads, graph data associated with a plurality of edges and a plurality of nodes for the plurality of edges of a graph; and for each edge of the plurality of edges, with a thread of the plurality of threads that read the graph data associated with that edge, one of: (i) discard that edge, (ii) sample that edge to generate one or more samples and provide the one or more samples to a random queue of a plurality of queues, and (iii) oversample that edge to generate the one or more samples and provide the one or more samples to the random queue of the plurality of queues, based on frequencies of nodes for that edge, wherein the plurality of queues corresponds to a plurality of groups of threads; and a plurality of graphics processing units (GPUs), wherein a different GPU of the plurality of GPUs executes each group of threads of the plurality of groups of threads, and wherein the plurality of GPUs are programmed and/or configured to: train, in parallel, with the plurality of groups of threads, a plurality of embeddings of a plurality of samples provided to the plurality of queues.

Clause 10. The system of clause 9, wherein the at least one CPU is further programmed and/or configured to: convert, using a hash table, the graph to the graph data associated with the plurality of edges of the graph, wherein the graph data associated with the plurality of edges of the graph includes frequencies of the plurality of edges and frequencies of nodes for the plurality of edges.

Clause 11. The system of clauses 9 or 10, wherein the plurality of nodes includes a plurality of different types of nodes, and wherein for each edge of the plurality of edges, the thread of the plurality of threads that read the graph data associated with that edge determines to perform the one of: (i), (ii), and (iii) based on the frequencies of the nodes for that edge only with respect to frequencies of other nodes of a same type of node of the plurality of different types of nodes.

Clause 12. The system of any of clauses 9-11, wherein the at least one CPU is further programmed and/or configured to provide the one or more samples to the random queue of the plurality of queues by: for each of the one or more samples, determine a distance between that sample and a negative sample including at least one of a different node than that sample, a same node having a different node type than the same node of that sample, and a same edge having a different edge type than the same edge of that sample; and in response to determining that the distance satisfies a threshold distance, provide the negative sample to the random queue of the plurality of queues.

Clause 13. The system of any of clauses 9-12, wherein the plurality of GPUs are programmed and/or configured to train, in parallel, with the plurality of groups of threads, the plurality of embeddings by: for each queue of the plurality of queues, generating, with a group of threads of the plurality of groups of threads corresponding to that queue, node embeddings for two nodes and an edge embedding for an edge connecting the two nodes, based on samples provided to that queue, using an objective function that depends on embeddings of two nodes and an embedding of an edge connecting the two nodes; and storing, in a shared memory, with each group of threads of the plurality of groups of threads, the embeddings generated by that group of threads.

Clause 14. The system of any of clauses 9-13, wherein the plurality of queues corresponding to the plurality of groups of threads further correspond to a plurality of intermediate threads, and wherein the at least one CPU is further programmed and/or configured to: for each queue of the plurality of queues, with an intermediate thread of the plurality of intermediate threads corresponding to that queue: determine, that (i) the queue is at full capacity and (ii) the GPU of the group of threads corresponding to that queue is ready for a next batch of training samples; and in response to determining that (i) the queue is at full capacity and (ii) the group of threads corresponding to that queue is ready for the next batch of training samples, copy the samples provided to that queue from that queue to a memory of the GPU of the group of threads corresponding to that queue.

Clause 15. The system of any of clauses 9-14, wherein the objective function is defined according to the following Equation:

$$L = \sum_{R_r \in R} \sum_{(e_{r_1}, r, e_{r_2}) \in R_r} \sigma(r \cdot (e_{r_1} \oplus e_{r_2})),$$

wherein $e_{r_1}$, $e_{r_2}$ and r respectively denote an embedding representation of the two nodes and the connecting edge of the two nodes, and wherein $\sigma(x) = 1/(1+e^{-x})$.

Clause 16. A computer program product comprising at least one non-transitory computer-readable medium including program instructions that, when executed by at least one processor, cause the at least one processor to: read, in parallel, with a plurality of threads, graph data associated with a plurality of edges and a plurality of nodes for the plurality of edges of a graph; for each edge of the plurality of edges, with a thread of the plurality of threads that read the graph data associated with that edge, one of: (i) discard that edge, (ii) sample that edge to generate one or more samples and provide the one or more samples to a random queue of a plurality of queues, and (iii) oversample that edge to generate the one or more samples and provide the one or more samples to the random queue of the plurality of queues, based on frequencies of nodes for that edge, wherein the plurality of queues corresponds to a plurality of groups of threads; and train, in parallel, with the plurality of groups of threads, a plurality of embeddings of a plurality of samples provided to the plurality of queues.

Clause 17. The computer program product of clause 16, wherein the at least one processor includes at least one central processing unit (CPU) and a plurality of graphics processing units (GPUs), wherein the at least one CPU executes the plurality of threads, and wherein a different GPU of the plurality of GPUs executes each group of threads of the plurality of groups of threads.

Clause 18. The computer program product of clauses 16 or 17, wherein the plurality of groups of threads, train, in parallel, the plurality of embeddings by: for each queue of the plurality of queues, generating, with a group of threads of the plurality of groups of threads corresponding to that queue, node embeddings for two nodes and an edge embedding for an edge connecting the two nodes, based on samples provided to that queue, using an objective function that depends on embeddings of two nodes and an embedding of an edge connecting the two nodes; and storing, in a shared memory, with each group of threads of the plurality of groups of threads, the embeddings generated by that group of threads.

Clause 19. The computer program product of any of clauses 16-18, wherein the plurality of queues corresponding to the plurality of groups of threads further correspond to a plurality of intermediate threads, and wherein the instructions cause the at least one CPU to execute the plurality of intermediate threads to: for each queue of the plurality of queues, with an intermediate thread of the plurality of intermediate threads corresponding to that queue: determine, that (i) the queue is at full capacity and (ii) the group of threads corresponding to that queue is ready for a next batch of training samples; and in response to determining that (i) the queue is at full capacity and (ii) the group of threads corresponding to that queue is ready for the next batch of training samples, copy the samples provided to that queue from that queue to a memory of the group of threads corresponding to that queue.

Clause 20. The computer program product of any of clauses 16-19, wherein the objective function is defined according to the following Equation:

$$L = \sum_{R_r \in R} \sum_{(e_{r_1}, r, e_{r_2}) \in R_r} \sigma(r \cdot (e_{r_1} \oplus e_{r_2})),$$

wherein $e_{r1}$, $e_{r2}$ and r respectively denote an embedding representation of the two nodes and the connecting edge of the two nodes, and wherein $\sigma(x)=1/(1+e^{-x})$.

Clause 21. A computer-implemented method comprising: obtaining, with at least one processor, a graph including a first layer including a plurality of first edges and a plurality of first nodes for the plurality of first edges, wherein the plurality of first nodes is associated with the plurality of entities, and wherein the plurality of first edges is associated with a plurality of first relationships between the plurality of entities; selecting and aggregating, with at least one processor, according to at least one function, a first subset of edges from the plurality of first edges and a first subset of nodes from the plurality of first nodes to generate an intermediate layer including a plurality of intermediate edges and a plurality of intermediate nodes for the plurality of intermediate edges, wherein the plurality of intermediate nodes is associated with a plurality of intermediate entities, and wherein the plurality of intermediate edges is associated with a plurality of intermediate relationships between the plurality of intermediate entities; and generating, with at least one processor, based on the intermediate layer, an embedding layer including embeddings for the plurality of intermediate edges and the plurality of intermediate nodes for the plurality of intermediate edges using an objective function that depends on the embeddings of two intermediate nodes and an intermediate edge connecting the two intermediate nodes.

Clause 22. The computer-implemented method of clause 21, wherein selecting and aggregating, according to the at least one function, the first subset of edges from the plurality of first edges and the first subset of nodes from the plurality of first nodes to generate the intermediate layer further includes: selecting and aggregating, according to a to a first function, the first subset of edges from the plurality of first edges and the first subset of nodes from the plurality of first nodes to generate a second layer including a plurality of second edges and a plurality of second nodes for the plurality of second edges, wherein the plurality of second nodes is associated with the plurality of entities, and wherein the plurality of second edges is associated with a plurality of second relationships between the plurality of entities; and selecting and aggregating, according to a second function, a second subset of edges from the plurality of first edges and the plurality of second edges and a second subset of nodes from the plurality of first nodes and the plurality of second nodes to generate as the intermediate layer a third layer including a plurality of third edges as the plurality of intermediate edges and a plurality of third nodes as the plurality of intermediate nodes for the plurality of third edges, wherein the plurality of third nodes is associated with a plurality of third entities, and wherein the plurality of third edges is associated with a plurality of third relationships between the plurality of third entities.

Clause 23. The computer-implemented method of clauses 21 or 22, wherein the objective function is defined according to the following equation:

$$L = \sum_{R_r \in R} \sum_{(e_1, r, e_2) \in R_r} \sigma(r(\vec{e}_1 \otimes \vec{e}_2))$$

where $\vec{e}_1$, $\vec{e}_2$ and r respectively denote an embedding representation of the two intermediate nodes and the connecting edge of the two intermediate nodes, and wherein $\sigma(x)=1/(1+e^{-x})$.

Clause 24. The computer-implemented method of any of clauses 21-23, wherein the objective function further depends on types of entities associated with the two intermediate nodes.

Clause 25. The computer-implemented method of any of clauses 21-24 wherein the objective function is defined according to the following equation:

$$\sigma_A(O_{Er1}(e_{r1}, r), O_{Er2}(e_{r2}, r))$$

wherein $\sigma_A$ is an alignment function that is the same for any pair of intermediate entity types $E_{r1}$, $E_{r2}$, wherein $e_{r1}$, $e_{r2}$ and r respectively denote an embedding representation of the two intermediate nodes and the connecting edge of the two intermediate nodes, wherein $O_{Er1}$ and $O_{Er2}$ respectively denote two projection operations depending on an entity type of a head entity $E_{r1}$ and an entity type of tail entity $E_{r2}$ of the two intermediate nodes $e_{r1}$, $e_{r2}$ for the connecting intermediate edge r.

Clause 26. The computer-implemented method of any of clauses 21-25, wherein generating the embeddings further includes: selecting a further subset of nodes from the plurality of intermediate nodes that have a threshold number of intermediate edges between a same two intermediate nodes; generating, based on only the further subset of nodes and the intermediate edges between the further subset of nodes, the embeddings for the further subset of nodes and the intermediate edges between the further subset of nodes using the objective function that depends on the embeddings of the two intermediate nodes and the intermediate edge connecting the two intermediate nodes; and generating, based on (i) the embeddings for the further subset of nodes and the intermediate edges between the further subset of nodes and (ii) the remaining intermediate nodes of the plurality of intermediate nodes not included in the further subset of nodes and the intermediate edges between the remaining intermediate nodes, the embeddings for the remaining intermediate nodes of the plurality of intermediate nodes not included in the further subset of nodes and the intermediate edges between the remaining intermediate nodes, using the objective function that depends on the embeddings of the two intermediate nodes and the intermediate edge connecting the two intermediate nodes, without updating the embeddings for the further subset of nodes and the intermediate edges between the further subset of nodes.

Clause 27. The computer-implemented method of any of clauses 21-26, further comprising: obtaining, with the at least one processor, an output of a machine learning model generated based on an input to the machine learning model, wherein the machine learning model is trained using the embeddings for the plurality of intermediate edges and the plurality of intermediate nodes for the plurality of intermediate edges, wherein the input includes a first intermediate entity of the plurality of intermediate entities and one or more intermediate entities of the plurality of intermediate entities having a different entity type than the first intermediate entity, and wherein the output includes at least one intermediate entity of the plurality of intermediate entities having a same entity type as the one or more intermediate entities, and wherein the same entity type is associated with a plurality of entity attribute types $A_1$, $A_2$, ... $A_n$; determining, with the at least one processor, for each entity attribute type $A_i$ of the plurality of entity attribute types $A_1$, $A_2$, ... $A_n$, a variance of that entity attribute type Variance $(A_i)$ as a cardinality of that entity attribute type Cardinality $(A_i)$ over the one or more intermediate entities included in the input; determining, with the at least one processor, for each entity attribute type $A_i$ for which the at least one intermediate entity in the output has a value $a_j$, a statistical significance of that entity attribute type Statistical Significance $(A_i=a_j)$ as a number of the one or more intermediate entities in the input that have a value $a_j$ for that entity attribute type $A_i$ divided by the variance of that entity attribute type Variance$(A_i)$; normalizing, with the at least one processor, to a 0 to 1 range the statistical significance of each entity attribute type Statistical Significance $(A_i=a_j)\sim[0, 1]$; and generating, with the at least one processor, based on the normalized statistical significance of each entity attribute type Statistical Significance $(A_i=a_j)\sim[0, 1]$, an explanation for the output of the machine learning model.

Clause 28. A system comprising: at least one processor programmed and/or configured to: obtain a graph including a first layer including a plurality of first edges and a plurality of first nodes for the plurality of first edges, wherein the plurality of first nodes is associated with the plurality of entities, and wherein the plurality of first edges is associated with a plurality of first relationships between the plurality of entities; select and aggregate, according to at least one function, a first subset of edges from the plurality of first edges and a first subset of nodes from the plurality of first nodes to generate an intermediate layer including a plurality of intermediate edges and a plurality of intermediate nodes for the plurality of intermediate edges, wherein the plurality of intermediate nodes is associated with a plurality of intermediate entities, and wherein the plurality of intermediate edges is associated with a plurality of intermediate relationships between the plurality of intermediate entities; and generate, based on the intermediate layer, an embedding layer including embeddings for the plurality of intermediate edges and the plurality of intermediate nodes for the plurality of intermediate edges using an objective function that depends on the embeddings of two intermediate nodes and an intermediate edge connecting the two intermediate nodes.

Clause 29. The system of clause 28, wherein the at least one processor is further programmed and/or configured to select and aggregate, according to the at least one function, the first subset of edges from the plurality of first edges and the first subset of nodes from the plurality of first nodes to generate the intermediate layer further by: selecting and aggregating, according to a to a first function, the first subset of edges from the plurality of first edges and the first subset of nodes from the plurality of first nodes to generate a second layer including a plurality of second edges and a plurality of second nodes for the plurality of second edges, wherein the plurality of second nodes is associated with the plurality of entities, and wherein the plurality of second edges is associated with a plurality of second relationships between the plurality of entities; and selecting and aggregating, according to a second function, a second subset of edges from the plurality of first edges and the plurality of second edges and a second subset of nodes from the plurality of first nodes and the plurality of second nodes to generate as the intermediate layer a third layer including a plurality of third edges as the plurality of intermediate edges and a plurality of third nodes as the plurality of intermediate nodes for the plurality of third edges, wherein the plurality of third nodes is associated with a plurality of third entities, and wherein the plurality of third edges is associated with a plurality of third relationships between the plurality of third entities.

Clause 30. The system of clauses 28 or 29, wherein the objective function is defined according to the following equation:

$$L = \sum_{R_r \in R} \sum_{(e_1, r, e_2) \in R_r} \sigma\left(r(\vec{e}_1 \otimes \vec{e}_2)\right)$$

where $\vec{e}_1$, $\vec{e}_2$ and r respectively denote an embedding representation of the two intermediate nodes and the connecting edge of the two intermediate nodes, and wherein $\sigma(x)=1/(1+e^{-x})$.

Clause 31. The system of any of clauses 28-30, wherein the objective function further depends on types of entities associated with the two intermediate nodes.

Clause 32. The system of any of clauses 28-31, wherein the objective function is defined according to the following equation:

$$\sigma_A(O_{Er1}(e_{r1}, r), O_{Er2}(e_{r2}, r))$$

wherein $\sigma_A$ is an alignment function that is the same for any pair of intermediate entity types $E_{r1}$, $E_{r2}$, wherein $e_{r1}$, $e_{r2}$ and r respectively denote an embedding representation of the two intermediate nodes and the connecting edge of the two intermediate nodes, wherein $O_{Er1}$ and $O_{Er2}$ respectively denote two projection operations depending on an entity type of a head entity $E_{r1}$ and an entity type of tail entity $E_{r2}$ of the two intermediate nodes $e_{r1}$, $e_{r2}$ for the connecting intermediate edge r.

Clause 33. The system of any of clauses 28-32, wherein the at least one processor is further programmed and/or configured to generate generating the embeddings by: selecting a further subset of nodes from the plurality of intermediate nodes that have a threshold number of intermediate edges between a same two intermediate nodes; generating, based on only the further subset of nodes and the intermediate edges between the further subset of nodes, the embeddings for the further subset of nodes and the intermediate edges between the further subset of nodes using the objective function that depends on the embeddings of the two intermediate nodes and the intermediate edge connecting the two intermediate nodes; and generating, based on (i) the embeddings for the further subset of nodes and the intermediate edges between the further subset of nodes and (ii) the remaining intermediate nodes of the plurality of intermediate nodes not included in the further subset of nodes and the intermediate edges between the remaining intermediate nodes, the embeddings for the remaining intermediate nodes of the plurality of intermediate nodes not included in the further subset of nodes and the intermediate edges between the remaining intermediate nodes, using the objective function that depends on the embeddings of the two intermediate nodes and the intermediate edge connecting the two intermediate nodes, without updating the embeddings for the further subset of nodes and the intermediate edges between the further subset of nodes.

Clause 34. The system of any of clauses 28-33, wherein the at least one processor is further programmed and/or configured to: obtain an output of a machine learning model generated based on an input to the machine learning model, wherein the machine learning model is trained using the embeddings for the plurality of intermediate edges and the plurality of intermediate nodes for the plurality of intermediate edges, wherein the input includes a first intermediate entity of the plurality of intermediate entities and one or more intermediate entities of the plurality of intermediate entities having a different entity type than the first intermediate entity, and wherein the output includes at least one intermediate entity of the plurality of intermediate entities having a same entity type as the one or more intermediate entities, and wherein the same entity type is associated with a plurality of entity attribute types $A_1$, $A_2$, ... $A_n$; determine, for each entity attribute type $A_i$ of the plurality of entity attribute types $A_1$, $A_2$, . . . $A_n$, a variance of that entity attribute type Variance($A_i$) as a cardinality of that entity attribute type Cardinality($A_i$) over the one or more intermediate entities included in the input; determine, for each entity attribute type $A_i$ for which the at least one intermediate entity in the output has a value $a_j$, a statistical significance of that entity attribute type Statistical Significance ($A_i=a_j$) as a number of the one or more intermediate entities in the input that have a value $a_j$ for that entity attribute type $A_i$ divided by the variance of that entity attribute type Variance($A_i$); normalize, to a 0 to 1 range the statistical significance of each entity attribute type Statistical Significance ($A_i=a_j$)~[0, 1]; and generate, based on the normalized statistical significance of each entity attribute type Statistical Significance ($A_i=a_j$)~[0, 1], an explanation for the output of the machine learning model.

Clause 35. A computer program product comprising at least one non-transitory computer-readable medium including program instructions that, when executed by at least one processor, cause the at least one processor to: obtain a graph including a first layer including a plurality of first edges and a plurality of first nodes for the plurality of first edges, wherein the plurality of first nodes is associated with the plurality of entities, and wherein the plurality of first edges is associated with a plurality of first relationships between the plurality of entities; select and aggregate, according to at least one function, a first subset of edges from the plurality of first edges and a first subset of nodes from the plurality of first nodes to generate an intermediate layer including a plurality of intermediate edges and a plurality of intermediate nodes for the plurality of intermediate edges, wherein the plurality of intermediate nodes is associated with a plurality of intermediate entities, and wherein the plurality of intermediate edges is associated with a plurality of intermediate relationships between the plurality of intermediate entities; and generate, based on the intermediate layer, an embedding layer including embeddings for the plurality of intermediate edges and the plurality of intermediate nodes for the plurality of intermediate edges using an objective function that depends on the embeddings of two intermediate nodes and an intermediate edge connecting the two intermediate nodes.

Clause 36. The computer program product of clause 35, wherein the instructions, when executed by the at least one processor, further cause the at least one processor to select and aggregate, according to the at least one function, the first subset of edges from the plurality of first edges and the first subset of nodes from the plurality of first nodes to generate the intermediate layer further by: selecting and aggregating, according to a to a first function, the first subset of edges from the plurality of first edges and the first subset of nodes from the plurality of first nodes to generate a second layer including a plurality of second edges and a plurality of second nodes for the plurality of second edges, wherein the plurality of second nodes is associated with the plurality of entities, and wherein the plurality of second edges is associated with a plurality of second relationships between the plurality of entities; and selecting and aggregating, according to a second function, a second subset of edges from the plurality of first edges and the plurality of second edges and a second subset of nodes from the plurality of first nodes and the plurality of second nodes to generate as the intermediate layer a third layer including a plurality of third edges as the plurality of intermediate edges and a plurality of third nodes as the plurality of intermediate nodes for the plurality of third edges, wherein the plurality of third nodes is associated with a plurality of third entities, and wherein the plurality of third edges is associated with a plurality of third relationships between the plurality of third entities.

Clause 37. The computer program product of clauses 35 or 36, wherein the objective function is defined according to the following equation:

$$L = \sum_{R_r \in R} \sum_{(e_1, r, e_2) \in R_r} \sigma\left(r\left(\vec{e}_1 \otimes \vec{e}_2\right)\right)$$

where $\vec{e}_1$, $\vec{e}_2$ and r respectively denote an embedding representation of the two intermediate nodes and the connecting edge of the two intermediate nodes, and wherein $\sigma(x)=1/(1+e^{-x}))$.

Clause 38. The computer program product of any of clauses 35-37, wherein the objective function further depends on types of entities associated with the two intermediate nodes.

Clause 39. The computer program product of any of clauses 35-38, wherein the objective function is defined according to the following equation:

$$\sigma_A(O_{Er1}(e_{r1},r),O_{Er2}(e_{r2},r))$$

wherein $\sigma_A$ is an alignment function that is the same for any pair of intermediate entity types $E_{r1}$, $E_{r2}$, wherein $e_{r1}$, $e_{r2}$ and r respectively denote an embedding representation of the two intermediate nodes and the connecting edge of the two intermediate nodes, wherein $O_{Er1}$ and $O_{Er2}$ respectively denote two projection operations depending on an entity type of a head entity $E_{r1}$ and an entity type of tail entity $E_{r2}$ of the two intermediate nodes $e_{r1}$, $e_{r2}$ for the connecting intermediate edge r.

Clause 40. The computer program product of any of clauses 35-39, wherein the instructions, when executed by the at least one processor, further cause the at least one processor to generate the embeddings by: selecting a further subset of nodes from the plurality of intermediate nodes that have a threshold number of intermediate edges between a same two intermediate nodes; generating, based on only the further subset of nodes and the intermediate edges between the further subset of nodes, the embeddings for the further subset of nodes and the intermediate edges between the further subset of nodes using the objective function that depends on the embeddings of the two intermediate nodes and the intermediate edge connecting the two intermediate nodes; and generating, based on (i) the embeddings for the further subset of nodes and the intermediate edges between the further subset of nodes and (ii) the remaining intermediate nodes of the plurality of intermediate nodes not included in the further subset of nodes and the intermediate edges between the remaining intermediate nodes, the embeddings for the remaining intermediate nodes of the plurality of intermediate nodes not included in the further subset of nodes and the intermediate edges between the remaining intermediate nodes, using the objective function that depends on the embeddings of the two intermediate nodes and the intermediate edge connecting the two intermediate nodes, without updating the embeddings for the further subset of nodes and the intermediate edges between the further subset of nodes.

Clause 41. The computer program product of any of clauses 35-40, wherein the instructions, when executed by the at least one processor, further cause the at least one processor to: obtain an output of a machine learning model generated based on an input to the machine learning model, wherein the machine learning model is trained using the embeddings for the plurality of intermediate edges and the plurality of intermediate nodes for the plurality of intermediate edges, wherein the input includes a first intermediate entity of the plurality of intermediate entities and one or more intermediate entities of the plurality of intermediate entities having a different entity type than the first intermediate entity, and wherein the output includes at least one intermediate entity of the plurality of intermediate entities having a same entity type as the one or more intermediate entities, and wherein the same entity type is associated with a plurality of entity attribute types $A_1$, $A_2$, ... $A_n$; determine, for each entity attribute type $A_i$ of the plurality of entity attribute types $A_1$, $A_2$, ... $A_n$, a variance of that entity attribute type Variance($A_i$) as a cardinality of that entity attribute type Cardinality($A_i$) over the one or more intermediate entities included in the input; determine, for each entity attribute type $A_i$ for which the at least one intermediate entity in the output has a value $a_j$, a statistical significance of that entity attribute type Statistical Significance ($A_i=a_j$) as a number of the one or more intermediate entities in the input that have a value $a_j$ for that entity attribute type $A_i$ divided by the variance of that entity attribute type Variance($A_i$); normalize, to a 0 to 1 range the statistical significance of each entity attribute type Statistical Significance ($A_i=a_j$)~[0, 1]; and generate, based on the normalized statistical significance of each entity attribute type Statistical Significance ($A_i=a_j$)~[0, 1], an explanation for the output of the machine learning model.

Clause 42. A computer-implemented method comprising: obtaining, with at least one processor, embeddings for a plurality of nodes in a graph including the plurality of nodes and a plurality of edges, wherein the plurality of nodes is associated with a plurality of entities, and wherein the plurality of edges is associated with a plurality of relationships between the plurality of entities; for each focus entity of a subset of focus entities, generating, with the at least one processor, using a machine learning model, at least one primary counterfactual link between that focus entity and at least one other entity; for each focus entity of the subset of focus entities, determining, with the at least one processor, at least one secondary counterfactual link between that focus entity and at least one 1-hop node neighbor entity of the at least one other entity; for each focus entity of the subset of focus entities, determining, with the at least one processor, one or more factual links between that focus entity and one or more other entities; learning, with at least one processor, a residual function by iteratively and alternatively optimizing a first objective function that depends on the one or more factual links and a second objective function that depends on the at least one primary counterfactual link and the at least one secondary counterfactual link, wherein alternatively optimizing the first objective function and the second objective function alternately updates embeddings of focus entities in the subset of focus entities, the residual function, and discrepancy distance measures of node embeddings across a factual domain and counterfactual domain.

Clause 43. The computer-implemented method of clause 42, wherein the first objective function is defined according to the following Equation:

$$\mathcal{L}_F = \sum_{(e_1,r,e_F)\in F(S_1)} sim((\vec{e}_1^T \otimes (\vec{p}_1^r + s[\![]\!]))(\vec{e}_F^T \otimes (\vec{p}_2^r + s[\![]\!])))$$

where $S_1$ is the subset of focus entities of a set of focus entities $E_1^j$ of a first entity type $E_1$ for a task j, where the task j is associated with the machine learning model, where $(e_1,r,e_F)\in F(S_1)$ is a set of each factual link for each focus entity of the subset of focus entities $S_1$, where each factual link $(e_1,r,e_F)$ is between a focus entity $e_1$ of the subset of focus entities $S_1$ and a tail entity $e_F$ of that focus entity $e_1$, where r is a relation type of each factual link $(e_1,r,e_F)$, where $\vec{e}_1^T$ is a transformed embedding of the focus entity $e_1$, where $\vec{e}_F^T$ is a transformed embedding of the tail entity $e_F$, where $\vec{p}_1^r$ is a projector of the focus entity $e_1$ for the relation type r, where $\vec{p}_2^r$ is a projector of the tail entity $e_F$ for the relation type r, and where $s\mathbb{I}$ is an identity-matrix scaling factor, wherein the second objective function is defined according to the following Equation:

$$\mathcal{L}_{CF}^{j} = \sum_{(e_1, e_{CF}) \in CF^j(S_1)} \mathcal{LPR}_{(\vec{e}_1 + \delta_{E_1}^j(\vec{e}_1), \vec{e}_{CF} + \delta_{E_{CF}}^j(\vec{e}_{CF})) + d1 \times disc(\delta_{E_1}^j(\vec{e}_1)) + d2 \times disc(\delta_{E_1}^j(\vec{e}_1))}^{CF}$$

where $(e_1, e_{CF}) \in CF^j(S_1)$ is a set counterfactual links including each primary counterfactual link and each secondary counterfactual link for each focus entity of the subset of focus entities $S_1$, where each counterfactual link $(e_1, e_{CF})$ is between the focus entity $e_1$ and a counterfactual entity $e_{CF}$ of that focus entity, where $\vec{e}_1$ is an embedding of the focus entity $e_1$, where $\delta_{E_1}^j$ is the residual function for the task j and the first entity type $E_1$, where $\vec{e}_{CF}$ is an embedding of the counterfactual entity $e_{CF}$, where d1 is a head scaling parameter, where d2 is a tail scaling parameter, where disc is a discrepancy distance measure, and where $\vec{e}_i$ are embeddings of focus entities $e_i$ in a focus set $S_{E_i}$.

Clause 44. A computer-implemented method comprising: obtaining, with at least one processor, embeddings for a plurality of nodes in a graph including the plurality of nodes and a plurality of edges, wherein the plurality of nodes is associated with a plurality of entities, and wherein the plurality of edges is associated with a plurality of relationships between the plurality of entities; for each focus entity of a subset of focus entities, generating, with the at least one processor, using a machine learning model, at least one primary counterfactual link between that focus entity and at least one other entity; for each focus entity of the subset of focus entities, determining, with the at least one processor, one or more factual links between that focus entity and one or more other entities; for each focus entity of the subset of focus entities, generating, with the at least one processor, a soft alignment of an entity pair of the one or more factual links; and updating, with the at least one processor, one or more parameters of the machine learning model using an objective function that depends on the at least one primary counterfactual link and the soft alignment of the entity pair of the one or more factual links for each focus entity.

Clause 45. The computer-implemented method of clause 44, wherein the soft alignment of the entity pair is generated according to the following Equation:

$$SA^j(e_1, e_F) = \mathcal{L}_{(\vec{e}_1 + \delta_{E_1}^j(\vec{e}_1), e_{CF} + \delta_{E_{CF}}^j(\vec{e}_{CF}))}$$

where $(e_1, e_F)$ is the entity pair of the one or more factual links between a focus entity $e_1$ of a subset of focus entities $S_1$ of a set of focus entities $E_1^j$ of a first entity type $E_1$ for a task j and a factual entity $e_F$ of that focus entity, where the task j is associated with the machine learning model, where $\vec{e}_1$ is an embedding of the focus entity $e_1$, where $\delta_{E_1}^j$ is a residual function for the task j and the first entity type $E_1$, where $\vec{e}_{CF}$ is an embedding of a counterfactual entity $e_{CF}$ of a counterfactual link between the focus entity $e_1$ and the counterfactual entity $e_{CF}$, where $\delta_{E_{CF}}^j$ is a residual function for the task j and an entity type of the counterfactual entity $e_{CF}$, and where $\mathcal{L}$ is a factual likelihood defined according to the following Equation:

$$\mathcal{L}_{(\vec{e}_1, r, \vec{e}_2)} = sim((\vec{e}_1^T \otimes (\vec{p}_1^r + s\mathbb{I}))(\vec{e}_F^T \otimes (\vec{p}_2^r + s\mathbb{I}))$$

where $\vec{e}_1^T$ is a transformed embedding of the focus entity $e_1$, where $\vec{e}_F^T$ is a transformed embedding of factual entity $e_F$, where $\vec{p}_1^r$ is a projector of the focus entity $e_1$ for the relation type r, where $\vec{p}_2^r$ is a projector of the factual entity $e_F$ for the relation type r, and where $s\mathbb{I}$ is an identity-matrix scaling factor.

Clause 46. A computer-implemented method comprising: obtaining, with at least one processor, embeddings for a plurality of nodes in a graph including the plurality of nodes and a plurality of edges, wherein the plurality of nodes is associated with a plurality of entities, and wherein the plurality of edges is associated with a plurality of relationships between the plurality of entities; for each focus entity of a subset of focus entities, generating, with the at least one processor, using a machine learning model, at least one primary counterfactual link between that focus entity and at least one other entity; for each focus entity of the subset of focus entities, determining, with the at least one processor, at least one secondary counterfactual link between that focus entity and at least one 1-hop node neighbor entity of the at least one other entity; for each focus entity of the subset of focus entities, determining, with the at least one processor, one or more factual links between that focus entity and one or more other entities; for each focus entity of the subset of focus entities, generating, with the at least one processor, a soft alignment of an entity pair of the one or more factual links; and learning, with the at least one processor, a residual function by iteratively and alternatively optimizing a first objective function that depends on the one or more factual links, a second objective function that depends on the at least one primary counterfactual link and the at least one secondary counterfactual link, and a third objective function that depends on the at least one primary counterfactual link and the soft alignment of the entity pair of the one or more factual links, wherein alternatively optimizing the first objective function, the second objective function, and the third objective function alternately updates embeddings of focus entities in the set of focus entities, the residual function, discrepancy distance measures of node embeddings across a factual domain and a counterfactual domain, and one or more parameters of the machine learning model.

Clause 47. The computer-implemented method of clause 46, wherein the first objective function is defined according to the following Equation:

$$\mathcal{L}_F = \sum_{(e_1, r, e_F) \in F(S_1)} sim((\vec{e}_1^T \otimes (\vec{p}_1^r + s\mathbb{I}))(\vec{e}_F^T \otimes (\vec{p}_2^r + s\mathbb{I}))$$

where $S_1$ is the subset of focus entities of a set of focus entities $E_1^j$ of a first entity type $E_1$ for a task j, where the task j is associated with the machine learning model, where $(e_1, r, e_F) \in F(S_1)$ is a set of each factual link for each focus entity of the subset of focus entities $S_1$, where each factual link $(e_1, r, e_F)$ is between a focus entity $e_1$ of the subset of focus entities $S_1$ and a tail entity $e_F$ of that focus entity $e_1$, where r is a relation type of each factual link $(e_1, r, e_F)$, where $\vec{e}_1^T$ is a transformed embedding of the focus entity $e_1$, where $\vec{e}_F^T$ is a transformed embedding of the tail entity $e_F$, where $\vec{p}_1^r$ is a projector of the focus entity $e_1$ for the relation type r, where $\vec{p}_2^r$ is a projector of the tail entity $e_F$ for the relation type r, and where $s\mathbb{I}$ is an identity-matrix scaling factor, wherein the second objective function is defined according to the following Equation:

$$\mathcal{L}_{CF}^{j} =$$

$$\sum_{(e_1, e_{CF}) \in CF^j(S_1)} \mathcal{LPR}_{(\vec{e}_1 + \delta_{E_1}^j(\vec{e}_1), \vec{e}_{CF} + \delta_{E_{CF}}^j(\vec{e}_{CF})) + d1 \times disc(\delta_{E_1}^j(\vec{e}_1)) + d2 \times disc(\delta_{E_1}^j(\vec{e}_i))}^{CF}$$

where $(e_1, e_{CF}) \in CF^j(S_1)$ is a set counterfactual links including each primary counterfactual link and each secondary counterfactual link for each focus entity of the subset of focus entities $S_1$, where each counterfactual link $(e_1, e_{CF})$ is between the focus entity $e_1$ and a counterfactual entity $e_{CF}$ of that focus entity, where $\vec{e}_1$ is an embedding of the focus entity $e_1$, where $\delta_{E_1}^j$ is the residual function for the task j and the first entity type $E_1$, where $\vec{e}_{CF}$ is an embedding of the counterfactual entity $e_{CF}$, where d1 is a head scaling parameter, where d2 is a tail scaling parameter, where disc is a discrepancy distance measure, and where $e_i$ are embeddings of focus entities $e_i$ in a focus set $S_{E_i}$, where the third objective function is defined according to the following Equation:

$$\tilde{O}^j = O^j + \lambda^j \sum_{(e_1, r, e_F) \in F(S_1)} (SA^j(e_1, e_F) - M^j(e_1, e_F))$$

where $O^j$ is a differentiable objective function of the machine learning model $M^j$, where $\lambda^j$ is a strength parameter that sets a strength of a regularization applied to the machine learning model $M^j$, where $M^j(e_1, e_F)$ is a predicted output of the machine learning model $M^j$ for an input including the focus entity $e_1$ of the entity pair of the one or more factual links between the focus entity $e_1$ and the factual entity $e_F$ of that focus entity, where $SA^j(e_1, e_F)$ is the soft alignment of the entity pair of the one or more factual links between the focus entity $e_1$ and the factual entity $e_F$ of that focus entity.

Clause 48. A computer-implemented method comprising: obtaining, with at least one processor, embeddings for a plurality of nodes in a graph including the plurality of nodes and a plurality of edges, wherein the plurality of nodes is associated with a plurality of entities, and wherein the plurality of edges is associated with a plurality of relationships between the plurality of entities; for each focus entity of a subset of focus entities, generating, with the at least one processor, using a machine learning model, at least one primary counterfactual link between that focus entity and at least one other entity; for each focus entity of the subset of focus entities, determining, with the at least one processor, at least one secondary counterfactual link between that focus entity and at least one 1-hop node neighbor entity of the at least one other entity; for each focus entity of the subset of focus entities, determining, with the at least one processor, one or more factual links between that focus entity and one or more other entities; learning, with the at least one processor, a residual function by iteratively and alternatively optimizing a first objective function that depends on the one or more factual links and a second objective function that depends on the at least one primary counterfactual link and the at least one secondary counterfactual link, wherein, for each at least one other entity generated for each focus entity using the machine learning model, that at least one other entity is connected to one 1-hop node neighbor entity of that focus entity to update the node embeddings of those entities while holding the residual function constant; for each focus entity of the subset of focus entities, generating, with the at least one processor, using a further machine learning model different than the machine learning model, at least one further primary counterfactual link between that focus entity and at least one further entity; for each focus entity of the set of focus entities, determining, with the at least one processor, one or more further factual links between that focus entity and one or more further entities; for each focus entity of the set of focus entities, generate, with the at least one processor, a soft alignment of an entity pair of the one or more further factual links; and updating, with the at least one processor, one or more parameters of the further machine learning model using a further objective function that depends on the at least one further primary counterfactual link and the soft alignment of the entity pair of the one or more further factual links.

Clause 49. The computer-implemented method of clause 48, wherein the first objective function is defined according to the following Equation:

$$\mathcal{L}_F = \sum_{(e_1, r, e_F) \in F(S_1)} sim((\vec{e}_1^T \otimes (\vec{p}_1^r + s\mathbb{I}))(\vec{e}_F^T \otimes (\vec{p}_2^r + s\mathbb{I}))$$

where $S_1$ is the subset of focus entities of a set of focus entities $E_1^j$ of a first entity type $E_1$ for a task j, where the task j is associated with the machine learning model, where $(e_1, r, e_F) \in F(S_1)$ is a set of each factual link for each focus entity of the subset of focus entities $S_1$, where each factual link $(e_1, r, e_F)$ is between a focus entity $e_1$ of the subset of focus entities $S_1$ and a tail entity $e_F$ of that focus entity $e_1$, where r is a relation type of each factual link $(e_1, r, e_F)$, where $\vec{e}_1^T$ is a transformed embedding of the focus entity $e_1$, where $\vec{e}_F^T$ is a transformed embedding of the tail entity $e_F$, where $\vec{p}_1^r$ is a projector of the focus entity $e_1$ for the relation type r, where $\vec{p}_2^r$ is a projector of the tail entity $e_F$ for the relation type r, and where $s\mathbb{I}$ is an identity-matrix scaling factor, wherein the second objective function is defined according to the following Equation:

$$\mathcal{L}_{CF}^{j} =$$

$$\sum_{(e_1, e_{CF}) \in CF^j(S_1)} \mathcal{LPR}_{(\vec{e}_1 + \delta_{E_1}^j(\vec{e}_1), \vec{e}_{CF} + \delta_{E_{CF}}^j(\vec{e}_{CF})) + d1 \times disc(\delta_{E_1}^j(\vec{e}_1)) + d2 \times disc(\delta_{E_1}^j(\vec{e}_i))}^{CF}$$

where $(e_1, e_{CF}) \in CF^j(S_1)$ is a set counterfactual links including each primary counterfactual link and each secondary counterfactual link for each focus entity of the subset of focus entities $S_1$, where each counterfactual link $(e_1, e_{CF})$ is between the focus entity $e_1$ and a counterfactual entity $e_{CF}$ of that focus entity, where $\vec{e}_1$ is an embedding of the focus entity $e_1$, where $\delta_{E_1}^j$ is the residual function for the task j and the first entity type $E_1$, where $\vec{e}_{CF}$ is an embedding of the counterfactual entity $e_{CF}$, where d1 is a head scaling parameter, where d2 is a tail scaling parameter, where disc is a discrepancy distance measure, and where $\vec{e}_i$ are embeddings of focus entities $e_i$ in a focus set $S_{E_i}$, wherein the further objective function is defined according to the following Equation:

$$\hat{O}^{j2} = O^{j2} + \lambda^{j2} \sum_{(e_1, r, e_{FF}) \in F(S_1)} \left( SA^{j2}(e_1, e_{FF}) - M^{j2}(e_1, e_{FF}) \right)$$

where $O^{j2}$ is a differentiable objective function of the further machine learning model $M^{j2}$, where $\lambda^{j2}$ is a strength parameter that sets a strength of a regularization applied to the further machine learning model $M^{j2}$, where $M^{j2}(e_1, e_{FF})$ is a predicted output of the further machine learning model $M^{j2}$ for an input including the focus entity $e_1$ of the entity pair of the one or more factual links between the focus entity $e_1$ and the further factual entity $e_F$ of that focus entity, where $SA^{j}(e_1, e_{FF})$ is the soft alignment of the entity pair of the one or more further factual links between the focus entity $e_1$ and the further factual entity $e_{FF}$ of that focus entity.

Clause 50. The computer-implemented method of clauses 48 or 49, wherein the soft alignment of the entity pair is generated according to the following Equation:

$$SA^{j2}(e_1, e_F) = \mathcal{L}_{(\vec{e}_1 + \delta_{E_1}^{j2}(\vec{e}_1), e_{CFF} + \delta_{E_{CF}}^{j2}(\vec{e}_{CFF}))}$$

where $(e_1, e_{FF})$ is the entity pair of the one or more further factual links between the focus entity $e_1$ and a further factual entity $e_{FF}$ of that focus entity, where a task $j2$ is associated with the further machine learning model, where $\vec{e}_1$ is an embedding of the focus entity $e_1$, where $\delta_{E_1}^{j2}$ is a residual function for the task $j2$ and the first entity type $E_1$, where $\vec{e}_{CFF}$ is an embedding of a further counterfactual entity $e_{CFF}$ of a further counterfactual link between the focus entity $e_1$ and the further counterfactual entity $e_{CF}$, where $\delta_{E_{CFF}}^{j2}$ is a residual function for the task $j2$ and an entity type of the further counterfactual entity $e_{CFF}$, and where $\mathcal{L}$ is a factual likelihood defined according to the following Equation:

$$\mathcal{L}_{(\vec{e}_1, r, \vec{e}_2)} = sim((\vec{e}_1^T \otimes (\vec{p}_1^r + s\mathbb{I}))(\vec{e}_{FF}^T \otimes$$
$$(\vec{p}_2^r + s\mathbb{I}))$$

where $\vec{e}_1^T$ is a transformed embedding of the focus entity $e_1$, where $\vec{e}_{FF}^T$ is a transformed embedding of the further factual entity $e_{FF}$, where $\vec{p}_1^r$ is a projector of the focus entity $e_1$ for the relation type r, where $\vec{p}_2^r$ is a projector of the further factual entity $e_{FF}$ for the relation type r, and where $s\mathbb{I}$ is an identity-matrix scaling factor.

Clause 51. A system comprising: at least one processor programmed and/or configured to: obtain embeddings for a plurality of nodes in a graph including the plurality of nodes and a plurality of edges, wherein the plurality of nodes is associated with a plurality of entities, and wherein the plurality of edges is associated with a plurality of relationships between the plurality of entities; for each focus entity of a subset of focus entities, generate, using a machine learning model, at least one primary counterfactual link between that focus entity and at least one other entity; for each focus entity of the subset of focus entities, determine at least one secondary counterfactual link between that focus entity and at least one 1-hop node neighbor entity of the at least one other entity; for each focus entity of the subset of focus entities, determine one or more factual links between that focus entity and one or more other entities; learn a residual function by iteratively and alternatively optimizing a first objective function that depends on the one or more factual links and a second objective function that depends on the at least one primary counterfactual link and the at least one secondary counterfactual link, wherein alternatively optimizing the first objective function and the second objective function alternately updates embeddings of focus entities in the subset of focus entities, the residual function, and discrepancy distance measures of node embeddings across a factual domain and counterfactual domain.

Clause 52. The system of clause 51, wherein the first objective function is defined according to the following Equation:

$$\mathcal{L}_F = \sum_{(e_1, r, e_F) \in F(S_1)} sim((\vec{e}_1^T \otimes (\vec{p}_1^r + s\mathbb{I}))(\vec{e}_F^T \otimes (\vec{p}_2^r + s\mathbb{I})))$$

where $S_1$ is the subset of focus entities of a set of focus entities $E_1^j$ of a first entity type $E_1$ for a task j, where the task j is associated with the machine learning model, where $(e_1, r, e_F) \in F(S_1)$ is a set of each factual link for each focus entity of the subset of focus entities $S_1$, where each factual link $(e_1, r, e_F)$ is between a focus entity $e_1$ of the subset of focus entities $S_1$ and a tail entity $e_F$ of that focus entity $e_1$, where r is a relation type of each factual link $(e_1, r, e_F)$, where $\vec{e}_1^T$ is a transformed embedding of the focus entity $e_1$, where $\vec{e}_F^T$ is a transformed embedding of the tail entity $e_F$, where $\vec{p}_1^r$ is a projector of the focus entity $e_1$ for the relation type r, where $\vec{p}_2^r$ is a projector of the tail entity $e_F$ for the relation type r, and where $s\mathbb{I}$ is an identity-matrix scaling factor, wherein the second objective function is defined according to the following Equation:

$$\mathcal{L}_{CF}^j = \sum_{(e_1, e_{CF}) \in CF^j(S_1)}$$
$$\mathcal{LPR}_{(\vec{e}_1 + \delta_{E_1}^j(\vec{e}_1), \vec{e}_{CF} + \delta_{E_{CF}}^j(\vec{e}_{CF}))}^{CF} + d1 \times disc(\delta_{E_1}^j(\vec{e}_1)) + d2 \times disc(\delta_{E_1}^j(\vec{e}_1))$$

where $(e_1, e_{CF}) \in CF^j(S_1)$ is a set counterfactual links including each primary counterfactual link and each secondary counterfactual link for each focus entity of the subset of focus entities $S_1$, where each counterfactual link $(e_1, e_{CF})$ is between the focus entity $e_1$ and a counterfactual entity $e_{CF}$ of that focus entity, where $\vec{e}_1$ is an embedding of the focus entity $e_1$, where $\delta_{E_1}^j$ is the residual function for the task j and the first entity type $E_1$, where $\vec{e}_{CF}$ is an embedding of the counterfactual entity $e_{CF}$, where d1 is a head scaling parameter, where d2 is a tail scaling parameter, where disc is a discrepancy distance measure, and where $\vec{e}_i$ are embeddings of focus entities $e_i$ in a focus set $S_{E_i}$.

Clause 53. A system comprising: at least one processor programmed and/or configured to: obtain embeddings for a plurality of nodes in a graph including the plurality of nodes and a plurality of edges, wherein the plurality of nodes is associated with a plurality of entities, and wherein the plurality of edges is associated with a plurality of relationships between the plurality of entities; for each focus entity of a subset of focus entities, generate, using a machine learning model, at least one primary counterfactual link between that focus entity and at least one other entity; for each focus entity of the subset of focus entities, determine one or more factual links between that focus entity and one or more other entities; for each focus entity of the subset of focus entities, generate a soft alignment of an entity pair of the one or more factual links; and update one or more parameters of the machine learning model using an objective function that depends on the at least one primary counterfactual link and the soft alignment of the entity pair of the one or more factual links for each focus entity.

Clause 54. The system of clause 53, wherein the soft alignment of the entity pair is generated according to the following Equation:

$$SA^j(e_1,e_F) = \mathcal{L}_{(\vec{e}_1 + \delta_{E_1}{}^j(\vec{e}_1), e_{CF} + \delta_{E_{CF}}{}^j(\vec{e}_{CF}))}$$

where $(e_1, e_F)$ is the entity pair of the one or more factual links between a focus entity $e_1$ of a subset of focus entities $S_1$ of a set of focus entities $E_1{}^j$ of a first entity type $E_1$ for a task $j$ and a factual entity $e_F$ of that focus entity, where the task $j$ is associated with the machine learning model, where $\vec{e}_1$ is an embedding of the focus entity $e_1$, where $\delta_{E_i}{}^j$ is a residual function for the task $j$ and the first entity type $E_1$, where $\vec{e}_{CF}$ is an embedding of a counterfactual entity $e_{CF}$ of a counterfactual link between the focus entity $e_1$ and the counterfactual entity $e_{CF}$, where $\delta_{E_{CF}}{}^j$ is a residual function for the task $j$ and an entity type of the counterfactual entity $e_{CF}$, and where $\mathcal{L}$ is a factual likelihood defined according to the following Equation:

$$\mathcal{L}_{(\vec{e}_1, r, \vec{e}_2)} = \text{sim}((\vec{e}_1{}^T \otimes (\vec{p}_1{}^r + s\,\mathbb{I}))(\vec{e}_{FF}{}^T \otimes (\vec{p}_2{}^r + s\,\mathbb{I}))$$

where $\vec{e}_1{}^T$ is a transformed embedding of the focus entity $e_1$, where $\vec{e}_F{}^T$ is a transformed embedding of factual entity $e_F$, where $\vec{p}_1{}^r$ is a projector of the focus entity $e_1$ for the relation type $r$, where $\vec{p}_2{}^r$ is a projector of the factual entity $e_F$ for the relation type $r$, and where $s\,\mathbb{I}$ is an identity-matrix scaling factor.

Clause 55. A system comprising: at least one processor programmed and/or configured to: obtain embeddings for a plurality of nodes in a graph including the plurality of nodes and a plurality of edges, wherein the plurality of nodes is associated with a plurality of entities, and wherein the plurality of edges is associated with a plurality of relationships between the plurality of entities; for each focus entity of a subset of focus entities, generate, using a machine learning model, at least one primary counterfactual link between that focus entity and at least one other entity; for each focus entity of the subset of focus entities, determine at least one secondary counterfactual link between that focus entity and at least one 1-hop node neighbor entity of the at least one other entity; for each focus entity of the subset of focus entities, determine one or more factual links between that focus entity and one or more other entities; for each focus entity of the subset of focus entities, generate a soft alignment of an entity pair of the one or more factual links; and learn a residual function by iteratively and alternatively optimizing a first objective function that depends on the one or more factual links, a second objective function that depends on the at least one primary counterfactual link and the at least one secondary counterfactual link, and a third objective function that depends on the at least one primary counterfactual link and the soft alignment of the entity pair of the one or more factual links, wherein alternatively optimizing the first objective function, the second objective function, and the third objective function alternately updates embeddings of focus entities in the set of focus entities, the residual function, discrepancy distance measures of node embeddings across a factual domain and a counterfactual domain, and one or more parameters of the machine learning model.

Clause 56. The system of clause 55, wherein the first objective function is defined according to the following Equation:

$$\mathcal{L}_F = \sum_{(e_1, r, e_F) \in F(S_1)} \text{sim}\left(\left(\vec{e}_1{}^T \otimes \left(\vec{p}_1{}^r + s\,\mathbb{I}\right)\right)\left(\vec{e}_F{}^T \otimes \left(\vec{p}_2{}^r + s\,\mathbb{I}\right)\right)\right)$$

where $S_1$ is the subset of focus entities of a set of focus entities $E_1{}^j$ of a first entity type $E_1$ for a task $j$, where the task $j$ is associated with the machine learning model, where $(e_1, r, e_F) \in F(S_1)$ is a set of each factual link for each focus entity of the subset of focus entities $S_1$, where each factual link $(e_1, r, e_F)$ is between a focus entity $e_1$ of the subset of focus entities $S_1$ and a tail entity $e_F$ of that focus entity $e_1$, where $r$ is a relation type of each factual link $(e_1, r, e_F)$, where $\vec{e}_1{}^T$ is a transformed embedding of the focus entity $e_1$, where $\vec{e}_F{}^T$ is a transformed embedding of the tail entity $e_F$, where $\vec{p}_1{}^r$ is a projector of the focus entity $e_1$ for the relation type $r$, where $\vec{p}_2{}^r$ is a projector of the tail entity $e_F$ for the relation type $r$, and where $s\,\mathbb{I}$ is an identity-matrix scaling factor, wherein the second objective function is defined according to the following Equation:

$$\mathcal{L}_{CF}{}^j = \sum_{(e_1, e_{CF}) \in CF^j(S_1)}$$

$$\mathcal{LPR}_{\left(\vec{e}_1 + \delta_{E_1}^j\left(\vec{e}_1\right), \vec{e}_{CF} + \delta_{E_{CF}}^j\left(\vec{e}_{CF}\right)\right) + d1 \times \text{disc}\left(\delta_{E_1}^j\left(\vec{e}_1\right)\right) + d2 \times \text{disc}\left(\delta_{E_1}^j\left(\vec{e}_1\right)\right)}^{CF}$$

where $(e_1, e_{CF}) \in CF^j(S_1)$ is a set counterfactual links including each primary counterfactual link and each secondary counterfactual link for each focus entity of the subset of focus entities $S_1$, where each counterfactual link $(e_1, e_{CF})$ is between the focus entity $e_1$ and a counterfactual entity $e_{CF}$ of that focus entity, where $\vec{e}_1$ is an embedding of the focus entity $e_1$, where $\delta_{E_1}{}^j$ is the residual function for the task $j$ and the first entity type $E_1$, where $\vec{e}_{CF}$ is an embedding of the counterfactual entity $e_{CF}$, where $d1$ is a head scaling parameter, where $d2$ is a tail scaling parameter, where disc is a discrepancy distance measure, and where $\vec{e}_i$ are embeddings of focus entities $e_i$ in a focus set $S_{E_i}$, where the third objective function is defined according to the following Equation:

$$\partial^j = O^j + \lambda^j \sum_{(e_1, r, e_F) \in F(S_1)} \left(SA^j(e_1, e_F) - M^j(e_1, e_F)\right)$$

where $O^j$ is a differentiable objective function of the machine learning model $M^j$, where $\lambda^j$ is a strength parameter that sets a strength of a regularization applied to the machine learning model $M^j$, where $M^j(e_1, e_F)$ is a predicted output of the machine learning model $M^j$ for an input including the focus entity $e_1$ of the entity pair of the one or more factual links between the focus entity $e_1$ and the factual entity $e_F$ of that focus entity, where $SA^j(e_1, e_F)$ is the soft alignment of the entity pair of the one or more factual links between the focus entity $e_1$ and the factual entity $e_F$ of that focus entity.

Clause 57. A system comprising: at least one processor programmed and/or configured to: obtain embeddings for a plurality of nodes in a graph including the plurality of nodes and a plurality of edges, wherein the plurality of nodes is associated with a plurality of entities, and wherein the plurality of edges is associated with a plurality of relationships between the plurality of entities; for each focus entity of a subset of focus entities, generate, using a machine learning model, at least one primary counterfactual link between that focus entity and at least one other entity; for each focus entity of the subset of focus entities, determine at least one secondary counterfactual link between that focus entity and at least one 1-hop node neighbor entity of the at least one other entity; for each focus entity of the subset of focus entities, determine one or more factual links between that focus entity and one or more other entities; learn a residual function by iteratively and alternatively optimizing a first objective function that depends on the one or more factual links and a second objective function that depends on the at least one primary counterfactual link and the at least one secondary counterfactual link, wherein, for each at least one other entity generated for each focus entity using the machine learning model, that at least one other entity is connected to one 1-hop node neighbor entity of that focus entity to update the node embeddings of those entities while holding the residual function constant; for each focus entity of the subset of focus entities, generate, using a further machine learning model different than the machine learning model, at least one further primary counterfactual link between that focus entity and at least one further entity; for each focus entity of the set of focus entities, determine one or more further factual links between that focus entity and one or more further entities; for each focus entity of the set of focus entities, generate a soft alignment of an entity pair of the one or more further factual links; and update one or more parameters of the further machine learning model using a further objective function that depends on the at least one further primary counterfactual link and the soft alignment of the entity pair of the one or more further factual links.

Clause 58. The system of clause 57, wherein the first objective function is defined according to the following Equation:

$$\mathcal{L}_F = \sum_{(e_1,r,e_F)\in F(S_1)} sim\left(\left(\vec{e}_1^{\,T}\otimes\left(\vec{p}_1^{\,r}+s\mathbb{I}\right)\right)\left(\vec{e}_F^{\,T}\otimes\left(\vec{p}_2^{\,r}+s\mathbb{I}\right)\right)\right)$$

where $S_1$ is the subset of focus entities of a set of focus entities $E_1^j$ of a first entity type $E_1$ for a task j, where the task j is associated with the machine learning model, where $(e_1,r,e_F)\in F(S_1)$ is a set of each factual link for each focus entity of the subset of focus entities $S_1$, where each factual link $(e_1,r,e_F)$ is between a focus entity $e_1$ of the subset of focus entities $S_1$ and a tail entity $e_F$ of that focus entity $e_1$, where r is a relation type of each factual link $(e_1,r,e_F)$, where $\vec{e}_1^{\,T}$ is a transformed embedding of the focus entity $e_1$, where $\vec{e}_F^{\,T}$ is a transformed embedding of the tail entity $e_F$, where $\vec{p}_1^{\,r}$ is a projector of the focus entity $e_1$ for the relation type r, where $\vec{p}_2^{\,r}$ is a projector of the tail entity $e_F$ for the relation type r, and where $s\mathbb{I}$ is an identity-matrix scaling factor, wherein the second objective function is defined according to the following Equation:

$$\mathcal{L}_{CF}^j = \sum_{(e_1,e_{CF})\in CF^j(S_1)}$$
$$\mathcal{LPR}_{\left(\vec{e}_1+\delta_{E_1}^j\left(\vec{e}_1\right),\vec{e}_{CF}+\delta_{E_{CF}}^j\left(\vec{e}_{CF}\right)\right)+d1\times\mathrm{disc}\left(\delta_{E_1}^j\left(\vec{e}_1\right)\right)+d2\times\mathrm{disc}\left(\delta_{E_1}^j\left(\vec{e}_1\right)\right)}^{CF}$$

where $(e_1, e_{CF})\in CF^j(S_1)$ is a set counterfactual links including each primary counterfactual link and each secondary counterfactual link for each focus entity of the subset of focus entities $S_1$, where each counterfactual link $(e_1, e_{CF})$ is between the focus entity $e_1$ and a counterfactual entity $e_{CF}$ of that focus entity, where $\vec{e}_1$ is an embedding of the focus entity $e_1$, where $\delta_{E_1}^j$ is the residual function for the task j and the first entity type $E_1$, where $\vec{e}_{CF}$ is an embedding of the counterfactual entity $e_{CF}$, where d1 is a head scaling parameter, where d2 is a tail scaling parameter, where disc is a discrepancy distance measure, and where $\vec{e}_i$ are embeddings of focus entities $e_i$ in a focus set $S_{E_i}$, wherein the further objective function is defined according to the following Equation:

$$O^{j2} = O^{j2} + \lambda^{j2}\sum_{(e_1,r,e_{FF})\in F(S_1)}\left(SA^{j2}(e_1, e_{FF}) - M^{j2}(e_1, e_{FF})\right)$$

where $O^{j2}$ is a differentiable objective function of the further machine learning model $M^{j2}$, where $\lambda^{j2}$ is a strength parameter that sets a strength of a regularization applied to the further machine learning model $M^{j2}$, where $M^{j2}(e_1,e_{FF})$ is a predicted output of the further machine learning model $M^{j2}$ for an input including the focus entity $e_1$ of the entity pair of the one or more factual links between the focus entity $e_1$ and the further factual entity $e_F$ of that focus entity, where $SA^j(e_1,e_{FF})$ is the soft alignment of the entity pair of the one or more further factual links between the focus entity $e_1$ and the further factual entity $e_{FF}$ of that focus entity.

Clause 59. The system of clauses 57 or 58, wherein the soft alignment of the entity pair is generated according to the following Equation:

$$SA^{j2}(e_1,e_F)=\mathcal{L}_{(\vec{e}_1+\delta_{E_1}^{j2}(\vec{e}_1),e_{CFF}+\delta_{E_{CF}}^{j2}(\vec{e}_{CFF}))}$$

where $(e_1,e_{FF})$ is the entity pair of the one or more further factual links between the focus entity $e_1$ and a further factual entity $e_{FF}$ of that focus entity, where a task j2 is associated with the further machine learning model, where $\vec{e}_1$ is an embedding of the focus entity $e_1$, where $\delta_{E_1}^{j2}$ is a residual function for the task j2 and the first entity type $E_1$, where $\vec{e}_{CFF}$ is an embedding of a further counterfactual entity $e_{CFF}$ of a further counterfactual link between the focus entity $e_1$ and the further counterfactual entity $e_{CF}$, where $\delta_{E_{CFF}}^{j2}$ is a residual function for the task j2 and an entity type of the further counterfactual entity $e_{CFF}$, and where $\mathcal{L}$ is a factual likelihood defined according to the following Equation:

$$\mathcal{L}_{(\vec{e}_1,r,\vec{e}_2)}=sim((\vec{e}_1^{\,T}\otimes(\vec{p}_1^{\,r}+s\mathbb{I}))(\vec{e}_{FF}^{\,T}\otimes(\vec{p}_2^{\,r}+s\mathbb{I}))$$

where $\vec{e}_1^{\,T}$ is a transformed embedding of the focus entity $e_1$, $\vec{e}_{FF}^{\,T}$ is a transformed embedding of the further factual entity $e_{FF}$, where $\vec{p}_1^{\,r}$ is a projector of the focus entity $e_1$ for the relation type r, where $\vec{p}_2^{\,r}$ is a projector of the further factual entity $e_{FF}$ for the relation type r, and where $s\mathbb{I}$ is an identity-matrix scaling factor.

Clause 60. A computer program product comprising at least one non-transitory computer-readable medium including program instructions that, when executed by at least one processor, cause the at least one processor to: obtain embeddings for a plurality of nodes in a graph including the plurality of nodes and a plurality of edges, wherein the plurality of nodes is associated with a plurality of entities, and wherein the plurality of edges is associated with a plurality of relationships between the plurality of entities; for each focus entity of a subset of focus entities, generate, using a machine learning model, at least one primary counterfactual link between that focus entity and at least one other entity; for each focus entity of the subset of focus entities, determine at least one secondary counterfactual link between that focus entity and at least one 1-hop node neighbor entity of the at least one other entity; for each focus entity of the subset of focus entities, determine one or more factual links between that focus entity and one or more other entities; learn a residual function by iteratively and alternatively optimizing a first objective function that depends on the one or more factual links and a second objective function that depends on the at least one primary counterfactual link and the at least one secondary counterfactual link, wherein alternatively optimizing the first objective function and the second objective function alternately updates embeddings of focus entities in the subset of focus entities, the residual function, and discrepancy distance measures of node embeddings across a factual domain and counterfactual domain.

Clause 61. The computer program product system of clause 60, wherein the first objective function is defined according to the following Equation:

$$\mathcal{L}_F = \sum_{(e_1, r, e_F) \in F(S_1)} sim\left(\left(\vec{e}_1^T \otimes \left(\vec{p}_1^r + s\mathbb{I}\right)\right)\left(\vec{e}_F^T \otimes \left(\vec{p}_2^r + s\mathbb{I}\right)\right)\right)$$

where $S_1$ is the subset of focus entities of a set of focus entities $E_1^j$ of a first entity type $E_1$ for a task j, where the task j is associated with the machine learning model, where $(e_1, r, e_F) \in F(S_1)$ is a set of each factual link for each focus entity of the subset of focus entities $S_1$, where each factual link $(e_1, r, e_F)$ is between a focus entity $e_1$ of the subset of focus entities $S_1$ and a tail entity $e_F$ of that focus entity $e_1$, where r is a relation type of each factual link $(e_1, r, e_F)$, where $\vec{e}_1^T$ is a transformed embedding of the focus entity $e_1$, where $\vec{e}_F^T$ is a transformed embedding of the tail entity $e_F$, where $\vec{p}_1^r$ is a projector of the focus entity $e_1$ for the relation type r, where $\vec{p}_2^r$ is a projector of the tail entity $e_F$ for the relation type r, and where $s\mathbb{I}$ is an identity-matrix scaling factor, wherein the second objective function is defined according to the following Equation:

$$\mathcal{L}_{CF}^j = \sum_{(e_1, e_{CF}) \in CF^j(S_1)}$$

$$\mathcal{LPR}_{\left(\vec{e}_1 + \delta_{E_1}^j \left(\vec{e}_1\right), \vec{e}_{CF} + \delta_{E_{CF}}^j \left(\vec{e}_{CF}\right)\right) + d1 \times disc\left(\delta_{E_1}^j \left(\vec{e}_1\right)\right)) + d2 \times disc\left(\delta_{E_1}^j \left(\vec{e}_1\right)\right)}^{CF}$$

where $(e_1, e_{CF}) \in CF^j(S_1)$ is a set counterfactual links including each primary counterfactual link and each secondary counterfactual link for each focus entity of the subset of focus entities $S_1$, where each counterfactual link $(e_1, e_{CF})$ is between the focus entity $e_1$ and a counterfactual entity $e_{CF}$ of that focus entity, where $\vec{e}_1$ is an embedding of the focus entity $e_1$, where $\delta_{E_1}^j$ is the residual function for the task j and the first entity type $E_1$, where $\vec{e}_{CF}$ is an embedding of the counterfactual entity $e_{CF}$, where d1 is a head scaling parameter, where d2 is a tail scaling parameter, where disc is a discrepancy distance measure, and where $\vec{e}_i$ are embeddings of focus entities $e_i$ in a focus set $S_{E_i}$.

Clause 62. A computer program product comprising at least one non-transitory computer-readable medium including program instructions that, when executed by at least one processor, cause the at least one processor to: obtain embeddings for a plurality of nodes in a graph including the plurality of nodes and a plurality of edges, wherein the plurality of nodes is associated with a plurality of entities, and wherein the plurality of edges is associated with a plurality of relationships between the plurality of entities; for each focus entity of a subset of focus entities, generate, using a machine learning model, at least one primary counterfactual link between that focus entity and at least one other entity; for each focus entity of the subset of focus entities, determine one or more factual links between that focus entity and one or more other entities; for each focus entity of the subset of focus entities, generate a soft alignment of an entity pair of the one or more factual links; and update one or more parameters of the machine learning model using an objective function that depends on the at least one primary counterfactual link and the soft alignment of the entity pair of the one or more factual links for each focus entity.

Clause 63. The computer program product of clause 62, wherein the soft alignment of the entity pair is generated according to the following Equation:

$$SA^j(e_1, e_F) = \mathcal{L}_{(\vec{e}_1 + \delta_{E_1}^j(\vec{e}_1), e_{CF} + \delta_{E_{CF}}^j(\vec{e}_{CF}))}$$

where $(e_1, e_F)$ is the entity pair of the one or more factual links between a focus entity $e_1$ of a subset of focus entities $S_1$ of a set of focus entities $E_1^j$ of a first entity type $E_1$ for a task j and a factual entity $e_F$ of that focus entity, where the task j is associated with the machine learning model, where $\vec{e}_1$ is an embedding of the focus entity $e_1$, where $\delta_{E_1}^j$ is a residual function for the task j and the first entity type $E_1$, where $\vec{e}_{CF}$ is an embedding of a counterfactual entity $e_{CF}$ of a counterfactual link between the focus entity $e_1$ and the counterfactual entity $e_{CF}$, where $\delta_{E_{CF}}^j$ is a residual function for the task j and an entity type of the counterfactual entity $e_{CF}$, and where $\mathcal{L}$ is a factual likelihood defined according to the following Equation:

$$\mathcal{L}_{(\vec{e}_1, r, \vec{e}_2)} = sim\left(\left(\vec{e}_1^T \otimes (\vec{p}_1^r + s\mathbb{I})\right)(\vec{e}_F^T \otimes (\vec{p}_2^r + s\mathbb{I}))\right)$$

where $\vec{e}_1^T$ is a transformed embedding of the focus entity $e_1$, where $\vec{e}_F^T$ is a transformed embedding of factual entity $e_F$, where $\vec{p}_1^r$ is a projector of the focus entity $e_1$ for the relation type r, where $\vec{p}_2^r$ is a projector of the factual entity $e_F$ for the relation type r, and where $s\mathbb{I}$ is an identity-matrix scaling factor.

Clause 64. A computer program product comprising at least one non-transitory computer-readable medium including program instructions that, when executed by at least one processor, cause the at least one processor to: obtain embeddings for a plurality of nodes in a graph including the plurality of nodes and a plurality of edges, wherein the plurality of nodes is associated with a plurality of entities, and wherein the plurality of edges is associated with a plurality of relationships between the plurality of entities; for each focus entity of a subset of focus entities, generate, using a machine learning model, at least one primary counterfactual link between that focus entity and at least one other entity; for each focus entity of the subset of focus entities, determine at least one secondary counterfactual link between that focus entity and at least one 1-hop node neighbor entity of the at least one other entity; for each focus entity of the subset of focus entities, determine one or more factual links between that focus entity and one or more other entities; for each focus entity of the subset of focus entities, generate a soft alignment of an entity pair of the one or more factual links; and learn a residual function by iteratively and alternatively optimizing a first objective function that depends on the one or more factual links, a second objective function that depends on the at least one primary counterfactual link and the at least one secondary counterfactual link, and a third objective function that depends on the at least one primary counterfactual link and the soft alignment of the entity pair of the one or more factual links, wherein alternatively optimizing the first objective function, the second objective function, and the third objective function alternately updates embeddings of focus entities in the set of focus entities, the residual function, discrepancy distance measures of node embeddings across a factual domain and a counterfactual domain, and one or more parameters of the machine learning model.

Clause 65. The computer program product of clause 64, wherein the first objective function is defined according to the following Equation:

$$\mathcal{L}_F = \sum_{(e_1, r, e_F) \in F(S_1)} sim\left(\left(\vec{e}_1^T \otimes \left(\vec{p}_1^r + s\mathbb{I}\right)\right)\left(\vec{e}_F^T \otimes \left(\vec{p}_2^r + s\mathbb{I}\right)\right)\right)$$

where $S_1$ is the subset of focus entities of a set of focus entities $E_1^j$ of a first entity type $E_1$ for a task j, where the task j is associated with the machine learning model, where $(e_1, r, e_F) \in F(S_1)$ is a set of each factual link for each focus entity of the subset of focus entities $S_1$, where each factual link $(e_1, r, e_F)$ is between a focus entity $e_1$ of the subset of focus entities $S_1$ and a tail entity $e_F$ of that focus entity $e_1$, where r is a relation type of each factual link $(e_1, r, e_F)$, where $\vec{e}_1^T$ is a transformed embedding of the focus entity $e_1$, where $\vec{e}_F^T$ is a transformed embedding of the tail entity $e_F$, where $\vec{p}_1^r$ is a projector of the focus entity $e_1$ for the relation type r, where $\vec{p}_2^r$ is a projector of the tail entity $e_F$ for the relation type r, and where $s\mathbb{I}$ is an identity-matrix scaling factor, wherein the second objective function is defined according to the following Equation:

$$\mathcal{L}_{CF}^j = \sum_{(e_1, e_{CF}) \in CF^j(S_1)}$$

$$\mathcal{LPR}_{\left(\vec{e}_1 + \delta_{E_1}^j\left(\vec{e}_1\right), \vec{e}_{CF} + \delta_{E_{CF}}^j\left(\vec{e}_{CF}\right)\right) + d1 \times disc\left(\delta_{E_1}^j\left(\vec{e}_1\right)\right)) + d2 \times disc\left(\delta_{E_1}^j\left(\vec{e}_1\right)\right)}^{CF}$$

where $(e_1, e_{CF}) \in CF^j(S_1)$ is a set counterfactual links including each primary counterfactual link and each secondary counterfactual link for each focus entity of the subset of focus entities $S_1$, where each counterfactual link $(e_1, e_{CF})$ is between the focus entity $e_1$ and a counterfactual entity $e_{CF}$ of that focus entity, where $\vec{e}_1$ is an embedding of the focus entity $e_1$, where $\delta_{E_1}^j$ is the residual function for the task j and the first entity type $E_1$, where $\vec{e}_{CF}$ is an embedding of the counterfactual entity $e_{CF}$, where d1 is a head scaling parameter, where d2 is a tail scaling parameter, where disc is a discrepancy distance measure, and where $\vec{e}_i$ are embeddings of focus entities $e_i$ in a focus set $S_{E_i}$, where the third objective function is defined according to the following Equation:

$$\tilde{O}^j = O^j + \lambda^j \sum_{(e_1, r, e_F) \in F(S_1)} \left(SA^j(e_1, e_F) - M^j(e_1, e_F)\right)$$

where $O^j$ is a differentiable objective function of the machine learning model $M^j$, where $\lambda^j$ is a strength parameter that sets a strength of a regularization applied to the machine learning model $M^j$, where $M^j(e_1, e_F)$ is a predicted output of the machine learning model $M^j$ for an input including the focus entity $e_1$ of the entity pair of the one or more factual links between the focus entity $e_1$ and the factual entity $e_F$ of that focus entity, where $SA^j(e_1, e_F)$ is the soft alignment of the entity pair of the one or more factual links between the focus entity $e_1$ and the factual entity $e_F$ of that focus entity.

Clause 66. A computer program product comprising at least one non-transitory computer-readable medium including program instructions that, when executed by at least one processor, cause the at least one processor to: obtain embeddings for a plurality of nodes in a graph including the plurality of nodes and a plurality of edges, wherein the plurality of nodes is associated with a plurality of entities, and wherein the plurality of edges is associated with a plurality of relationships between the plurality of entities; for each focus entity of a subset of focus entities, generate, using a machine learning model, at least one primary counterfactual link between that focus entity and at least one other entity; for each focus entity of the subset of focus entities, determine at least one secondary counterfactual link between that focus entity and at least one 1-hop node neighbor entity of the at least one other entity; for each focus entity of the subset of focus entities, determine one or more factual links between that focus entity and one or more other entities; learn a residual function by iteratively and alternatively optimizing a first objective function that depends on the one or more factual links and a second objective function that depends on the at least one primary counterfactual link and the at least one secondary counterfactual link, wherein, for each at least one other entity generated for each focus entity using the machine learning model, that at least one other entity is connected to one 1-hop node neighbor entity of that focus entity to update the node embeddings of those entities while holding the residual function constant; for each focus entity of the subset of focus entities, generate, using a further machine learning model different than the machine learning model, at least one further primary counterfactual link between that focus entity and at least one further entity; for each focus entity of the set of focus entities, determine one or more further factual links between that focus entity and one or more further entities; for each focus entity of the set of focus entities, generate a soft alignment of an entity pair of the one or more further factual links; and update one or more parameters of the further machine learning model using a further objective function that depends on the at least one further primary counterfactual link and the soft alignment of the entity pair of the one or more further factual links.

Clause 67. The computer program product of clause 66, wherein the first objective function is defined according to the following Equation:

$$\mathcal{L}_F = \sum_{(e_1, r, e_F) \in F(S_1)} sim\left(\left(\vec{e}_1^{\,T} \otimes \left(\vec{p}_1^{\,r} + s\mathbb{I}\right)\right)\left(\vec{e}_F^{\,T} \otimes \left(\vec{p}_2^{\,r} + s\mathbb{I}\right)\right)\right)$$

where $S_1$ is the subset of focus entities of a set of focus entities $E_1^{\,j}$ of a first entity type $E_1$ for a task j, where the task j is associated with the machine learning model, where $(e_1, r, e_F) \in F(S_1)$ is a set of each factual link for each focus entity of the subset of focus entities $S_1$, where each factual link $(e_1, r, e_F)$ is between a focus entity $e_1$ of the subset of focus entities $S_1$ and a tail entity $e_F$ of that focus entity $e_1$, where r is a relation type of each factual link $(e_1, r, e_F)$, where $\vec{e}_1^{\,T}$ is a transformed embedding of the focus entity $e_1$, where $\vec{e}_F^{\,T}$ is a transformed embedding of the tail entity $e_F$, where $\vec{p}_1^{\,r}$ is a projector of the focus entity $e_1$ for the relation type r, where $\vec{p}_2^{\,r}$ is a projector of the tail entity $e_F$ for the relation type r, and where $s\mathbb{I}$ is an identity-matrix scaling factor, wherein the second objective function is defined according to the following Equation:

$$\mathcal{L}_{CF}^{\,j} = \sum_{(e_1, e_{CF}) \in CF^j(S_1)} \mathcal{LPR}_{\left(\vec{e}_1 + \delta_{E_1}^{j}(\vec{e}_1), \vec{e}_{CF} + \delta_{E_{CF}}^{j}(\vec{e}_{CF})\right) + d1 \times disc\left(\delta_{E_1}^{j}(\vec{e}_1)\right)\right) + d2 \times disc\left(\delta_{E_1}^{j}(\vec{e}_i)\right)}^{CF}$$

where $(e_1, e_{CF}) \in CF^j(S_1)$ is a set counterfactual links including each primary counterfactual link and each secondary counterfactual link for each focus entity of the subset of focus entities $S_1$, where each counterfactual link $(e_1, e_{CF})$ is between the focus entity $e_1$ and a counterfactual entity $e_{CF}$ of that focus entity, where $\vec{e}_1$ is an embedding of the focus entity $e_1$, where $\delta_{E_1}^{j}$ is the residual function for the task j and the first entity type $E_1$, where $\vec{e}_{CF}$ is an embedding of the counterfactual entity $e_{CF}$, where d1 is a head scaling parameter, where d2 is a tail scaling parameter, where disc is a discrepancy distance measure, and where $\vec{e}_i$ are embeddings of focus entities $e_i$ in a focus set $S_{E_i}$, wherein the further objective function is defined according to the following Equation:

$$\tilde{O}^{j2} = O^{j2} + \lambda^{j2} \sum_{(e_1, r, e_{FF}) \in F(S_1)} \left(SA^{j2}(e_1, e_{FF}) - M^{j2}(e_1, e_{FF})\right)$$

where $O^{j2}$ is a differentiable objective function of the further machine learning model $M^{j2}$, where $\lambda^{j2}$ is a strength parameter that sets a strength of a regularization applied to the further machine learning model $M^{j2}$, where $M^{j2}(e_1, e_{FF})$ is a predicted output of the further machine learning model $M^{j2}$ for an input including the focus entity $e_1$ of the entity pair of the one or more factual links between the focus entity $e_1$ and the further factual entity $e_F$ of that focus entity, where $SA^j(e_1, e_{FF})$ is the soft alignment of the entity pair of the one or more further factual links between the focus entity $e_1$ and the further factual entity $e_{FF}$ of that focus entity.

Clause 68. The computer program product of clauses 66 or 67, wherein the soft alignment of the entity pair is generated according to the following Equation:

$$SA^{j2}(e_1, e_F) = \mathcal{L}_{(\vec{e}_1 + \delta_{E_1}^{j2}(\vec{e}_1), e_{CFF} + \delta_{E_{CF}}^{j2}(\vec{e}_{CFF}))}$$

where $(e_1, e_{FF})$ is the entity pair of the one or more further factual links between the focus entity $e_1$ and a further factual entity $e_{FF}$ of that focus entity, where a task j2 is associated with the further machine learning model, where $\vec{e}_1$ is an embedding of the focus entity $e_1$, where $\delta_{E_1}^{j2}$ is a residual function for the task j2 and the first entity type $E_1$, where $\vec{e}_{CFF}$ is an embedding of a further counterfactual entity $e_{CFF}$ of a further counterfactual link between the focus entity $e_1$ and the further counterfactual entity $e_{CF}$, where $\delta_{E_{CFF}}^{j2}$ is a residual function for the task j2 and an entity type of the further counterfactual entity $e_{CFF}$, and where $\mathcal{L}$ is a factual likelihood defined according to the following Equation:

$$\mathcal{L}_{(\vec{e}_1, r, \vec{e}_2)} = sim((\vec{e}_1^{\,T} \otimes (\vec{p}_1^{\,r} + s\mathbb{I}))(\vec{e}_{FF}^{\,T} \otimes (\vec{p}_2^{\,r} + s\mathbb{I}))$$

where $\vec{e}_1^{\,T}$ is a transformed embedding of the focus entity $e_1$, where $\vec{e}_{FF}^{\,T}$ is a transformed embedding of the further factual entity $e_{FF}$, where $\vec{p}_1^{\,r}$ is a projector of the focus entity $e_1$ for the relation type r, where $\vec{p}_2^{\,r}$ is a projector of the further factual entity $e_{FF}$ for the relation type r, and where s $\mathbb{I}$ is an identity-matrix scaling factor.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of limits. As used in the specification and the claims, the singular form of "a," "an," and "the" include plural referents unless the context clearly dictates otherwise.

BRIEF DESCRIPTION OF THE DRAWINGS
AND APPENDICES

Additional advantages and details are explained in greater detail below with reference to the exemplary embodiments that are illustrated in the accompanying schematic figures, in which.

DESCRIPTION

Figure 1:
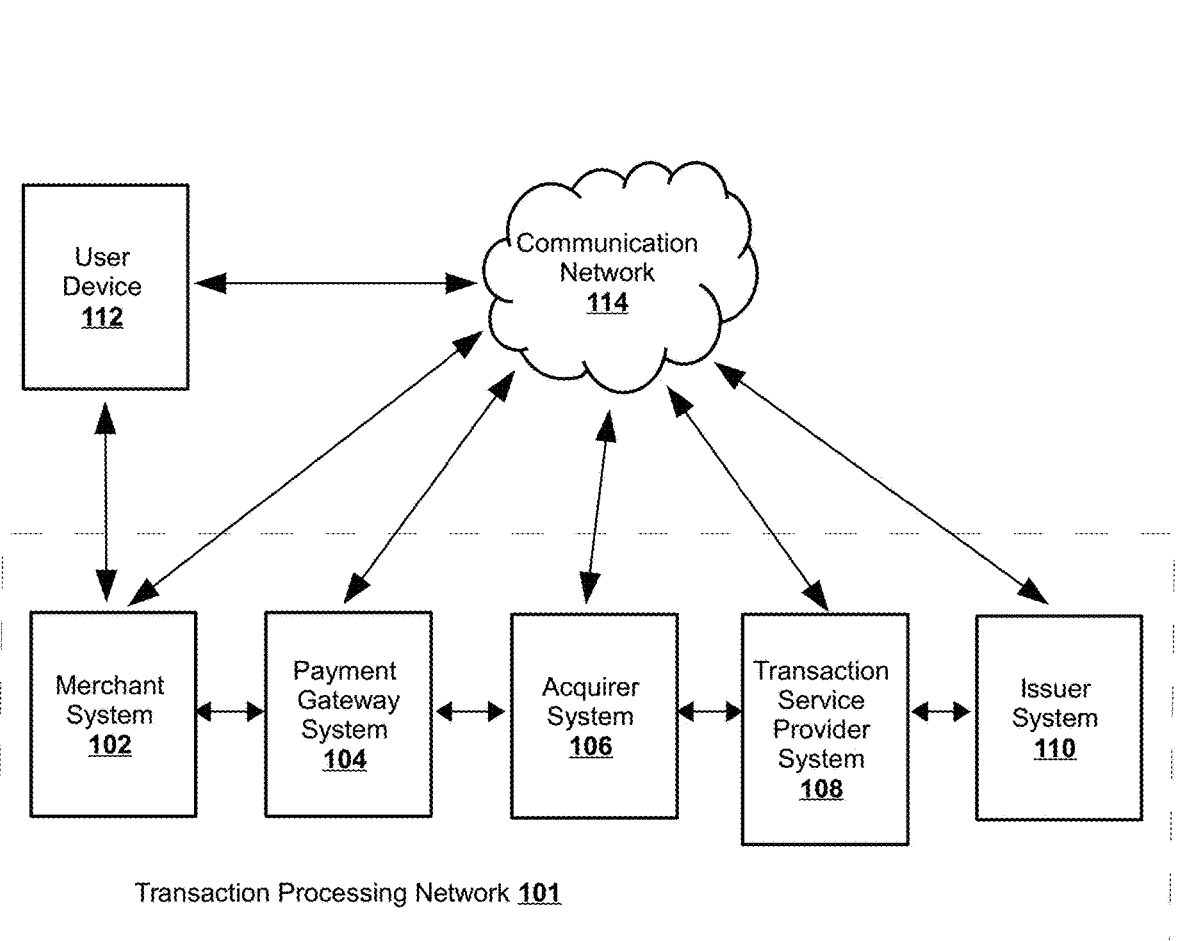
FIG. 1 is a diagram of non-limiting embodiments or aspects of an environment in which systems, devices, products, apparatus, and/or methods, described herein, may be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/ or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computing devices operated by or on behalf of a transaction service provider, such as a transaction processing server executing one or more software applications. A transaction processing system may include one or more processors and, in some non-limiting embodiments, may be operated by or on behalf of a transaction service provider.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes.

As used herein, the terms "issuer institution," "portable financial device issuer," "issuer," or "issuer bank" may refer to one or more entities that provide one or more accounts to a user (e.g., a customer, a consumer, an entity, an organization, and/or the like) for conducting transactions (e.g., payment transactions), such as initiating credit card payment transactions and/or debit card payment transactions. For example, an issuer institution may provide an account identifier, such as a PAN, to a user that uniquely identifies one or more accounts associated with that user. The account identifier may be embodied on a portable financial device, such as a physical financial instrument (e.g., a payment card), and/or may be electronic and used for electronic payments. In some non-limiting embodiments or aspects, an issuer institution may be associated with a bank identification number (BIN) that uniquely identifies the issuer institution. As used herein, the term "issuer institution system" may refer to one or more computer systems operated by or on behalf of an issuer institution, such as a server computer executing one or more software applications. For example, an issuer institution system may include one or more authorization servers for authorizing a payment transaction.

As used herein, the term "merchant" may refer to an individual or entity that provides goods and/or services, or access to goods and/or services, to users (e.g., customers) based on a transaction (e.g., a payment transaction). As used herein, the terms "merchant" or "merchant system" may also refer to one or more computer systems, computing devices, and/or software application operated by or on behalf of a merchant, such as a server computer executing one or more software applications. A "point-of-sale (POS) system," as used herein, may refer to one or more computers and/or peripheral devices used by a merchant to engage in payment transactions with users, including one or more card readers, near-field communication (NFC) receivers, radio frequency identification (RFID) receivers, and/or other contactless transceivers or receivers, contact-based receivers, payment terminals, computers, servers, input devices, and/or other like devices that can be used to initiate a payment transaction. A POS system may be part of a merchant system. A merchant system may also include a merchant plug-in for facilitating online, Internet-based transactions through a merchant webpage or software application. A merchant plug-in may include software that runs on a merchant server or is hosted by a third party for facilitating such online transactions.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The terms "client device" and "user device," as used herein, refer to any electronic device that is configured to communicate with one or more servers or remote devices and/or systems. A client device or user device may include a mobile device, a network-enabled appliance (e.g., a network-enabled television, refrigerator, thermostat, and/or the like), a computer, a POS system, and/or any other device or system capable of communicating with a network.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a PDA, and/or other like devices. A computing device may also be a desktop computer or other form of non-mobile computer.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider.

As used herein, the term "payment device" may refer to a portable financial device, an electronic payment device, a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a PDA, a pager, a security card, a computer, an access card, a wireless terminal, a transponder, and/or the like. In some non-limiting embodiments or aspects, the payment device may include volatile or nonvolatile memory to store information (e.g., an account identifier, a name of the account holder, and/or the like).

As used herein, the term "server" and/or "processor" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, POS devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "acquirer" may refer to an entity licensed by the transaction service provider and/or approved by the transaction service provider to originate transactions using a portable financial device of the transaction service provider. Acquirer may also refer to one or more computer systems operated by or on behalf of an acquirer, such as a server computer executing one or more software applications (e.g., "acquirer server"). An "acquirer" may be a merchant bank, or in some cases, the merchant system may be the acquirer. The transactions may include original credit transactions (OCTs) and account funding transactions (AFTs). The acquirer may be authorized by the transaction service provider to sign merchants of service providers to originate transactions using a portable financial device of the transaction service provider. The acquirer may contract with payment facilitators to enable the facilitators to sponsor merchants. The acquirer may monitor compliance of the payment facilitators in accordance with regulations of the transaction service provider. The acquirer may conduct due diligence of payment facilitators and ensure that proper due diligence occurs before signing a sponsored merchant. Acquirers may be liable for all transaction service provider programs that they operate or sponsor. Acquirers may be responsible for the acts of its payment facilitators and the merchants it or its payment facilitators sponsor.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the term "application programming interface" (API) may refer to computer code that allows communication between different systems or (hardware and/or software) components of systems. For example, an API may include function calls, functions, subroutines, communication protocols, fields, and/or the like usable and/or accessible by other systems or other (hardware and/or software) components of systems.

As used herein, the term "user interface" or "graphical user interface" refers to a generated display, such as one or more graphical user interfaces (GUIs) with which a user may interact, either directly or indirectly (e.g., through a keyboard, mouse, touchscreen, etc.).

Referring now to FIG. 1, FIG. 1 is a diagram of an example environment 100 in which devices, systems, methods, and/or products described herein, may be implemented. As shown in FIG. 1, environment 100 includes transaction processing network 101, which may include merchant system 102, payment gateway system 104, acquirer system 106, transaction service provider system 108, issuer system 110, user device 112, and/or communication network 114. Transaction processing network 101, merchant system 102, payment gateway system 104, acquirer system 106, transaction service provider system 108, issuer system 110, and/or user device 112 may interconnect (e.g., establish a connection to communicate, etc.) via wired connections, wireless connections, or a combination of wired and wireless connections.

Merchant system 102 may include one or more devices capable of receiving information and/or data from payment gateway system 104, acquirer system 106, transaction service provider system 108, issuer system 110, and/or user device 112 via communication network 114 and/or communicating information and/or data to payment gateway system 104, acquirer system 106, transaction service provider system 108, issuer system 110, and/or user device 112 via communication network 114. Merchant system 102 may include a device capable of receiving information and/or data from user device 112 via a communication connection (e.g., an NFC communication connection, an RFID communication connection, a Bluetooth® communication connection, etc.) with user device 112, and/or communicating information and/or data to user device 112 via the communication connection. For example, merchant system 102 may include a computing device, such as a server, a group of servers, a client device, a group of client devices, and/or other like devices. In some non-limiting embodiments or aspects, merchant system 102 may be associated with a merchant as described herein. In some non-limiting embodiments or aspects, merchant system 102 may include one or more devices, such as computers, computer systems, and/or peripheral devices capable of being used by a merchant to conduct a payment transaction with a user. For example, merchant system 102 may include a POS device and/or a POS system.

Payment gateway system 104 may include one or more devices capable of receiving information and/or data from merchant system 102, acquirer system 106, transaction service provider system 108, issuer system 110, and/or user device 112 via communication network 114 and/or communicating information and/or data to merchant system 102, acquirer system 106, transaction service provider system 108, issuer system 110, and/or user device 112 via communication network 114. For example, payment gateway system 104 may include a computing device, such as a server, a group of servers, and/or other like devices. In some non-limiting embodiments or aspects, payment gateway system 104 is associated with a payment gateway as described herein.

Acquirer system 106 may include one or more devices capable of receiving information and/or data from merchant system 102, payment gateway system 104, transaction service provider system 108, issuer system 110, and/or user device 112 via communication network 114 and/or communicating information and/or data to merchant system 102, payment gateway system 104, transaction service provider system 108, issuer system 110, and/or user device 112 via communication network 114. For example, acquirer system 106 may include a computing device, such as a server, a group of servers, and/or other like devices. In some non-limiting embodiments or aspects, acquirer system 106 may be associated with an acquirer as described herein.

Transaction service provider system 108 may include one or more devices capable of receiving information and/or data from merchant system 102, payment gateway system 104, acquirer system 106, issuer system 110, and/or user device 112 via communication network 114 and/or communicating information and/or data to merchant system 102, payment gateway system 104, acquirer system 106, issuer system 110, and/or user device 112 via communication network 114. For example, transaction service provider system 108 may include a computing device, such as a server (e.g., a transaction processing server, etc.), a group of servers, and/or other like devices. In some non-limiting embodiments or aspects, transaction service provider system 108 may be associated with a transaction service provider as described herein. In some non-limiting embodiments or aspects, transaction service provider 108 may include and/or access one or more internal and/or external databases including transaction data.

Issuer system 110 may include one or more devices capable of receiving information and/or data from merchant system 102, payment gateway system 104, acquirer system 106, transaction service provider system 108, and/or user device 112 via communication network 114 and/or communicating information and/or data to merchant system 102, payment gateway system 104, acquirer system 106, transaction service provider system 108, and/or user device 112 via communication network 114. For example, issuer system 110 may include a computing device, such as a server, a group of servers, and/or other like devices. In some non-limiting embodiments or aspects, issuer system 110 may be associated with an issuer institution as described herein. For example, issuer system 110 may be associated with an issuer institution that issued a payment account or instrument (e.g., a credit account, a debit account, a credit card, a debit card, etc.) to a user (e.g., a user associated with user device 112, etc.).

In some non-limiting embodiments or aspects, transaction processing network 101 includes a plurality of systems in a communication path for processing a transaction. For example, transaction processing network 101 can include merchant system 102, payment gateway system 104, acquirer system 106, transaction service provider system 108, and/or issuer system 110 in a communication path (e.g., a communication path, a communication channel, a communication network, etc.) for processing an electronic payment transaction. As an example, transaction processing network 101 can process (e.g., initiate, conduct, authorize, etc.) an electronic payment transaction via the communication path between merchant system 102, payment gateway system 104, acquirer system 106, transaction service provider system 108, and/or issuer system 110.

User device 112 may include one or more devices capable of receiving information and/or data from merchant system 102, payment gateway system 104, acquirer system 106, transaction service provider system 108, and/or issuer system 110 via communication network 114 and/or communicating information and/or data to merchant system 102, payment gateway system 104, acquirer system 106, transaction service provider system 108, and/or issuer system 110 via communication network 114. For example, user device 112 may include a client device and/or the like. In some non-limiting embodiments or aspects, user device 112 may be capable of receiving information (e.g., from merchant system 102, etc.) via a short range wireless communication connection (e.g., an NFC communication connection, an RFID communication connection, a Bluetooth® communication connection, and/or the like), and/or communicating information (e.g., to merchant system 102, etc.) via a short range wireless communication connection. In some non-limiting embodiments or aspects, user device 112 may include an application associated with user device 112, such as an application stored on user device 112, a mobile application (e.g., a mobile device application, a native application for a mobile device, a mobile cloud application for a mobile device, an electronic wallet application, an issuer bank application, and/or the like) stored and/or executed on user device 112.

Communication network 114 may include one or more wired and/or wireless networks. For example, communication network 114 may include a cellular network (e.g., a long-term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and systems shown in FIG. 1 are provided as an example. There may be additional devices and/or systems, fewer devices and/or systems, different devices and/or systems, or differently arranged devices and/or systems than those shown in FIG. 1. Furthermore, two or more devices and/or systems shown in FIG. 1 may be implemented within a single device and/or system, or a single device and/or system shown in FIG. 1 may be implemented as multiple, distributed devices and/or systems. Additionally, or alternatively, a set of devices and/or systems (e.g., one or more devices or systems) of environment 100 may perform one or more functions described as being performed by another set of devices and/or systems of environment 100.

Figure 2:
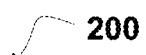
FIG. 2 is a diagram of non-limiting embodiments or aspects of components of one or more devices and/or one or more systems of FIG. 1.
Figure 2:
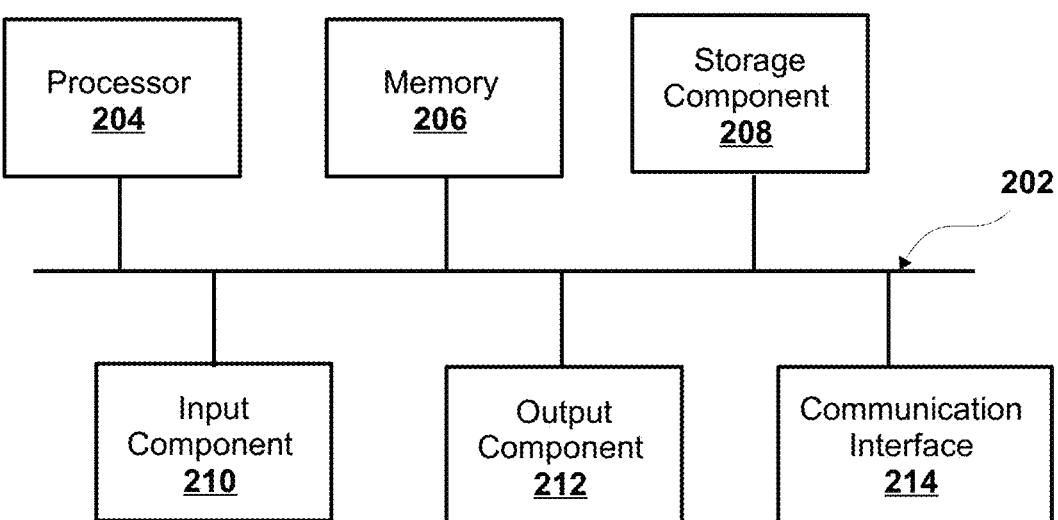

Referring now to FIG. 2, FIG. 2 is a diagram of example components of a device 200. Device 200 may correspond to one or more devices of merchant system 102, one or more devices of payment gateway system 104, one or more devices of acquirer system 106, one or more devices of transaction service provider system 108, one or more devices of issuer system 110, and/or user device 112 (e.g., one or more devices of a system of user device 112, etc.). In some non-limiting embodiments or aspects, one or more devices of merchant system 102, one or more devices of payment gateway system 104, one or more devices of acquirer system 106, one or more devices of transaction service provider system 108, one or more devices of issuer system 110, and/or user device 112 (e.g., one or more devices of a system of user device 112, etc.) may include at least one device 200 and/or at least one component of device 200. As shown in FIG. 2, device 200 may include a bus 202, a processor 204, memory 206, a storage component 208, an input component 210, an output component 212, and a communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a plurality of CPUs, a graphics processing unit (GPU), a plurality of GPUs, an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 (e.g., a central processing unit (CPU), a graphics processing unit (GPU), etc.) executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, etc.). Device 200 may be capable of receiving information from, storing information in, communicating information to, or searching information stored in the data storage or one or more data structures in memory 206 and/or storage component 208.

The number and arrangement of components shown in FIG. 2 are provided as an example. In some non-limiting embodiments or aspects, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Multi-Layer Knowledge Graphs

Figure 3:
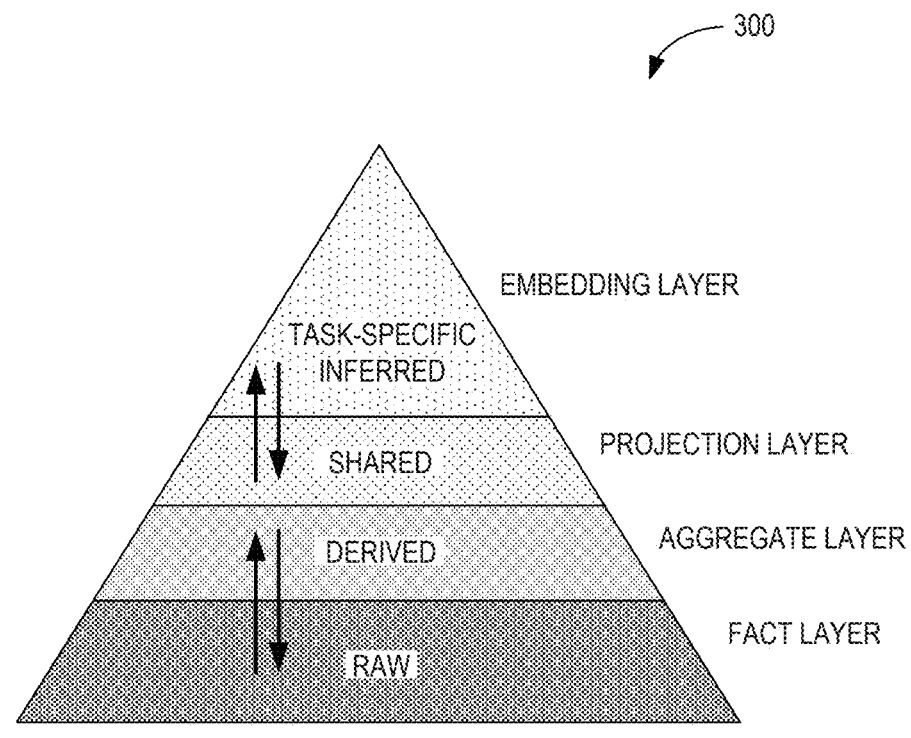
FIG. 3 is a diagram of an implementation of non-limiting embodiments or aspects of a multi-layer knowledge graph.

Referring now to FIG. 3, FIG. 3 is a diagram of an implementation 300 of non-limiting embodiments or aspects of a multi-layer knowledge graph. As shown in FIG. 3, a multi-layer knowledge graph may include a hierarchy of abstraction levels with node mapping functions between the different layers. For example, a multi-layer knowledge graph may include a fact layer, an aggregate layer, a projection layer, and/or an embedding layer. The fact layer may include a base knowledge graph. For example, the fact layer may include base data (e.g., transaction data, information directly from authorization and settlement transactions, transaction parameters, such as payment card usage type, transaction amount, transaction date and/or time, merchant name, merchant type, account identifier, transaction identifier, and/or the like, etc.). The aggregate layer may include information derived from the fact layer (e.g., high spending payment card, major issuer bank, etc.). The projection layer may facilitate sharing of model inferences between tasks (e.g., restaurant cuisine, etc.). The embedding layer (e.g., the top layer, etc.) may include a task-specific embedding layer.

Multi-layer knowledge graphs according to non-limiting embodiments or aspects of the present disclosure may enable conducting analytics at different granularities. Existing knowledge graph techniques focus on a base layer and run simple retrieval queries on the base layer to mine insights. Multi-layer knowledge graphs according to non-limiting embodiments or aspects of the present disclosure may generate and/or use an aggregate layer to provide complex insights efficiently without having to run or execute expensive data mining algorithms and analytics queries, and/or may generate and use a projection layer and/or an embedding layer to facilitate machine learning or artificial intelligence (AI) models.

As described herein below in more detail, a multi-layer knowledge graph according to non-limiting embodiments or aspects of the present disclosure may be used to jointly learn high quality representations or embeddings (e.g., for cardholders and merchants, etc.), to address sparsity and skew across a data space by densifying the multi-layer knowledge graph (e.g., by inferring edges in the multi-layer knowledge graph and/or by employing sampling techniques to handle sparse user-item interactions in data and/or missing data attribute issues, etc.), to generate explanations based on transitive connections, and/or to augment existing and/or future machine learning or AI models.

Figure 4A:
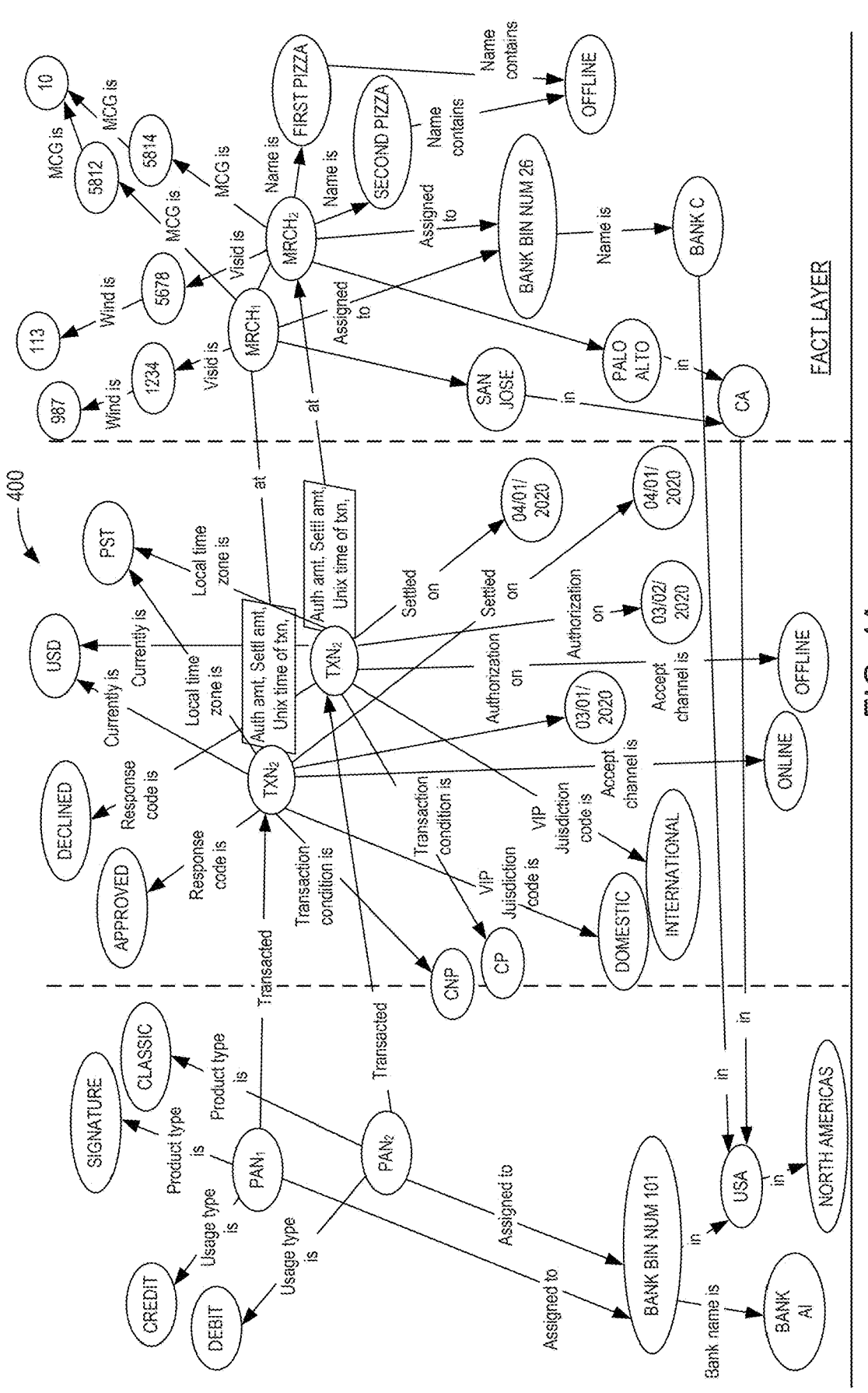
FIGS. 4A-4C are diagrams of implementations of non-limiting embodiments or aspects of layers of a multi-layer knowledge graph.

Referring now to FIG. 4A, FIG. 4A is a diagram of an implementation 400 of non-limiting embodiments or aspects of a fact layer (e.g., a base layer, etc.) of a multi-layer knowledge graph. As shown in FIG. 4A, a fact layer may include a base knowledge graph including transaction data that includes transaction parameters associated with transactions (e.g., $TXN_1$, $TXN_2$, etc.).

Figure 4B:
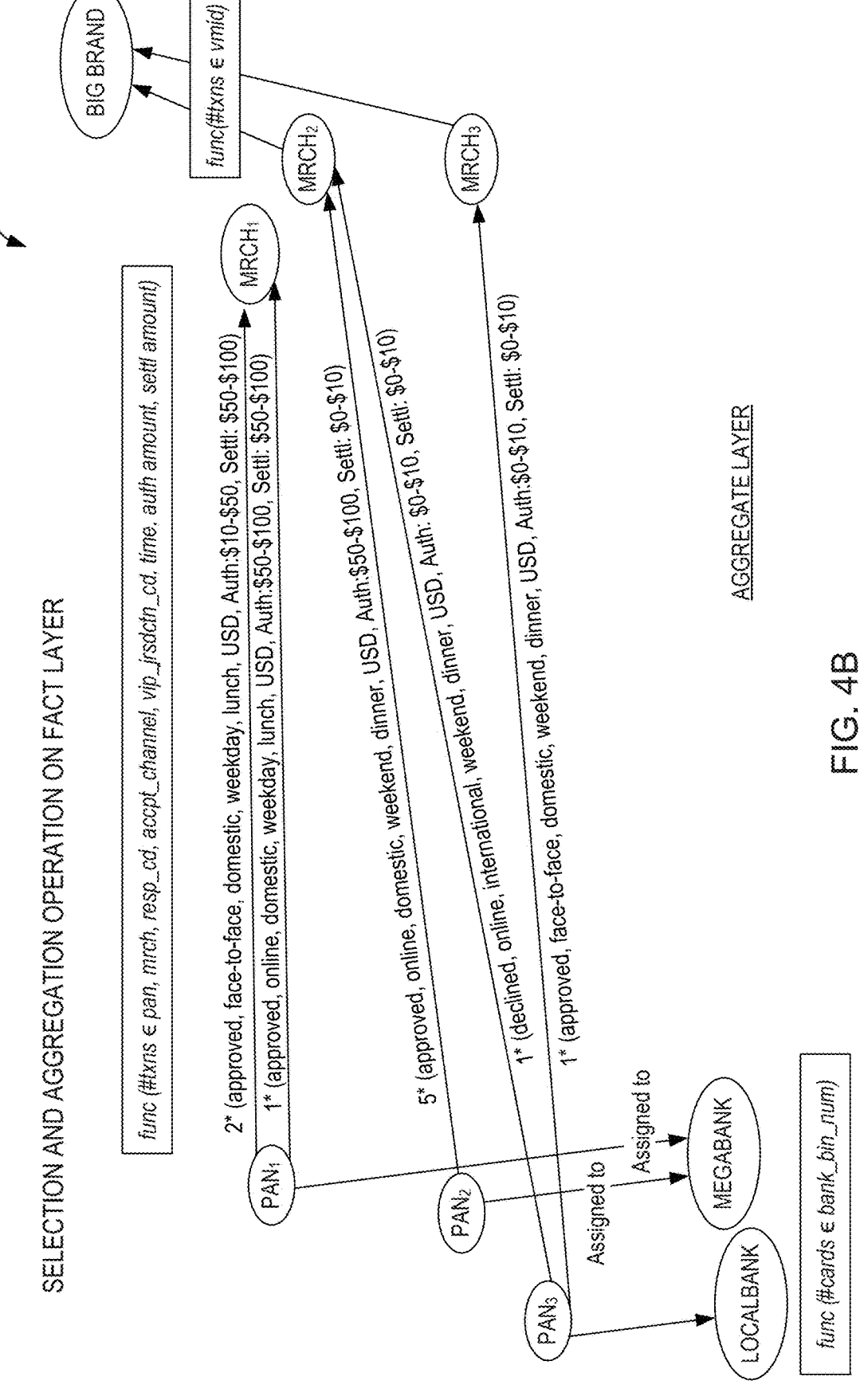

Referring also to FIG. 4B, FIG. 4B is a diagram of an implementation 420 of non-limiting embodiments or aspects of an aggregate layer of a multi-layer knowledge graph. As shown in FIG. 4B, the aggregate layer may include derived data. For example, the aggregate layer may include any desired number of aggregates or derived attributes generated based on the fact layer. As an example, a structure of an aggregate layer may depend on operations that an organization desires to conduct on the multi-layer knowledge graph to meet business goals. In such an example, selection and aggregation operators may be applied to the fact layer to build meaningful aggregates and/or derived attributes for the aggregate layer which, in turn, may reduce information overload.

Figure 4C:
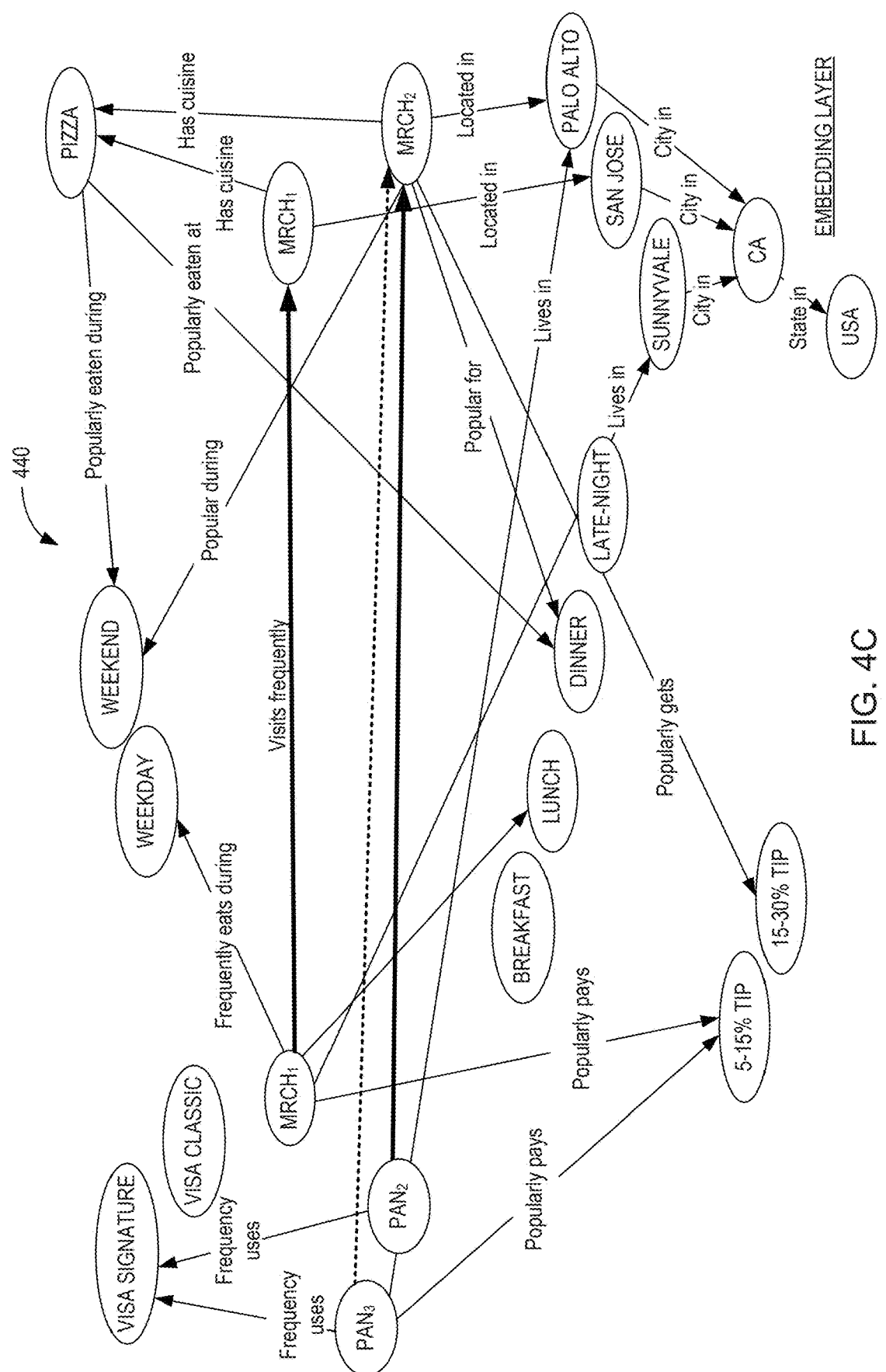

Referring further to FIG. 4C, FIG. 4C is a diagram of an implementation 440 of non-limiting embodiments or aspects of an embedding layer of a multi-layer knowledge graph. As shown in FIG. 4C, the embedding layer may be a task-specific top layer of a multi-layer knowledge graph. For example, the embedding layer may be generated by applying selection and aggregation operators on the fact layer and/or the aggregate layer. As an example, the embedding layer may include entities and entity attributes as nodes. For example, for an example restaurant recommendation task as shown in FIG. 4C, the embedding layer may include each of cardholders and restaurants as entity nodes, and entity attributes such as cardholder payment, card issuer, bank details, merchant MCC, merchant location, and/or the like as entity attribute nodes. However, non-limiting embodiments or aspects of the present disclosure are not limited thereto and may be readily extended to other machine learning or AI tasks, such as hotel recommendation, fraud detection, and/or the like.

In some non-limiting embodiments or aspects, an embedding layer may be missing information, for example, because some transactions (e.g., some cardholder-merchant interactions, etc.) have not occurred and/or because attributes associated with cardholder entities and/or merchant entities are incomplete and/or inaccurate. As described herein below in more detail, non-limiting embodiments or aspects of the present disclosure may provide a solution to this missing information that enriches the multi-layer knowledge graph by inferring task-specific edges with feedback from external task-specific predictive models via counterfactual inference, and/or non-limiting embodiments or aspects of the present disclosure may empower the embedding layer with technologies that enable a wide range of applications, such as jointly learning high quality embeddings (e.g., high quality cardholder and merchant embeddings, etc.), densifying data for handling skew/sparsity, explaining machine learning or AI models, augmenting future machine learning or AI tasks, and/or sharing knowledge between different machine learning or AI tasks.

In recommendation and behavior prediction problems for users, vast volumes of interaction data from users and items may be filtered and refined to extract relevant features and train inductive/predictive models with specific task-based objectives. For example, a set of restaurant interactions for each user and historical interaction features of those restaurants may be extracted to model preferences of the users for future restaurant recommendations. As an example, a set of fraudulent interactions, user histories, and historical false positives may be extracted to train a fraud detection model. Across this wide array of ever-improving and ever-expanding set of task-driven models, questions may arise. For example, what are the common latent associations or links between users, items, and other attributes to explain these task-specific predictions? If a consistent set of entity associations between users, items, and the other interacting facets of the data can be identified, why models make certain predictions and what were the likely driving factors behind them may be reasoned or explained. Further, maintaining such a common resource provides a strong basis to build future predictive models by grounding the learning process of the models and overcoming challenges, such as overfitting to noisy task data, and/or the like.

Non-limiting embodiments or aspects of the present disclosure provide for learning statistical knowledge representations on top of known facts that form an underlying fact-based knowledge graph between interacting entities (e.g., a user transacted with a specific restaurant several times over a past month, etc.) and incorporate previously trained task-specific models for knowledge inference. For example, a cuisine prediction model applied to restaurant interactions of a user may enable inferring dietary preferences of the user and adding new statistical links between the user and other such restaurants. As an example, non-limiting embodiments or aspects of task-specific models may establish certain latent associations that transitively densify a fact-based knowledge graph with new stochastic links and enable the creation of a powerful tool to explain model predictions. Further, relevant subsets of these inferred stochastic links may aid task-driven modeling efforts, overcoming challenges such as data sparsity and overfitting.

A base or fact layer of a knowledge graph may be built from a set of entity co-occurrences as directly observed (e.g., users transacting with a specific item, etc.) and/or from other known associations (e.g., restaurants whose cuisines appear in their item names, etc.) in historical interaction data. There are classes of stochastic inferences that can be made on top of the base or fact layer of a knowledge graph using a task-specific predictive model. As an example, new stochastic links between each predicate (or model-input) node and the predicted outcome that do not appear in the base knowledge graph (e.g., predicates may be the features/attributes of interest and outcome variables are predicted by a task-specific model, etc.) may be inferred. As another example, novel counterfactuals, where the prediction made by the task-specific model significantly varies from the most likely prediction based on the links in the knowledge graph may be inferred, which ties to the notion of propensity estimation, for example, the likelihood of a specific outcome based on the set of links in the knowledge graph may be estimated. However, if a task model predicts a different outcome, what are the stochastic links that may be added to the knowledge graph so as to best explain this difference in the model and knowledge graph predictions? This intuition may form the basis of a stochastic inference approach according to non-limiting embodiments or aspects of the present disclosure.

While predictive models may disentangle selective aspects of the available data based on task-specific supervision, non-limiting embodiments or aspects of the present disclosure recognize that multiple task models may rely on covariant latent connections between the interacting entities to structure their task-specific solutions. Non-limiting embodiments or aspects of the present disclosure thus provide a principled approach to infer, store, and/or leverage these connections across the set of interacting entities, as stochastic typed links between entities in a heterogenous multi-relational graph, thereby enabling a wide range of applications, such as generating and structuring explanations for task-specific predictions and grounding training and development of future task models.

Links in a base knowledge graph (e.g., links in a base or fact layer of a multi-layer knowledge graph, etc.) may be fully reusable across multiple tasks, with a combination of projection, selection, and/or aggregation operations to process the relevant subset of nodes and edges for a specific task. Further, some types of nodes and edges may be aggregated and/or merged depending on task requirements. As an example, if user details are not needed, the set of users who visit a restaurant in a base knowledge graph may be merged, and aggregate nodes that indicate medium, low, or high traffic to represent visitor counts and link the visitors to restaurants may be generated, thereby forming derived links for an aggregate layer. On top of this derived or aggregate layer, a task model may be applied to add inferred stochastic links between entities. However, the graph representation may still not be fully conducive to update with differentiable neural models and, thus, may be embedded into a suitable latent space to incorporate the predictions of the task-specific predictive models. As a post-hoc step, the projected knowledge graph may be revisited after the embeddings are updated using the model predictions, and the stochastic links may be added to the projected knowledge graph using a simple proximity measure on the inferred embeddings. A multi-layered arrangement of a framework according to non-limiting embodiments or aspects may thus be built on top of a base knowledge graph (e.g., on top of a base or fact layer of a multi-layer knowledge graph, etc.). For example, the base knowledge graph (e.g., a base or fact layer of a multi-layer knowledge graph, etc.) may be left untouched and/or may be only updated with new interaction data, while the upper layers may be updated with the task-model predictions.

The construction of an intermediate layer (e.g., an aggregate layer, a derived layer, a projection layer, etc.) may facilitate the sharing of model inferences across multiple tasks. For example, a neural network model that predicts the cuisines of restaurants may be used to add stochastic cuisine links to a second or aggregated layer (e.g., a layer also including subsets of links in the base knowledge graph, such as the known restaurant visits of users or cuisines that may be recognized from the name of the item, and/or the like, etc.). These inferred cuisine links (e.g., stochastic links between items and cuisine types, etc.) may be leveraged to construct explanations for a different predictive task, such as a restaurant recommendation task, and/or the like. While the predictive model may be unable to directly justify its predictions, likely explanations using the inferred links may be constructed. For example, if an accurate cuisine prediction model is developed, the inferences from the cuisine prediction model may contribute to the densification of such a shared knowledge graph layer. Further, the model may be trained independently and the stochastic links may be densified only in the shared knowledge graph layer, or a bidirectional update where both the graph and the task-specific model are simultaneously updated may be applied.

Because a model may be primarily observed from a vantage point of a base-knowledge graph, a model prediction that significantly differs from the path-based associations in the knowledge graph may be a counterfactual outcome. Non-limiting embodiments or aspects of the present disclosure may infer missing stochastic links that, when applied to the knowledge graph, may best explain the model prediction. Counterfactuals may be the prediction outcomes that do not associate well with their predicates (or corresponding input features to the model) in the knowledge graph. Counterfactuals may thus be used to establish new stochastic links, with a strength of these new links depending on the existing set of links in the knowledge graph. The less a prediction can be explained with the base knowledge graph, the stronger the stochastic links that may need to be added to explain the prediction. Further, by inferring these links, non-limiting embodiments or aspects of the present disclosure may discover indirect correlations and transitive paths that significantly densify the knowledge space, thereby providing transductive advantages associated with adding new paths and links within existing graphs. Moreover, these new paths enable the construction of persuasive explanations for predictive models.

Non-limiting embodiments or aspects of the present disclosure may pre-train a knowledge space for inference. For example, a relevant set of relation types and nodes from a base knowledge graph for a specific predictive task may be defined, selection, projection, and/or aggregation operations may be applied to construct an intermediate knowledge graph layer, and/or nodes and edges of the intermediate layer may be embedded by back propagating with a chosen propensity/likelihood objective (e.g., an objective function that uses node and edge embeddings to explain the edges in the graph, etc.). The embedding step may be computationally intense because the intermediate knowledge graph layer may be very large depending on the prediction task, and may need to be handled at once to obtain the knowledge space embeddings.

Non-limiting embodiments or aspects of the present disclosure may use the knowledge space updated by a different task model. For example, inferences may be added to a knowledge space that was trained for a different task model, and updated with the predictions of that model, which may use manual curation to select semantically related tasks in a correct sequence for sequential inferencing.

Non-limiting embodiments or aspects of the present disclosure may infer stochastic links with task-model predictions. For example, based on a knowledge space (e.g., trained from an intermediate knowledge graph layer, etc.) and the task model, samples where a variation between a model prediction and the knowledge space propensity are the greatest (e.g., satisfy a threshold level, etc.) may be identified, either in absolute terms or relative to the variance in the input variable (e.g., examples where changing a few features causes the model and the knowledge graph to vary by a threshold amount, etc.). An objective function increases the knowledge graph propensity of the counterfactual predictions if only the knowledge graph is being updated, or try to converge each of the knowledge graph and the task model if the knowledge graph and the task model are alternating updating (e.g., a bi-directional update, etc.). This step may not be as computationally intensive as the embedding step, because specific predicate and outcome variables for counterfactual updates may be focused on and only those parts of the knowledge space may be loaded to memory.

A set of constructed or projected relation types in an intermediate layer may not be constrained to a task. While a specific set of derived relations between entities that are specialized to a specific task may be formulated, the derived relations may be inadequate to explain or improve a different prediction task. For example, for restaurants, a specific relation between a zip code and an item may be distance (which can have subtypes, in proximity, etc.). However, more generic features may be simultaneously introduced, such as a transaction velocity associated with a merchant. A constraint may thus be to maintain task-specific or general purpose attributes/relation types. This flexibility is provided by the presence of a sharing mechanism which can select a subset of the inferred edges, based on their relation types, for reuse in a different prediction application.

In these ways, non-limiting embodiments or aspects of the present disclosure may enable layered inference to support multi-task reasoning, counterfactual updates to a knowledge graph, and/or seamless incorporation of task-specific models. For example, grounding task-specific inferences on a shared base knowledge graph, with intermediate layers enabling incorporation of projections and aggregations of base links, may enable stochastic link inferences for reasoning across multiple related tasks or models. For example, understanding what data points are not well explained by the existing knowledge space and pushing data driven updates to guide future tasks using an inherently modular approach with intermediate layers forming repositories of task-model based insights may enable the notion of counterfactual examples, in task-model predictions, as updates to a knowledge graph. As an example, a joint approach to incorporate base knowledge graph links and task models to obtain new stochastic links may start with base edges and graph nodes and embed the base edges and graph nodes into a pre-trained latent knowledge space, evaluate the predictions of a task-specific model against this knowledge space to detect novel counterfactuals, and make updates accordingly in the knowledge space, with the transition to a continuous space enabling utilization of the knowledge graph seamlessly with any differentiable task model. Note that the knowledge space can be re-translated into stochastic links in an intermediate graph layer using any post-hoc proximity norm.

Knowledge Graph Embeddings

Performance of machine learning and AI models may be heavily dependent on a choice of features (e.g., data representations, etc.) on which the models are applied. Embeddings may include low dimensional, learned continuous vector representations of data that make extraction of useful information easier when building classifiers and/or other prediction models. Embedding/representation learning may be particularly useful when there is little to no metadata and label information.

Knowledge graph representations may be referred to as a knowledge representation space. The knowledge representation space may establish a consistent interface that connects underlying raw data and edges derived from the underlying raw data with task models that make predictions associating different subsets of interacting entities in a knowledge graph. However, there are several fundamental differences between modeling efforts for these two types of edges. Raw data edges (e.g., edges in a fact layer of a knowledge graph, etc.) are factual edges that can be directly incorporated in the representations, and edges suggested by task models are counterfactual. For example, an understanding of the counterfactual implications of the suggested edges and an attempt to infer the changes that need to be incorporated in the knowledge space may be needed to justify or explain the suggested associations. These modifications may constitute a holistic incorporation of the latent space characteristics of the task model into the knowledge representation space in a consistent manner.

Figure 5:
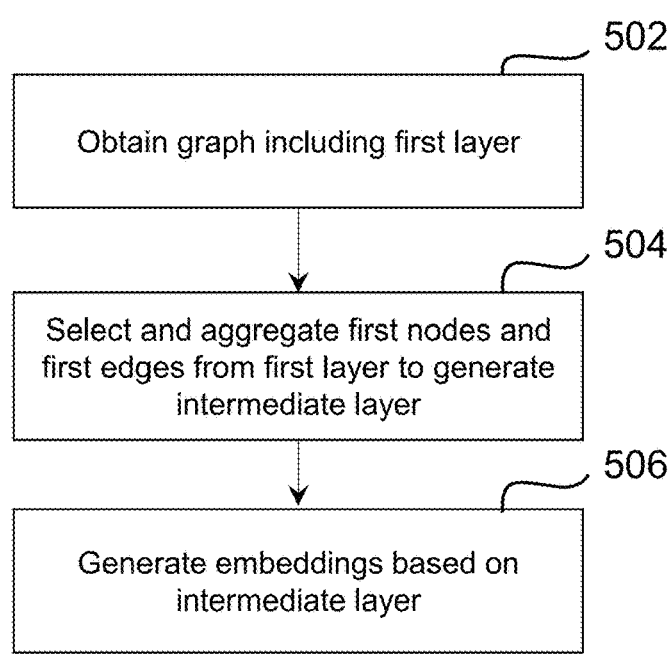
FIG. 5 is a flowchart of non-limiting embodiments or aspects of a process for generating knowledge graph-based embeddings.

Referring now to FIG. 5, FIG. 5 is a flowchart of non-limiting embodiments or aspects of a process 500 for generating knowledge graph-based embeddings. In some non-limiting embodiments or aspects, one or more of the steps of process 500 may be performed (e.g., completely, partially, etc.) by transaction service provider system 108 (e.g., one or more devices of transaction service provider system 108). In some non-limiting embodiments or aspects, one or more of the steps of process 500 may be performed (e.g., completely, partially, etc.) by another device or a group of devices separate from or including transaction service provider system 108, such as merchant system 102, (e.g., one or more devices of merchant system 102), payment gateway system 104 (e.g., one or more devices of payment gateway system 104), acquirer system 106 (e.g., one or more devices of acquirer system 106), transaction service provider system 108 (e.g., one or more devices of transaction service provider system 108, etc.), issuer system 110 (e.g., one or more devices of issuer system 110), and/or user device 112.

As shown in FIG. 5, at step 502, process 500 includes obtaining a graph including a first layer. For example, transaction service provider system 108 may obtain a graph including a first layer (e.g., a base knowledge graph, a fact layer of a multi-layer knowledge graph, etc.) including a plurality of first edges and a plurality of first nodes for the plurality of first edges. As an example, the plurality of first nodes may be associated with a plurality of first entities (e.g., the plurality of first entities, entity attributes of the plurality of entities, etc.), and the plurality of first edges may be associated with a plurality of first relationships between the plurality of first entities (e.g., between entities, between entities and entity attributes of the entities, etc.). In such an example, the plurality of first nodes may include sets of independent entities and/or entity attributes, and the plurality of first edges may include a set of sets of relations where each set of relations is the collection of all links of a specific link type that connects two fixed entity types. For example, the plurality of first nodes may include first entities of a plurality of different entity types and/or entity attributes of a plurality of different entity attribute types, and/or the plurality of edges may include first edges of a plurality of different relation types.

As shown in FIG. 5, at step 504, process 500 includes selecting and aggregating first nodes and first edges from a first layer of a graph to generate an intermediate layer of the graph. For example, transaction service provider system 108 may select and aggregate, according to at least one function (e.g., a selection function, a projection function, an aggregation function, etc.), a first subset of edges from the plurality of first edges and a first subset of nodes from the plurality of first nodes to generate an intermediate layer including a plurality of intermediate edges and a plurality of intermediate nodes for the plurality of intermediate edges. As an example, the plurality of intermediate nodes may be associated with a plurality of intermediate entities (e.g., a subset of entities of the plurality of first entities, derived entities and/or entity attributes, etc.), and the plurality of intermediate edges may be associated with a plurality of intermediate relationships between the plurality of intermediate entities. In such an example, transaction service provider system 108 may generate the plurality of intermediate edges by applying one or more selections, projections, and/or aggregations to the first layer (e.g., the base or fact layer, etc.) of the graph.

The plurality of intermediate nodes may include sets of independent entities (e.g., multiple types of entities, etc.) and relations, and entity types may be represented as: $E_1$ (e.g., users), $E_2$ (e.g., items) . . . $E_{|\varepsilon|}$ where $\varepsilon = \{E_1, E_2 \ldots E_{|\varepsilon|}\}$ is the set of all entity types. The set of all nodes in the graph may be $\cup E_i$. $R = \{R_1, R_2, \ldots R_{|R|}\}$ and may denote the set of relations where each relation $R_r$: $E_1{}^r \rightarrow E_2{}^r$ is a collection of links between two entity types $E_1{}^r$, $E_2{}^r \in \varepsilon$. Note that two different relations can exist between the same pair of entity sets. Each edge (e.g., an intermediate edge, etc.) may be denoted as $(e_1, r, e_2)$ where $e_1 \in E_1{}^r$, $e_2 \in E_2{}^r$ denote the head and tail entities, respectively, and r is a relation type of the head and tail entities. The respective d-dimensional entity embeddings may be denoted by adding an overhead arrow to the above notation, e.g., $\vec{e}_1$, $\vec{e}_2$. Each relation type r may be described by head and tail projectors $(p_1{}^r, \vec{p}_2{}^r)$ of that relation type, which may be d-dimensional like the entity embeddings. The subscripts 1 and 2 are used herein below to denote head and tail entities of a link, while the notation r is used to denote a relation type. Analogously, the notation j is used to denote a task model, $\mathcal{M}^j$: $E_1{}^j \rightarrow E_2{}^j$.

In some non-limiting embodiments or aspects, transaction service provider system 108 may generate a plurality of intermediate layers. For example, transaction service provider system 108 may select an aggregate, according to a first function, the first subset of edges from the plurality of first edges and the first subset of nodes from the plurality of first nodes to generate a second layer (e.g., a first intermediate layer, etc.) including a plurality of second edges and a plurality of second nodes for the plurality of second edges, the plurality of second nodes being associated with a plurality of second entities (e.g., a subset of the plurality of entities, derived entities and/or entity attributes, etc.), and the plurality of second edges being associated with a plurality of second relationships between the plurality of second entities. As an example, transaction service provider system 108 may select and aggregate, according to a second function, a second subset of edges from the plurality of first edges and the plurality of second edges and a second subset of nodes from the plurality of first nodes and the plurality of second nodes to generate a third layer (e.g., a second intermediate layer, a projection layer, an embedding layer, etc.) including a plurality of third edges and a plurality of third nodes for the plurality of third edges, wherein the plurality of third nodes is associated with a plurality of third entities (e.g., a subset of the plurality of entities, derived entities and/or entity attributes, etc.), and wherein the plurality of third edges is associated with a plurality of third relationships between the plurality of third entities.

As shown in FIG. 5, at step 506, process 500 includes generating embeddings based on an intermediate layer of a graph. For example, transaction service provider system 108 may generate, based on the intermediate layer, an embedding layer including embeddings for the plurality of intermediate edges and the plurality of intermediate nodes for the plurality of intermediate edges using an objective function that depends on the embeddings of two intermediate nodes and an intermediate edge connecting the two intermediate nodes. As an example, transaction service provider system 108 may embed each of the entities and each relation type into a common compatible knowledge space. In such an example, an embedding of an edge ($e_1$, r, $e_2$) may be represented as ($\vec{e}_1$,r,$\vec{e}_2$).

In some non-limiting embodiments or aspects, the objective function may defined according to the following Equation (1):

$$L = \sum_{R_r \in R} \sum_{(e_1, r, e_2) \in R_r} \sigma\left(r\left(\vec{e}_1 \otimes \vec{e}_2\right)\right) \tag{1}$$

where $\vec{e}_1$, $\vec{e}_2$ and r respectively denote an embedding representation of the two intermediate nodes and the connecting edge of the two intermediate nodes, and wherein $\sigma(x)=1/(1+e^{-x})$. For example, optimizing the objective function defined according to Equation (1) may provide the latent knowledge space of the above entity and relation embeddings for a chosen linear link likelihood model $\sigma(r(\vec{e}_1 \otimes \vec{e}_2))$.

In some non-limiting embodiments or aspects, the objective function may consider multiple non-linear forms for the entity representation, where the linear projection operation $\sigma(r(\vec{e}_1 \otimes \vec{e}_2))$ may be replaced by two projection operations depending on the entity types of the head and tail entities, e.g., $E_1{}^r$, $E_2{}^r$ for the relation type r, denoted by $O_{E_1}{}^r$ and $O_{E_2}{}^r$, respectively. In such an example, the non-linear propensity for the edge ($e_1$, r, $e_2$) where $e_1 \in E_1{}^r$, $e_2 \in E_2{}^r$ may be given as $\sigma_A(O_{E_1'}(\vec{e}_1,r), O_{E_1'}((\vec{e}_2,r))$, and the objective function may be defined according to the following Equation (2):

$$L = \sum_{R_r \in R} \sum_{(e_1, r, e_2) \in R_r} \sigma_A\left(O_{E_1'}(\vec{e}_1, r), O_{E_2'}((\vec{e}_2, r)\right) \tag{2}$$

where $\sigma_A$ is an alignment function that is the same for any pair of intermediate entity types $E_1{}^r$, $E_2{}^r$, where $\vec{e}_1$, $\vec{e}_2$, and r, respectively, denote an embedding representation of the two intermediate nodes and the connecting edge of the two intermediate nodes, wherein $O_{E_1}{}^r$ and $O_{E_2}{}^r$ respectively denote two projection operations depending on an entity type of the head entity $E_1{}^r$ and an entity type of the tail entity $E_2{}^r$ of the two intermediate nodes $e_1$, $e_2$ for the connecting intermediate edge ($e_1$, r, $e_2$).

For example, transaction service provider system 108 may generate the embeddings using a dual learning approach. For example, there may be a massive information gap in the latent embedding representations associated with cardholders and merchants in existing modeling efforts. A primary reason may be the disparity in the volume of available data. As an example, in a 2-month transaction window for Bay Area restaurants, an average of over 100 transactions per merchant may be obtained, while most cardholders only average less than 5 transactions over the same window. As a result, the merchant embedding representations may be simultaneously aligned to a very vast and diverse group of cardholders who transacted with the merchants. However, the number of attributes associated with the merchant, such as popular business hours, busiest days of the week, cuisine information, and other auxiliary contextual features may not scale in a similar manner. For any merchant node in the knowledge graph, the number of transaction edges may outnumber the attribute set by several orders of magnitude, resulting in an imbalanced learning problem. As a result, the model may be forced to choose between encoding attribute knowledge vs. cardholder feature representations in the merchant embedding space. However, each of these sources of data may be desired for use. For example, contextual features establish unique clusters of merchants that may not be identifiable from their user transactions alone.

To overcome this representation challenge, non-limiting embodiments or aspects of the present disclosure may learn a pair of embeddings for each merchant node in the knowledge graph, one connected to the attribute set of the merchant, and the other to the transaction edges. Further, these two representations are not isolated, and the correlations between them may be exploited. If some subset of the merchant attributes are tightly correlated to the user visits, while the rest are not, those dimensions of the attribute representation may be aligned with the transaction representation through a non-linear weighted alignment strategy.

In some non-limiting embodiments or aspects, transaction service provider system 108 may generate the embeddings using a two-phase learning approach. For example, the heterogeneity of some transaction data may not be limited to only the nature of the transaction activity, but also the distribution of transaction volume and quality across the participating cardholders and merchants in the transaction processing network, which poses unique challenges in the representation learning task. Specifically, the skew in the length of the transaction history across users often poses inference challenges, and if not dealt with, may adversely affect the parameter learning methods employed for representation learning and predictive modeling efforts. For example, the presence of skew and sparsity across regions of the knowledge graph may result in disparities in the quality and effectiveness of the embedding representations. Sampling and synthetic data generation (e.g., oversampling, etc.) are two existing approaches to deal with these challenges. However, sampling and synthetic data generation may be limited to handcrafted rules and rigid data pipelines.

To mitigate these shortcomings, non-limiting embodiments or aspects of the present disclosure may employ a two-phase learning algorithm that attempts to encapsulate the intuitions of sampling approaches in an effective gradient separation strategy. For example, transaction service provider system 108 may generate the embeddings by: selecting a further subset of nodes from the plurality of intermediate nodes that have a threshold number of intermediate edges between a same two intermediate nodes; generating, based on only the further subset of nodes and the intermediate edges between the further subset of nodes, the embeddings for the further subset of nodes and the intermediate edges between the further subset of nodes using the objective function that depends on the embeddings of the two intermediate nodes and the intermediate edge connecting the two intermediate nodes; and generating, based on (i) the embeddings for the further subset of nodes and the intermediate edges between the further subset of nodes and (ii) the remaining intermediate nodes of the plurality of intermediate nodes not included in the further subset of nodes and the intermediate edges between the remaining intermediate nodes, the embeddings for the remaining intermediate nodes of the plurality of intermediate nodes not included in the further subset of nodes and the intermediate edges between the remaining intermediate nodes, using the objective function that depends on the embeddings of the two intermediate nodes and the intermediate edge connecting the two intermediate nodes, without updating the embeddings for the further subset of nodes and the intermediate edges between the further subset of nodes. Accordingly, in a first iteration or phase, transaction service provider system 108 may perform gradient updates on the parameter space of the knowledge graph using only a core subset of the entities (e.g., the cardholders and merchants, etc.) in the knowledge graph. As an example, a subset with an adequate or threshold volume of transactions between them may be selected, and an informative representation space may be generated based on their interaction structure. The sparse set of entities (e.g., the cardholders and merchants, etc.) may be introduced into this informative representation space, which is established by the dense subset, and only the sparse embeddings may be updated without changing the underlying structure and arrangement of the dense set embeddings. In this way, non-limiting embodiments or aspects of the present disclosure may not only prevent the noisy updates to the dense set, thus retaining the quality of the dense set embeddings, but may also transfer the representative structures of the dense set embeddings to the sparse embedding sets.

An overall modularity of a knowledge space representation approach according to non-limiting embodiments or aspects of the present disclosure may derive from the independent formulation of the above propensity and/or objective functions, dependent on the set of entities, entity types, relation types of links and the specific links in the knowledge graph, while being agnostic to how the links are added or suggested by external prediction models. An independent representation space may be updated by external models or the underlying raw data in the form of new typed edges. The ability to add new edges from the raw data or counterfactual edges from external models enables non-limiting embodiments or aspects to maintain a consistent interface between the knowledge representation space and all external knowledge suppliers, for example, predictive models and the raw data (e.g., new incoming interactions, etc.).

Knowledge Graph Explainability

Recent times have witnessed several efforts intending to bring interpretability to machine learning and artificial intelligence. When using outcomes from an algorithm or model to make high-impact decisions, especially in sectors such as healthcare and finance, users may want to understand which aspects contributed to the outcome and which aspects were not taken into account. However, explaining models, especially models built on embeddings, is difficult. Existing efforts on model interpretability or explainability typically develop new methods for specific tasks instead of explaining existing models. This is not always a practical solution, especially in the financial industry. For example, if a fraud detection model that uses a machine learning algorithm in production wants to interpret why a transaction has been labeled fraudulent, a way to explain the algorithm itself may be desired instead of developing a brand new fraud detection model for the purpose.

Non-limiting embodiments or aspects of the present disclosure may use a multi-layer knowledge graph framework to generate explanations for oracle or prediction models (e.g., white box models, black box models, etc.), such as restaurant recommendation models, fraud detection models, and/or the like, without touching or altering the models themselves. Non-limiting embodiments or aspects of the present disclosure may also extend the multi-layer knowledge graph framework to leverage feedback returned by models, thereby improving the models.

Figure 6:
FIG. 6 is a flowchart of non-limiting embodiments or aspects of a process for generating an explanation for a model output.
Figure 6:
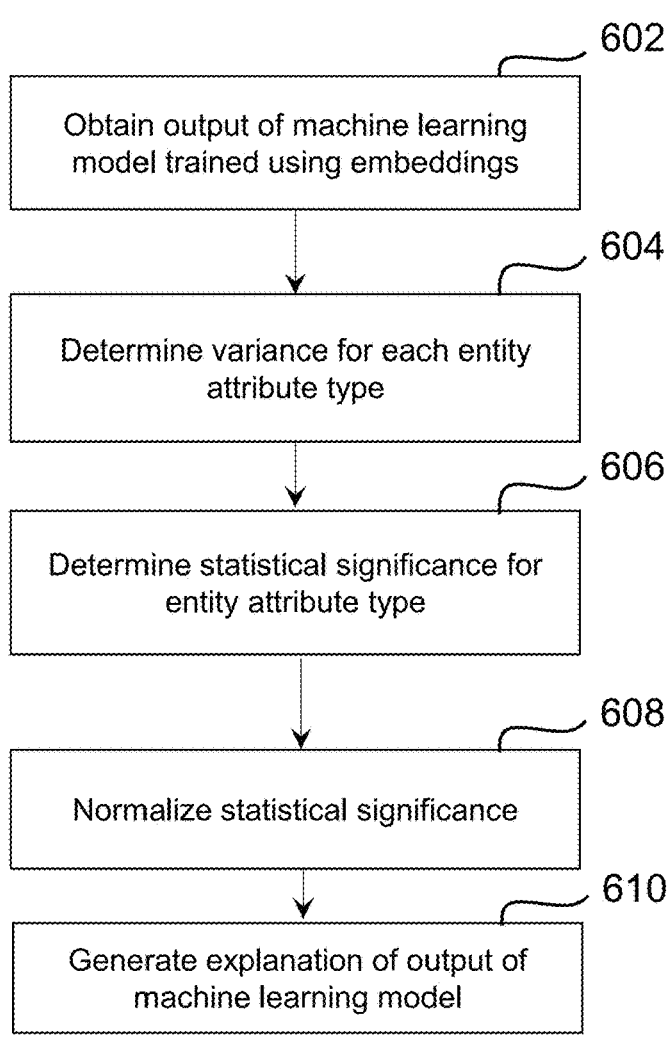

Referring now to FIG. 6, FIG. 6 is a flowchart of non-limiting embodiments or aspects of a process 600 for generating an explanation for a model output. In some non-limiting embodiments or aspects, one or more of the steps of process 600 may be performed (e.g., completely, partially, etc.) by transaction service provider system 108 (e.g., one or more devices of transaction service provider system 108). In some non-limiting embodiments or aspects, one or more of the steps of process 600 may be performed (e.g., completely, partially, etc.) by another device or a group of devices separate from or including transaction service provider system 108, such as merchant system 102 (e.g., one or more devices of merchant system 102), payment gateway system 104 (e.g., one or more devices of payment gateway system 104), acquirer system 106 (e.g., one or more devices of acquirer system 106), transaction service provider system 108 (e.g., one or more devices of transaction service provider system 108, etc.), issuer system 110 (e.g., one or more devices of issuer system 110), and/or user device 112.

As shown in FIG. 6, at step 602, process 600 includes obtaining an output of a machine learning model. For example, transaction service provider system 108 may obtain an output of a machine learning model. As an example, transaction service provider system 108 may obtain an output of a machine learning model generated based on an input to the machine learning model. In such an example, the machine learning model may be trained using the embeddings for the plurality of intermediate edges and the plurality of intermediate nodes for the plurality of intermediate edges generated in step 506 of process 500 shown in FIG. 5. The input may include a first intermediate entity of the plurality of intermediate entities and one or more intermediate entities of the plurality of intermediate entities having a different entity type than the first intermediate entity. The output may include at least one intermediate entity of the plurality of intermediate entities having a same entity type as the one or more intermediate entities, and the same entity type may be associated with a plurality of entity attribute types $A_1, A_2, \ldots A_n$. For example, for an example restaurant recommendation model, a top layer in a multi-layer knowledge graph may generate embeddings, which in turn, help to update, e.g., densify the knowledge space with missing links. As an example, a top layer of a multi-layer knowledge graph for a restaurant recommendation task as shown in FIG. 3 may be densified.

As shown in FIG. 6, at step 604, process 600 includes determining a variance for each entity attribute type. For example, transaction service provider system 108 may determine a variance for each entity attribute type. As an example, transaction service provider system 108 may determine, for each entity attribute type $A_i$ of the plurality of entity attribute types $A_1, A_2, \ldots A_n$, a variance of that entity attribute type $\text{Variance}(A_i)$ as a cardinality of that entity attribute type $\text{Cardinality}(A_i)$ over the one or more intermediate entities included in the input. For example, referring again to the example restaurant recommendation model, assume that the model recommends restaurant R0 to User U, and that U has visited restaurants R1, R2, R3, R4 in her transaction history, restaurants $R_0, R_1, R_2, R_3, R_4$ have entity attribute types $\{A_1, A_2, \ldots\}$ and specific values Ai=aj for each type. In such an example, transaction service provider system 108 may, for each entity attribute type $A_i$, compute a variance as Variance(Ai)=Cardinality(Ai) over $R_1$, $R_2$, $R_3$, $R_4$.

As shown in FIG. 6, at step 606, process 600 includes determining a statistical significance of each entity attribute type. For example, transaction service provider system 108 may determine a statistical significance of each entity attri- Still referring to the example restaurant recommendation model, assume that the restaurants $R_1$, $R_2$, $R_3$, $R_4$ have the following attributes illustrated below in Table A within the following ranges: Restaurant Price Range is (values=$, $$, $$$, $$$$), Restaurant is Popular for (values=breakfast, lunch, dinner, late-night), Restaurant is Popular during (values=weekday, weekend), Restaurant Name has (values=burger, pizza, sandwich, taco, . . . ), and Restaurant Location is (values=Sunnyvale, Mountain View, Palo Alto, . . . ).

TABLE A

| Restaurant | $R_0$ California Pizza Kitchen | $R_1$ Pizza My Heart | $R_2$ Bossman's Pizza | $R_3$ Curry Pizza House | $R_4$ Chicago's Pizza w/Twist |
|---|---|---|---|---|---|
| Price Range is | $$ | $$ | $$ | $$ | $$ |
| Is Popular for | dinner | ~ | lunch | ~ | dinner |
| Is Popular during | weekend | ~ | weekday | weekday | weekend |
| Name has | Pizza | Pizza | Pizza | Pizza | Pizza |
| Location is | Palo Alto | Sunnyvale | San Jose | Palo Alto | San Francisco | bute type. As an example, transaction service provider system 108 may determine, for each entity attribute type $A_i$ for which the at least one intermediate entity in the output has a value $a_j$, a statistical significance of that entity attribute type Statistical Significance $(A_i=a_j)$ as a number of the one or more intermediate entities in the input that have a value $a_j$ for that entity attribute type $A_i$ divided by the variance of that entity attribute type Variance($A_i$). For example, and referring again to the example restaurant recommendation model, in such an example, transaction service provider system 108 may, for each entity attribute type $A_i$ with assignment $A_i=a_j$ in $R_0$, compute a statistical significance Statistical Significance $(A_i=a_j)=[\{Count(A_i=a_j)$ over $R_1$, $R_2$, $R_3$, $R_4\}/\{Variance(A_i)\}]$.

As shown in FIG. 6, at step 608, process 600 includes normalizing the statistical significance of each entity attribute type. For example, transaction service provider system 108 may normalize the statistical significance of each entity attribute type. As an example, transaction service provider system 108 may normalize to a 0 to 1 range the statistical significance of each entity attribute type Statistical Significance $(A_i=a_j)\sim[0, 1]$. For example, and referring again to the example restaurant recommendation model, in such an example, transaction service provider system 108 may, for each entity attribute type Ai with assignment Ai=aj in R0, normalize the Statistical Significance $(A_i=a_j)\sim[0, 1]\rightarrow$(each attribute type can have value lie between n and 1/n where n is cardinality), which results in a Score(Ro~Ai=aj) over $R_1$, $R_2$, $R_3$, $R_4$.

As shown in FIG. 6, at step 610, process 600 includes generating an explanation for the output of the machine learning model. For example, transaction service provider system 108 may generate an explanation for the output of the machine learning model. As an example, transaction service provider system 108 may generate, based on the normalized statistical significance of each entity attribute type Statistical Significance $(A_i=a_j)\sim[0, 1]$, an explanation for the output of the machine learning model. For example, and referring again to the example restaurant recommendation model, in such an example, transaction service provider system 108 may, for each entity attribute type $A_i$ with assignment $A_i=a_j$ in $R_0$ with Score($A_i=a_j$), select a top-k (e.g., k=2, etc.) attribute types $A_x$ and $A_y$ with assignments $A_x$=a', $A_y$=a'' as the explanation for the output of the machine learning model.

In such an example, Score($R_0$~Price Range is)=4/1 normalized~1, Score($R_0$~is Popular for)=1/2 normalized~0.125, Score($R_0$~is Popular during)=1/2 normalized~0.125, Score($R_0$~Name has)=4/1 normalized~1, and Score($R_0$~Location is)=1/4 normalized~0.0625. Accordingly, the top two attributes are "Price Range" and "Name Has", and the explanation generated for the model recommending restaurant $R_0$ to User U is: "User is recommending $R_0$ because she prefers $$ and Pizza Restaurants".

Knowledge Graph Embedding and Multi-Task Learning Via Counterfactual Residuals

The modern-day rise of artificial intelligence in academic research and industrial applications has sparked renewed interest in knowledge graphs. Knowledge graphs are graph-structured knowledge bases where vast amounts of information available in the world may be succinctly represented as entities (nodes) and relationships (edges). Knowledge graphs may be semantically enriched (e.g., entities and relationships may have associated meanings, etc.) and unite machine learning and graph technologies to give artificial intelligence context. Knowledge graphs are resources in many vital applications today (e.g., intelligent assistants including Apple's Siri and Amazon's Alexa, question answering features of modern search engines including Google and Microsoft Bing, product recommendation and discovery features of e-commerce marketplaces including Amazon and eBay, etc.).

Figures 7A, 7B:
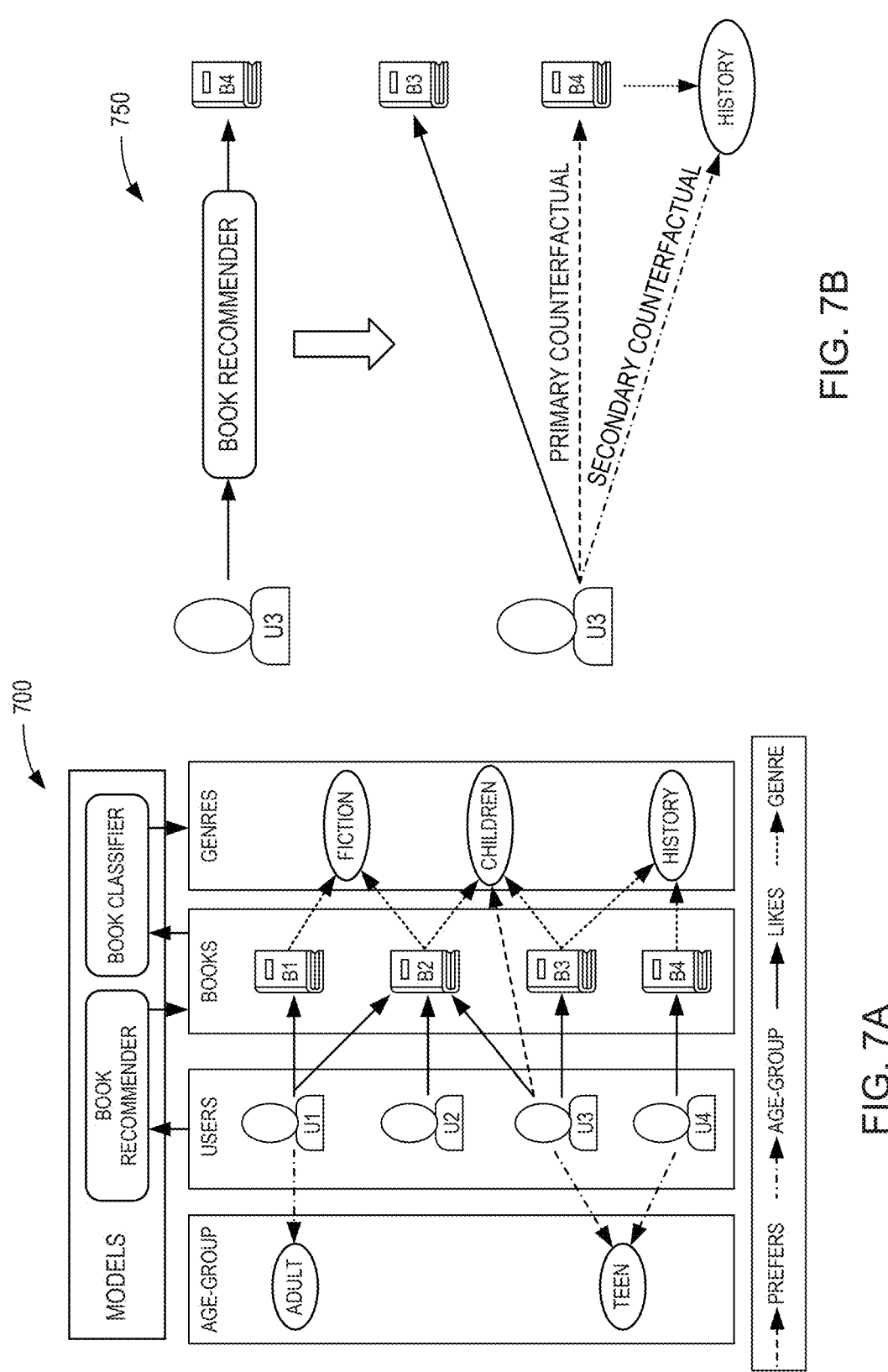
FIG. 7A is a diagram of non-limiting embodiments or aspects of an example knowledge graph.
FIG. 7B is a diagram of non-limiting embodiments or aspects of example counterfactual links.

Knowledge graphs may express heterogeneous knowledge in various domains in a usable form and satisfy many use cases for domains ranging from linguistics to biomedicine to finance. FIG. 7A is an example of a knowledge graph 700 that captures user attributes (e.g., age-group, etc.) and item/book attributes (e.g., genre, etc.), and relationships between the users and item/book attributes. For example, the knowledge graph shown in FIG. 7A includes four types of entities: user, book, user age-group, and book genre, the entities are connected via four types of relationships: prefers, in age-group, "likes," and genre, and models Book Recommender and Book Classifier recommend books to users and identify book genres, respectively.

A natural consequence of such a generalizable representation is that the representation may exhibit the characteristics of the underlying data, such as sparsity for some entities or some types of entities, skew in the volume and types of relationships connecting entities, and/or the like.

For example, the age-group relationship of each of the users in the example knowledge graph shown in FIG. 7A is not known. These ubiquitous distributional challenges may persist across several domains. Thus, constructed knowledge graphs may be far from complete and mandate continuous enrichment and curation, where enriching the knowledge graph can also help augment the underlying data.

Knowledge graph embedding attempts to enrich a knowledge graph and incorporate latent structural proximities of nodes by transitively learning a range of simple heuristic patterns among the nodes, such as symmetry, anti-symmetry, composition and analogy, and/or the like, each which is described herein below in more detail. These patterns are, however, may be unable to distinguish the different relation types and are applied in an equivalent manner to each of the relation types, which may lead to contradictory and incorrect inferences, and which may violate the domain knowledge. For example, in the example shown in FIG. 7A, a user may like a book, and the book may be connected to an author, but these relationships do not necessarily imply that the user likes the author. If there is a more detailed external task model, which can provide this feedback, this incorrect inference can be avoided. Accordingly, non-limiting embodiments or aspects of the present disclosure may adopt the utility of these patterns, but provide the ability to correct these mistakes across different relation types using external model feedback.

A knowledge graph may be viewed as an oracle for developing task-specific models that leverage existing connectivity patterns to improve performance for tasks such as question-answering and recommendation. A challenge in this scenario is that the view of the knowledge graph may not be optimized to the specific architecture of the task model. Conversely, inductive task models may not be directly leveraged to densify or improve the knowledge graph either. Non-limiting embodiments or aspects of the present disclosure may address this shortcoming by improving or optimizing the view of the knowledge graph such that the knowledge graph is better suited to the specific task model using counterfactual residual learning.

Some existing hybrid solutions may bridge the above two directions for specific fixed tasks by simultaneously performing task augmentation and graph enrichment. Such existing solutions are often predicated on some very specific architectural assumptions about the nature of the task/task model or external feedback. These solutions do not extend to a broader multi-task setting where different tasks correspond to subsets of graph nodes. Therefore, these existing solutions cannot be bi-directionally integrated with a knowledge graph. Non-limiting embodiments or aspects of the present disclosure may make no assumptions about the nature, architecture, or training objective of an external task model, which may enable leveraging a much more comprehensive range of task models to improve the knowledge graph.

Non-limiting embodiments or aspects of the present disclosure may provide a holistic solution to subsume multi-task learning and knowledge graph enrichment via multi-directional knowledge transfer (e.g., model-to-graph knowledge transfer, graph-to-model knowledge transfer, model-to-model via graph knowledge transfer, etc.) using a notion of counterfactual association learning. For example, each task model may be viewed as an intervention applied to the knowledge graph entities, much akin to a patient receiving a specific medicine. The counterfactual question then becomes: if we know how the patient reacted to one of the two scenarios (receiving or not receiving the medicine), can we use that outcome alone to accurately predict the counterfactual scenario? This question may be directly applicable to link prediction and model enhancement tasks as two complementary aspects of the factual-counterfactual question. When applying a task model to an entity, the task model predicts several connections for the entity.

Referring again to FIG. 7A, and referring also to FIG. 7B, when the Book Recommender model is used to recommend books for the user U3, B4 is provided as a recommended book, which enables generating a new connection between the user U3 and the book B4 as shown by connections 750 in FIG. 7B. The connections may be counterfactual because the nature of the task model biases the connections. For example, primary counterfactual links may be inferred directly from a model, and secondary counterfactual links may be inferred from 1-hop neighbors of the primary counterfactual links. A causal inference question of whether the suggested links originate from the task or task model eccentricities or vice-versa may thus be formulated. A counterfactual question that may be proposed is: how can the task or intervention-biased connections be leveraged to enrich the underlying knowledge graph (e.g., to infer the factual links, etc.)? Conversely, an opposite direction may be: given the factual links of an entity, what are the likely counterfactual links suggested by the model? While the counterfactual to factual link mapping direction enables enriching the knowledge graph, the opposite direction enables improving the task models based on the factual links of the knowledge graph. In this way, forward and reverse transformations may enable bi-directional knowledge transfer between task models and a knowledge graph.

Distinct components associated with knowledge graph representations according to non-limiting embodiments or aspects of the present disclosure are now described. This representation space may establish a consistent interface between a set of factual links across entities and task models that make predictions associating different subsets of the interacting entities in the knowledge graph. However, there may be several fundamental differences between modeling efforts for these two types of edges. While the factual edges may be directly incorporated in node representations, edges (e.g., the predictions, etc.) suggested by task models may be counterfactual. Non-limiting embodiments or aspects of the present disclosure provide a framework to incorporate the counterfactual edges and infer changes in the node representations.

As previously described, for a heterogeneous directed knowledge graph with multiple types of entities (or sets of nodes) and relations, entity types may be represented as: $E_1$ (e.g., users), $E_2$ (e.g., items) . . . $E_{|\varepsilon|}$ where $\varepsilon = \{E_1, E_2 \ldots E_{|\varepsilon|}\}$ is the set of all entity types. The set of all nodes in the graph may be $\cup E_i$. $R = \{R_1, R_2, \ldots R_{|R|}\}$ may denote the set of relations where each relation $R_r$: $E_1^r \rightarrow E_2^r$ is a collection of links between two entity types $E_1^r$, $E_2^r \in \varepsilon$. Note that two different relations can exist between the same pair of entity sets. Each edge (e.g., an intermediate edge, etc.) may be denoted as $(e_1, r, e_2)$ where $e_1 \in E_1^r$, $e_2 \in E_2^r$ denote the head and tail entities, respectively, and r is a relation type of the head and tail entities. The respective d-dimensional entity embeddings may be denoted by adding an overhead arrow to the above notation, e.g., $\vec{e}_1$, $\vec{e}_2$. Each relation type r may described by head and tail projectors $(\vec{p}_1^r, \vec{p}_2^r)$ of that relation type, which may be d-dimensional like the entity embeddings. The subscripts 1 and 2 are used herein below to denote head and tail entities of a link, while the notation r is used to denote a relation type. Analogously, the notation j is used to denote a task model, $\mathcal{M}^j$: $E_1^j \rightarrow E_2^j$.

For simplicity and/or brevity, only discrete prediction models are discussed herein below; however, non-limiting embodiments or aspects are not limited thereto, and regression models can be discretized to fit a similar abstraction. Each prediction model $\mathcal{M}^j$ may take an input entity $e_1 \in E_1^j$ and produce a predicted output entity $e_2 \in E_2^j$ thus inducing a connection across the two entity sets $E_1^j$, $E_2^j \in \varepsilon$ depending on a specific prediction task j of that prediction model $\mathcal{M}^j$. For example, a recommendation model may connect user nodes to respective recommended item nodes in a knowledge graph. These recommended connections may be referred to as task-biased or intervention-biased counterfactual links because the recommended connections may not exist in the knowledge graph, but the recommended connections may be predicted by the task model. For simplicity, only task models that establish connections between pairs of entity sets are discussed herein, although non-limiting embodiments or aspects of the present disclosure may be general to multi-variate scenarios.

Because knowledge graphs may often be incomplete and/or exhibit a lack of links for a substantial proportion of nodes, embedding models may attempt to infer missing links via proximities in the latent space. For example, Zhiqing Sun, Zhi-Hong Deng, Jian-Yun Nie, and Jian Tang in the paper entitled "Rotate: Knowledge graph embedding by relational rotation in complex space", arXiv preprint arXiv: 1902.10197 (2019), the entire contents of which are incorporated herein by reference, describe fundamental connectivity patterns: symmetry/antisymmetry, composition, and inversion, which can be stacked by learned models to encode higher-order patterns:

Symmetry: $(e_1, r_a, e_2) = \Longrightarrow (e_2, r_a, e_1)$

Anti-Symmetry: $(e_1, r_a, e_2) = \Longrightarrow$ not $(e_2, r_a, e_1)$

Analogy: $(e_1, r_a, e_2)$ and $(e_3, r_a, e_4) = \Longrightarrow (e_1, r_b, e_3)(e_2, r_c, e_4)$ Inversion: $(e_1, r_a, e_2) = \Longrightarrow (e_2, r_b, e_1)$ Composition: $(e_1, r_a, e_2)$ and $(e_2, r_b, e_1) = \Longrightarrow (e_1, r_c, e_3)$.

Although these patterns may enable a good first-cut link selection, these patterns do not distinguish different relation types and are applied in an equivalent manner to each relation type. For example, the learned patterns may often contradict domain knowledge for some types of links. Existing knowledge graph embedding methods do not provide any mechanism to overcome these challenges in large heterogeneous knowledge graphs. Non-limiting embodiments or aspects of the present disclosure may leverage the inductive bias of an external model designed for a specific task to filter the encoded patterns. Further, in a heterogeneous knowledge graph, a degree of sparsity may not be evenly spread across the different node and relation modalities. Cross-modal transfer may thus be particularly useful in any enrichment or completion effort, for example, the following type of cross-modal learning: How can $(e_1, r_a, e_2)$ be leveraged for predictions of the form $(e_1, r', e')$, $(e_2, r', e')$, $(e'', r'', e_1)$, $(e'', r'', e_2)$? Note that the answer to the above form of cross-modal learning is specific to the relation types $r_a, r', r''$ as well the entity nodes and, thus, may be answered effectively by leveraging external models that are designed and trained for prediction tasks involving either these entities and/or relations.

In addition to these properties, sizes of most knowledge graphs may exceed millions of nodes and billions of edges. Efficient parallelization in an embedding model may be particularly useful for many practical applications. DistMult, which is one of the most successful existing embedding models, owing to its simplicity and ability to be block optimized, is described by Bishan Yang, Wen-tau Yih, Xiaodong He, Jianfeng Gao, and Li Deng in the paper entitled "Embedding entities and relations for learning and inference in knowledge bases", arXiv preprint arXiv: 1412.6575 (2014), the entire contents of which are incorporated herein by reference. However, a weakness of the DistMult model is an inability to model anti-symmetry and composition owing to its formulation, as pointed out by Zhiqing Sun, Zhi-Hong Deng, Jian-Yun Nie, and Jian Tang in the paper entitled "Rotate: Knowledge graph embedding by relational rotation in complex space", arXiv preprint arXiv:1902.10197 (2019), the entire contents of which are incorporated herein by reference. On the other hand, this Rotate embedding model does not treat head and tail entities uniformly and, thus, poses scalability constraints with regard to some block optimizations. Non-limiting embodiments or aspects of the present disclosure consider each these perspectives in a base embedding model, which may be subsequently augmented in a multi-task setting, by applying a modification to DistMult to capture both anti-symmetry and composition in a heterogeneous node setting.

A basic DistMult model follows a bilinear function with a learned diagonal projector matrix $P_r$ representing the relation type r. Thus, the likelihood of an edge $(e_1, r, e_2)$ for the DistMult model may be given by the following Equation (3):

$$\mathcal{L}_{(\vec{e}_1, r, \vec{e}_2)} = \vec{e}_1^T P_r \vec{e}_2 \tag{3}$$

Due to this transformation's symmetric nature, anti-symmetry and inversion may be difficult to encode in this form. Non-limiting embodiments or aspects of the present disclosure may apply a modification to this transformation. The symmetric nature of Equation (3) may be changed by describing a head and tail dual-projector form for each relation. Note that this form only involves a few additional parameters, for example, twice as many parameters for the relation embeddings. However, in most knowledge graphs, the types of relations may be several orders of magnitude smaller than the number of nodes, and this parameter overhead may be negligible. The likelihood of an edge $(e_1, r, e_2)$ may thus be given according to the following Equation (4):

$$\mathcal{L}_{(\vec{e}_1, r, \vec{e}_2)} = \text{sim}((\vec{e}_1 \otimes \vec{p}_1^r)(\vec{e}_2 \otimes \vec{p}_2^r)) \tag{4}$$

Equation (4) may enable composition, inversion, and anti-symmetry. The proof may be relatively straightforward as follows:

Anti-Symmetry: Consider relations $r_a$ to be anti-symmetric, such that $(e_1, r_a, e_2) = \Longrightarrow$ not $(e_2, r_a, e_1)$, which may be encoded in the likelihood terms with orthogonal projectors for the head and tail, i.e., $\vec{p}_1^r \perp \vec{p}_2^r$, such that the orthogonal projections of the head and tail entity is taken when the direction of the relation is reversed.

Inversion: Consider relations $r_a$, $r_b$ to be inversions of each other, such that $(e_1, r_a, e_2) = \Longrightarrow (e_2, r_b, e_1)$, which may be encoded in the likelihood terms by switching the head and tail projectors, i.e., $\vec{p}_1^{r_a} = \vec{p}_2^{r_b}$ and $\vec{p}_2^{r_a} = \vec{p}_2^{r_a}$. It is easy to verify that this would result in $\mathcal{L}(\vec{e}_1, r_a, \vec{e}_2) = \mathcal{L}(\vec{e}_2, r_b, \vec{e}_1)$ which results in the desired inversion.

Composition: Consider relations $r_c$ to be composed of $r_a$ and $r_b$, so that, $(e_1, r_a, e_2)$ and $(e_2, r_b, e_3) = \Longrightarrow (e_1, r_c, e_3)$, which may be encoded in the likelihood terms with the following simple switch, i.e., $\vec{p}_1^{r_c}=\vec{p}_1^{r_a}$ and $\vec{p}_2^{r_c}=\vec{p}_2^{r_a}$, which transitively aligns the composed relation with the head and tail entities $e_1$ and $e_3$.

An identity-matrix scaling factor may be added to the relation projectors such that a percentage of the original node embedding dimensions in the projected versions may be retained according to the following Equation (5):

$$\Longrightarrow_{(\vec{e}_1, r, \vec{e}_2)}=\text{sim}((\vec{e}_1^{T}(\vec{p}_1^{r}+s\,\mathbb{I}))(\vec{e}_2^{T}\otimes$$
$$(\vec{p}_2^{r}+s\,\mathbb{I})) \tag{5}$$

In addition to the notion of head and tail projectors, a similarity function, which may be a dot product, may enable block sampling and optimization advantages. As a result, non-limiting embodiments or aspects of the present disclosure may provide a model that is scalable with the block optimizations and is expressive, the scalable and expressive nature forming an adaptive and scalable base embedding space to enable the multi-task and multi-modal transfer of knowledge from task-specific models.

Referring again to the above-definition of task models, a simplified abstraction thereof is provided and discussed herein below. Consider a discrete prediction model $\mathcal{M}^j$ to take an input entity $e_1^j \in E_1^j$ from a knowledge graph, and produce a predicted output entity $e_2^j \in E_2^j$, thus inducing a connection across the two entity sets $E_1^j$, $E_2^j \in \varepsilon$. Note that the specific prediction task j modeled by $\mathcal{M}^j$ may vary even between the same pair of entity sets $E_1^j, E_2^j \in \varepsilon$. For example, a point-of-interest (POI) recommendation model may connect user entities to preferred venue nodes in a knowledge graph. Simultaneously, a location-based recommendation model may produce a different map between the same two entity sets, because the location-based recommendation model may have a different objective function. In this way, each task model may generate a different mapping between the two spaces, depending on an inductive bias and task objective of that task model. These mappings may be referred to as task-specific counterfactual links because these mappings may not exist in the knowledge graph but, rather, are predicted by a task model. For simplicity and/or brevity, although non-limiting embodiments or aspects of the present disclosure are discussed primarily with respect to task models that establish connections between pairs of entity sets, non-limiting embodiments or aspects of the present disclosure provide a framework that may be general to multi-variate scenarios and regression with appropriate discretization.

Non-limiting embodiments or aspects of the present disclosure may consider each task-specific model as an intervention on a specific subset of nodes in a knowledge graph (e.g., analogous to a medical treatment applied to a patient, etc.). Note that the specific intervention may depend on each of the task (or objective) of the trained model and the model architecture, e.g., an inductive bias of the model. As discussed herein below in more detail, non-limiting embodiments or aspects of the present disclosure may provide a consistent pathway to enrich or complete the knowledge graph based on the intervention biased predictions. These predictions may not be treated equivalently. Some task models may be likely to better predict the existence of certain types of links in the original knowledge graph than other task models. These intervention biased links may be referred to as counterfactual links, in contrast to the factual links that exist in the knowledge graph. The counterfactual links may signal the existence of a factual link, depending on the applied intervention. It is also noted that some or all of the data used to train the task models may already be present in the knowledge graph (e.g., as a subset of the links in the graph, etc.), and may not necessarily involve any additional features or node attributes.

Links in a base knowledge graph may be the factual links across entities. At the same time, links suggested by task models may be referred to as counterfactual links, from the intervention perspective. For example, task model $\mathcal{M}^j$ may take an input entity $e_1^j \in E_1^j$ and predict the output entity $e_2^j \in E_2^j$ under task j, which may be referred to as a primary counter-factual link $(e_1^j, e_2^j)$, because the output entity is directly predicted by task model $\mathcal{M}^j$. In contrast to the factual links across entities in the knowledge graph, the counterfactual link suggested by the model may be intervention biased. Thus, to employ the model predicted edges to enrich the knowledge graph, non-limiting embodiments or aspects of the present disclosure may provide a bias-elimination procedure that can extract the relevant information from each task model and enrich the knowledge graph.

Referring again to task model $\mathcal{M}^j$, which may predict intervention-biased counterfactual links of the form $(e_1^j, e_2^j)$, where $e_1^j \in E_1^j$ and $e_2^j \in E_2^j$. Additional counterfactual links may be evaluated by sampling nodes in a 1-hop neighborhood of $e_2^j$ and connecting them to $e_1^j$, and vice-versa, which may enable inferring connections across entities in two different correlated tasks and permitting model-to-model transfer learning. Note that the counterfactual links may not have any associated relation, whereas the factual links in the knowledge graph may always have associated relations.

Each node in the knowledge graph may be updated via the feedback from the external prediction models. The models may supply intervention-biased counterfactual edges for each node, and these intervention-biased counterfactual edges are appropriately leveraged to update the underlying node embeddings of the knowledge graph nodes.

The knowledge transfer to node embeddings from the perspective of one specific focus node, $e_i \in E_i$ may be presented considering task models $\mathcal{M}^j$: $E_1^j \rightarrow E_2^j$ following the notations discussed herein above (e.g., different task models with the input entity set $E_i$ in which the focus node $e_i$ lies, etc.). Each task model may now produce an output prediction corresponding to the input $e_i$. Consider the following set of predicted outputs from the task models: $e_i \rightarrow M_{j1} \rightarrow e_{j1} \in E_{j1}^2$; $e_i \rightarrow M_{j2} \rightarrow e_{j2} \in E_{j2}^2$; and $e_i \rightarrow M_{j3} \rightarrow e_{j3} \in E_{j3}^2$. Each task may provide a distinct modality of edge connections (e.g., the sets $E_{j1}^2$, $E_{j2}^2$ and $E_{j3}^2$ may be distinct from each other, etc.).

A set of intervention-biased link inferences may be created from the above-noted model predictions: $e_i \rightarrow M_{j1} \rightarrow e_{j1} \in E_{j1}^2$; $e_i \rightarrow M_{j2} \rightarrow e_{j2} \in E_{j2}^2$; and $e_i \rightarrow M_{j3} \rightarrow e_{j3} \in E_{j3}^2$. For example, primary counterfactual links, for example, $(e_i, e_{j1})$, $(e_i, e_{j2})$, and $(e_i, e_{j3})$ may be created. However, inferences may not be limited to these primary links alone. Consider the set of 1-hop neighbors of each of the predicted primary connections, e.g., the 1-hop neighborhood $N_{j1}$ for $e_{j1}$, $N_{j2}$ for $e_{j2}$, and $N_{j3}$ for $e_{j3}$. Further, these 1-hop neighbors may be denoted $n_{j1} \in N_{j1}$, $n_{j2} \in N_{j2}$, and $n_{j3} \in N_{j3}$. These neighboring nodes can belong to different entity sets which may not be the same as $E_{j1}^2$, $E_{j2}^2$ or $E_{j3}^2$. As a result, these transitive 1-hop connections result in several new cross-modal inferences in addition to the primary counterfactual links. These cross-modal links are intervention-biased by association to the primary counterfactuals, $(e_i, e_{j1})$, $(e_i, e_{j2})$, and $(e_i, e_{j3})$, from which the cross-modal links originate. This new transitive set of cross-modal links may be referred to as the set of secondary counterfactual links.

Accordingly, for each predictive model, for example, $M_{j1}$, $M_{j2}$, and $M_{j3}$, sets of each of primary and secondary intervention-biased counterfactual links may be obtained for the focus entity $e_i$, which may be leveraged to update the respective knowledge graph node embeddings. The sets of counterfactual links for these three models, with the focus entity $e_i$, may be referred to as $C_{j1}(e_i)$, $C_{j2}(e_i)$, and $C_{j3}(e_i)$, respectively.

An overall modularity of the knowledge space representation approach may derive from the formulation of the above-noted edge likelihood functions, dependent on the set of entities, entity types, relation types of links, and the specific links in the knowledge graph, while being agnostic to how the links are added or suggested by the task models. Non-limiting embodiments or aspects of the present disclosure may maintain an independent representation space, which may be updated by external models by leveraging their counterfactual edge suggestions, thereby keeping a consistent interface between the knowledge representation space and each external task model.

Non-limiting embodiments or aspects of the present disclosure may leverage a set of counterfactual links for node embedding updates, which may follow the Rubin-Neyman causal model. Consider a set of factual links of a focus entity $e_1$ G $E_i$, that are present in a knowledge graph, and are known with certainty.

For a specific factual link $(e_i,r,e_j)$, under the base embedding model, the likelihood of this factual link may be given according to the following Equation (6):

$$\mathcal{L}_{(\vec{e}_1,r,\vec{e}_2)} = \text{sim}((\vec{e}_1^T \otimes (\vec{p}_1^r + s\, \mathbb{I}))(\vec{e}_2^T \otimes (\vec{p}_1^r + s\, \mathbb{I})) \tag{6}$$

An approach to estimate the likelihood of any counterfactual link $(e_i,r_{CF},e_j)$ suggested by a task model using the same base likelihood model may be provided according to the following Equation (7):

$$\mathcal{L}_{(\vec{e}_1,r_{CF},\vec{e}_2)} = \text{sim}((\vec{e}_1^T \otimes (\vec{p}_1^{r_{CF}} + s\, \mathbb{I}))(\vec{e}_2^T \otimes$$
$$(\vec{p}_2^{r_{CF}} + s\, \mathbb{I})) \tag{7}$$

The counterfactual relation-type $r_{CF}$ (of the counterfactual link) may or may not be predicted by the external model. The following three heuristics may address the case where $r_{CF}$ is not known:

A Relation-Agnostic (RA) counterfactual likelihood may be defined according to the following Equation (8):

$$\mathcal{L}\mathcal{R}\mathcal{A}^{CF}_{(\vec{e}_1,\vec{e}_2)} = \|\vec{e}_1 \otimes \vec{e}_2\| \tag{8}$$

where $\|$ denotes a suitable norm function such as L2 distance or hinge loss. $\mathcal{L}\mathcal{R}\mathcal{A}^{CF}$ may maximize the dimensions along which the two entity embeddings match, which may effectively increase the likelihood of any valid relation type between the entity pair depending on the projection component, as long as the different relation types are not anti-correlated.

A Preferred-Relation (PR) Counterfactual Likelihood may be defined according to the following Equation (9):

$$\mathcal{L}\mathcal{P}\mathcal{R}^{CF}(\vec{e}_1,\vec{e}_2) = \text{argmax}\,\sigma((\vec{e}_1 \otimes \vec{p}_1^r).(\vec{e}_2 \otimes \vec{p}_2^r)) \tag{9}$$
$$r\,|\,R_r : E_1^r \to E_2^r$$

$\mathcal{L}\mathcal{P}\mathcal{R}^{CF}$ may only consider the most-likely relation type for any pair of entities in the likelihood estimation, which may be much more reliable than $\mathcal{L}\mathcal{R}\mathcal{A}^{CF}$ for pairs of entity types that have anti-correlated relations between them.

A Relation-Sum (RS) Counterfactual Likelihood may be defined according to the following Equation (10):

$$\mathcal{L}\mathcal{R}\mathcal{S}^{CF}(\vec{e}_1,\vec{e}_2) = \sum_{r\,|\,R_r : E_1^r \to E_2^r} \sigma((\vec{e}_1 \otimes \vec{p}_1^r).(\vec{e}_2 \otimes \vec{p}_2^r)) \tag{10}$$

$\mathcal{L}\mathcal{R}\mathcal{S}^{CF}$ may amortize the gradients across each of the relation types between any pair of entity sets.

However, more fundamentally, each the above likelihoods in Equations (8)-(10) may assume that each suggested counterfactual link is well aligned to the factual set of links of each node, which may not hold if the set of task models are trained with very distinct training objectives, or if the task models learn fundamentally different views of the underlying node space owing to either inductive biases or the training objectives of the task models. In such a case, the counterfactual likelihood $\mathcal{L}^{CF}(\vec{e}_1,\vec{e}_2)$ (where $\mathcal{L}$ is $\mathcal{L}\mathcal{R}\mathcal{S}$, $\mathcal{L}\mathcal{P}\mathcal{R}$, or $\mathcal{L}\mathcal{R}\mathcal{A}$) may account for the biases introduced by the specific task model into the counterfactual links suggested by the specific task model. The counterfactual likelihood equation may hold even if the counterfactual links have specific relation types $r_{CF}$ associated with the counterfactual links. Non-limiting embodiments or aspects of the present disclosure may view this bias as a fundamental distributional shift on the latent node features (note that in the absence of node attributes, the latent node features only include the node embeddings learned by a base embedding model via Equation (5)). This view may be grounded in the notion of individualized treatment effect, wherein the effect of an intervention on a specific node is evaluated. For example, consider the base embeddings of entity set $E_i$ to be drawn from a factual distribution (that satisfies the factual likelihood $\mathcal{L}(\vec{e}_1,r_F,\vec{e}_2)$) in Equation (5) as defined according to the following Equation (11):

$$\vec{e}_1 \sim p^F(E_1^{r_F})$$
$$\vec{e}_2 \sim p^F(E_2^{r_F}) \tag{11}$$

Conversely, the node embeddings that satisfy the counterfactual links drawn from each task model $\mathcal{M}^j$, as described herein above, may induce a different distribution in the embedding space for the same nodes, $\vec{e}_1, \vec{e}_2$, depending on the objectives and inductive biases of model $\vec{e}_1$, as defined according to the following Equation (12):

$$\vec{e}_1 \sim p_j^{CF}(E_1^j)$$
$$\vec{e}_2 \sim p_j^{CF}(E_2^j) \tag{12}$$

The above mismatch may result in a clearly quantizable distributional difference in the factual and counterfactual embedding distributions for each task model $\mathcal{M}^j$ for each entity set $E$, which may be given by the following Equation (13):

$$\Delta_j(P^F(E),P_j^{CF}(E)) \tag{13}$$

As described in more detail herein below, non-limiting embodiments or aspects of the present disclosure may use this distributional difference via counterfactual residuals such that knowledge may be transferred between the node embeddings and the respective task models.

As described herein above, each version of a counterfactual likelihood may be prone to the distributional mismatch problem that is also described herein above, which may imply that updates that are obtained by optimizing any of the above three objectives, for example $\mathcal{LRA}^{CF}$, $\mathcal{LRA}^{CF}$, and $\mathcal{LRA}^{CF}$, may be likely to differ depending on the task model $\mathcal{M}^j$ that was used to create the counterfactual links. As a result, non-limiting embodiments or aspects of the present disclosure may learn the corresponding distributional differences and account for the learned differences when updating the underlying knowledge graph embeddings.

This learning of the corresponding distributional differences and accounting for the learned differences when updating the underlying knowledge graph embeddings may include a manifestation of a covariate shift, a special case of domain adaptation, and may be addressed via residual learning. Specifically, respective counterfactual link likelihoods may be defined according to the following Equation (14):

$$\mathcal{LPR}^{CF}_{(\tilde{e}_1, \tilde{e}_2)} = \text{argmax } \sigma\big((\tilde{e}_1 \otimes \vec{p}_1) \cdot (\tilde{e}_2 \otimes \vec{p}_2)\big) \tag{14}$$
$$r \,|\, R_r : E_1 \to E_2$$

Equation (14) may be viewed as transforming a domain-adapted or intervention-adapted variation of the node embedding instead of the direct node embedding. Under this consideration, the intervention adapted embeddings may be given according to the following Equation (15):

$$\vec{e}_1{}^j = \vec{e}_1 + \delta_{E_1}{}^j(\vec{e}_1)$$

$$\vec{e}_2{}^j = \vec{e}_2 + \delta_{E_2}{}^j(\vec{e}_2) \tag{15}$$

where the residual functions $\delta_{E_1}{}^j$, $\delta_{E_2}{}^j$ may be learned to optimize for the components of the underlying embeddings of each the entity sets $E_1{}^j$, $E_2{}^j$ that are best captured by the counterfactual links from model $\mathcal{M}^j$, and separation for the embedding dimensions that are inversely impacted by the model intervention is maximized. Note that the residual functions $\delta_E{}^j$ may be specific to each model $\mathcal{M}^j$ and the entity set $E$, because each entity set is impacted differently by the model intervention.

The $\mathcal{LPR}$ likelihood term $\mathcal{LPR}^{CF}_{(\vec{e}_1, \vec{e}_2)}$ as defined by Equation (9) may be viewed as optimizing the bias-adapted version of the focus node embeddings and the connections thereof. For example, $\mathcal{LPR}^{CF}_{(\vec{e}_1, \vec{e}_2)}$ may be optimized where $\vec{e}_1{}^j = \vec{e}_1 + \delta_{E_1}{}^j(\vec{e}_1)$ may be backpropagated instead of $\vec{e}_1$ and likewise for $\vec{e}_2$.

Accordingly, to learn the above residual function $\delta_E{}^j$, the embedding dimensions that are bias corrected to account for the intervention bias of model $\mathcal{M}^j$ may be learned. A single learnable neural network layer may be used for each residual function $\delta_E{}^j$. For example, the embedding dimensions that are bias corrected to account for the intervention bias of model $\mathcal{M}^j$ may be learned using a linear form of the single learnable neural network layer with tanh activation defined according to the following Equation (16).

$$\delta_{E_1}{}^j(\vec{e}_1) = \tan h(W_{E_1}{}^j \vec{e}_1 + b_{E_1}{}^j) \tag{16}$$

The above form of $\delta$ may be grounded in the notion of decreasing returns. The model interventions may be hypothesized to produce a scaled effect on the distributional characteristics of each node, which may be captured by the matrix $W^j$, and the tanh function may change the shape of the corresponding dimension discount (e.g., the scaling factor for each dimension may be a tanh shaped learnable receptive curve, etc.).

Non-limiting embodiments or aspects of the present disclosure may not make any assumptions about the underlying feature distributions of nodes in a knowledge graph. Given a set of node attributes, or in a case of structural embeddings, non-limiting embodiments or aspects of the present disclosure may learn the set of features that vary across the factual and counterfactual distributions with the task-specific and entity-type specific residual functions, $\delta_E{}^i$, in order to obtain the counterfactual views of each node embedding according to the following Equation (17):

$$\vec{e}_1{}^j = \vec{e}_1 + \delta_{E_1}{}^j(\vec{e}_1) \tag{17}$$

For example, residuals that reduce the discrepancy between the feature distributions (e.g., the node embeddings, etc.) across the factual and counterfactual domains may not bias to "unreliable" features of the node embeddings. As an example, if a recommendation model heavily favors high degree item nodes, the resulting residual function $\delta_{E_1}{}^j(\vec{e}_1)$ where $E_1$ is the item set, may attempt to completely eliminate this feature difference. As a result, the underlying item node embeddings $\vec{e}_1$ may not learn any informative covariates from the counterfactual links if the entire difference is explained by the residuals alone.

To reduce or prevent this degenerate solution, where the node embedding does not receive any informative task model updates, non-limiting embodiments or aspects of the present disclosure may leverage the notion of discrepancy distance. The discrepancy distance measure serves as a strong regularizer to prevent or reduce overfitting the learned residual to any specific node feature, much akin to discrepancy distance minimizers. As a result, components of the counterfactual distribution can partially flow to the base node embedding $e_1$.

Existing methods have shown how to derive generalization bounds with a well-defined empirical discrepancy distance for a limited hypothesis class of models. Non-limiting embodiments or aspects of the present disclosure, however, may not restrict the set of task models to any specific hypothesis class, but instead may propose a non-linear L1 norm on the residual value across each of the task models with a task and entity type specific weight factor $w_E{}^j$ defined according to the following Equation (18):

$$\text{disc}(\delta_{E_1}{}^j(e_1)) = \|\sigma(W_{E_1}{}^j \times \delta_{E_1}{}^j(e_1))\| \tag{18}$$

How the above components fit into an overall training strategy for graph-to-model and model-to-graph co-training, as well as model-to-model (via graph) cross-training, is now described herein below. For example, an overall training objective and procedures for simultaneous graph embedding updates and model training and transfer of knowledge from one model to a different model by updating the respective node embedding may now be described herein below.

Figure 8:
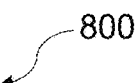
FIG. 8 is a flowchart of non-limiting embodiments or aspects of a process for model-to-graph knowledge transfer.
Figure 8:
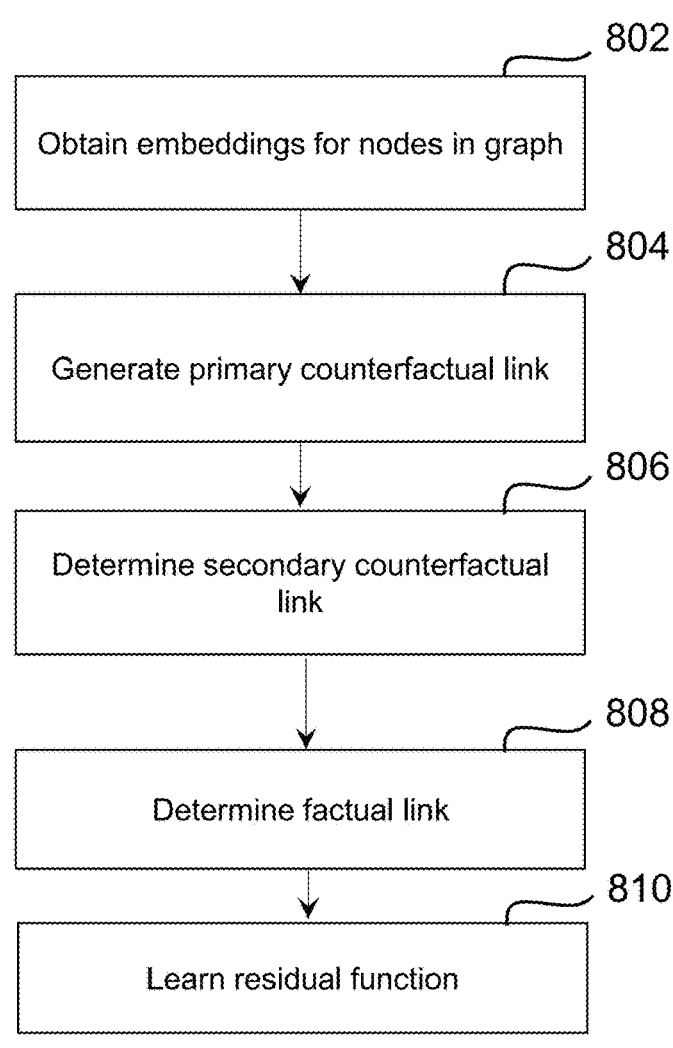

Referring now to FIG. 8, FIG. 8 is a flowchart of non-limiting embodiments or aspects of a process 800 for model-to-graph knowledge transfer. In some non-limiting embodiments or aspects, one or more of the steps of process 800 may be performed (e.g., completely, partially, etc.) by transaction service provider system 108 (e.g., one or more devices of transaction service provider system 108). In some non-limiting embodiments or aspects, one or more of the steps of process 800 may be performed (e.g., completely, partially, etc.) by another device or a group of devices separate from or including transaction service provider system 108, such as merchant system 102 (e.g., one or more devices of merchant system 102), payment gateway system 104 (e.g., one or more devices of payment gateway system 104), acquirer system 106 (e.g., one or more devices of acquirer system 106), transaction service provider system 108 (e.g., one or more devices of transaction service provider system 108, etc.), issuer system 110 (e.g., one or more devices of issuer system 110), and/or user device 112.

As shown in FIG. 8, at step 802, process 800 includes obtaining embeddings for a plurality of nodes in a graph including the plurality of nodes and a plurality of edges. For example, transaction service provider system 108 may obtain embeddings for the plurality of nodes in a graph including the plurality of nodes and a plurality of edges. The plurality of nodes may be associated with a plurality of entities, and the plurality of edges may be associated with a plurality of relationships between the plurality of entities.

As shown in FIG. 8, at step 804, process 800 includes, for each focus entity of a subset of focus entities, generating, using a machine learning model, at least one primary counterfactual link between that focus entity and at least one other entity. For example, for each focus entity of a subset of focus entities, transaction service provider system 108 may generate, using a machine learning model, at least one primary counterfactual link between that focus entity and at least one other entity. As an example, and as described herein previously, an objective of a bias-elimination residual may be to learn distributional differences in node embeddings across an original embedding space and a transformed embedding space of each focus entity $e_1 \in E_1^j$, which has a primary counterfactual link to $e_2 \in E_2^j$, which is the prediction output of model $\mathcal{M}^j$, and secondary counterfactual links to the neighbors of $e_2$, for example, $N_{e_2}$. In such an example, for a given randomly sampled subset of focus entities, $S_1 \subseteq E_1^j$, each of the possible primary and secondary counterfactual links for each focus entity $e_1 \in S_1$ may be generated using the model $\mathcal{M}^j$ as described herein above. This set of counterfactual links may be denoted as $(e_1, e_{CF})$ $\in CF^j(S_1)$.

As shown in FIG. 8, at step 806, process 800 includes, for each focus entity of the subset of focus entities, determining at least one secondary counterfactual link between that focus entity and at least one 1-hop node neighbor entity of the at least one other entity. For example, for each focus entity of the subset of focus entities, transaction service provider system 108 may determine at least one secondary counterfactual link between that focus entity and at least one 1-hop node neighbor entity of the at least one other entity. As an example, for a given randomly sampled subset of focus entities, $S_1 \subseteq E_1^j$, each of the possible primary and secondary counterfactual links for each focus entity $e_1 \in S_1$ may be generated using the model $\mathcal{M}^j$ as described herein above. This set of counterfactual links may be denoted as $(e_1, e_{CF})$ $\in CF^j(S_1)$.

As shown in FIG. 8, at step 808, process 800 includes, for each focus entity of the subset of focus entities, determining one or more factual links between that focus entity and one or more other entities. For example, for each focus entity of the subset of focus entities, transaction service provider system 108 may determine one or more factual links between that focus entity and one or more other entities. As an example, a set of factual links associated with the same subset of focus entities $S_1$ may be determined, which may be denoted as $(e_1, r, e_F) \in F(S_1)$. The factual links are specific to the focus entity set $E_1^j$, and the counterfactual links are specific to the task model subscript j and the focus entity set $E_1^j$.

As shown in FIG. 8, at step 810, process 800 includes learning a residual function by iteratively and alternatively optimizing a first objective function that depends on the one or more factual links and a second objective function that depends on the at least one primary counterfactual link and the at least one secondary counterfactual link. For example, transaction service provider system 108 may learn a residual function by iteratively and alternatively optimizing a first objective function that depends on the one or more factual links and a second objective function that depends on the at least one primary counterfactual link and the at least one secondary counterfactual link. As an example, alternatively optimizing the first objective function and the second objective function may alternately update embeddings of focus entities in the subset of focus entities, the residual function, and discrepancy distance measures of node embeddings across a factual domain and counterfactual domain.

The first objective function may be defined according to the following Equation (19):

$$\mathcal{L}_F = \sum_{(e_1, r, e_F) \in F(S_1)} sim\left(\left(\vec{e}_1^T \otimes (\vec{p}_1^r + s\mathbb{1})\right)\left(\vec{e}_F^T \otimes (\vec{p}_2^r + s\mathbb{1})\right)\right) \quad (19)$$

where $S_1$ is the subset of focus entities of a set of focus entities $E_1^j$ of a first entity type $E_1$ for a task j, where the task j is associated with the machine learning model, where $(e_1, r, e_F) \in F(S_1)$ is a set of each factual link for each focus entity of the subset of focus entities $S_1$, where each factual link $(e_1, r, e_F)$ is between a focus entity $e_1$ of the subset of focus entities $S_1$ and a tail entity $e_F$ of that focus entity $e_1$, where r is a relation type of each factual link $(e_1, r, e_F)$, where $\vec{e}_1^T$ is a transformed embedding of the focus entity $e_1$, where $\vec{e}_F^T$ is a transformed embedding of the tail entity $e_F$, where $\vec{p}_1^r$ is a projector of the focus entity $e_1$ for the relation type r, where $\vec{p}_2^r$ is a projector of the tail entity $e_F$ for the relation type r, and where $s\mathbb{1}$ is an identity-matrix scaling factor.

The second objective function may be defined according to the following Equation (20):

$$\mathcal{L}_{CF}^j = \sum_{(e_1, e_{CF}) \in CF^j(S_1)} \mathcal{LPR}_{\left(\vec{e}_1 + \delta_{E_1}^j(\vec{e}_1), \vec{e}_{CF} + \delta_{E_{CF}}^j(\vec{e}_{CF})\right) + d1 \times disc\left(\delta_{E_1}^j(\vec{e}_1)\right) + d2 \times disc\left(\delta_{E_1}^j(\vec{e}_i)\right)}^{CF} \quad (20)$$

where $(e_1, e_{CF}) \in CF^j(S_1)$ is a set of counterfactual links including each primary counterfactual link and each secondary counterfactual link for each focus entity of the subset of focus entities $S_1$, where each counterfactual link $(e_1, e_{CF})$ is between the focus entity $e_1$ and a counterfactual entity $e_{CF}$ of that focus entity, where $\vec{e}_1$ is an embedding of the focus entity $e_1$, where $\delta_{E_1}^j$ is the residual function for the task j and the first entity type $E_1$, where $\vec{e}_{CF}$ is an embedding of the counterfactual entity $e_{CF}$, where d1 is a head scaling parameter, where d2 is a tail scaling parameter, where disc is a discrepancy distance measure, and where $\vec{e}_i$ are embeddings of focus entities $e_i$ in a focus set $S_{E_i}$.

For example, in order to learn the distributional difference residual function $\delta_j$ across the counterfactual and factual link sets, non-limiting embodiments or aspects of the present disclosure may alternately optimize the two stochastic objective functions defined according to Equations (19) and (20) (the stochasticity emerges from the random selection of the focus entity subset, $S_1 \subseteq E_i^j$). Alternately optimizing Equation (19) and Equation (20) results in stochastic updates to the node embeddings $\vec{e}_1$ of entities in the focus set $S_{E_i}$, the residual functions $\delta_j$, and the discrepancy distance measures, scaled by head and tail parameters d1, d2.

It is noted that $E_{CF}$ may be any entity set, and $E_{CF}$ is not limited to the entity set $E_2^j$, because the 1-hop neighbors of $e_2$ are used in the counterfactual set. Although Equation (17) uses the Preferred-Relation (PR) Counterfactual Likelihood from Equation (16), non-limiting embodiments or aspects of the present disclosure are not limited thereto and may use the Relation-Agnostic (RA) version (Equation (8)) or the Relation-Sum (RS) version (Equation (10)).

Optimizing Equation (19) and Equation (20) as described herein above may provide for one direction of knowledge transfer (e.g., model-to-graph, etc.). However, non-limiting embodiments or aspects of the present disclosure may train node embeddings and task models bi-directionally if a task model is a model (e.g., a white box model, etc.) with a continuous differentiable objective function.

Note that each residual function may be applied additively to the node embeddings with the $\mathcal{LPR}^{CF}$ likelihood when updating the node embeddings and residual functions as described in Equation (20). However, in Equation (20), the model is held fixed (e.g., the backpropagation updates are only carried out to the node embeddings, etc.). The direction of information flow is from the task model to the node embeddings.

Conversely, if updating the task model $\mathcal{M}^j$, the gradients may flow from the node embeddings to the model rather than the reverse. To achieve this effect, non-limiting embodiments or aspects of the present disclosure may apply the same residual transformations to the node embeddings of factual links that are present in the graph (instead of the counterfactual links), and add the transformations as a soft-alignment criterion to the model optimization objective.

Figure 9:
FIG. 9 is a flowchart of non-limiting embodiments or aspects of a process for graph-to-model knowledge transfer.
Figure 9:
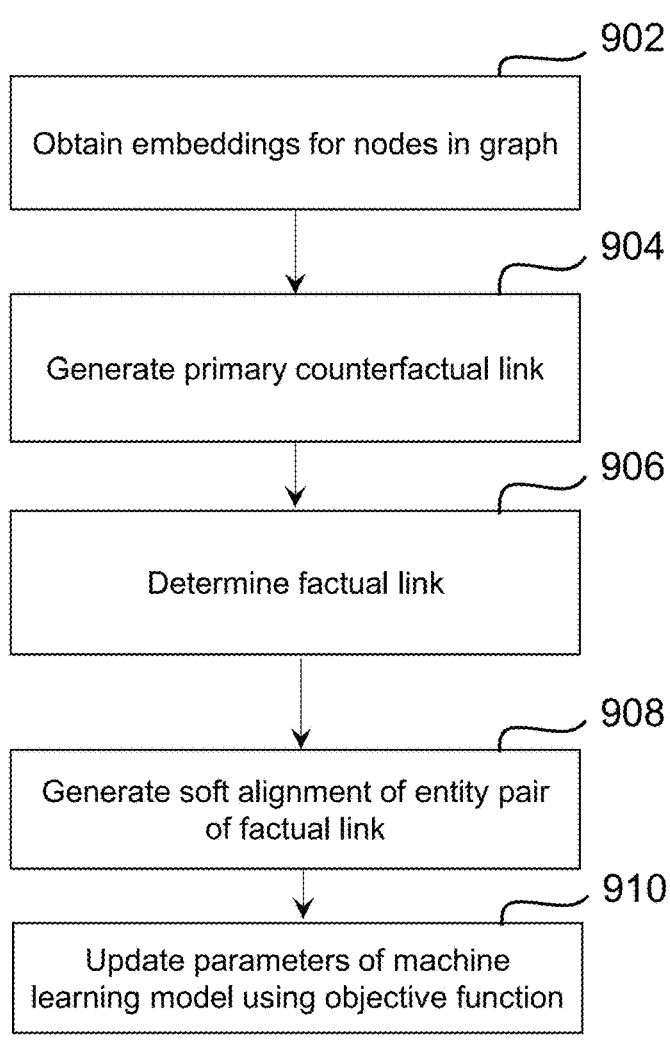

Referring now to FIG. 9, FIG. 9 is a flowchart of non-limiting embodiments or aspects of a process 900 for graph-to-model knowledge transfer. In some non-limiting embodiments or aspects, one or more of the steps of process 900 may be performed (e.g., completely, partially, etc.) by transaction service provider system 108 (e.g., one or more devices of transaction service provider system 108). In some non-limiting embodiments or aspects, one or more of the steps of process 900 may be performed (e.g., completely, partially, etc.) by another device or a group of devices separate from or including transaction service provider system 108, such as merchant system 102, (e.g., one or more devices of merchant system 102), payment gateway system 104 (e.g., one or more devices of payment gateway system 104), acquirer system 106 (e.g., one or more devices of acquirer system 106), transaction service provider system 108 (e.g., one or more devices of transaction service provider system 108, etc.), issuer system 110 (e.g., one or more devices of issuer system 110), and/or user device 112.

As shown in FIG. 9, at step 902, process 900 includes obtaining embeddings for a plurality of nodes in a graph including the plurality of nodes and a plurality of edges. For example, transaction service provider system 108 may obtain embeddings for a plurality of nodes in a graph including the plurality of nodes and a plurality of edges. The plurality of nodes may be associated with a plurality of entities, and the plurality of edges may be associated with a plurality of relationships between the plurality of entities.

As shown in FIG. 9, at step 904, process 900 includes, for each focus entity of a subset of focus entities, generating, using a machine learning model, at least one primary counterfactual link between that focus entity and at least one other entity. For example, for each focus entity of a subset of focus entities, transaction service provider system 108 may generate, using a machine learning model, at least one primary counterfactual link between that focus entity and at least one other entity. As an example, and as described herein previously, each focus entity $e_1 \in E_1^j$ may have a primary counterfactual link to $e_2 \in E_2^j$, which is the prediction output of model $\mathcal{M}^j$. In such an example, for a given randomly sampled subset of focus entities, $S_1 \subseteq E_1^j$, each of the possible primary counterfactual links for each focus entity $e_1 \in S_1$ may be generated using the model $\mathcal{M}^j$ as described herein above. This set of counterfactual links may be denoted as $(e_1, e_{CF}) \in CF^j(S_1)$.

As$_1$ shown in FIG. 9, at step 906, process 900 includes, for each focus entity of the subset of focus entities, determining one or more factual links between that focus entity and one or more other entities. For example, for each focus entity of the subset of focus entities, transaction service provider system 108 may determine one or more factual links between that focus entity and one or more other entities. As an example, a set of factual links of focus entities $S_1 \subseteq E_1^j$, for example $F(S_1)$, may be created as described herein above.

As shown in FIG. 9, at step 908, process 900 includes, for each focus entity of the subset of focus entities, generating a soft alignment of an entity pair of the one or more factual links. For example, for each focus entity of the subset of focus entities, transaction service provider system 108 may generate a soft alignment of an entity pair of the one or more factual links.

A soft alignment of an entity pair (e.g., soft alignments $SA^j(e_1, e_F)$ for the entity pairs in each link $\Sigma(e_1, r, e_F) \in F(S_1)$, etc.) may be generated according to the following Equation (21):

$$SA^j(e_1, e_F) = \mathcal{L}(\vec{e}_1 + \delta_{E_1}^j(\vec{e}_1), e_{CF} + \delta_{E_{CF}}^j(\vec{e}_{CF})) \qquad (21)$$

where $(e_1, e_F)$ is the entity pair of the one or more factual links between a focus entity $e_1$ of a subset of focus entities $S_1$ of a set of focus entities $E_1^j$ of a first entity type $E_1$ for a task j and a factual entity $e_F$ of that focus entity, where the task j is associated with the machine learning model, where $\vec{e}_1$ is an embedding of the focus entity $e_1$, where $\delta_{E_1}^j$ is a residual function for the task j and the first entity type $E_1$, where $\vec{e}_{CF}$ is an embedding of a counterfactual entity $e_{CF}$ of a counterfactual link between the focus entity $e_1$ and the counterfactual entity $e_{CF}$, where $\delta_{E_{CF}}^j$ is a residual function for the task j and an entity type of the counterfactual entity $e_{CF}$, and where $\mathcal{L}$ may be a factual likelihood defined according to Equation (5). For example, $\mathcal{L}(\vec{e}_1, r, \vec{e}_2) = sim((\vec{e}_1^T \otimes (\vec{p}_1^r + s\mathbb{I}))(\vec{e}_F^T \otimes (\vec{p}_2^r + s\mathbb{I}))$, where $\vec{e}_1^T$ is a transformed embedding of the focus entity $e_1$, where $\vec{e}_F^T$ is a transformed embedding of factual entity $e_F$, where $\vec{p}_1^r$ is a projector of the focus entity $e_1$ for the relation type r, where $\vec{p}_2^r$ is a projector of the factual entity $e_F$ for the relation type r, and where $s\mathbb{I}$ is an identity-matrix scaling factor.

As shown in FIG. 9, at step 910, process 900 includes updating one or more parameters of the machine learning model using an objective function that depends on the at least one primary counterfactual link and the soft alignment of the entity pair of the one or more factual links for each focus entity. For example, transaction service provider system 108 may update one or more parameters of the machine learning model using an objective function that depends on the at least one primary counterfactual link and the soft alignment of the entity pair of the one or more factual links for each focus entity. As an example, transaction service provider system 108 may update one or more parameters of the machine learning model using an objective function as defined in the following Equation (22):

$$\tilde{O}^j = O^j + \lambda^j \sum_{(e_1, r, e_F) \in F(S_1)} \left( SA^j(e_1, e_F) - M^j(e_1, e_F) \right) \qquad (22)$$

where $O^j$ is a differentiable objective function of the machine learning model $\mathcal{M}^j$, where $\lambda^i$ is a strength parameter that sets a strength of a regularization applied to the machine learning model $\mathcal{M}^j$, where $\mathcal{M}^j(e_1, e_F)$ is a predicted output of the machine learning model $\mathcal{M}^j$ for an input including the focus entity $e_1$ of the entity pair of the one or more factual links between the focus entity $e_1$ and the factual entity $e_F$ of that focus entity, where $SA^j(e_1, e_F)$ is the soft alignment of the entity pair of the one or more factual links between the focus entity $e_1$ and the factual entity $e_F$ of that focus entity.

For example, a white-box model $\mathcal{M}^j$ may have a differentiable objective function $O^j$, as a function of the predicted outputs of the white-box model $\mathcal{M}^j$ (e.g., the primary counterfactual links, etc.), and a term may be added to the differentiable objective function $O^j$ as defined according to Equation (19). Here, the $\mathcal{M}^j(e_1, e_F)$ term is overloaded to indicate how the model measures the proximities of the input and output entities of the model. Note that the second term here makes the model align its own proximities to what is suggested using the residual functions and node embeddings. The parameter $\lambda^j$ determines the strength of the regularization applied to the model. Residual discrepancies may not be needed with respect to Equation (19), because the residual parameters are not being updated. For example, only the model parameters of task model $\mathcal{M}^j$ may be updated.

Figure 12:
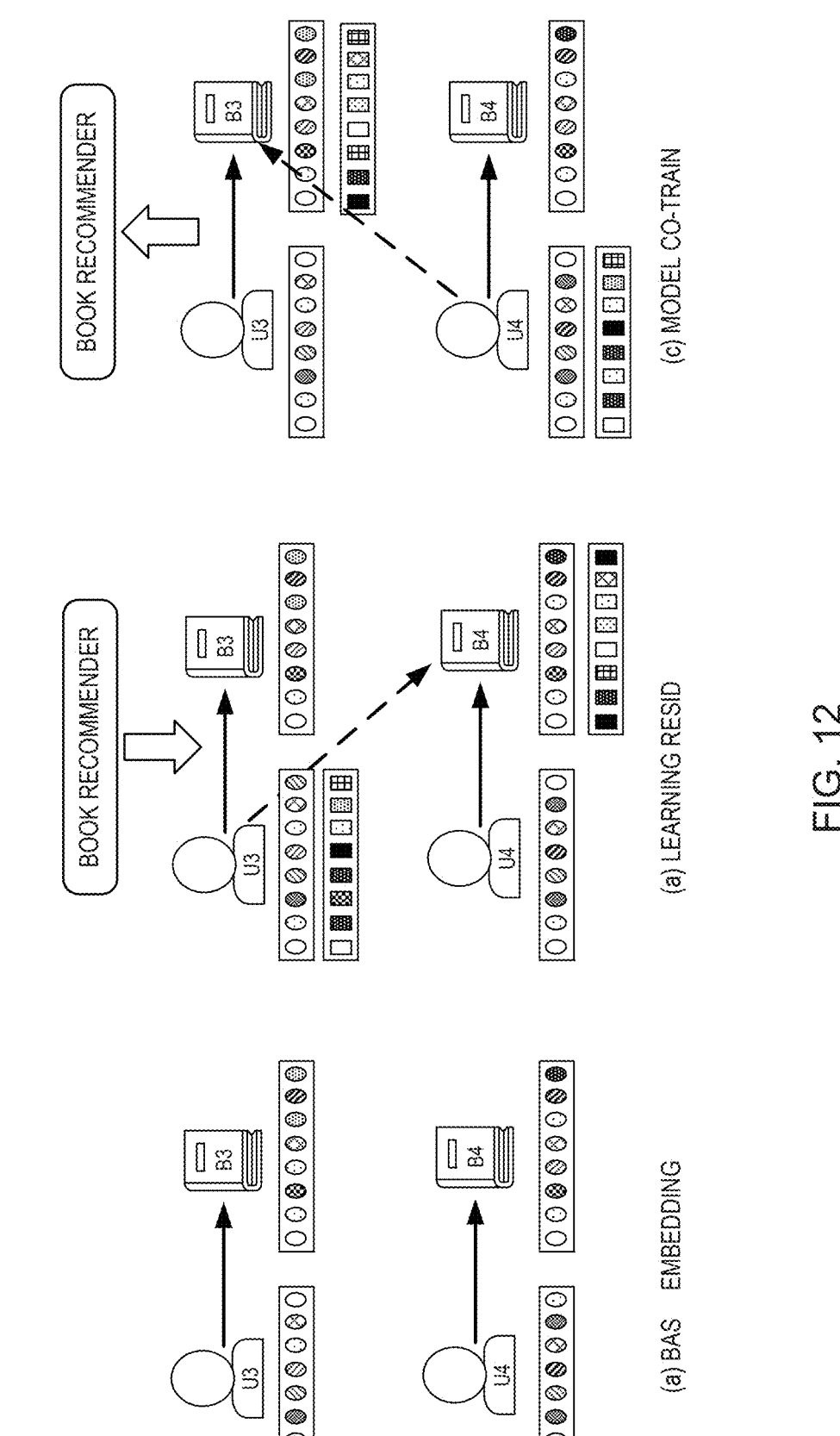
FIG. 12 illustrates examples of basic embeddings, a learning residual, and model-co-training.

As an example, and referring also to FIG. 12, which illustrates examples 1200 of (a) basic embeddings, (b) a learning residual, and (c) model-co-training, node embeddings may be learned using Equation (5) for factual links, a task model (e.g., a book recommender model that provides recommendations of books for users as described herein, etc.) may be used to infer counterfactual edges and train residuals using Equation (15), and the task model may be improved using the residuals in Equation (22).

Figure 10:
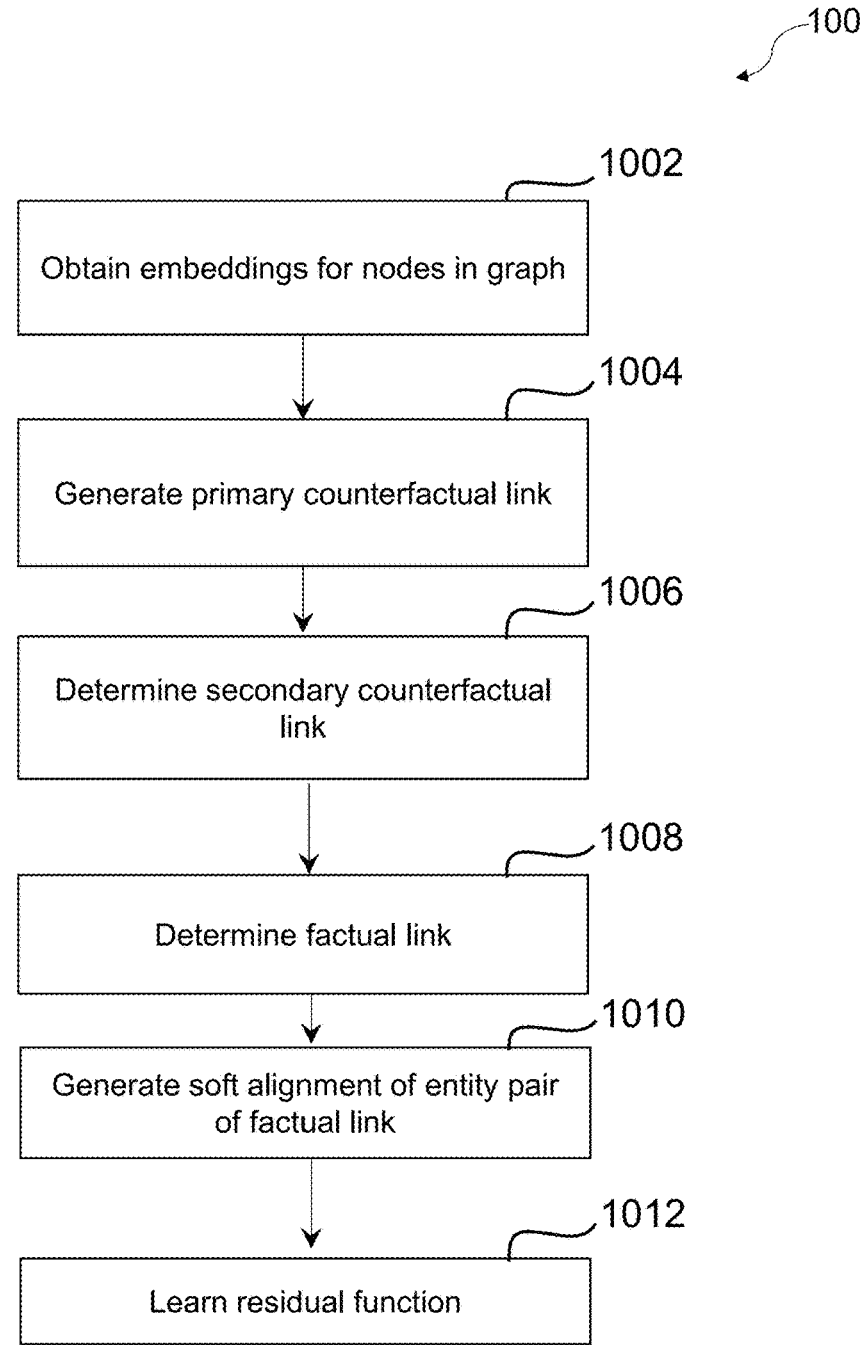
FIG. 10 is a flowchart of non-limiting embodiments or aspects of a process for graph and model co-training.

Referring now to FIG. 10, FIG. 10 is a flowchart of non-limiting embodiments or aspects of a process 1000 for graph and model co-training. In some non-limiting embodiments or aspects, one or more of the steps of process 1000 may be performed (e.g., completely, partially, etc.) by transaction service provider system 108 (e.g., one or more devices of transaction service provider system 108). In some non-limiting embodiments or aspects, one or more of the steps of process 1000 may be performed (e.g., completely, partially, etc.) by another device or a group of devices separate from or including transaction service provider system 108, such as merchant system 102, (e.g., one or more devices of merchant system 102), payment gateway system

104 (e.g., one or more devices of payment gateway system 104), acquirer system 106 (e.g., one or more devices of acquirer system 106), transaction service provider system 108 (e.g., one or more devices of transaction service provider system 108, etc.), issuer system 110 (e.g., one or more devices of issuer system 110), and/or user device 112.

As shown in FIG. 10, at step 1002, process 1000 includes obtaining embeddings for a plurality of nodes in a graph including the plurality of nodes and a plurality of edges. For example, transaction service provider system 108 may obtain embeddings for a plurality of nodes in a graph including the plurality of nodes and a plurality of edges. The plurality of nodes may be associated with a plurality of entities, and the plurality of edges may be associated with a plurality of relationships between the plurality of entities.

As shown in FIG. 10, at step 1004, process 1000 includes, for each focus entity of a subset of focus entities, generating, using a machine learning model, at least one primary counterfactual link between that focus entity and at least one other entity. For example, for each focus entity of a subset of focus entities, transaction service provider system 108 may generate, using a machine learning model, at least one primary counterfactual link between that focus entity and at least one other entity. As an example, and as described herein previously, an objective of a bias-elimination residual may be to learn distributional differences in node embeddings across an original embedding space and a transformed embedding space of each focus entity $e_1 \in E_1^j$, which has a primary counterfactual link to $e_2 \in E_2^j$, which is the prediction output of model $\mathcal{M}^j$, and secondary counterfactual links to the neighbors of $e_2$, for example $N_{e2}$. In such an example, for a given randomly sampled subset of focus entities, $S_1 \subseteq E_1^j$, each of the possible primary and secondary counterfactual links for each focus entity $e_1 \in S_1$ may be generated using the model $\mathcal{M}^j$ as described herein above. This set of counterfactual links may be denoted as $(e_1, e_{CF}) \in CF^j(S_1)$.

As shown in FIG. 10, at step 1006, process 1000 includes, for each focus entity of the subset of focus entities, determining at least one secondary counterfactual link between that focus entity and at least one 1-hop node neighbor entity of the at least one other entity. For example, for each focus entity of the subset of focus entities, transaction service provider system 108 may determine at least one secondary counterfactual link between that focus entity and at least one 1-hop node neighbor entity of the at least one other entity. As an example, for a given randomly sampled subset of focus entities, $S_1 \subseteq E_1^j$, each of the possible primary and secondary counterfactual links for each focus entity $e_1 \in S_1$ may be generated using the model $\mathcal{M}^j$ as described herein above. This set of counterfactual links may be denoted as $(e_1, e_{CF}) \in CF^j(S_1)$.

As shown in FIG. 10, at step 1008, process 1000 includes, for each focus entity of the subset of focus entities, determining one or more factual links between that focus entity and one or more other entities. For example, for each focus entity of the subset of focus entities, transaction service provider system 108 may determine one or more factual links between that focus entity and one or more other entities. As an example, a set of factual links associated with the same subset of focus entities $S_1$ may be determined, which may be denoted as $(e_1, r, e_F) \in F(S_1)$. The factual links are specific to the focus entity set $E_1^j$, and the counterfactual links are specific to the task model subscript j and the focus entity set $E_1^j$.

As shown in FIG. 10, at step 1010, process 1000 includes, for each focus entity of the subset of focus entities, generating a soft alignment of an entity pair of the one or more factual links. For example, for each focus entity of the subset of focus entities, transaction service provider system 108 may generate a soft alignment of an entity pair of the one or more factual links. As an example, a soft alignment of an entity pair (e.g., soft alignments $SA^j(e_1, e_F)$ for the entity pairs in each link $\Sigma(e_1, r, e_F) \in F(S_1)$, etc.) may be generated according to Equation (21) as described herein.

As shown in FIG. 10, at step 1012, process 1000 includes learning a residual function by iteratively and alternatively optimizing a first objective function that depends on the one or more factual links, a second objective function that depends on the at least one primary counterfactual link and the at least one secondary counterfactual link, and a third objective function that depends on the at least one primary counterfactual link and the soft alignment of the entity pair of the one or more factual links. For example, transaction service provider system 108 may learn a residual function by iteratively and alternatively optimizing a first objective function that depends on the one or more factual links, a second objective function that depends on the at least one primary counterfactual link and the at least one secondary counterfactual link, and a third objective function that depends on the at least one primary counterfactual link and the soft alignment of the entity pair of the one or more factual links. As an example, alternatively optimizing the first objective function, the second objective function, and the third objective function may alternately update embeddings of focus entities in the set of focus entities, the residual function, discrepancy distance measures of node embeddings across a factual domain and a counterfactual domain, and one or more parameters of the machine learning model.

In such an example, the first objective function may be defined according to Equation (19), the second objective function may be defined according to Equation (20), and the third objective function may be defined according to Equation (22). For example, an overall hybrid update model may also be permitted where the model parameters and the node and residual functions may be simultaneously changed by iteratively and alternatingly optimizing each of the three objective functions at the same time, for example: Equation (19), Equation (20), and Equation (22).

Figure 11A:
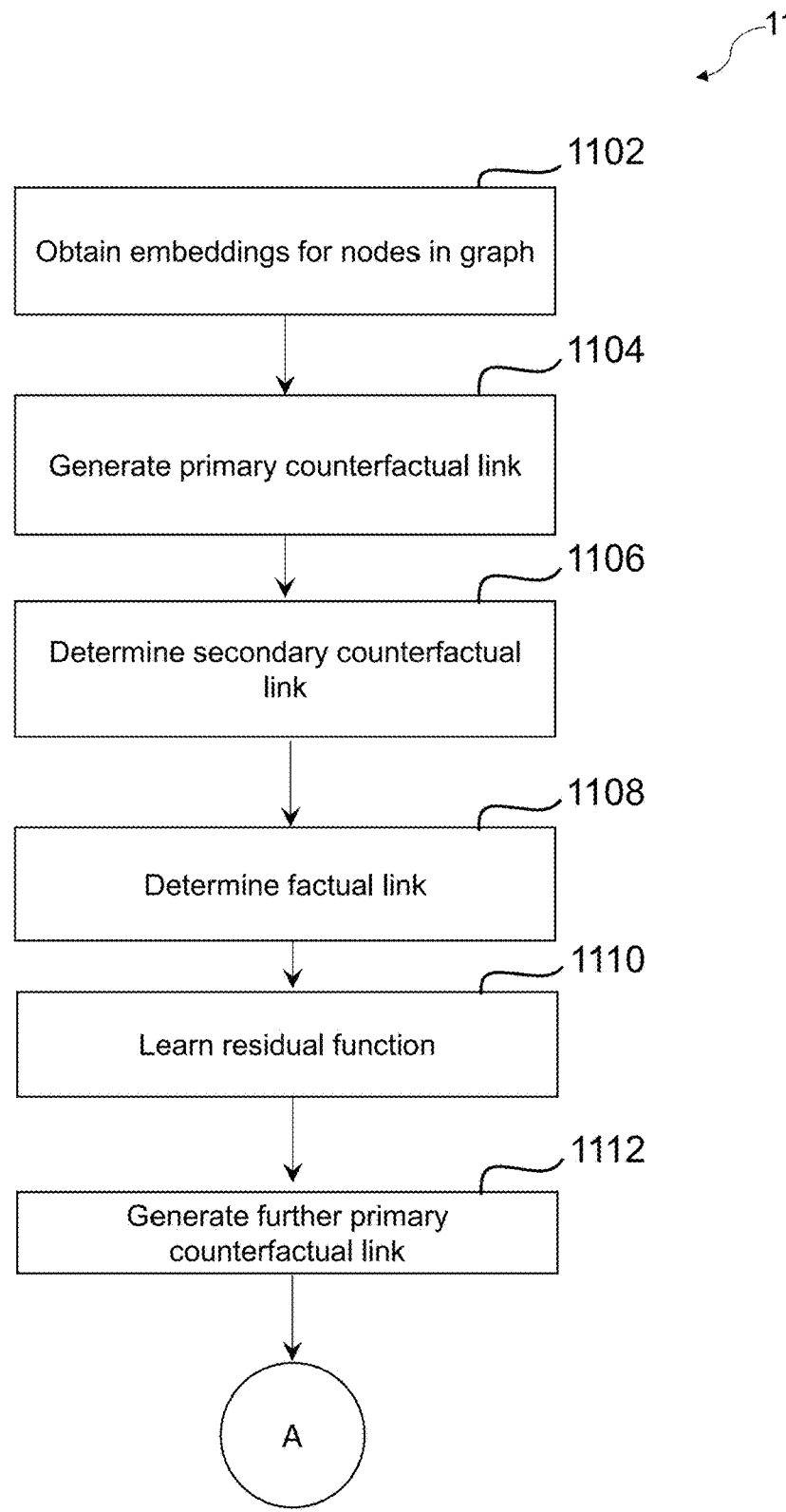
FIGS. 11A and 11B are flowcharts of non-limiting embodiments or aspects of a process for model-to-model cross training.
Figure 11B:
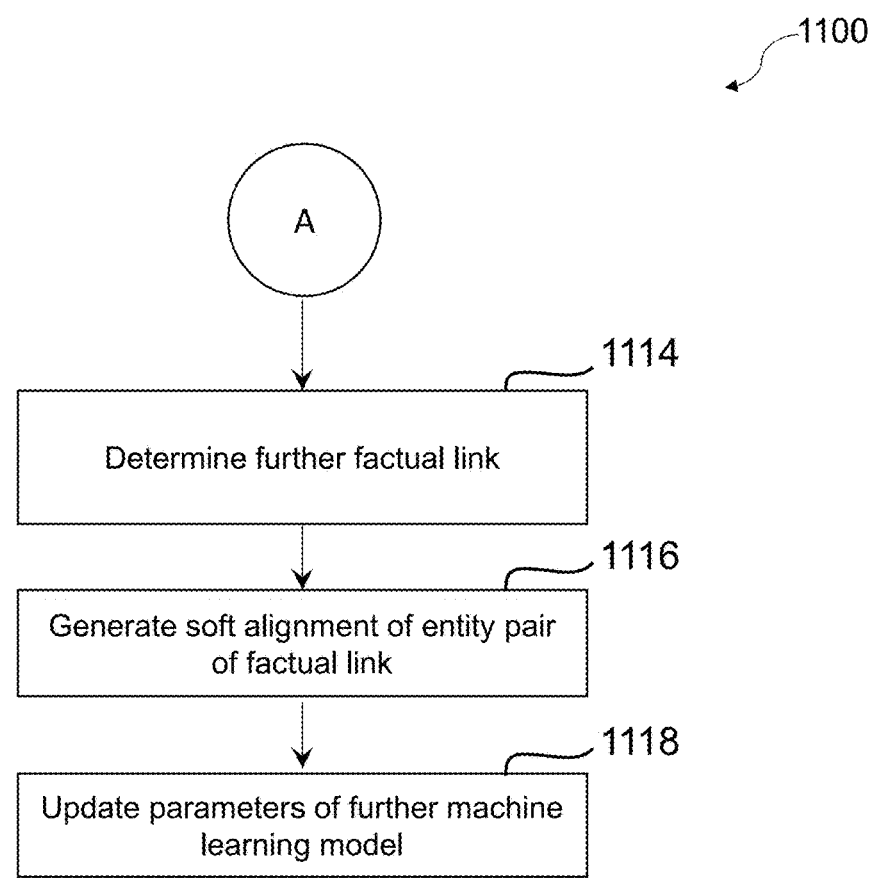

Referring now to FIGS. 11A and 11B, FIGS. 11A and 11B are flowcharts of non-limiting embodiments or aspects of a process 1100 for model-to-model cross training. In some non-limiting embodiments or aspects, one or more of the steps of process 1100 may be performed (e.g., completely, partially, etc.) by transaction service provider system 108 (e.g., one or more devices of transaction service provider system 108). In some non-limiting embodiments or aspects, one or more of the steps of process 1100 may be performed (e.g., completely, partially, etc.) by another device or a group of devices separate from or including transaction service provider system 108, such as merchant system 102, (e.g., one or more devices of merchant system 102), payment gateway system 104 (e.g., one or more devices of payment gateway system 104), acquirer system 106 (e.g., one or more devices of acquirer system 106), transaction service provider system 108 (e.g., one or more devices of transaction service provider system 108, etc.), issuer system 110 (e.g., one or more devices of issuer system 110), and/or user device 112.

As shown in FIG. 11A, at step 1102, process 1100 includes obtaining embeddings for a plurality of nodes in a graph including the plurality of nodes and a plurality of edges. For example, transaction service provider system 108 may obtain embeddings for a plurality of nodes in a graph including the plurality of nodes and a plurality of edges. As an example, the plurality of nodes may be associated with a plurality of entities, and the plurality of edges may be associated with a plurality of relationships between the plurality of entities. In such an example, the embeddings for the plurality of nodes (e.g., a first cut set of node embeddings, etc.) may be learned by leveraging factual links in the graph for each entity in the graph and optimizing for the likelihood given by Equation (5).

Non-limiting embodiments or aspects of the present disclosure may provide model-to-model cross-training of a (first) machine learning model $M^{j1}$ and a further or second machine learning model $M^{j2}$ different than the first machine learning model $M^{j1}$. For example, consider the following directionality of model-to-model cross-training: $M^{j1} \rightarrow M^{j2}$. For cross-training the two models $M^{j1}$, $M^{j2}$, the condition $\{E_1^{j1}, E_2^{j1}\} \cap \{E_1^{j2}, E_2^{j2}\} \neq \Phi$ is held. Note that this condition simply states that at least one of the entity sets whose node embeddings are updated by the counterfactual likelihoods in Equation (20) is present across each of the models. For example, a model-to-model cross-training scenario may be explained herein below with a sample scenario where $E_2^{j1} = E_1^{j2}$.

As shown in FIG. 11A, at step 1104, process 1100 includes, for each focus entity of a subset of focus entities, generating, using a machine learning model, at least one primary counterfactual link between that focus entity and at least one other entity. For example, for each focus entity of a subset of focus entities, transaction service provider system 108 may generate, using a machine learning model, at least one primary counterfactual link between that focus entity and at least one other entity. As an example, and as described herein previously, an objective of a bias-elimination residual may be to learn distributional differences in node embeddings across an original embedding space and a transformed embedding space of each focus entity $e_1 \in E_1^{j1}$, which has a primary counterfactual link to $e_2 \in E_2^{j1}$, which is the prediction output of model $\mathcal{M}^j$, and secondary counterfactual links to the neighbors of $e_2$, for example, $N_{e2}$. In such an example, for a given randomly sampled subset of focus entities, $S_1 \subseteq E_1^{j1}$, each of the possible primary and secondary counterfactual links for each focus entity $e_1 \in S_1$ may be generated using the model $\mathcal{M}^j$ as described herein above. This set of counterfactual links may be denoted as $(e_1, e_{CF}) \in CF^{j1}(S_1)$.

As shown in FIG. 11A, at step 1106, process 1100 includes, for each focus entity of the subset of focus entities, determining at least one secondary counterfactual link between that focus entity and at least one 1-hop node neighbor entity of the at least one other entity. For example, for each focus entity of the subset of focus entities, transaction service provider system 108 may determine at least one secondary counterfactual link between that focus entity and at least one 1-hop node neighbor entity of the at least one other entity. As an example, for a given randomly sampled subset of focus entities, $S_1 \subseteq E_1^{j1}$, each of the possible primary and secondary counterfactual links for each focus entity $e_1 \in S_1$ may be generated using the model $\mathcal{M}^j$ as described herein above. This set of counterfactual links may be denoted as $(e_1, e_{CF}) \in CF^{j1}(S_1)$.

As shown in FIG. 11A, at step 1108, process 1100 includes, for each focus entity of the subset of focus entities, determining one or more factual links between that focus entity and one or more other entities. For example, for each focus entity of the subset of focus entities, transaction service provider system 108 may determine one or more factual links between that focus entity and one or more other entities. As an example, a set of factual links associated with the same subset of focus entities $S_1$ may be determined, which may be denoted as $(e_1,r,e_F) \in F(S_1)$. The factual links are specific to the focus entity set $E_1^{j1}$, and the counterfactual links are specific to the task model subscript j1 and the focus entity set $E_1^{j1}$.

As shown in FIG. 11A, at step 1110, process 1100 includes learning a residual function by iteratively and alternatively optimizing a first objective function that depends on the one or more factual links and a second objective function that depends on the at least one primary counterfactual link and the at least one secondary counterfactual link, and, for each at least one other entity generated for each focus entity using the machine learning model, that at least one other entity being connected to one 1-hop node neighbor entity of that focus entity to update the node embeddings of those entities while holding the residual function constant. For example, transaction service provider system 108 may learn a residual function by iteratively and alternatively optimizing a first objective function that depends on the one or more factual links and a second objective function that depends on the at least one primary counterfactual link and the at least one secondary counterfactual link. As an example, for each at least one other entity generated for each focus entity using the machine learning model, transaction service provider system 108 may connect that at least one other entity to one 1-hop node neighbor entity of that focus entity to update the node embeddings of those entities while holding the residual function constant. In such an example, transaction service provider system 108 may select the first model $\mathcal{M}^{j1}$ in the above sequence and learn the counterfactual residuals by alternating optimization with the likelihoods in Equation (19) and Equation (20) and, in each prediction with a focus entity, e.g., $e_1 \in E_1^{j1}$, connect the predicted output entity of $\mathcal{M}^{j1}$, say $e_2 \in E_2^{j2}$, to each of the 1-hop neighbors of $e_1$, and use $e_2 \in E_2^{j2}$ to update the node embeddings while holding the residual functions learned above as constant.

As shown in FIG. 11A, at step 1112, process 1100 includes, for each focus entity of the subset of focus entities, generating, using a further machine learning model different than the machine learning model, at least one further primary counterfactual link between that focus entity and at least one further entity. For example, for each focus entity of the subset of focus entities, transaction service provider system 108 may generate, using a further machine learning model different than the machine learning model, at least one further primary counterfactual link between that focus entity and at least one further entity. As an example, an objective of a bias-elimination residual may be to learn distributional differences in node embeddings across an original embedding space and a transformed embedding space of each focus entity $e_1 \in E_1^{j2}$, which has a primary counterfactual link to $e_2 \in E_2^{j2}$ which is the prediction output of the further machine learning model $\mathcal{M}^{j2}$ different than the machine learning model $\mathcal{M}^{j1}$, and secondary counterfactual links to the neighbors of $e_2$, for example $N_{e2}$. In such an example, for a given randomly sampled subset of focus entities, $S_1 \subseteq E_1^{j2}$, each of the possible further primary and secondary counterfactual links for each focus entity $e_1 \in S_1$ may be generated using the further model $\mathcal{M}^{j2}$ as described herein above. This set of further counterfactual links may be denoted as $(e_1,e_{CFF}) \in CF^{j2}(S_1)$.

As shown in FIG. 11B, at step 1114, process 1100 includes, for each focus entity of the subset of focus entities, determining one or more further factual links between that focus entity and one or more further entities. For example, for each focus entity of the subset of focus entities, transaction service provider system 108 may determine one or more further factual links between that focus entity and one or more further entities. As an example, a set of further factual links associated with the same subset of focus entities $S_1$ may be determined, which may be denoted as $(e_1,r,e_{FF}) \in F(S_1)$. The factual links are specific to the focus entity set $E_1^{j2}$, and the counterfactual links are specific to the task model subscript j2 and the focus entity set $E_1^{j2}$.

As shown in FIG. 11B, at step 1116, process 1100 includes, for each focus entity of the subset of focus entities, generating a soft alignment of an entity pair of the one or more further factual links. For example, for each focus entity of the subset of focus entities, transaction service provider system 108 may generate a soft alignment of an entity pair of the one or more further factual links. As an example, a soft alignment of an entity pair (e.g., soft alignments $SA^{j2}(e_1, e_{FF})$ for the entity pairs in each link $\Sigma(e_1,r,e_{FF}) \in F(S_1)$, etc.) may be generated according to Equation (21) as described herein, which is rewritten below with notations for the further or second machine learning model $M^{j2}$ as Equation (23):

$$SA^{j2}(e_1,e_F)= \mathcal{L}_{(\vec{e}_1+\delta_{E_1}^{j2}(\vec{e}_1),e_{CFF}+\delta_{E_{CF}}^{j2}(\vec{e}_{CFF}))} \tag{23}$$

where $(e_1,e_{FF})$ is the entity pair of the one or more further factual links between the focus entity $e_1$ and a further factual entity $e_{FF}$ of that focus entity, where a task j2 is associated with the further machine learning model, where $\vec{e}_1$ is an embedding of the focus entity $e_1$, where $\delta_{E_1}^{j2}$ is a residual function for the task j2 and the first entity type $E_1$, where $\vec{e}_{CFF}$ is an embedding of a further counterfactual entity $e_{CFF}$ of a further counterfactual link between the focus entity $e_1$ and the further counterfactual entity $e_{CF}$, where $\delta_{E_{CFF}}^{j2}$ is a residual function for the task j2 and an entity type of the further counterfactual entity $e_{CFF}$, and where $\mathcal{L}$ may be a factual likelihood defined according to Equation (5) with notations for the further or second machine learning model $M^{j2}$ as Equation (24):

$$\mathcal{L}_{(\vec{e}_1,r,\vec{e}_2)}=sim((\vec{e}_1^T \otimes (\vec{p}_1^r+s\ \mathbb{I}))(\vec{e}_{FF}^T \otimes$$
$$(\vec{p}_2^r+s\ \mathbb{I})) \tag{24}$$

where $\vec{e}_1^T$ is a transformed embedding of the focus entity $e_1$, where $\vec{e}_{FF}^T$ is a transformed embedding of the further factual entity $e_{FF}$, where $\vec{p}_1^r$ is a projector of the focus entity $e_1$ for the relation type r, where $\vec{p}_2^r$ is a projector of the further factual entity $e_{FF}$ for the relation type r, and where s $\mathbb{I}$ is an identity-matrix scaling factor.

As shown in FIG. 11B, at step 1118, process 1100 includes updating one or more parameters of the further machine learning model using a further objective function that depends on the at least one further primary counterfactual link and the soft alignment of the entity pair of the one or more further factual links. For example, transaction service provider system 108 may update one or more parameters of the further machine learning model using a further objective function that depends on the at least one further primary counterfactual link and the soft alignment of the entity pair of the one or more further factual links. In such an example, the further objective function may be defined according to Equation (22), which is rewritten below with notations for the further or second machine learning model $\mathcal{M}^{j2}$ as Equation (25):

$$\hat{O}^{j2} = O^{j2} + \lambda^{j2} \sum_{(e_1, r, e_{FF}) \in F(S_1)} \left( SA^{j2}(e_1, e_{FF}) - M^{j2}(e_1, e_{FF}) \right) \quad (25)$$

where $O^{j2}$ is a differentiable objective function of the further machine learning model $M^{j2}$, where $\lambda^{j2}$ is a strength parameter that sets a strength of a regularization applied to the further machine learning model $M^{j2}$, where $M^{j2}(e_1, e_{FF})$ is a predicted output of the further machine learning model $M^{j2}$ for an input including the focus entity $e_1$ of the entity pair of the one or more factual links between the focus entity $e_1$ and the further factual entity $e_F$ of that focus entity, where $SA^j(e_1, e_{FF})$ is the soft alignment of the entity pair of the one or more further factual links between the focus entity $e_1$ and the further factual entity $e_{FF}$ of that focus entity. For example, with the node embeddings updated by $M^{j1}$, transaction service provider system 108 may perform the graph-to-model transfer as described herein with respect to process 900 in FIG. 9 to improve the performance of $M^{j2}$.

It is noted that non-limiting embodiments or aspects of the present disclosure may provide an overall framework that is not theoretically exchangeable because the order in which the models are cross-trained with the knowledge graph influences the final results. This non-exchangeability may be a fundamental limitation of the causal interpretation of node embeddings and counterfactual updates because a directionality of cause to effect is assigned. This limitation also applies to the order in which models are co-trained and updated with the knowledge graph.

Experimental Results

Example experimental analyses on diverse multi-domain datasets are now discussed, in which the experimental results on two public datasets show that non-limiting embodiments or aspects of the present disclosure may effectively integrate task models with knowledge graph embedding and permit for model-to-graph knowledge transfer, graph-to-model knowledge transfer, and model-to-model via graph knowledge transfer. First, counterfactual enrichment with effective task models is shown to significantly improve the quality of node embeddings for modalities with sparse connections by evaluating the updated embeddings on the held-out link completion task. Next, co-training a context-aware neural recommendation model with the knowledge graph is shown to lead to simultaneous embedding updates and better model performance for nodes with lower degrees (although a small degradation in the performance for high-degree nodes may be noticed). Additionally, the above context-aware neural recommendation model is shown to be significantly improved by leveraging a distributed word embedding model using an implementation of non-limiting embodiments or aspects of the above-described model-to-model cross-training method. A scalability analysis against publicly available baseline implementations is also provided.

In a Google Local Reviews Dataset, users rate businesses on a 0-5 scale with temporal, spatial, and textual context available for each review. This dataset is filtered with a criteria of at least 10 users per business and 5 businesses per user recursively, and to eliminate each review with less than a 3-star rating. The resulting dataset has 38,614 users and 26,922 businesses, and the following contextual node types are obtained: Review Words, Business Name Words, Categories of the Business, Price, Location nodes (e.g., states, cities, etc.), and Temporal or time (e.g., binned into 6-hour chunks, month, day, etc.).

A knowledge graph is created by connecting each of the users to the businesses that the user rated, the name and review words of the businesses to each business, the review words, categories of visits, and business names to the users who rated them, and the "pricey-ness" or cost, locations, and times to businesses and users. On each of these links, a 1-4 level is associated depending on the strength of the associations (e.g., measured statistically on a per-user and per-business basis, etc.). This constitutes the relation types. A count for each entity type is shown in Table 1 below.

TABLE 1

| Google Local KG Statistics | |
|---|---|
| Entity Type | Count |
| Users | 38,614 |
| Businesses | 26,922 |
| Business Name Words | 2,000 |
| Review Words | 5,000 |
| Business Categories | 650 |
| Priciness | 4 |
| Time | 23 |
| Location | 312 |
| Total Links | 7,325,614 |

In a Yelp Challenge Dataset, users rate businesses on a 0-5 scale with temporal, spatial, and textual context available for each review. This dataset is filtered with a criteria of at least 30 users per business and 10 businesses per user recursively, and to eliminate each review with less than a 3-star rating. The resulting filtered dataset may have 25,3695 users and 69,738 businesses, and the following contextual nodes are obtained: Users, Restaurants, Review Words, Business Attributes, Location nodes (e.g., states, cities, and latitude-longitude (binned using a KD-tree), and Temporal or time (e.g., binned into 6-hour chunks, month, day, etc.).

A knowledge graph is created by connecting each of the users to the restaurants that the user rated, the review words and attributes of the restaurants to each restaurant, the location nodes, the associated time nodes, and likewise for the users as well. On each of these links, a 1-4 level is associated depending on the strength of the associations (e.g., measured statistically on a per-user and per-business basis, etc.). This constitutes the relation types. A count for each entity type is shown in Table 2 below.

TABLE 2

| Yelp KG Statistics | |
|---|---|
| Entity Type | Count |
| Users | 20,750 |
| Restaurants | 75,871 |
| Review Words | 2,000 |
| Business Attributes | 200 |
| Time | 23 |
| Location | 1,062 |
| Total Links | 10,162,877 |

The following knowledge graph embedding baselines are used as a representative set to evaluate the edge completion task: TransE, DistMult, ComplEx, Rotate. The OpenKE implementations in Tensorflow/PyTorch with default parameter settings, wherever applicable, were also used.

For each dataset, a pair of task models that each have the same input entity-set (e.g., users, etc.), and different output entity sets (e.g., business category and businesses, respectively, etc.) is used for the analysis.

A distributional word2vec word-embedding model is trained on the set of review text words, business names, and each of the business attributes text over each of the reviews in the dataset. A version (e.g., non-transfer version, etc.) of the context-aware recommendation model disclosed by Adit Krishnan, Mahashweta Das, Mangesh Bendre, Hao Yang, and Hari Sundaram in the paper entitled "Transfer Learning via Contextual Invariants for One-to-Many Cross-Domain Recommendation" arXiv preprint arXiv:2005.10473 (2020), the entire contents of which are hereby incorporated by reference, is used with the non-textual categorical links of the users and businesses (as above) to form the context of each review. To predict business category/attribute words for each user, an average of review word set embeddings of that user is determined, and the average is mapped to the closest business category words as learned by the model. Note that to train the word2vec model, the review text is used as context for the business attribute text.

In each dataset, for the context-aware recommendation model, parameters with 200-dimensional embeddings and the Gensim implementation of word2vec with a maximum 10-length window may be used. Additional parameters, such as the discrepancy scaling in Equation (20) are tuned with an exponential grid-search approach ($e^{-5}$ to $e^0$). The knowledge graph and counterfactual residuals are trained with 200-dimensional embeddings, implemented in Tensorflow, and run on a Tesla K80 GPU. Table 3 below provides the overall link prediction results.

TABLE 3

Overall Link Prediction Results

| Link Type | User to Business | | User to Category | |
|---|---|---|---|---|
| Metric | R @ 5 | R @ 10 | R @ 5 | R @ 10 |
| TransE | 0.43 | 0.60 | 0.52 | 0.68 |
| RotatE | 0.59 | 0.72 | 0.65 | 0.80 |
| DistMult | 0.56 | 0.70 | 0.63 | 0.77 |
| CompleX | 0.57 | 0.70 | 0.61 | 0.76 |
| MutatE-F | 0.58 | 0.73 | 0.64 | 0.79 |
| MutatE-CF | 0.62 | 0.80 | 0.68 | 0.84 |

In each of the datasets, held-out links are attempted to be predicted using the embeddings learned by the models, as well as the embedding baselines. For each held-out link of the form $(e_1,r,e_2)$, several negative samples of the form $(e_1,r,\tilde{e}_2)$ and $(\tilde{e}_1,r,e_2)$ are created (e.g., with the same relation type and head and tail entity types, however, a randomly sampled entity for either the head or tail, etc.). The entire list of negative samples is ranked against the true link $(e_1,r,e_2)$ under each embedding model, and the Recall@K, NDCG@K values of the respective ranked lists are measured. Specifically, the Recall@5, Recall@10 for two types of held-out links—User→Business and User→Category word (Attribute in case of yelp), for a 100-length ranked list, are measured.

The two knowledge graphs are evaluated on a link completion task in which 20% of the user nodes are randomly tagged as held-out nodes, and for which two types of links are held out for the tagged users: half of the user-business links of the tagged users, and half of the user-business attribute/category word links of the tagged users. Note that these two link types directly correspond to the two task models used: the word2vec model predicts user-business category word links and the context-aware recommender predicts the user-business links.

Two variants or implementations of non-limiting embodiments or aspects of a model are presented: MUTATE-F, which only uses the factual nodes, and MUTATE-CF, which uses counterfactual enrichment for the held-out user set. Specifically, the top 5 words predicted by the word2vec model, and the top 5 businesses predicted by the recommender are used to form counterfactual user-business and user-word links. Each of the baseline embedding models is trained on the same knowledge graphs, and the same set of held-out links is attempted to be predicted using the trained embeddings of the baseline models.

Referring again to Table 3, the relative order of performance of the baselines is roughly as expected, DistMult performs somewhat weakly owing to the inverse nature of some relation types in the knowledge graphs across user-context-business paths. In contrast, the MUTATE-F base model is able to overcome this challenge, and performs comparably to the other baselines.

Further, the MUTATE-CF model strongly outperforms each of the competing models on the User-Word link prediction and User-Business link prediction tasks. This is unsurprising, because the two external task models, for example word2vec model and the context-aware recommendation model, are able to much better predict the missing links and enrich the graph, as compared to the heuristic or path-based link completion approach in the other baselines. Accordingly, it can be seen how the inductive biases of the specific models can be leveraged and, while the word2vec model is able to interpret the distributional properties of the review text, the context-aware recommender leverages the multiplicative predictors from the context features. Also, note that these two models only use data that is already used to construct the knowledge graphs, and do not depend on any external sources of data.

A co-training approach for the recommender model with the knowledge graph is now described. Specifically, predictions from these models for users are made, and these counterfactual links are used to update the knowledge graph embeddings, as described in Equation (19), and simultaneously, predictions from the updated embeddings for the users are made, and the updated embeddings are used to augment the loss function of the recommender model, as described in Equation (21). In this way, the model performance over only training the model in isolation may be improved.

Overregularizing the model, as well as underregularizing the model may be suboptimal. For example, co-training may proceed better when the regularizer $\lambda^j$ is set to an optimal balance.

The numbers in Table 4 below indicate the best performance improvements achieved for the recommender model under different settings of $\lambda^j$. A higher value of $\lambda^j$ means that the recommender model was more constrained by the knowledge graph, while a lower value means that more information flows from the model to the graph. Thus, we need an ideal tradeoff between the forward and reverse information flow.

TABLE 4

| $\lambda^j$ | $e^{-5}$ | $e^{-4}$ | $e^{-3}$ | $e^{-2}$ | $e^{-1}$ |
|---|---|---|---|---|---|
| Word2Vec | -5.6% | -1.3% | +8.1% | -4.9% | -18.6% |
| Context Recommender | +2.8% | -1.03% | +5.4% | -8.6% | -28.9% |

Figure 13:
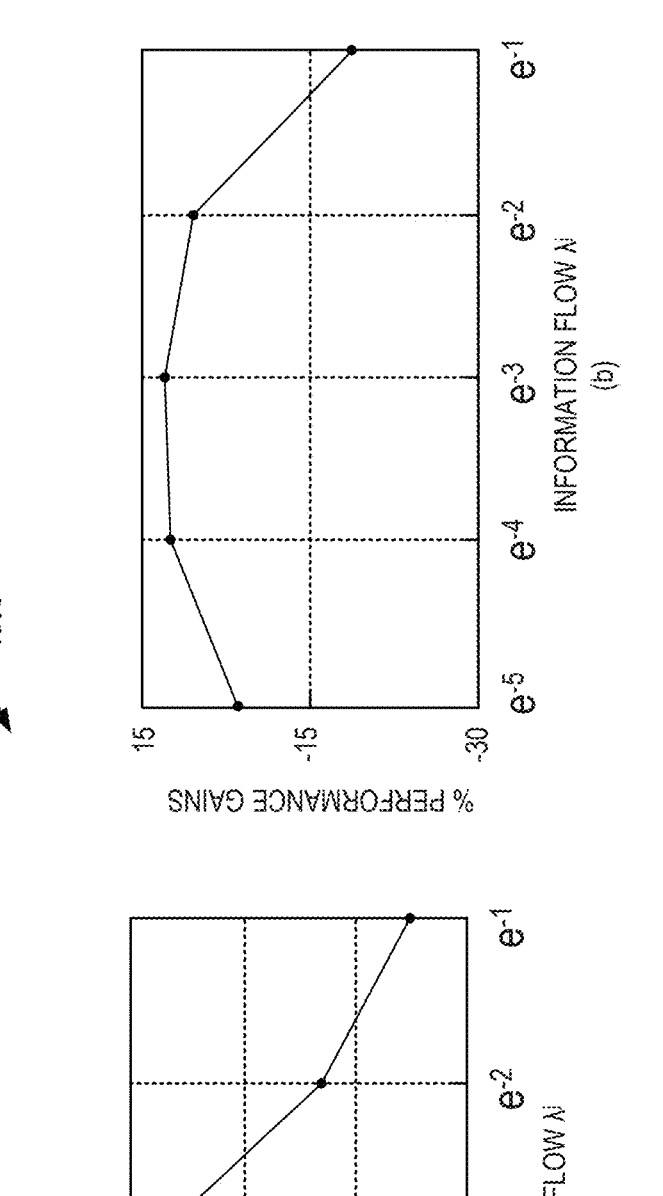
FIG. 13 is a graph showing cross-training performance gains of example models.

A cross-training approach for the recommender model by leveraging the word2vec model is now described. The word2vec model is trained on the base data, the trained word2vec model is used to update the knowledge graph embeddings by using the model to graph the knowledge transfer method described herein above, and the reverse direction is used to generate additional regularization for the recommender model (e.g., knowledge now flows from the update graph to the recommender model, etc.). For example, the overall direction of knowledge flow may be as follows: $M^{word2vec} \rightarrow$ Knowledge Graph $\rightarrow M^{context\text{-}aware\text{-}recommender}$. Because the review text is strongly informative of the user embeddings and is connected to the business embeddings owing to the shared link structure therebetween, noticeable performance gains for the recommender model (see Table 4) are achieved after leveraging the sequence of update-steps as described with the method for model-to-model cross-training. For example, FIG. 13 is a graph 1300 showing cross-training performance gains for the context-recommender with word2vec with respect to the parameter j set to varying values as in Equation (20). Information flow directions are: (a) $M^{word2vec} \rightarrow KG \rightarrow M^{context\text{-}aware\text{-}recommender}$ and (b) $M^{context\text{-}aware\text{-}recommender} \rightarrow KG \rightarrow M^{word2vec}$.

Figure 14:
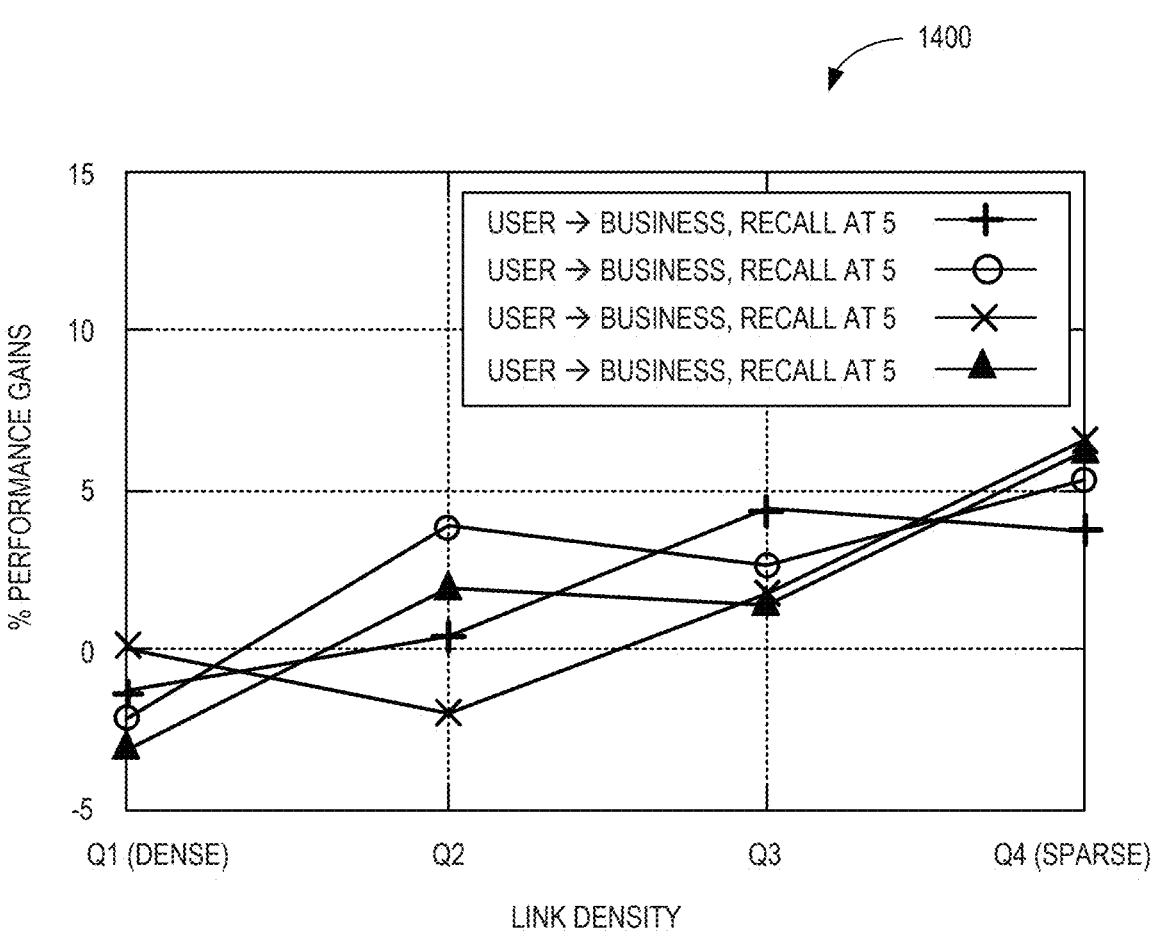
FIG. 14 is a graph showing relative performance gains of example models.

An impact of counterfactual updates on sparse and non-sparse nodes is now discussed. For example, for each of the example tasks, user-word link prediction and user-business link prediction, the relative gains obtained by counterfactual updates (e.g., the difference in performance of MUTATE-CF and MUTATE-F for the different sparsity sets are studied, etc.). $Q_1$, $Q_2$, $Q_3$ and $Q_4$ may denote the four sparsity quartiles for each respective user node, and the average performance difference between MUTATE and MUTATE-F may be measured for each quartile. For example, and referring now to FIG. 14, FIG. 14 is a graph 1400 showing performance gains of MUTATE-CF relative to MUTATE-F on the two types of link prediction. In each case, the performance gains across 4 quartiles of users are measured and arranged by the density of that specific type of link for the user. As expected, the strongest gains are obtained for sparse users (e.g., users in quartiles Q3/Q4, etc.) because the sparse users lack the word-associations to learn better node embeddings. Thus, the distributional knowledge encoded in the word2vec model can significantly bridge this gap in the knowledge graph and enrich the corresponding node embeddings.

Accordingly, non-limiting embodiments or aspects of the present disclosure may provide a novel framework to connect task-specific inductive models with knowledge graph completion and enrichment processes, in which models that predict links between distinct, potentially disconnected subsets of nodes in the knowledge graph are unified vis-a-vis the underlying node embedding space, permitting multi-directional knowledge transfer (e.g., model-to-graph, graph-to-model, model-to-model via graph, etc.) through counterfactual reasoning, and providing a highly generalizable framework that can integrate diverse tasks and model architectures through a common set of underlying knowledge embeddings and that can model different task-specific distributions with the same underlying knowledge graph via counterfactual residual learning.

Accordingly, non-limiting embodiments or aspects of the present disclosure provide a holistic view of knowledge graphs and multi-task learning that enables multi-directional transfer of knowledge between domain-specific knowledge graphs and task models without making assumptions about the nature of the specific task models, architectures, or objectives.

Further, non-limiting embodiments or aspects of the present disclosure provide a framework that is highly generalizable; no assumptions about the data-domain or the task models connected to the data-domain are made. As a result, very diverse tasks and model architectures of the tasks may be integrated through a common set of underlying knowledge embeddings. For example, this capability is exhibited herein with respect to two very distinct example models, one recommendation model connecting users and items, and a second item-content model that attempts to predict the most likely words to describe a specific item, for which it is shown that counterfactual updates obtained from the prediction model can be leveraged to significantly improve the recommendation model's performance for sparse users (e.g., the item-word links are leveraged to form user-item links, etc.).

Still further, non-limiting embodiments or aspects of the present disclosure may identify a connection between multi-task knowledge graph updates and covariate domain shift theory, which enables modeling different task-specific distributions with the same underlying knowledge graph via residual learning, in a very inexpensive manner.

Scalable Knowledge Graph Embedding Learning

Non-limiting embodiments or aspects of the present disclosure may further address a problem of representing very large heterogeneous graphs into low dimensional space (e.g., learning high-quality node embeddings for graphs with billions of nodes, and trillions of edges, etc.). The representation of graphs into low dimensional space may be referred to as graph embeddings, where each node in a graph may be shown as a vector in low dimensional space. In graph analytics, effective representations for nodes are desired, as these representations largely determine the performance of many downstream tasks such as visualization, node classification, link prediction, recommendation, and/or the like. There is a growing interest in unsupervised learning of graph representations, which is aimed at preserving the structure of graphs in a low-dimensional space. For example, there are various existing efforts on graph embeddings, which mainly perform well on small-size graphs with a million nodes and a few hundred millions edges. However, adapting graph embedding methods to very large graphs remains very challenging. With such large graphs, which may contain billions of nodes and trillions of edges, these existing methods become inefficient. For example, a challenge associated with most existing methods is scalability. As an example, there is a need to scale graph embedding methods for learning feature representation of large graphs while preserving the property of arbitrary types of graphs: undirected, directed and/or weighted, homogeneous/heterogeneous.

A challenge associated with graph embedding is memory utilization. Most existing methods for graph embeddings assume that all nodes, edges, attributes, even augmented graphs, and embedding matrices for the training, can be fit into a main memory, which is an assumption that ignores the real world graphs, where these graphs are often stored in a distributed fashion. Non-limiting embodiments or aspects of the present disclosure provide an improved model for reading and generating samples from large graphs for achieving memory utilization and consequently scalability.

Another challenge associated with graph embedding is computation. Training embeddings for massive graphs is computationally intensive. Most existing frameworks suffer from high computation exposed by big graphs. A popular existing method is to leverage the power of GPUs in a hybrid system. For building an efficient framework, considering the limitation of GPUs, such as memory, bus bandwidth, and synchronization cost, is a vital factor. Non-limiting embodiments or aspects of the present disclosure provide a hybrid CPUs-GPUs system that may collaborate on preparing input for training and computation to deliver speedup for the computation part of graph embedding.

A further challenge associated with graph embedding is data skew. Large-scale graphs may show high data skew, which is often ignored in existing frameworks. Data skew in graph representation learning can result in low quality embeddings. Non-limiting embodiments or aspects of the present disclosure provide a model that more effectively represents nodes in high-skew data by considering data skew in embeddings training, and that mitigates the effect of data skew by introducing a new sampling mechanism that imposes a decision on accepting a sample from high or low frequent nodes for training.

A still further challenge associated with graph embedding is an input graph. Generally, undirected graphs may be the primary input of many representation learning algorithms. However, many real-world graphs have complex multi-model or multi-structures that cannot be effectively represented by existing methods. This complexity may arise from having heterogeneous nodes and various edge types in the real network. Non-limiting embodiments or aspects of the present disclosure provide an efficient system model that addresses this heterogeneity by leveraging different encoders for node types and edge types and changing the objective function in order to distinguish and apply the complex information in the learning process.

A graph (e.g., a layer of a graph, a base knowledge graph, a fact layer for a multi-layer knowledge graph, etc.) may be defined as $G=(V, E)$, where $v \in V$ is a node and $e \in E$ is an edge. A set of node types and a set of edge types may be respectively denoted by $S_v$ and $S_e$. Each node $v_i \in V$ may belong to one type of node, and $e_i \in E$ may be a particular type of edge. For homogeneous graphs, $|S_v|=|S_e|=1$, meaning that all nodes belong to one type and all edges belong to one type. For heterogeneous graphs, $|S_v|>1$ and/or $|S_e|>1$, meaning that there are different types of nodes and/or different types of edges.

Given a graph $G=(V, E)$, a goal of embedding may be to learn a low-dimensional representation for each node $v \in V$. The learned embeddings may be expected to capture the structure of the graph. For example, an embedding process may traverse the graph and perform training on the samples obtained from the graph. The embedding process may load the graph with all nodes and edges into main memory with $O(V+E)$ space. After loading the graph, the embedding process may perform a random walk from a randomly picked node. Most existing embedding methods train graph embeddings on the positive edges (e.g., obtained samples) against some randomly negative edges. Once the graph is sampled, graph embeddings are trained on the samples. Typically, there are two sets of embeddings, for example: vertex embedding matrix and context embedding matrix. For an edge sample (u, v), the dot product of vertex[u] and context[v] may be computed to predict whether the sample is a positive edge or drawn from negative samples. This encourages neighbor nodes to have close embeddings, whereas distant nodes may have very different embeddings. Non-limiting embodiments or aspects of the present disclosure may bound a memory requirement by the number of nodes, which is $O(V)$, and provide an optimization that leverages auxiliary information from a pre-processing step and reduces the memory utilization to $O(1)$. For homogeneous graphs, non-limiting embodiments or aspects of the present disclosure may use a method disclosed by J. Tang, M. Qu, M. Wang, M. Zhang, J. Yan, and Q. Mei in the paper entitled "LINE: Large-scale information network embedding," in *Proceedings of the 24th international conference on world wide web*, pp. 1067-1077, 2015, the entire contents of which are incorporated by reference, which is basically trying to use two joint probability distribution for each pair of nodes (u, v), and minimizes the Kullback-Leibler (KL) divergence of the distributions (distance measure between two probability distributions).

As previously noted, a problem with existing embedding frameworks is scalability. There are many existing efforts on graph embeddings that mainly perform well on small-sized graphs. However, larger graphs pose an extra challenge to the existing embedding methods by including billions of nodes and trillions of edges, where each edge can represent various connections between nodes. Existing embedding frameworks cannot scale efficiently to this size of data. A first bottleneck may be a memory requirement which is exposed by augmenting the graph. The original graph and the augmented graph are stored in the main memory, which may prevent processing large graphs due to a memory limitation. Another problem with existing methods arises when accuracy is not kept at an acceptable level while processing large graphs. A further problem with scalability is the speed of training, but slow training speed may not be mitigated without efficient methods for graph traversing at a large scale.

In existing embedding methods, a first stage of graph embeddings is to sample the graphs using random walks. For this reason, existing methods put the original graph into main memory to mitigate the effect of random access memory caused by random walks. The resulting graph, for example, an augmented graph, may be in order of magnitude larger than the original size of the graph. Therefore, loading large-scale graphs into main memory may be impossible if the original graph is already very large.

By recognizing this as a problem of scalability, non-limiting embodiments or aspects of the present disclosure provide a parallel online reading, which may generate edge samples on the fly similar to breadth first search (BFS). Non-limiting embodiments or aspects of the present disclosure may generate edge samples from the graphs without the need to store them in the main memory, which may result in an ability to process very large graphs. For example, in prepossessing, a frequency of each node may be obtained for later sampling purposes. In an online parallel manner, each thread may be assigned to an equal portion of the graph. For the number of epochs, each of the edges may be drawn one-by-one. In each epoch, each thread may retrieve an edge from the file (and/or portion of the file loaded in the main memory) and, before sending the edge for training, consider the edge for sub-sampling and/or over-sampling with a probability proportional to the degree of each node of that edge. In contrast, existing methods ignore low frequent nodes and over represent high frequent nodes. The samples related to low frequent nodes may be replicated in a shared pool and represented in the training input for a number of times proportional to a degree of the node. By using the shared pool, non-limiting embodiments or aspects of the present disclosure may avoid sending the same edge sample in a correlated pattern. As a result of this randomness for low frequent nodes, a substantially similar quality of embeddings may be obtained for each of the nodes, and a number of edges for high frequent nodes may be reduced in a training process in order to mitigate the effect of over-representing the high frequent nodes.

In this way, instead of keeping entire graphs inside main memory, which causes scalability issues, non-limiting embodiments or aspects of the present disclosure may read the original graphs in parallel manner. It is noted that care should be taken to use the cache memory efficiently, because the pattern of reading is not random. However, this randomness helps to assure the accuracy of embedding vectors. Accordingly, non-limiting embodiments or aspects of the present disclosure provide a pseudo-randomness for sending computations to GPUs to address this cache-based issue.

Further, non-limiting embodiments or aspects of the present disclosure may save auxiliary information obtained from the graph in preprocessing, such as frequency of nodes and edges (e.g., which is used for sampling strategy), and/or the like, with the edges in a new file and/or the original graph, thereby enabling this auxiliary information to be further removed from the main memory and memory consumption to be reduced to O(1).

Many existing graph embedding frameworks are not designed to work with heterogeneous graphs, in which nodes can be different types and weights on edges can show various connections. Non-limiting embodiments or aspects of the present disclosure may provide a framework that is compatible with heterogeneous graphs, and in which graphs can be either directed or undirected and weights of edges can be real values or reflect different relationships.

Figure 15:
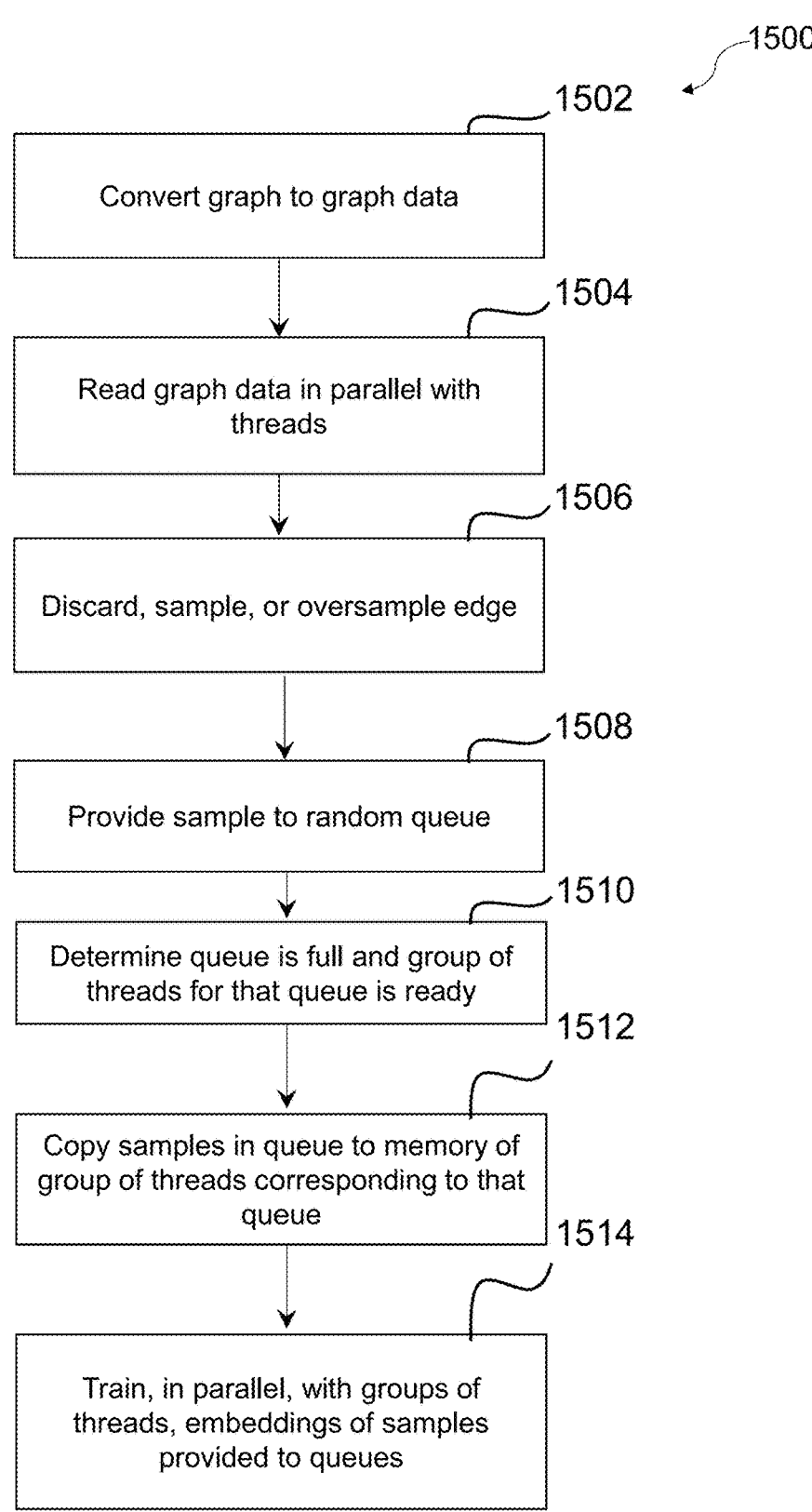
FIG. 15 is a flowchart of non-limiting embodiments or aspects of a process for scalable graph embedding learning.

Referring now to FIG. 15, FIG. 15 is a flowchart of non-limiting embodiments or aspects of a process 1500 for scalable graph embedding learning. In some non-limiting embodiments or aspects, one or more of the steps of process 1500 may be performed (e.g., completely, partially, etc.) by transaction service provider system 108 (e.g., one or more devices of transaction service provider system 108). In some non-limiting embodiments or aspects, one or more of the steps of process 1500 may be performed (e.g., completely, partially, etc.) by another device or a group of devices separate from or including transaction service provider system 108, such as merchant system 102, (e.g., one or more devices of merchant system 102), payment gateway system 104 (e.g., one or more devices of payment gateway system 104), acquirer system 106 (e.g., one or more devices of acquirer system 106), transaction service provider system 108 (e.g., one or more devices of transaction service provider system 108, etc.), issuer system 110 (e.g., one or more devices of issuer system 110), and/or user device 112.

As shown in FIG. 15, at step 1502, process 1500 includes converting graph-to-graph data. For example, transaction service provider system 108 (e.g., at least one processor of transaction service provider system 108, etc.) may convert, using a hash table, graph-to-graph data associated with a plurality of edges of the graph. As an example, and referring also to FIG. 16, which is a diagram of an implementation 1600 of non-limiting embodiments or aspects of a process for scalable graph embedding learning, at least one central processing unit (CPU) may convert, using a hash table, a graph to graph data associated with a plurality of edges of the graph. In such an example, the graph data associated with the plurality of edges of the graph may include frequencies of the plurality of edges and frequencies of nodes for the plurality of edges (e.g., auxiliary information, etc.).

As shown in FIG. 15, at step 1504, process 1500 includes reading, in parallel, with a plurality of threads, graph data. For example, transaction service provider system 108 (e.g., at least one processor of transaction service provider system 108, etc.) may read, in parallel, with a plurality of threads, graph data associated with a plurality of edges and a plurality of nodes for the plurality of edges of a graph. As an example, and referring also to FIG. 16, at least one CPU may read, in parallel, with a plurality of threads, graph data associated with a plurality of edges and a plurality of nodes for the plurality of edges of a graph. In such an example, each thread of the plurality of threads may access a specified part of the graph.

As shown in FIG. 15, at step 1506, process 1500 includes, for each edge of a plurality of edges, discarding, sampling, or oversampling that edge. For example, transaction service provider system 108 (e.g., at least one processor of transaction service provider system 108, etc.) may, for each edge of the plurality of edges, with a thread of the plurality of threads that reads the graph data associated with that edge, one of: (i) discard that edge, (ii) sample that edge to generate one or more samples, and (iii) oversample that edge to generate the one or more samples, based on frequencies of nodes for that edge. As an example, and referring also to FIG. 16, at least one CPU may, for each edge of the plurality of edges, with a thread of the plurality of threads that reads the graph data associated with that edge, one of: (i) discard that edge, (ii) sample that edge to generate one or more samples, and (iii) oversample that edge to generate the one or more samples, based on frequencies of nodes for that edge. In such an example, each thread may determine whether to discard, sample, or oversample an edge based on the auxiliary information (e.g., frequencies of the plurality of edges and frequencies of nodes for the plurality of edges, etc.).

In some non-limiting embodiments or aspects, the plurality of nodes may include a plurality of different types of nodes, and for each edge of the plurality of edges, the thread of the plurality of threads that reads the graph data associated with that edge may determine to perform the one of: (i), (ii), and (iii) in step 1506 of process 1500 based on the frequencies of the nodes for that edge only with respect to frequencies of other nodes of a same type of node of the plurality of different types of nodes. For example, as previously described herein, auxiliary information may be retrieved with the edges in an online fashion using the hash table. Accordingly, memory utilization may be bounded solely by the size of a shared memory assigned for oversampling (e.g., for an oversampling mechanism, etc.).

In contrast to existing edge sampling methods, non-limiting embodiments or aspects of the present disclosure provide a cache efficient method that guarantees scalability. An edge with the probabilities proportional to the frequency of its nodes may be considered, and a determination is made of whether to keep the edge for training, repeat the edge multiple times (e.g., oversample the edge, etc.), or discard the edge for model updating. Given this determination, the edges for low frequent nodes may be collected in a separate shared memory. Because source and destination for sampling strategy may be considered in two different steps, the same edge may be discarded for a high frequent node of that edge and over-sampled for a low frequent node of that edge. This sampling strategy for low frequent nodes and high frequent nodes may be extended to heterogeneous graphs, where each node type is considered against the same type of nodes (and similarly for edge types), thereby guaranteeing that each type of node is only considered among similar nodes, where the graph shows data skew at different levels for each type (same for edge type). The shared memory containing samples for low frequent nodes may be accessible by each thread of the plurality of threads, which may result in pseudo-randomness for these samples and consequently better embedding quality. A representation factor (e.g., a repeat factor, etc.) for low frequent nodes proportional to a degree of the low frequent nodes may be used as a parameter for the model (e.g., as an auto-tune parameter, as an input to the model/program, etc.) to indicate that a node with the lowest frequency has its corresponding samples (e.g., edges, etc.) for a longer time (e.g., for more times selection for training, etc.) in the shared memory compared to the nodes with a higher degree. However, low frequent nodes may be processed as many times as most of the nodes with a similar type.

As shown in FIG. 15, at step 1508, process 1500 includes providing samples to a random queue of a plurality of queues. For example, transaction service provider system 108 (e.g., at least one processor of transaction service provider system 108, etc.) may, for each edge of the plurality of edges, if sampling or oversampling that edge (e.g., if not discarding that edge, etc.), provide the one or more samples generated by sampling or oversampling that edge to a random queue of a plurality of queues. As an example, and referring also to FIG. 16, the at least one CPU may, for each edge of the plurality of edges, if sampling or oversampling that edge (e.g., if not discarding that edge, etc.), provide the one or more samples generated by sampling or oversampling that edge to a random queue of a plurality of queues. In such an example, the plurality of queues may correspond to a plurality of groups of threads.

Figure 16:
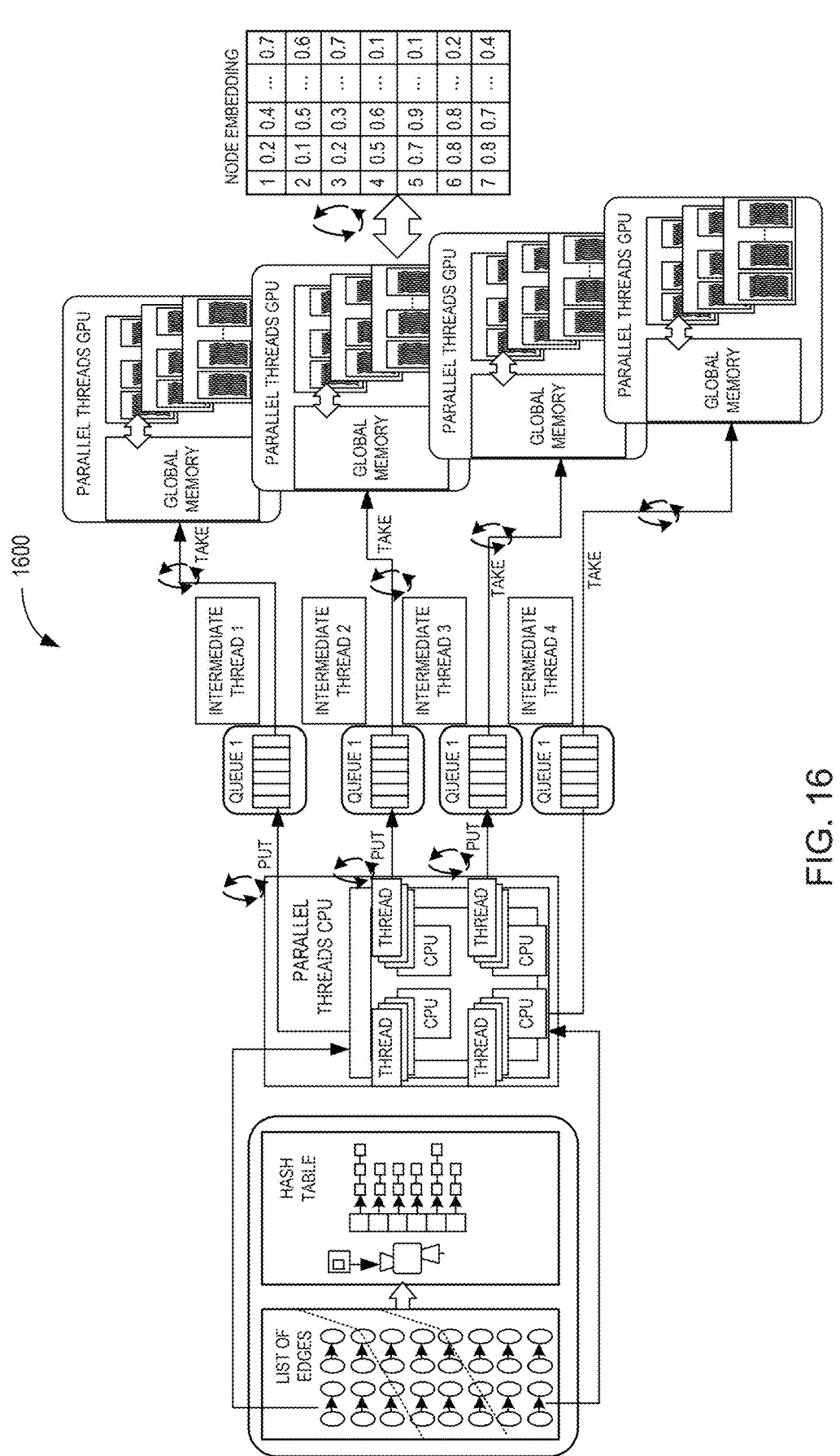
FIG. 16 is a diagram of an implementation of non-limiting embodiments or aspects of a process for scalable graph embedding learning.

Randomness in training data helps in optimization. Non-limiting embodiments or aspects of the present disclosure may introduce randomness in training by each thread of the plurality of threads randomly picking a queue of the plurality of queues to provide the one or more samples generated by sampling or oversampling an edge. If a randomly selected queue is currently full, another queue of the plurality of queues may be randomly selected to receive the one or more samples. For example, transaction service provider system 108 (e.g., at least one processor of transaction service provider system 108, etc.) may use a pseudo random technique that shuffles correlated samples while training the graph in epochs, which may ensure that the effect of correlated samples is mitigated, In some non-limiting embodiments or aspects, and referring again to FIG. 16, the at least one CPU may execute the plurality of threads, and a different graphics processing unit (GPU) of a plurality of GPUs may execute each group of threads of the plurality of groups of threads. For example, at least one processor of transaction service provider system 108 may include at least one CPU (e.g., a plurality of CPUs as shown in FIG. 16, etc.), and at least one other processor of transaction service provider system 108 may include a plurality of GPUs. As an example, each CPU of a plurality of CPUs may include or execute a subset of threads of the plurality of threads (e.g., a different subset of threads of the plurality of threads than the other CPUs of the plurality of CPUs, etc.), and each GPU of the plurality of GPUs may include or execute a different group of threads of the plurality of groups of threads than the other GPUs of the plurality GPUs.

In some non-limiting embodiments or aspects, providing one or more samples generated by sampling or oversampling an edge to a random queue of a plurality of queues may further include: for each of the one or more samples, determining (e.g., with at least one processor of transaction service provider system 108, with the at least one CPU, etc.) a distance between that sample and a negative sample including at least one of a different node than that sample, a same node having a different node type than the same node of that sample, and a same edge having a different edge type than the same edge of that sample; and in response to determining that the distance satisfies a threshold distance, providing (e.g., with at least one processor of transaction service provider system 108, with the at least one CPU, etc.) the negative sample to the random queue of the plurality of queues. For example, negative sampling for nodes and edge type may be used for optimizing an objective function for heterogeneous graphs, which enables returning feature representations that increase or maximize a likelihood of preserving graph neighborhoods of nodes in a d-dimensional feature space. As an example, for heterogeneous graphs with different edge types and node types, non-limiting embodiments or aspects of the present disclosure may generate negative samples from nodes and edges that do not exist in the original graphs, with the positive sample being trained against the negative samples.

It is desirable to avoid generating negative edge types that exist in the original graphs for corresponding nodes. Existing methods may attempt to prevent this mistake by traversing the entire graph and checking for the negative samples and negative edge type. However, such an approach may be extremely difficult and/or impossible due to complexity and time and space limitations. Non-limiting embodiments or aspects of the present disclosure may, for each positive sample, choose from all the other nodes and edge types to generate negative samples. For example, because a number of edges and a number of node types are significantly smaller than the total size of nodes in the entire graph, transaction service provider system 108 (e.g., at least one processor of transaction service provider system 108, etc.) may rapidly inspect the embeddings of various edge types and compare them with the edge type of the positive edge. If the distance of two embeddings are considerable, transaction service provider system 108 (e.g., at least one processor of transaction service provider system 108, etc.) may consider that edge type as a negative edge (e.g., generate a negative sample with the same nodes but different edge types, etc.). Inversely, if the embeddings of two edges are close enough, transaction service provider system 108 (e.g., at least one processor of transaction service provider system 108, etc.) may not accept the edge type as a negative sample. Transaction service provider system 108 (e.g., at least one processor of transaction service provider system 108, etc.) may repeat the same process for node types. Accordingly, non-limiting embodiments or aspects of the present disclosure may apply three different mechanisms for generating negative samples by choosing a different node, edge type, or node type.

Existing graph embedding methods typically sample negative edges from all possible nodes. However, it is very time consuming if GPUs have to communicate with each other to get embeddings of negative samples. To avoid this time cost, non-limiting embodiments or aspects of the present disclosure may prepare samples for positive edges along with negative candidates in advance and put the positive edge samples and the negative samples in parallel queues in a random manner. For example, each parallel queue may be assigned to one (e.g., a single, etc.) compute unified device architecture (CUDA) stream in a GPU and, if the GPU is busy training a previous batch of samples, the samples in the queue may be stored for a next kernel call of that GPU. This parallel training across the plurality of GPUs enables different GPUs to train node embeddings concurrently, with synchronization being performed only after training each batch of samples, thereby avoiding the time cost associated with the GPUs communicating with each other to get embeddings of negative samples during training. However, it is noticed that embeddings matrices are also shared between CPUs and GPUs. In parallel negative sampling, the positive samples and the negative samples are prepared in queues and assigned to GPUs. The size of queues is obtained with respect to a memory of a GPU and how frequently synchronization is performed. Thus, instead of copying entire embedding matrices to a GPU memory, non-limiting embodiments or aspects of the present disclosure may transfer a portion of the entire embeddings matrices by a small granularity. In this way, the memory cost of edge samples on GPUs becomes negligible.

As shown in FIG. 15, at step 1510, process 1500 includes determining that a queue is at full capacity and a group of threads corresponding to that queue is ready. For example, transaction service provider system 108 (e.g., at least one processor of transaction service provider system 108, etc.) may determine that a queue is at full capacity and a group of threads corresponding to that queue is ready. As an example, the plurality of queues corresponding to the plurality of groups of threads may further correspond to a plurality of intermediate threads. In such an example, and referring also to FIG. 16, the at least one CPU, may, for each queue of the plurality of queues, with an intermediate thread of the plurality of intermediate threads corresponding to that queue, determine that (i) the queue is at full capacity and (ii) the group of threads corresponding to that queue is ready for a next batch of training samples.

As shown in FIG. 15, at step 1512, process 1500 includes copying samples in a queue to a memory of a group of threads corresponding to that queue. For example, transaction service provider system 108 (e.g., at least one processor of transaction service provider system 108, etc.) may copy samples in a queue to a memory of a group of threads corresponding to that queue. As an example, and referring also to FIG. 16, the at least one CPU may, for each queue of the plurality of queues, with an intermediate thread of the plurality of intermediate threads corresponding to that queue, in response to determining that (i) the queue is at full capacity and (ii) the group of threads corresponding to that queue is ready for the next batch of training samples, copy the samples provided to that queue from that queue to a memory of the group of threads corresponding to that queue.

For example, a set of dedicated threads (e.g., the intermediate threads, etc.) may monitor or check the plurality of queues and the plurality of GPUs at the same time. If a queue is at full capacity (e.g., a queue cannot receive or store additional samples, etc.) and a GPU is ready for a next batch of training samples of the plurality of samples, a thread for that queue copies the samples from the queue to the memory of the GPU. Otherwise, threads may wait for signals from each of the queues and the GPUs to repeat this process. Each queue and GPU may be monitored or handled by one (e.g., single, etc.) intermediate thread, and this monitoring may be replicated by each of the intermediate threads.

Non-limiting embodiments or aspects of the present disclosure may transfer more data to the GPUs, but enable the multi-core CPUs to handle parsing of input while the GPUs need only handle floating point operations, which may be a bulk of the work. The CPU to GPU memory transfer latency may be hidden and overlapped by the amount of time a GPU takes to complete the floating point operations. Further, by having a diverse set of training data in each batch, issues relating to accuracy may be solved.

As shown in FIG. 15, at step 1514, process 1500 includes training, in parallel, with a plurality of groups of threads, a plurality of embeddings of a plurality of samples provided to a plurality of queues. For example, transaction service provider system 108 (e.g., at least one other processor of transaction service provider system 108, etc.) may train, in parallel, with the plurality of groups of threads, a plurality of embeddings of a plurality of samples provided to the plurality of queues. As an example, and referring also to FIG. 16, the plurality of GPUs may train, in parallel, with the plurality of groups of threads, a plurality of embeddings of a plurality of samples provided to the plurality of queues.

In such an example, the plurality of GPUs may perform the parallel computations by thousands of light-weight threads for training embeddings of the plurality of samples. The embeddings for nodes and edges may be pulled from the shared memory and may be accessible by each of the GPUs of the plurality of GPUs. When each GPU finishes a computation (e.g., finishes training on a batch of samples, etc.), that GPU may copy the embedding vectors to the shared memory and receive a next batch of samples from a queue of the plurality of queues.

In some non-limiting embodiments or aspects, training (e.g., with the at least one other processor of transaction service provider system 108, with the plurality of GPUs, etc.), in parallel, with the plurality of groups of threads, the plurality of embeddings includes: for each queue of the plurality of queues, generating, with a group of threads of the plurality of groups of threads corresponding to that queue, node embeddings for two nodes and an edge embedding for an edge connecting the two nodes, based on samples provided to that queue, using an objective function that depends on embeddings of two nodes and an embedding of an edge connecting the two nodes; and storing, in a shared memory, with each group of threads of the plurality of groups of threads, the embeddings generated by that group of threads.

In some non-limiting embodiments or aspects, the objective function may be defined according to the following equation (26):

$$L = \sum_{R_r \in R} \sum_{(e_1, r, e_2) \in R_r} \sigma\left(r\left(\vec{e}_1 \otimes \vec{e}_2\right)\right)$$

where $\vec{e}_1$, $\vec{e}_2$, and r respectively denote an embedding representation of the two intermediate nodes and the connecting edge of the two intermediate nodes, and wherein $\sigma(x)=1/(1+e^{-x})$). For example, optimizing this objective function results in embeddings for the two nodes and their relation.

Defining an objective function for learning embeddings for heterogeneous graphs is a challenge that involves a trade-off in computational efficiency and predictive accuracy. Existing techniques fail to define and optimize a reasonable objective for scalable learning of heterogeneous graphs. Edges on graphs may represent different connections between nodes. Despite existing methods for handling graphs with weighted edges, there is the challenge of dealing with different types of edges, for example, providing embedding vectors for these different types of edges, as well as for the different types of nodes. Non-limiting embodiments or aspects of the present disclosure provide a novel objective function that overcomes the complexity of heterogeneity, provides computationally efficient optimization, and results in an acceptable accuracy similar to homogenous graphs (or even higher). For example, using non-limiting embodiments or aspects of an objective function, an edge type may be brought into training, and embedding vectors for the edge type may be created in the graph and for different types of vertices with feature representations of individual nodes being extended to the edges.

In order to accelerate training of node embeddings, non-limiting embodiments or aspects of the present disclosure may leverage the power of GPUs. For example, referring again to FIG. 16, non-limiting embodiments or aspects of the present disclosure may use CPUs and GPUs for training node embeddings. A majority of execution time may be spent on training embeddings, and non-limiting embodiments or aspects of the present disclosure thus provide a hybrid CPUs-GPUs system for training graph embeddings. The training of node embeddings involves much more memory access per computation, which results in mini-batch Sarcastic Gradient Descent (SGD) suffering from severe memory latency on the bus before SGF can benefit from fast GPU computation. Non-limiting embodiments or aspects of the present disclosure provide a system that leverages distinct advantages of CPUs and GPUs and uses these advantages in a collaborative manner to hide these bottlenecks.

In graph embeddings, edges may be utilized as input for training. Because GPUs are highly parallelizable, non-limiting embodiments or aspects of the present disclosure may divide the task of training into at least two different stages. In a training stage, the training task may be divided into parallel queues and each queue may be distributed to a GPU of the plurality of GPUs. For example, in CPUs, parallel threads prepare the inputs for some empty queues and at the same time, when GPUs finish computation for a previous portion of sample data, another set of parallel threads put these data into GPU memory and call a next kernel launch for the corresponding GPU.

In a second stage of the training, multiple GPUs work on learning the embedding for different samples. The embedding training in the GPUs may be designed with no sharing of data between the GPUs during the embedding training in order to remove the synchronization cost among GPUs. Due to GPU memory limitations and the large size of real graphs, embedding matrices may not be stored on GPUs. Instead, this problem of limited GPU memory may be solved by each GPU only storing the subset of node embeddings corresponding to the current samples being trained. As a result, each of the vertex embedding matrices and context embedding matrices may be stored in the main memory and transferred to the GPUs in small parts or batches during training. For example, after completing of training samples by each GPU, that GPU updates the corresponding embedding matrices stored in shared memory accessible by the CPUs and the GPUs. If multiple GPUs try to update the same node embedding, the average of each of the updates may be replaced by previous content, which may avoid the conflict and complexity of synchronization among the GPUs.

A limitation of GPUs is bus bandwidth. The computations of GPUs happens much faster than the transfer of data between CPU-GPU and GPU-GPU. In order to keep each of the CUDA cores of each GPU well-fed with training operations, greater parallelism is required. Threads in a multi-core CPU may parse the graph data and generate batches of training samples in multiple queues. To minimize an idle time and latency in each of the CPU and GPUs, multiple online queues that are ready to exchange a next batch of training data among CPUs and GPUs are provided for the GPUs. Threads in the multi-core CPUs may perform the parsing at the same time that the GPU is using floating point units to process training batches. A CPU thread may fill up a queue and, when a GPU finishes the training, data is iteratively passed to the GPU. Each thread in a CPU may work with a CUDA stream to send data and queue kernel launches when the buffer is filled. GPUs consequently pull corresponding embeddings from shared memory. Because GPUs do not share embeddings, multiple GPUs can perform gradient updates simultaneously. Each GPU may update its own embedding partitions using asynchronous stochastic gradient descent (ASGD), and each GPU may perform the batched matrix operations and vector updates in the model.

Accordingly, non-limiting embodiments or aspects of the present disclosure may provide a high-performance CPU-GPU hybrid system for graph embeddings learning that is suitable for arbitrary types of graphs and easily scales to hundreds of millions of nodes, a novel objective function for heterogeneous graphs that overcomes limitations tied to a particular sampling strategy and provides parameters to tune explored samples, and/or an edge selection process for improving or optimizing a quality of embedding for low and high frequent nodes that efficiently optimizes a graph-aware, neighborhood preserving objective using SGD.

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method comprising:

reading, with at least one processor, in parallel, with a plurality of threads, graph data associated with a plurality of edges and a plurality of nodes for the plurality of edges of a graph;

for each edge of the plurality of edges, with a thread of the plurality of threads that read the graph data associated with that edge, one of: (i) discarding that edge, (ii) sampling that edge to generate one or more samples and providing the one or more samples to a random queue of a plurality of queues, and (iii) oversampling that edge to generate the one or more samples and providing the one or more samples to the random queue of the plurality of queues, based on frequencies of nodes for that edge, wherein the plurality of queues corresponds to a plurality of groups of threads; and training, with at least one other processor, in parallel, with the plurality of groups of threads, a plurality of embeddings of a plurality of samples provided to the plurality of queues, wherein edges for lower frequent nodes having lower degrees in the graph than other nodes having higher degrees in the graph are collected in a shared memory that is accessible by each thread of the plurality of threads, and wherein, for each lower frequent node, each edge for that lower frequent node is represented in the training for a number of times proportional to a degree of that lower frequent node.

2. The computer-implemented method of claim 1, wherein at least one central processing unit (CPU) executes the plurality of threads, and wherein a different graphics processing unit (GPU) of a plurality of GPUs executes each group of threads of the plurality of groups of threads.

3. The computer-implemented method of claim 1, further comprising:

converting, with the at least one processor, using a hash table, the graph to the graph data associated with the plurality of edges of the graph, wherein the graph data associated with the plurality of edges of the graph includes frequencies of the plurality of edges and frequencies of nodes for the plurality of edges.

4. The computer-implemented method of claim 1, wherein the plurality of nodes includes a plurality of different types of nodes, and wherein for each edge of the plurality of edges, the thread of the plurality of threads that read the graph data associated with that edge determines to perform the one of: (i), (ii), and (iii) based on the frequencies of the nodes for that edge only with respect to frequencies of other nodes of a same type of node of the plurality of different types of nodes.

5. The computer-implemented method of claim 1, wherein providing the one or more samples to the random queue of the plurality of queues further includes:

for each of the one or more samples, determining, with the at least one processor, a distance between that sample and a negative sample including at least one of a different node than that sample, a same node having a different node type than the same node of that sample, and a same edge having a different edge type than the same edge of that sample; and in response to determining that the distance satisfies a threshold distance, providing, with the at least one processor, the negative sample to the random queue of the plurality of queues.

6. The computer-implemented method of claim 1, wherein training, with the at least one other processor, in parallel, with the plurality of groups of threads, the plurality of embeddings includes:

for each queue of the plurality of queues, generating, with a group of threads of the plurality of groups of threads corresponding to that queue, node embeddings for two nodes and an edge embedding for an edge connecting the two nodes, based on samples provided to that queue, using an objective function that depends on embeddings of two nodes and an embedding of an edge connecting the two nodes; and storing, in a shared memory, with each group of threads of the plurality of groups of threads, the embeddings generated by that group of threads.

7. The computer-implemented method of claim 6, further comprising:

for each queue of the plurality of queues:

determining, with the at least one processor, that (i) the queue is at full capacity and (ii) the group of threads corresponding to that queue is ready for a next batch of training samples; and in response to determining that (i) the queue is at full capacity and (ii) the group of threads corresponding to that queue is ready for the next batch of training samples, copying, with the at least one processor, the samples provided to that queue from that queue to a memory of the group of threads corresponding to that queue.

8. The computer-implemented method of claim 6, wherein the objective function is defined according to the following Equation:

$$L = \sum_{R_r \in R} \sum_{(e_1, r, e_2) \in R_r} \sigma\left(r\left(\vec{e}_1 \otimes \vec{e}_2\right)\right)$$

where entity types are represented as $E_1, E_2 \ldots E_{|\varepsilon|}$ where $\varepsilon = \{E_1, E_2 \ldots E_{|\varepsilon|}\}$ is a set of all entity types, $R = \{R_1, R_2, \ldots R_{|\varepsilon|}\}$ denotes a set of relations where each relation $R_r : E_1{}^r \to E_2{}^r$ is a collection of links between two entity types $E_1{}^r, E_2{}^r \in \varepsilon$, each edge is denoted as $(e_1, r, e_2)$ where $e_1 \in E_1{}^r$, $e_2{}^r \in E_2{}^r$ denotes head and tail entities, respectively, and r is a relation type of the head and tail entities, $\vec{e}_1$, $\vec{e}_2$ and r respectively denote an embedding representation of the two nodes and the connecting edge of the two nodes, $\sigma(x) = 1/(1+e^{-x})$, and $\otimes$ is an outer product of the embeddings $\vec{e}_1$, $\vec{e}_2$.

9. A system comprising:

at least one central processing unit (CPU) programmed and/or configured to:

read, in parallel, with a plurality of threads, graph data associated with a plurality of edges and a plurality of nodes for the plurality of edges of a graph; and for each edge of the plurality of edges, with a thread of the plurality of threads that read the graph data associated with that edge, one of: (i) discard that edge, (ii) sample that edge to generate one or more samples and provide the one or more samples to a random queue of a plurality of queues, and (iii) oversample that edge to generate the one or more samples and provide the one or more samples to the random queue of the plurality of queues, based on frequencies of nodes for that edge, wherein the plurality of queues corresponds to a plurality of groups of threads; and a plurality of graphics processing units (GPUs), wherein a different GPU of the plurality of GPUs executes each group of threads of the plurality of groups of threads, and wherein the plurality of GPUs are programmed and/or configured to:

train, in parallel, with the plurality of groups of threads, a plurality of embeddings of a plurality of samples provided to the plurality of queues, wherein edges for lower frequent nodes having lower degrees in the graph than other nodes having higher degrees in the graph are collected in a shared memory that is accessible by each thread of the plurality of threads, and wherein, for each lower frequent node, each edge for that lower frequent node is represented in the training for a number of times proportional to a degree of that lower frequent node.

10. The system of claim 9, wherein the at least one CPU is further programmed and/or configured to:

convert, using a hash table, the graph to the graph data associated with the plurality of edges of the graph, wherein the graph data associated with the plurality of edges of the graph includes frequencies of the plurality of edges and frequencies of nodes for the plurality of edges.

11. The system of claim 9, wherein the plurality of nodes includes a plurality of different types of nodes, and wherein for each edge of the plurality of edges, the thread of the plurality of threads that read the graph data associated with that edge determines to perform the one of: (i), (ii), and (iii) based on the frequencies of the nodes for that edge only with respect to frequencies of other nodes of a same type of node of the plurality of different types of nodes.

12. The system of claim 9, wherein the at least one CPU is further programmed and/or configured to provide the one or more samples to the random queue of the plurality of queues by:

for each of the one or more samples, determine a distance between that sample and a negative sample including at least one of a different node than that sample, a same node having a different node type than the same node of that sample, and a same edge having a different edge type than the same edge of that sample; and in response to determining that the distance satisfies a threshold distance, provide the negative sample to the random queue of the plurality of queues.

13. The system of claim 9, wherein the plurality of GPUs are programmed and/or configured to train, in parallel, with the plurality of groups of threads, the plurality of embeddings by:

for each queue of the plurality of queues, generating, with a group of threads of the plurality of groups of threads corresponding to that queue, node embeddings for two nodes and an edge embedding for an edge connecting the two nodes, based on samples provided to that queue, using an objective function that depends on embeddings of two nodes and an embedding of an edge connecting the two nodes; and storing, in a shared memory, with each group of threads of the plurality of groups of threads, the embeddings generated by that group of threads.

14. The system of claim 13, wherein the at least one CPU is further programmed and/or configured to:

for each queue of the plurality of queues:

determine, that (i) the queue is at full capacity and (ii) the GPU of the group of threads corresponding to that queue is ready for a next batch of training samples; and in response to determining that (i) the queue is at full capacity and (ii) the group of threads corresponding to that queue is ready for the next batch of training samples, copy the samples provided to that queue from that queue to a memory of the GPU of the group of threads corresponding to that queue.

15. The system of claim 13, wherein the objective function is defined according to the following Equation:

$$L = \sum_{R_r \in R} \sum_{(e_1, r, e_2) \in R_r} \sigma\left(r\left(\vec{e}_1 \otimes \vec{e}_2\right)\right)$$

where entity types are represented as $E_1, E_2 \ldots E_{|\varepsilon|}$ where $\varepsilon = \{E_1, E_2 \ldots E_{|\varepsilon|}\}$ is a set of all entity types, $R = \{R_1, R_2, \ldots R_{|R|}\}$ denotes a set of relations where each relation $R_r : E_1^r \to E_2^r$ is a collection of links between two entity types $E_1^r, E_2^r \in \varepsilon$, each edge is denoted as $(e_1, r, e_2)$ where $e_1 \in E_1^r$, $e_2 \in E_2^r$ denotes head and tail entities, respectively, and r is a relation type of the head and tail entities, $\vec{e}_1$, $\vec{e}_2$ and r respectively denote an embedding representation of the two nodes and the connecting edge of the two nodes, $\sigma(x) = 1/(1 + e^{-x})$, and $\otimes$ is an outer product of the embeddings $\vec{e}_1$, $\vec{e}_2$.

16. A computer program product comprising at least one non-transitory computer-readable medium including program instructions that, when executed by at least one processor, cause the at least one processor to:

read, in parallel, with a plurality of threads, graph data associated with a plurality of edges and a plurality of nodes for the plurality of edges of a graph;

for each edge of the plurality of edges, with a thread of the plurality of threads that read the graph data associated with that edge, one of: (i) discard that edge, (ii) sample that edge to generate one or more samples and provide the one or more samples to a random queue of a plurality of queues, and (iii) oversample that edge to generate the one or more samples and provide the one or more samples to the random queue of the plurality of queues, based on frequencies of nodes for that edge, wherein the plurality of queues corresponds to a plurality of groups of threads; and train, in parallel, with the plurality of groups of threads, a plurality of embeddings of a plurality of samples provided to the plurality of queues, wherein edges for lower frequent nodes having lower degrees in the graph than other nodes having higher degrees in the graph are collected in a shared memory that is accessible by each thread of the plurality of threads, and wherein, for each lower frequent node, each edge for that lower frequent node is represented in the training for a number of times proportional to a degree of that lower frequent node.

17. The computer program product of claim 16, wherein the at least one processor includes at least one central processing unit (CPU) and a plurality of graphics processing units (GPUs), wherein the at least one CPU executes the plurality of threads, and wherein a different GPU of the plurality of GPUs executes each group of threads of the plurality of groups of threads.

18. The computer program product of claim 17, wherein the plurality of groups of threads, train, in parallel, the plurality of embeddings by:

for each queue of the plurality of queues, generating, with a group of threads of the plurality of groups of threads corresponding to that queue, node embeddings for two nodes and an edge embedding for an edge connecting the two nodes, based on samples provided to that queue, using an objective function that depends on embeddings of two nodes and an embedding of an edge connecting the two nodes; and storing, in a shared memory, with each group of threads of the plurality of groups of threads, the embeddings generated by that group of threads.

19. The computer program product of claim 17, wherein the program instructions, when executed by the at least one CPU, cause the at least one CPU to:

for each queue of the plurality of queues:

determine, that (i) the queue is at full capacity and (ii) the group of threads corresponding to that queue is ready for a next batch of training samples; and in response to determining that (i) the queue is at full capacity and (ii) the group of threads corresponding to that queue is ready for the next batch of training samples, copy the samples provided to that queue from that queue to a memory of the group of threads corresponding to that queue.

20. The computer program product of claim 17, wherein an objective function is defined according to the following Equation:

$$L = \sum_{R_r \in R} \sum_{(e_1, r, e_2) \in R_r} \sigma\left(r\left(\vec{e}_1 \otimes \vec{e}_2\right)\right)$$

where entity types are represented as $E_1, E_2 \ldots E_{|\varepsilon|}$ where $\varepsilon = \{E_1, E_2 \ldots E_{|\varepsilon|}\}$ is a set of all entity types, $R = \{R_1, R_2, \ldots R_{|R|}\}$ denotes a set of relations where each relation $R_r : E_1^r \rightarrow E_2^r$ is a collection of links between two entity types $E_1^r, E_2^r \in \varepsilon$, each edge is denoted as $(e_1, r, e_2)$ where $e_1 \in E_1^r$, $e_2^r \in E_2^r$ denotes head and tail entities, respectively, and r is a relation type of the head and tail entities, $\vec{e}_1$, $\vec{e}_2$ and r respectively denote an embedding representation of the two nodes and the connecting edge of the two nodes, $\sigma(x) = 1/(1+e^{-x})$, and $\otimes$ is an outer product of the embeddings $\vec{e}_1$, $\vec{e}_2$.

\* \* \* \* \*